(12) United States Patent
Yoshida et al.

(10) Patent No.: US 8,968,094 B2
(45) Date of Patent: Mar. 3, 2015

(54) POWER MANAGEMENT APPARATUS, AND METHOD OF PROVIDING GAME CONTENTS

(75) Inventors: Asami Yoshida, Kanagawa (JP); Masanobu Katagi, Kanagawa (JP); Shiho Moriai, Kanagawa (JP); Tomoyuki Asano, Kanagawa (JP); Masakazu Ukita, Kanagawa (JP); Yohei Kawamoto, Tokyo (JP); Yu Tanaka, Tokyo (JP); Seiichi Matsuda, Tokyo (JP)

(73) Assignee: Sony Corporation, Tokyo (JP)

( * ) Notice: Subject to any disclaimer, the term of this patent is extended or adjusted under 35 U.S.C. 154(b) by 965 days.

(21) Appl. No.: 13/008,309

(22) Filed: Jan. 18, 2011

(65) Prior Publication Data

US 2011/0183733 A1 Jul. 28, 2011

(30) Foreign Application Priority Data

Jan. 25, 2010 (JP) .................. P2010-013677

(51) Int. Cl.
*A63F 13/12* (2006.01)

(52) U.S. Cl.
USPC .......................................... 463/42

(58) Field of Classification Search
USPC .......................................... 463/42
See application file for complete search history.

(56) References Cited

U.S. PATENT DOCUMENTS

2010/0050004 A1* 2/2010 Hamilton et al. ............. 713/320

FOREIGN PATENT DOCUMENTS

JP 2002-354560 12/2002

OTHER PUBLICATIONS

Naccache, D. et al., "Can D.S.A. be improved?—Complexity Trade-Offs with the Digital Signature Standard," Springer-Verlag, pp. 77-85, (1998).
Bellare, M. et al., "Fast Batch Verification for Modular Exponentiation and Digital Signatures," EUROCRYPT '98, LNCS 1403, pp. 236-250, (1998).
Boneh, D. et al., "Aggregate and Verifiably Encrypted Signatures from Bilinear Maps," EUROCRYPT 2003, LNCS, pp. 416-432, (2003).
Boneh, D. et al., "A Survey of Two Signature Aggregation Techniques," CryptoBytes, vol. 6, No. 2, pp. 1-33, (2003).

* cited by examiner

*Primary Examiner* — Omkar Deodhar
(74) *Attorney, Agent, or Firm* — Finnegan, Hendersan, Farabow, Garrett & Dunner, L.L.P.

(57) ABSTRACT

There is provided a power management apparatus including a game service providing unit providing, to an electronic appliance, a service using game contents whose theme is power. The game service providing unit includes a game control unit controlling execution of the game contents, a real world constructing unit constructing a setting of a game reflecting a real-world environment, based on managed appliance information stored in a database, and a virtual world constructing unit constructing a setting of the game reflecting a virtual environment, based on a setting set in advance in the game contents. The game control unit is operable to initialize the game contents by combining the setting of the game constructed by the real world constructing unit and the setting of the game constructed by the virtual world constructing unit.

8 Claims, 81 Drawing Sheets

FIG. 9

| COMPONENT | OVERVIEW OF MAIN FUNCTIONS |
|---|---|
| APPLIANCE MANAGEMENT UNIT 1121 | APPLIANCE REGISTRATION, APPLIANCE AUTHENTICATION, ID MANAGEMENT OF APPLIANCES, MANAGEMENT OF OPERATION SETTINGS/SERVICE SETTINGS OF APPLIANCES, GRASPING OF OPERATION STATE/USAGE STATE OF APPLIANCES, GATHERING OF ENVIRONMENTAL INFORMATION, GRASPING OF USAGE STATE (IN UNITS OF APPLIANCES, ENTIRE SYSTEM, OR SPECIFIC BLOCKS), ETC. |
| POWER TRADING UNIT 1122 | ACQUISITION OF MARKET TRADING DATA/INDIVIDUAL TRADING DATA, TIMING CONTROL OF SELL ORDERS/BUY ORDERS, EXECUTION OF SELL ORDERS/BUY ORDERS, MANAGEMENT OF TRADE LOG, ETC. |
| INFORMATION ANALYZING UNIT 1123 | ANALYSIS OF POWER GENERATION DATA, ANALYSIS OF POWER STORAGE DATA, LEARNING OF LIFE PATTERN, ANALYSIS OF POWER CONSUMPTION DATA (IN UNITS OF APPLIANCES, ENTIRE SYSTEM, OR SPECIFIC BLOCKS), ESTIMATION OF POWER CONSUMPTION PATTERN, ESTIMATION OF POWER STORAGE PATTERN, ESTIMATION OF POWER DISCHARGE PATTERN, ESTIMATION OF POWER GENERATION PATTERN, CALCULATION OF PRESENT $CO^2$ EMISSIONS, ESTIMATION OF FUTURE $CO^2$ EMISSIONS, CALCULATION OF POWER SAVING PATTERN, CALCULATION OF LOW $CO^2$ EMISSIONS PATTERN, CALCULATION OF APPLIANCE CONFIGURATION/APPLIANCE ARRANGEMENT TO PRODUCE POWER SAVING/LOW $CO^2$ EMISSIONS, ETC. |
| DISPLAY INFORMATION GENERATING UNIT 1124 | GENERATION OF INFORMATION RELATING TO APPLIANCES, INFORMATION RELATING TO POWER, INFORMATION RELATING TO ENVIRONMENT, INFORMATION RELATING TO TRADING DATA, INFORMATION RELATING TO ANALYSIS RESULTS, ETC. |
| SYSTEM MANAGEMENT UNIT 1125 | MANAGEMENT/UPDATE OF FIRMWARE VERSION, ACCESS RESTRICTIONS, ANTIVIRUS MEASURES, ETC. |

FIG. 12
116 : DISPLAY UNIT
| USAGE LOCATION | POWER CONSUMPTION | BILLED AMOUNT |
|---|---|---|
| LOCATION#1 | ＊＊＊ kW | ＊＊＊ YEN |
| LOCATION#2 | ＊＊＊ kW | ＊＊＊ YEN |
| LOCATION#3 | ＊＊＊ kW | ＊＊＊ YEN |
FIG. 13
116 : DISPLAY UNIT
| APPLIANCE ID | APPLIANCE TYPE | POWER CONSUMPTION |
|---|---|---|
| 0011 | AIR CONDITIONER | ▨▨ |
| 0012 | TV SET | ▨ |
| ⋮ | ⋮ | ⋮ |
| 0003 | ELECTRIC VEHICLE | ▨▨▨▨▨▨▨▩ |
 POWER USED OUTSIDE PRESENT SYSTEM
 POWER USED WITHIN PRESENT SYSTEM (A) EXAMPLE OF POWER CONSUMPTION PATTERN (B) EXAMPLE OF POWER CONSUMPTION PATTERN

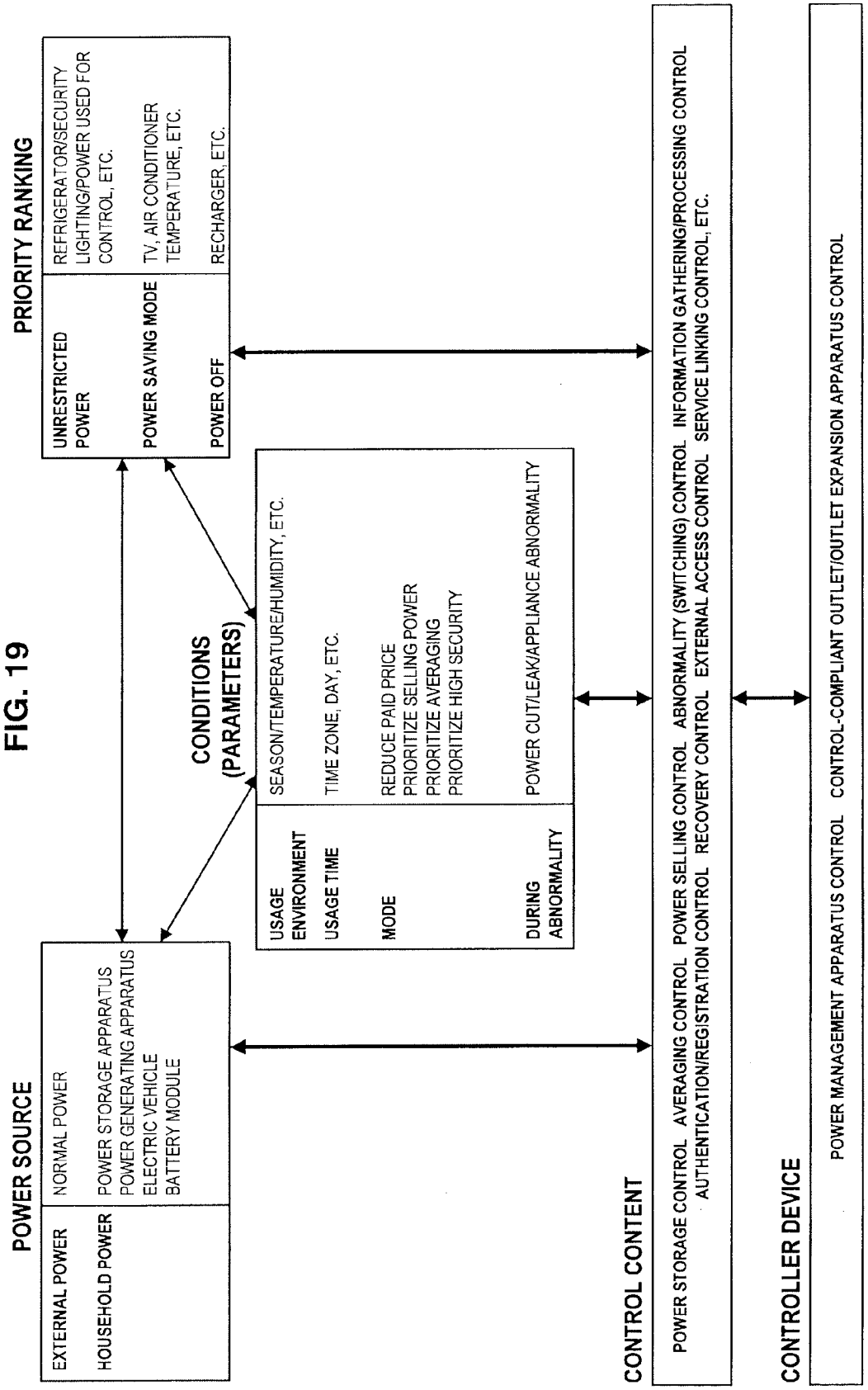

FIG. 20

| MANAGEMENT SERIAL No. | | |
|---|---|---|
| POWER MANAGEMENT APPARATUS-ID | MANUFACTURER/MODEL NUMBER | REGISTRATION DATE/EXPIRY DATE STATUS |
| POWER MANAGEMENT APPARATUS PUBLIC KEY | CERTIFICATE | CERTIFICATE ISSUE DATE STATUS |
| USER NAME | USER ADDRESS/TEL | BILLING INFORMATION STATUS |
| SETTING CONDITIONS IN POWER MANAGEMENT APPARATUS | | |
| EMERGENCY CONTACT DURING ABNORMALITIES | | |
| POWER DISTRIBUTION APPARATUS-ID | MANUFACTURER/MODEL NUMBER | REGISTRATION DATE STATUS |
| CONTROL-COMPLIANT OUTLET-ID1 | MANUFACTURER/MODEL NUMBER | REGISTRATION DATE/EXPIRY DATE STATUS |
| CONTROL-COMPLIANT OUTLET-ID2 | ⋮ ⋮ | |
| ⋮ ⋮ | | |
| MANAGEMENT SERIAL No. | | |
| POWER MANAGEMENT APPARATUS-ID | | |
| ⋮ ⋮ | | |

FIG. 21

| OUTLET TYPE | CONNECTED APPLIANCE TYPE | POWER INFORMATION COMMUNICATION MEANS | APPLIANCE AUTHENTICATION MEANS | CONTROL OVER SUPPLYING OF POWER |
|---|---|---|---|---|
| CONTROL-COMPLIANT OUTLET | CONTROL-COMPLIANT APPLIANCE | ·ZigBee FROM CONNECTED APPLIANCE<br>·ZigBee OR PLC FROM CONTROL-COMPLIANT OUTLET | ·ZigBee FROM CONNECTED APPLIANCE | ·CONTROL COMMAND SENT TO POWER DISTRIBUTION APPARATUS FROM POWER MANAGEMENT APPARATUS<br>·LIMITED CONTROL POSSIBLE FROM CONTROL-COMPLIANT OUTLET |
| CONTROL-COMPLIANT OUTLET | NON-CONTROL-COMPLIANT APPLIANCE | ·ZigBee OR PLC FROM CONTROL-COMPLIANT OUTLET | ·NONE | ·CONTROL COMMAND SENT TO POWER DISTRIBUTION APPARATUS FROM POWER MANAGEMENT APPARATUS<br>·LIMITED CONTROL POSSIBLE FROM CONTROL-COMPLIANT OUTLET |
| NON-CONTROL COMPLIANT OUTLET | CONTROL-COMPLIANT APPLIANCE | ·ZigBee FROM CONNECTED APPLIANCE | ·ZigBee FROM CONNECTED APPLIANCE | ·CONTROL COMMAND SENT TO POWER DISTRIBUTION APPARATUS FROM POWER MANAGEMENT APPARATUS |
| NON-CONTROL COMPLIANT OUTLET | NON-CONTROL-COMPLIANT APPLIANCE | ·NONE | ·NONE | ·CONSTANT SUPPLY OF POWER |

(*) VERIFICATION CAN BE CARRIED OUT IN THE SAME WAY IN THE POWER MANAGEMENT APPARATUS (PROCESSING BY ANALYSIS SERVER)

FIG. 63

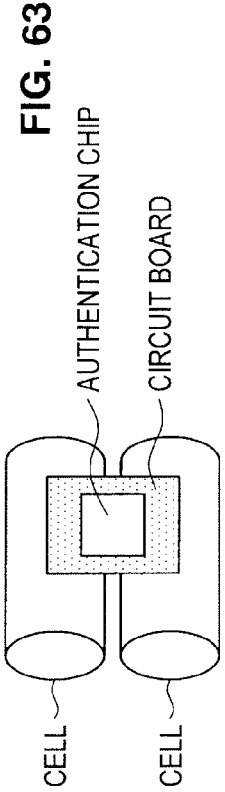

| case | CELL | CIRCUIT BOARD INCLUDING AUTHENTICATION CHIP | STATE | CELL CHARACTERISTICS/APPLIANCE INFORMATION |
|---|---|---|---|---|
| 1 | LEGITIMATE PRODUCT | LEGITIMATE PRODUCT | NORMAL | NO PROBLEMS WITH CELL CHARACTERISTICS, CORRECT APPLIANCE INFORMATION (*) OUTPUTTED |
| 2 | | | DETERIORATED | NO PROBLEMS WITH CELL CHARACTERISTICS, CORRECT APPLIANCE INFORMATION OUTPUTTED |
| 3 | | | | DISCREPANCY WITH ESTIMATED CELL CHARACTERISTICS OR APPLIANCE INFORMATION |
| 4 | | EITHER CASE | NORMAL | NO PROBLEMS WITH CELL CHARACTERISTICS, CORRECT APPLIANCE INFORMATION OUTPUTTED |
| 5 | FAKE PRODUCT | LEGITIMATE PRODUCT | PARTIALLY DEFECTIVE | DISCREPANCY WITH ESTIMATED CELL CHARACTERISTICS BUT CORRECT APPLIANCE INFORMATION OUTPUTTED |
| 6 | | FAKE AUTHENTICATION CHIP | | DISCREPANCY WITH ESTIMATED CELL CHARACTERISTICS BUT CORRECT APPLIANCE INFORMATION OUTPUTTED |
| 7 | | | DEFECTIVE | DISCREPANCY WITH ESTIMATED CELL CHARACTERISTICS AND ALSO DISCREPANCY IN APPLIANCE INFORMATION |

(*) INFORMATION RELATING TO VOLTAGE OF BATTERY, INFORMATION RELATING TO REMAINING CHARGE, ETC.

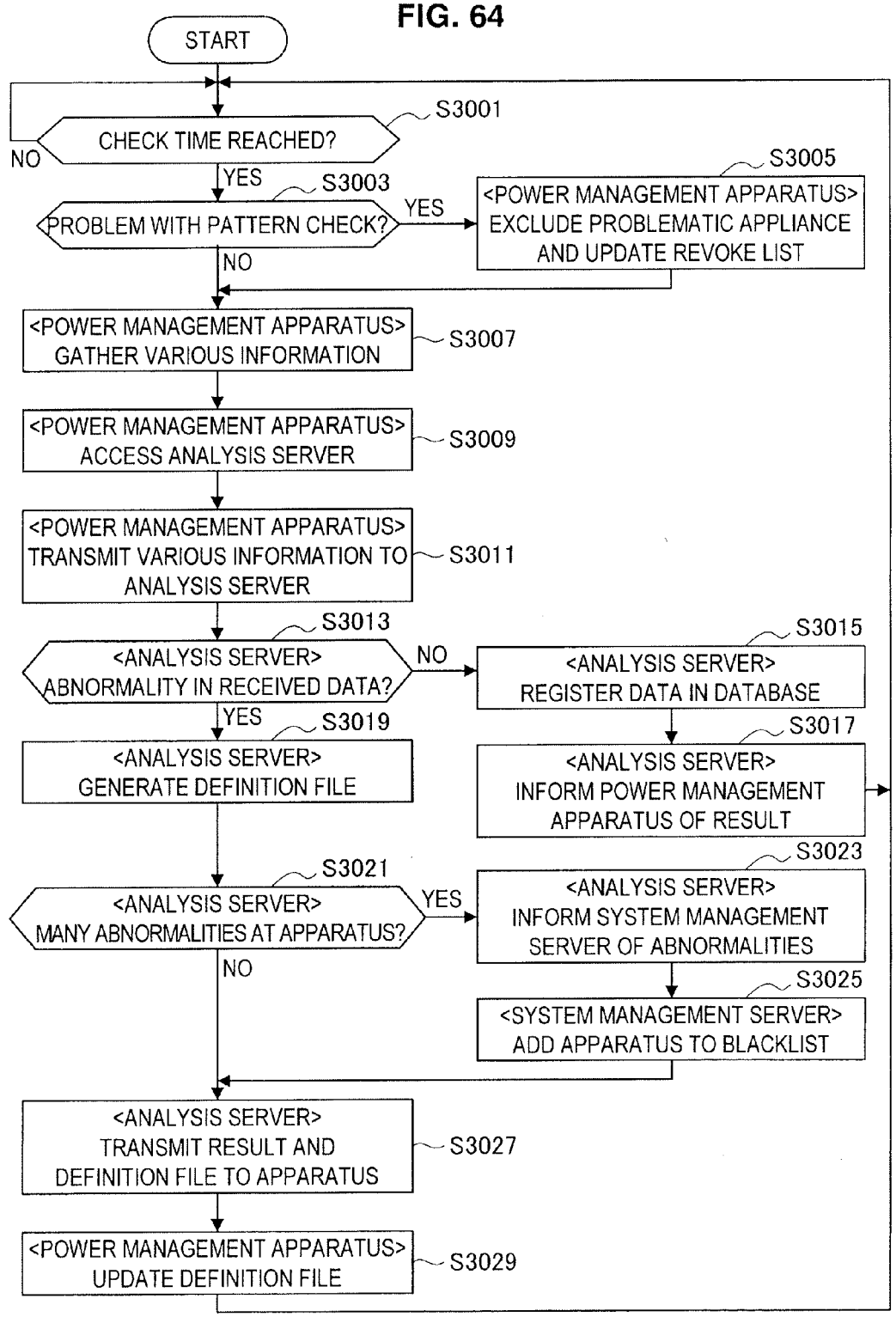

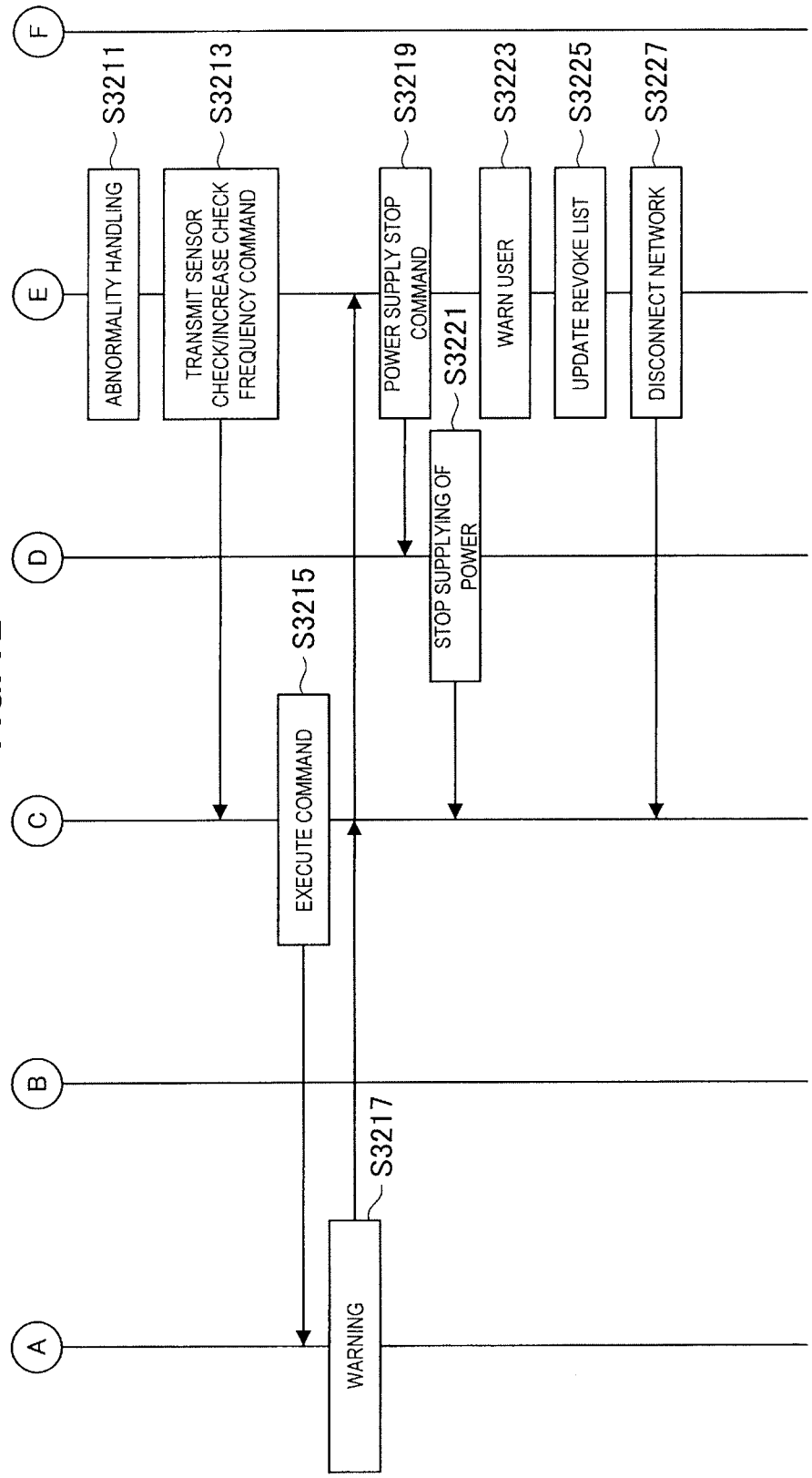

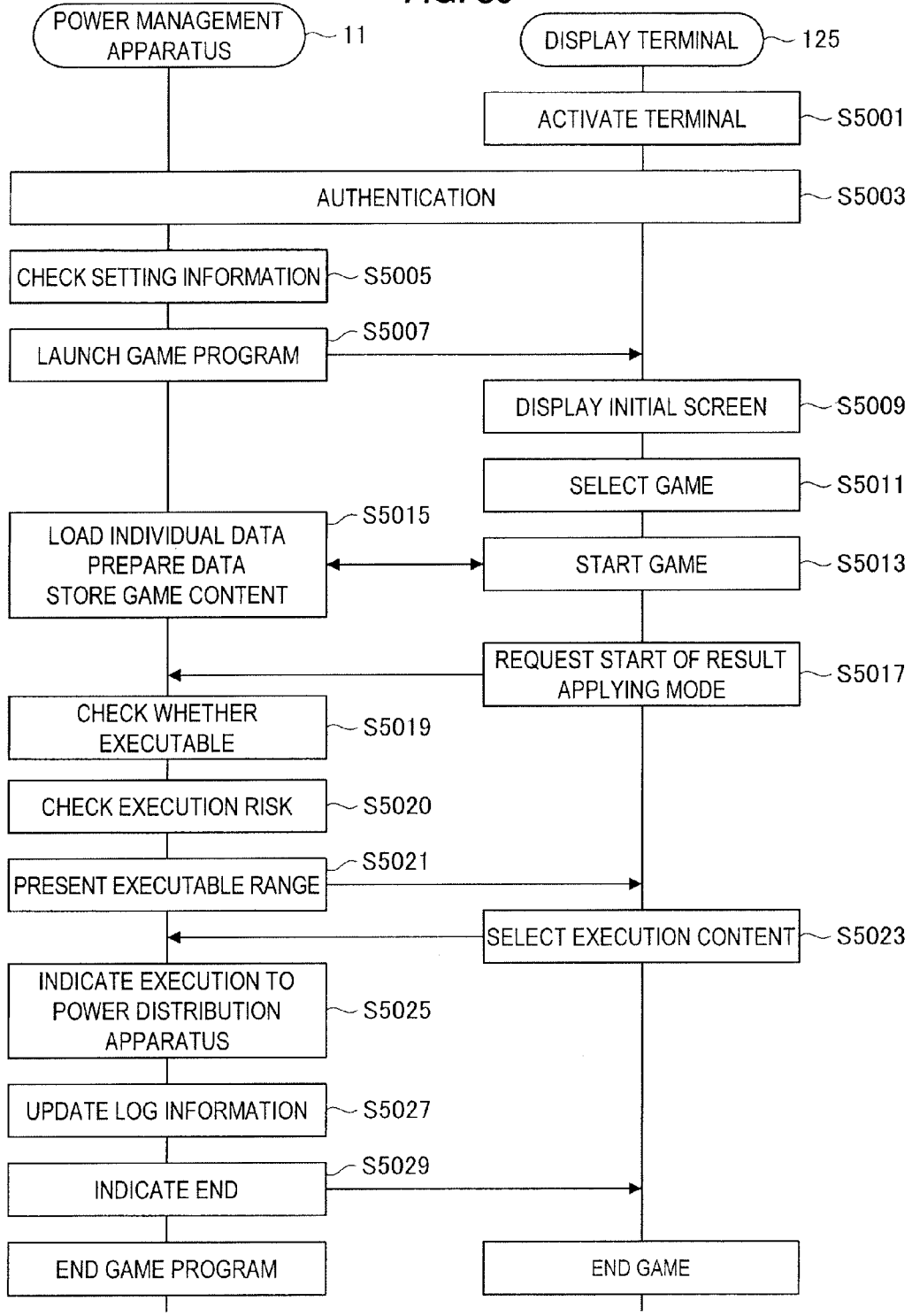

POWER MANAGEMENT APPARATUS, AND METHOD OF PROVIDING GAME CONTENTS

BACKGROUND OF THE INVENTION

1. Field of the Invention

The present invention relates to a power management apparatus, and a method of providing game contents.

2. Description of the Related Art

In recent years, a technology called smart grid has been gaining attention. The smart grid is a technological framework to realize efficient power usage by constructing a new transmission network having a communication channel along with the transmission network and using this intelligent transmission network. The background idea of the smart grid is to realize efficient management of the amount of power use, swift handling of an incident when such an incident occurs, remote control of the amount of power use, distributed power generation using power generation facilities outside the control of a power company, or charging management of an electric vehicle. Particularly, effective utilization of in-house power generating stations using renewable energy by ordinary households or operators other than power companies and charging management of various electric vehicles typically including electric cars have been attracting considerable attention. Incidentally, renewable energy is energy generated without using fossil fuel.

Power generated by ordinary households or operators other than power companies is used by power generation operators. Remaining power after use by the power generation operators is currently purchased by power companies. However, purchasing power supplied from power generation facilities outside the control of a power company is a heavy burden to the power company. For example, amount of power supplied from photovoltaic power generation facilities depends on the weather. Moreover, amount of power supplied from in-house power generating stations of ordinary households depends on power use of ordinary households that largely changes day by day. Thus, it is difficult for power companies to receive stable power supply from power generation facilities outside the control of power companies. For the above reason, it may become difficult for power companies to purchase power in the future.

Thus, a home battery initiative that uses power generated by power generation facilities outside the control of power companies after temporarily storing the power in batteries has recently been gaining attention. For example, a method of using power generated by photovoltaic power generation facilities by storing such power in batteries and making up for shortages in the night or when the weather is bad is considered. Furthermore, a method of limiting amount of power received from a power company in accordance with the battery storage amount or using power stored in batteries in the daytime when power rates are higher by storing power, in batteries, supplied by a power company in the night when power rates are lower are considered. Also, batteries can store power as DC, which makes DC/AC conversion or AC/DC conversion during transmission unnecessary so that losses during conversion can be reduced.

Thus, various expectations regarding power management mingle with one another amid the smart grid initiative. To realize such power management, the smart grid initiative is premised on having a communication channel along with a transmission network. That is, exchanging information about power management by using this intelligent transmission network is assumed (see JP-A-2002-354560, for example). However, in a region where a communication infrastructure is already built, instead of using a transmission network as a communication channel, information about power management may be exchanged by using a network constructed by the deployed communication infrastructure. That is, what is important in the smart grid initiative is how to efficiently manage power generation facilities and storage facilities that are not uniformly managed.

SUMMARY OF THE INVENTION

However, to realize the smart grid initiative as described above at home, various investments have to be made. Presently, there are not sufficient incentives to introduce the smart grid.

In light of the foregoing, it is desirable to provide a power management apparatus, and a method of providing game contents, which enable to take eco-friendly actions such as power management and power reduction while having fun doing so.

According to an embodiment of the present invention, there is provided a power management apparatus which includes a managed appliance registering unit carrying out authentication on an electronic appliance connected to a power network and registering an electronic appliance for which the authentication has succeeded as a managed appliance, a managed appliance information acquiring unit acquiring, from the managed appliance, as managed appliance information, at least any of appliance information including identification information that is unique to the electronic appliance, information indicating an operation state of the electronic appliance, information indicating an usage state of the electronic appliance and power information of the electronic appliance, a database storing the managed appliance information, and a game service providing unit providing, to the electronic appliance, a service using game contents whose theme is power. The game service providing unit includes a game control unit controlling execution of the game contents, a real world constructing unit constructing a setting of a game reflecting a real-world environment, based on the managed appliance information stored in the database, and a virtual world constructing unit constructing a setting of the game reflecting a virtual environment, based on a setting set in advance in the game contents. The game control unit is operable to initialize the game contents by combining the setting of the game constructed by the real world constructing unit and the setting of the game constructed by the virtual world constructing unit.

Position information indicating a location of the electronic appliance may be described in the database. The real world constructing unit may be operable to arrange an object corresponding to the electronic appliance registered as the managed appliance in a game stage based on the position information.

The game control unit may be operable, when an object corresponding to the electronic appliance is selected, to display on a display screen on which the game contents are displayed any of the appliance information of the electronic appliance corresponding to the selected object, the information indicating an operation state, the information indicating an usage state and the power information.

The power management apparatus may further include a control unit controlling operation of the managed appliance and supplying of power to the managed appliance. A result application mode of applying a game result of the game contents to the electronic appliance in a real world may be set in the game contents. The control unit may be operable, when there is a notification from the game control unit indicating that the result application mode is carried out, to reflect a result of the game to an actual electronic appliance.

The game service providing unit may provide the service using game contents while acting in concert with a game service providing server provided outside the power management apparatus.

According to another embodiment of the present invention, there is provided a method of providing game contents, which includes the steps of carrying out authentication on an electronic appliance connected to a power network and registering an electronic appliance for which the authentication has succeeded as a managed appliance, acquiring, from the managed appliance, as managed appliance information, at least any of appliance information including identification information that is unique to the electronic appliance, information indicating an operation state of the electronic appliance, information indicating an usage state of the electronic appliance and power information of the electronic appliance, and providing, to the electronic appliance, a service using game contents whose theme is power. The step of providing further includes the steps of constructing a setting of a game reflecting a real-world environment by referring to a database in which the managed appliance information is stored, and constructing a setting of the game reflecting a virtual environment, based on a setting set in advance in the game contents. The game contents are initialized by combining the setting of the game constructed in the step of constructing a setting of a game reflecting a real-world environment and the setting of the game constructed in the step of constructing a setting of the game reflecting a virtual environment.

According to the embodiments of the present invention described above, it is possible to take eco-friendly actions such as power management and power reduction while having fun doing so.

BRIEF DESCRIPTION OF THE DRAWINGS

FIG. 9 is a table useful in explaining the detailed functional configuration of the information management unit;

FIG. 12 is a diagram useful in explaining the content displayed on the display unit;

FIG. 13 is a diagram useful in explaining the content displayed on the display unit;

FIG. 19 is a diagram useful in explaining various control implemented by the power management apparatus;

FIG. 20 is a diagram useful in explaining various information managed by the power management apparatus;

FIG. 21 is a table showing combinations of communication means, authentication means, and control over supplying of power in accordance with an outlet type and a connected appliance type;

FIG. 63 is a diagram useful in explaining batteries to be excluded;

FIG. 64 is a flowchart useful in explaining a method of protecting against illegal attacks to the power management apparatus;

FIG. 72 is a flowchart useful in explaining a method implemented by the acquired data verification unit to specify a battery to be excluded;

FIG. 80 is a flowchart useful in explaining the flow of system-linked entertainment;

DETAILED DESCRIPTION OF THE EMBODIMENTS

Figure 1:
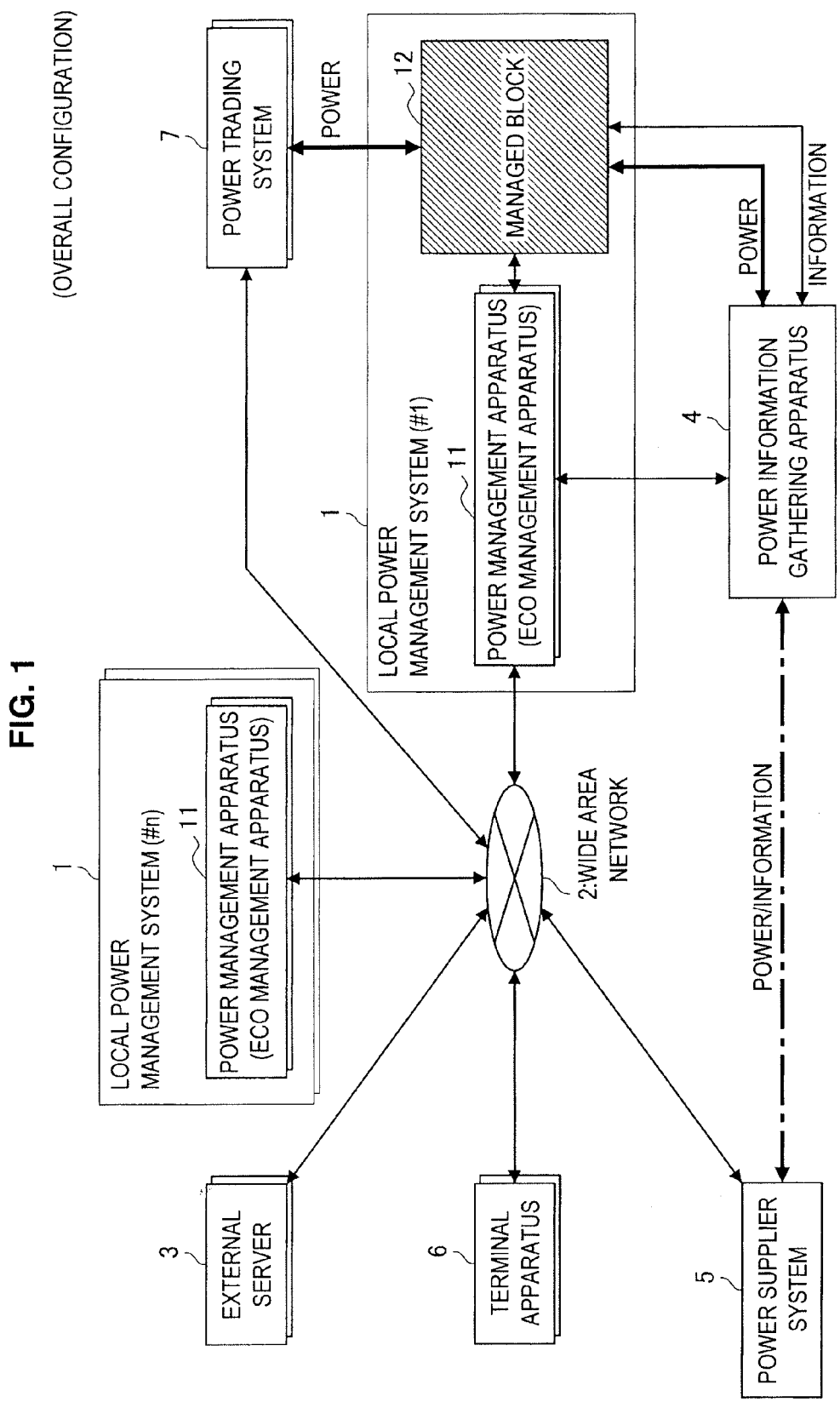
FIG. 1 is a diagram useful in explaining an overview of a power management system according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The following description is given in the order indicated below.

(1) First Embodiment
   (1-1) Overview of Power Management Apparatus
   (1-2) Configuration of Power Management Apparatus
   (1-3) Content Displayed by Display Unit
   (1-4) Concealing Power Consumption Pattern
   (1-5) Various Control by Power Management Apparatus
   (1-6) Configuration of Appliance Management Unit
   (1-7) Configuration of Information Analyzing Unit
   (1-8) Configuration of Control-Compliant Appliance
   (1-9) Configuration of Power Storage Apparatus
   (1-10) Specific Examples of Method of Embedding and Method of Method of Verifying Electronic Watermark Information
   (1-11) Method of Registering Power Management Apparatus
   (1-12) Method of Registering Control-Compliant Appliance (1-13) Method of Registering Control-Compliant Outlet
(1-14) Billing Process for Temporarily Registered Control-Compliant Appliance
(1-15) Modification to Method of Registering Control-Compliant Appliance
(1-16) Operation of Power Management Apparatus for Managed Appliance where Abnormality has Occurred
(1-17) Operation of Power Management Apparatus when Abnormality Has Occurred in Power State
(1-18) Flow of Method of Embedding and Method of Verifying Electronic Watermark Information
(1-19) Role of Analysis Server
(1-20) Configuration of Analysis Server
(1-21) Process Specifying Battery to be Excluded
(1-22) Method of Protecting Against Illegal Attacks to Power Management Apparatus
(1-23) Method of Excluding Battery
(1-24) Verification Process by Acquired Data Verification Unit
(1-25) Flow of Verification Process by First Verification Unit
(1-26) Testing Process by Database Management Unit
(1-27) Updating of Database and Generation of Judgment Dictionary
(1-28) Method of Managing Virus Definition File
(1-29) Flow of Method of Specifying Battery to be Excluded
(1-30) Processing when Multiple Power Management Apparatuses are Present
(2) Second Embodiment
   (2-1) Overview of Second Embodiment
   (2-2) Configuration of Service Providing Unit
   (2-3) Linking to Database
   (2-4) Security for System-Linked Entertainment
   (2-5) Flow of System-Linked Entertainment
(3) Hardware Configuration of Power Management Apparatus According to Embodiment of the Present Invention
First Embodiment
(1-1) Overview of Power Management Apparatus First, an overview of power management apparatus according to the first embodiment of the present invention will be described.

FIG. 1 shows an overall picture of the power management system according to the present embodiment.

As shown in FIG. 1, the power management system according to the present embodiment includes a local power management system 1, a wide area network 2, an external server 3, a power information gathering apparatus 4, a power supplier system 5, a terminal apparatus 6, and a power trading system 7. Also, the local power management system 1, the external server 3, the power information gathering apparatus 4, the power supplier system 5, the terminal apparatus 6, and the power trading system 7 are connected to the wide area network 2, and thus can exchange information with each other.

Additionally, in this specification, expressions "local" and "wide area" are used. "Local" means a small group configured from elements that can communicate without using the wide area network 2. On the other hand, "wide area" means a large group including elements that communicate via the wide area network 2. Also, a small group configured from elements arranged inside the local power management system 1 may be specifically expressed by the expression "local." On the other hand, the entire power management system shown in FIG. 1 may be expressed by the expression "wide area."

Now, the power management system described above attempts, as with the smart grid initiative described above, to enhance efficiency of power usage, and to appropriately manage various appliances operating on power, power storage means that stores power, power generating means that generates power, power supply means that supplies power from a power supply, and the like. The targets of power management in this power management system are the appliances, the power storage means, the power generating means, the power supply means, and the like provided in the local power management system 1. Additionally, a system in the smart grid initiative called HEMS (Home Energy Management System) or BEMS (Building Energy Management System) is an example of the local power management system 1.

As shown in FIG. 1, the local power management system 1 includes the power management apparatus 11, and a managed block 12. The power management apparatus 11 undertakes a role of managing the appliances, the power storage means, the power generating means, the power supply means, and the like provided in the local power management system 1. For example, the power management apparatus 11 permits or prohibits power supply to each appliance. Also, the power management apparatus 11 carries out authentication on each appliance to identify the appliance or to confirm validity of the appliance. Then, the power management apparatus 11 gathers information on power consumption or the like from each appliance.

Furthermore, the power management apparatus 11 acquires information on the amount of stored power or the like from the power storage means. Then, the power management apparatus 11 carries out charge/discharge control on the power storage means. Furthermore, the power management apparatus 11 acquires information on the amount of power generation or the like from the power generating means. Also, the power management apparatus 11 acquires information on the amount of power supplied from outside from the power supply means. In this manner, the power management apparatus 11 acquires information from the appliances, the power storage means, the power generating means, and the power supply means provided in the local power management system 1, and controls input/output of power. Of course, the power management apparatus 11 carries out, as appropriate, similar management of structural elements other than the appliances, the power storage means, the power generating means, and the power supply means. Furthermore, the power management apparatus 11 can also carry out management of not only power but also ecology in general, such as $CO_2$, water resources and the like, the reduction in which can be quantified. That is, the power management apparatus 11 can function also as an eco-management apparatus. Incidentally, in the following, an explanation will be made by taking power as an example of resources whose reduction can be quantified.

In the local power management system 1 shown in FIG. 1, the structural elements such as the appliances, the power storage means, the power generating means, and the power supply means, which are the targets of power management, are included in the managed block 12. The structural elements included in the managed block 12 and the power management apparatus 11 are capable of directly or indirectly exchanging information. Also, the power management apparatus 11 may be configured to be able to exchange information with the power information gathering apparatus 4. The power information gathering apparatus 4 manages information on power supplied from the power supplier system 5 managed by a power supplier. Additionally, an appliance called a smart meter in the smart grid initiative is an example of the power information gathering apparatus 4.

The power supplier system 5 supplies power to each local power management system 1. Then, the power supplied from the power supplier system 5 is supplied to the managed block 12 in the local power management system 1 via the power information gathering apparatus 4. At this point, the power information gathering apparatus 4 acquires information, for example, on the amount of power supplied to the managed block 12. Then, the power information gathering apparatus 4 transmits the acquired information on the amount of power or the like to the power supplier system 5. By using such a mechanism, the power supplier system 5 gathers information relating to power consumption or the like of the managed block 12 in each local power management system 1.

Furthermore, the power supplier system 5 refers to the gathered information relating to power consumption or the like, controls the power information gathering apparatus 4, and controls the amount of power supply such that efficient power usage by the managed block 12 or the entire power management system is realized. At this point, the power information gathering apparatus 4 restricts the amount of power supplied from the power supplier system 5 to the managed block 12, or lifts the restriction on the amount of power according to the power consumption of the managed block 12. Additionally, the power supplier may be a power company, a corporate or non-corporate power generation manager owning a power station, a corporate or non-corporate power storage manager owning a power storage facility, or the like, for example.

However, under current situations, a power company is likely to be the power supplier and, in this specification, an explanation will be made assuming a case where the power company is the power supplier. Also, most of the externally-supplied power is at present purchased from the power company, which is the power supplier. However, in the future, the electricity market may become active and the power purchased in the electricity market may cover most of the externally-supplied power. In such a case, it is assumed that the local power management system 1 will be supplied with power from the power trading system 7, as shown in FIG. 1.

The power trading system 7 carries out processes relating to power trading such as placement of a sell or buy order in the electricity market, price calculation after the execution of an order, a settlement process, placement of order for power supply, and the like. Furthermore, in the example of FIG. 1, reception of power for which an order has been executed in the electricity market is also carried out by the power trading system 7. Thus, in the example of FIG. 1, according to the type of an executed order, the power is supplied from the power trading system 7 to the local power management system 1, or from the local power management system 1 to the power trading system 7. Furthermore, placement of an order to the power trading system 7 is performed automatically or manually by using the power management apparatus 11.

Furthermore, the power management system shown in FIG. 1 includes a plurality of local power management systems 1. As described above, each local power management system 1 includes the power management apparatus 11. The plurality of power management apparatuses 11 can mutually exchange information via the wide area network 2 or a secure communication path (not shown). There may also be provided a mechanism for supplying power from one local power management system 1 to another local power management system 1. In such a case, the power management apparatuses 11 of both systems carry out information exchange relating to reception of power, and perform control to transmit the amount of power appropriately decided by the information exchange.

For its part, the power management apparatus 11 may be configured to be operable by an external terminal device 6 connected via the wide area network 2. For example, a user may want to check the power state of the local power management system 1 that the user manages, by using the terminal apparatus 6. In such a case, if the power management apparatus 11 is configured to be operable by the terminal apparatus 6, the user is enabled to have the power state of the local power management system 1 that the user manages displayed by the terminal apparatus 6 and to check the power state. The user is also enabled to perform power trading by the power management apparatus 11 by using the terminal apparatus 6.

Additionally, the terminal apparatus 6 may be provided inside the local power management system 1. In this case, the terminal apparatus 6 connects to the power management apparatus 11 by using a communication path provided in the local power management system 1 without using the wide area network 2. One advantage of using the terminal apparatus 6 is that the user does not have to go to the installation location of the power management apparatus 11. That is, if the terminal apparatus 6 can be used, the power management apparatus 11 can be operated from an arbitrary place. Additionally, as a concrete form of the terminal apparatus 6, there can be assumed, for example, a mobile phone, a mobile information terminal, a notebook computer, a portable game machine, an information appliance, a facsimile, a fixed-line phone, an audio/video appliance, a car navigation system, or an electric vehicle.

In the foregoing, power management in the power management system shown in FIG. 1 has been briefly described while referring to the operation or function of each structural element. However, the above-described power management apparatus 11 has, in addition to the function relating to power management, a function of providing various services to a user by using various pieces of information gathered from the managed block 12 and the like.

Information that can be gathered by the power management apparatus 11 may be, for example, a model number or an appliance ID of each appliance (hereinafter, appliance information), information relating to the profile of a user (hereinafter, user information), information relating to a billing account or a credit card of a user (hereinafter, billing information), registration information relating to a service to be used (hereinafter, service information), or the like. The appliance information mentioned above is set in each appliance in advance or is manually input by a user. Also, the user information, the billing information, and the service information mentioned above are, in many cases, manually input to the power management apparatus 11 by a user. Additionally, input method of the information is not limited to these examples, and may be changed to arbitrary input method. Also, in the following explanation, the appliance information, the user information, the billing information, and the service information will be referred to as "initial information."

The information that can be gathered by the power management apparatus 11 may be, in addition to the initial information, information relating to specifications of a battery connected to each appliance (hereinafter, appliance battery information), information relating to the state of each appliance or the like (including the power storage means, the power generating means, the power supply means, and the like) (hereinafter, appliance state information), information that can be acquired from an external system or server connected to the wide area network 2 (hereinafter, external information), and the like. The appliance state information mentioned above may be, for example, the discharge voltage or the amount of stored power of the power storage means at the time point of information gathering, the power generation voltage or the amount of power generation of the power generating means, power consumption of each appliance, and the like. Furthermore, the external information mentioned above may be the unit market price of power acquired from the power trading system 7, a list of available services acquired from the external server 3, and the like. Additionally, in the following explanation, the appliance battery information, the appliance state information, and the external information will be referred to as "primary information."

Furthermore, the power management apparatus 11 can calculate, by itself or by using the function of the external server 3, secondary information by using the initial information and the primary information. For example, the power management apparatus 11 analyzes the primary information described above, and calculates an index value indicating the balance between the power supplied from the power supplier system 5, the power generated by the power generating means, the power charged/discharged by the power storage means, and the power consumed by the managed block 12 (hereinafter, a balance index). Also, the power management apparatus 11 calculates a billing status and a $CO_2$ reduction status based on power consumption. Furthermore, the power management apparatus 11 calculates the degree of consumption of each appliance (a proportion of duration of use to duration of life, or the like) based on the initial information, or analyzes a user's life pattern based on the change over time in the consumed power.

Also, the power management apparatus 11 obtains various pieces of information (hereinafter, tertiary information) by performing calculation using the secondary information or by performing information exchange with a system or a server connected to the wide area network 2 or another power management apparatus 11. For example, the power management apparatus 11 obtains information relating to the status of sell/buy order or price in the electricity market (hereinafter, market data), information on the amount of surplus power or of deficit power in a neighbouring region (hereinafter, regional power information), information on an appliance suitable for a user's life pattern from the standpoint of promoting efficient power usage (hereinafter, appliance recommendation information), security information relating to a computer virus or the like, or appliance risk information relating to a fault in an appliance or the like.

By appropriately using the initial information, the primary information, the secondary information, and the tertiary information described above, the power management apparatus 11 can provide various services to a user. Meanwhile, the power management apparatus 11 is to hold important information relating to a user's privacy or the security of the local power management system 1. Also, the power management apparatus 11 is in a place to permit or prohibit power supply to the managed block 12. Thus, a high level of security is wanted from the power management apparatus 11 so that an attack from the outside of the local power management system 1 or an illegal behaviour performed within the local power management system 1 can be prevented.

As an attack that the power management apparatus 11 receives from the outside of the local power management system 1, there can be conceived a DoS attack (Denial of Service attack), a computer virus, or the like. A firewall is of course provided between the local power management system 1 and the wide area network 2, but a stricter security measure is wanted for the reason stated above. Furthermore, as the illegal behaviour performed within the local power management system 1, there can be conceived illegal modification of an appliance, the power storage means, or the like, falsification of information, connection of an unauthorized appliance, or the like. Furthermore, a measure against use, by a malicious third party, of information on consumed power reflecting a user's life pattern, or detection/recovery of breakdown (ignition or the like in some cases) of each appliance or the power management apparatus 11 may become necessary from the viewpoint of enhancing the security level.

As will be described later, the power management apparatus 11 has a function of realizing such high security level as described above. The power management apparatus 11 realizes power management for the managed block 12, service provision based on the initial information, the primary information, the secondary information, and the tertiary information gathered from the managed block 12, and the like, while maintaining the security level. Additionally, the maintenance of the high security level by the power management apparatus 11 may not be realized by the power management apparatus 11 alone. Accordingly, an appliance, the power storage means, the power generating means, the power supply means, and the like, provided in the managed block 12 are to attempt to maintain the security level in cooperation with the power management apparatus 11. Additionally, such structural elements of the managed block 12 will also be described later in detail.

Configuration of Managed Block

Figure 2:
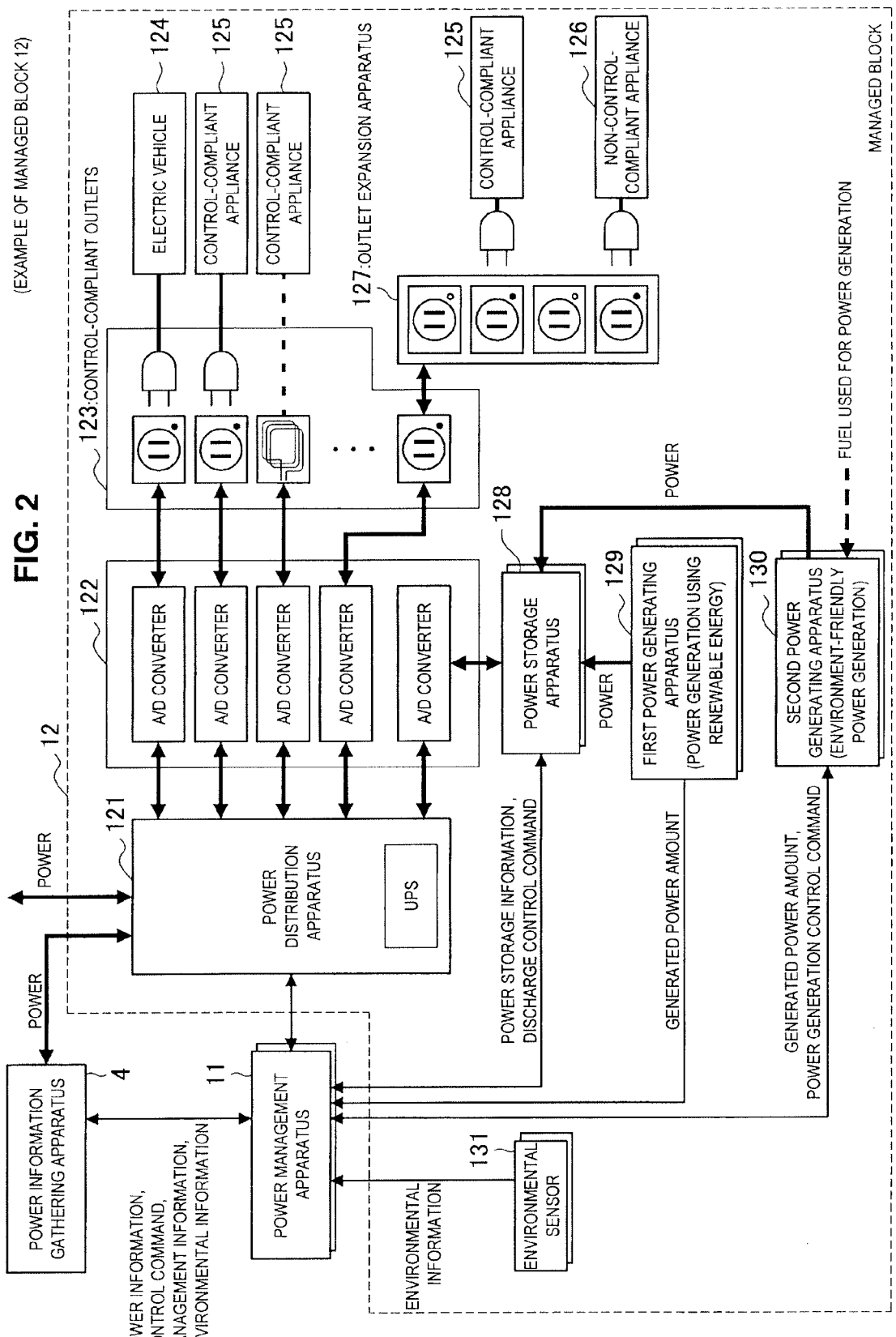
FIG. 2 is a diagram useful in explaining the overall configuration of a managed block.
Figure 3:
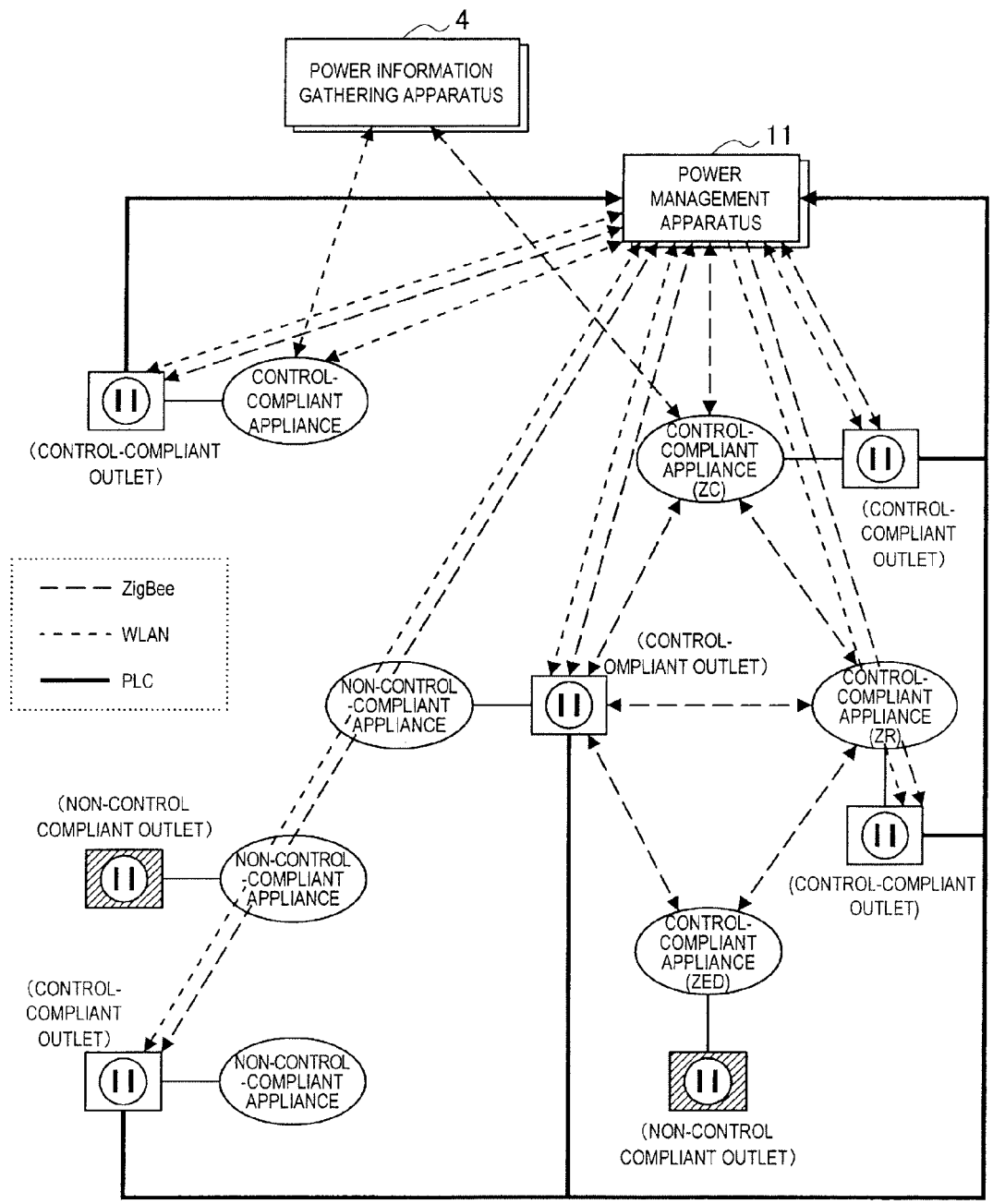
FIG. 3 is a diagram useful in explaining a communication network in a local power management system.
Figure 4:
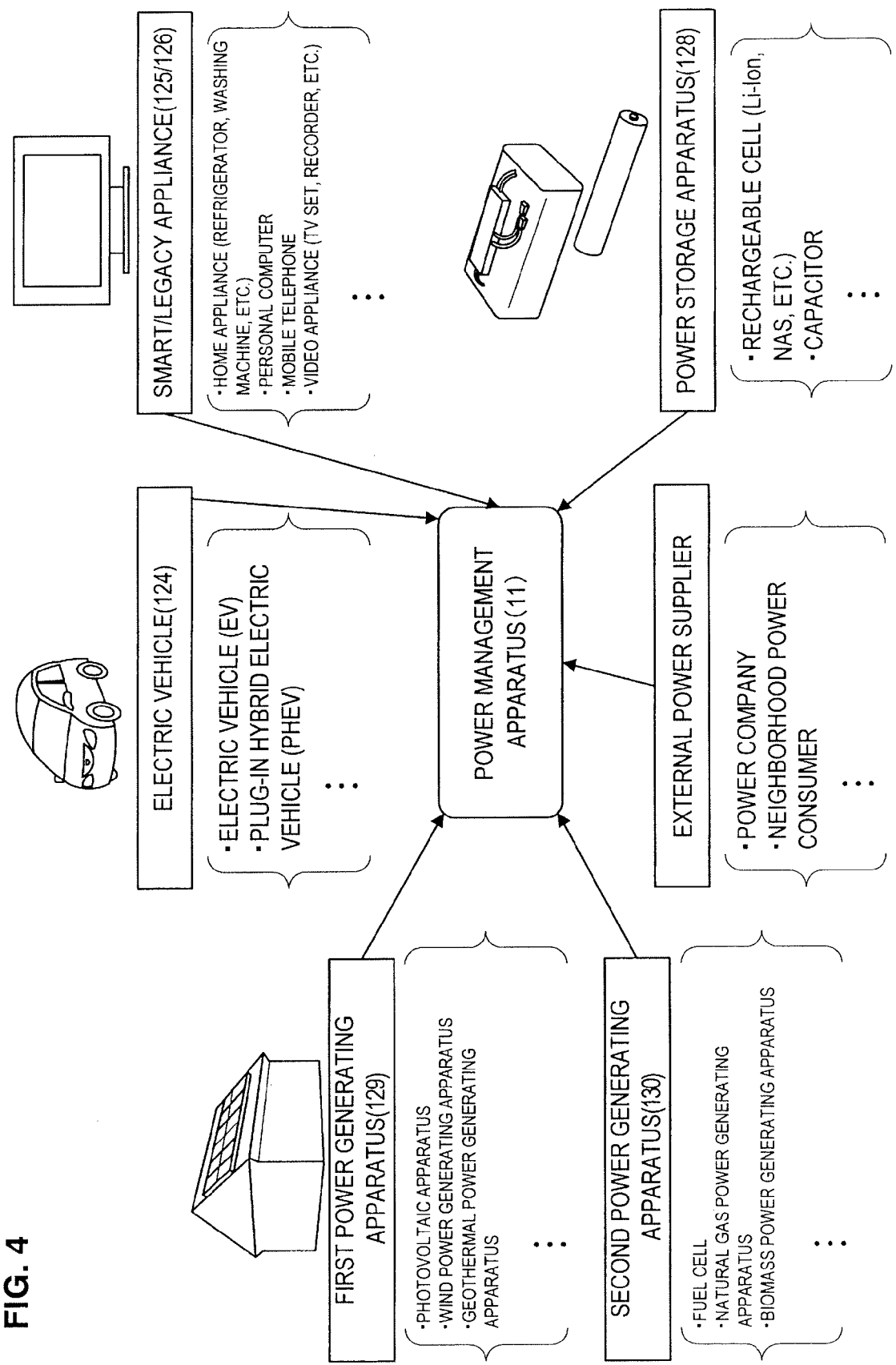
FIG. 4 is a diagram useful in explaining a system configuration that is centered on a power management apparatus.

A configuration of the managed block 12 will be described in detail here with reference to FIGS. 2 to 4. FIG. 2 shows the configuration of the managed block 12. Also, FIG. 3 shows a configuration of a communication network within the managed block 12. Furthermore, FIG. 4 shows specific configurations of main structural elements for exchanging information with the power management apparatus 11.

First, reference will be made to FIG. 2. As shown in FIG. 2, the managed block 12 includes a power distribution apparatus 121, an AC/DC converter 122, a control-compliant outlet 123, an electric vehicle 124, a control-compliant appliance 125, a non-control-compliant appliance 126, an outlet expansion apparatus 127, a power storage apparatus 128, a first power generating apparatus 129, a second power generating apparatus 130, and an environmental sensor 131.

Additionally, the control-compliant outlet 123, the electric vehicle 124, the control-compliant appliance 125, and the outlet expansion apparatus 127 are examples of the appliance described above. Also, the power storage apparatus 128 is an example of the power storage means described above. Furthermore, the first power generating apparatus 129 and the second power generating apparatus 130 are examples of the power generating means described above. The control-compliant outlet 123 and the outlet expansion apparatus 127 are also examples of the power supply means described above. Furthermore, the non-control-compliant appliance 126 is not directly subject to power management by the power management apparatus 11, and thus is not, by itself, an example of the appliance described above. However, as will be described later, by being combined with the outlet expansion apparatus 127, the non-control-compliant appliance 126 will be able to be managed by the power management apparatus 11, and will be an example of the appliance described above.

Flow of Power

Power supplied from the power supplier system 5, the power trading system 7, or another local power management system 1 (hereinafter, external power) is input to the power distribution apparatus 121. External AC power is assumed to be input to the power distribution apparatus 121 in the example of FIG. 2, but external DC power may also be input. However, for the sake of explanation, it is assumed in the following that external AC power is input to the power distribution apparatus 121. The external power input to the power distribution apparatus 121 is converted from AC to DC by the AC/DC converter 122, and is input to the control-compliant outlet 123 or the power storage apparatus 128.

Furthermore, power discharged from the power storage apparatus 128 (hereinafter, discharged power) is also input to the power distribution apparatus 121. The discharged power output from the power storage apparatus 128 is converted from DC to AC by the AC/DC converter 122, and is input to the power distribution apparatus 121. The discharged AC power input to the power distribution apparatus 121 is converted from AC to DC by the AC/DC converter 122, and is input to the control-compliant outlet 123. However, to avoid a loss in the discharged power at the AC/DC converter 122, the discharged power may also be supplied from the power storage apparatus 128 to the control-compliant outlet 123 without going through the AC/DC converter 122.

In addition to the external power input via the power distribution apparatus 121, power generated by the first power generating apparatus 129 and the second power generating apparatus 130 (hereinafter, generated power) is input to the power storage apparatus 128. Additionally, in the example of FIG. 2, the generated power generated by the first power generating apparatus 129 and the second power generating apparatus 130 is temporarily stored in the power storage apparatus 128. However, the generated power generated by the first power generating apparatus 129 and the second power generating apparatus 130 may also be input to the AC/DC converter 122 or the control-compliant outlet 123 without going through the power storage apparatus 128. However, in many cases, supply of the generated power output from the first power generating apparatus 129 is unstable due to the climate or the environment. Thus, in the case of using the generated power output from the first power generating apparatus 129, the generated power is preferably used after being temporarily stored in the power storage apparatus 128.

Additionally, the first power generating apparatus 129 is power generating means for generating power using renewable energy. For example, the first power generating apparatus 129 is a photovoltaic apparatus, a wind power generating apparatus, a geothermal power generating apparatus, a hydraulic power generating apparatus, or the like. On the other hand, the second power generating apparatus 130 is power generating means for generating power using non-renewable energy which is environment-friendly compared to, for example, thermal power generation that generates power by combusting gasoline, coal, or the like, and using the combustion. For example, the second power generating apparatus 130 is a fuel cell, a natural gas power generating apparatus, a biomass power generating apparatus, or the like. Incidentally, in the case hydrogen, which is the fuel for power generation by the fuel cell, is generated using power derived from renewable energy, the fuel cell is power generating means that generates power without using non-renewable energy.

The generated power generated by the first power generating apparatus 129 and the second power generating apparatus 130, and the power stored in the power storage apparatus 128 are, on the one hand, input to the control-compliant outlet 123 via the power distribution apparatus 121 or the AC/DC converter 122, and, on the other hand, may be purchased by the power supplier system 5, the power trading system 7, or the like. In such a case, the generated power generated by the first power generating apparatus 129 and the second power generating apparatus 130, and the discharged power output from the power storage apparatus 128 are converted by the AC/DC converter 122 from DC to AC, and are transmitted to the power supplier system 5, the power trading system 7, or the like, via the power distribution apparatus 121

In the foregoing, the flow of power in the managed block 12 has been roughly described. Particularly, a distribution path of the power flowing via the power distribution apparatus 121 has been described here. As described above, the power distribution apparatus 121 undertakes a role of dividing the distribution path of power within the managed block 12. Thus, if the power distribution apparatus 121 stops, the distribution of power within the managed block 12 is disrupted. Therefore, the power distribution apparatus 121 is provided with an uninterruptible power supply (UPS). Additionally, in the example of FIG. 2, the power distribution apparatus 121 is provided separately from the power management apparatus 11, but the power distribution apparatus 121 and the power management apparatus 11 may be installed in the same casing.

Authentication at the Time of Power Supply

In the managed block 12, the power flowing to the control-compliant outlet 123 or the power storage apparatus 128 via the power distribution apparatus 121 is managed by the power management apparatus 11. For example, the power management apparatus 11 controls the power distribution apparatus 121 and supplies power to the control-compliant outlet 123 or stops the supply of power to the control-compliant outlet 123.

The power management apparatus 11 also carries out authentication of the control-compliant outlet 123. Then, the power management apparatus 11 supplies power to the control-compliant outlet 123 for which authentication has been successful, and stops supply of power to the control-compliant outlet 123 for which authentication has failed. In this manner, supply or non-supply of power in the managed block 12 is determined by the success or failure of authentication by the power management apparatus 11. Authentication by the power management apparatus 11 is carried out not only on the control-compliant outlet 123, but also on the electric vehicle 124, the control-compliant appliance 125, and the outlet expansion apparatus 127. Incidentally, authentication by the power management apparatus 11 is not carried out on the non-control-compliant appliance 126, which does not possess a communication function with the power management apparatus 11 nor a computational function necessary for authentication Accordingly, the control-compliant outlet 123, the electric vehicle 124, the control-compliant appliance 125, or the outlet expansion apparatus 127 which has been authenticated can be supplied with power based on control by the power management apparatus 11. However, the non-control-compliant appliance 126, which is not, by itself, to be authenticated, will not be supplied with power based on control by the power management apparatus 11. Accordingly, power is continuously supplied to the non-control-compliant appliance 126 independently of control by the power management apparatus 11, or power is not at all supplied thereto. However, by having the outlet expansion apparatus 127 carry out authentication instead, it becomes possible for the non-control-compliant appliance 126 to be supplied with power based on control by the power management apparatus 11.

Summary of Appliance Function

The functions of the control-compliant outlet 123, the electric vehicle 124, the control-compliant appliance 125, the non-control-compliant appliance 126, and the outlet expansion apparatus 127 will be briefly summarized here.

Control-Compliant Outlet 123

First, the function of the control-compliant outlet 123 will be summarized. The control-compliant outlet 123 has terminals to be connected with power plugs of the electric vehicle 124, the control-compliant appliance 125, the non-control-compliant appliance 126, and the outlet expansion apparatus 127. Furthermore, the control-compliant outlet 123 has a function of supplying power supplied via the power distribution apparatus 121 to the electric vehicle 124, the control-compliant appliance 125, the non-control-compliant appliance 126, and the outlet expansion apparatus 127 connected to the terminals. That is, the control-compliant outlet 123 has a function as a power supply outlet.

The control-compliant outlet 123 also has various functions necessary for being authenticated by the power management apparatus 11. For example, the control-compliant outlet 123 has a communication function for exchanging information with the power management apparatus 11. This communication function is realized by cable communication by a power line or a signal line, or by providing the control-compliant outlet 123 with a communication module for wireless communication. The control-compliant outlet 123 also has a computational function for performing computation necessary at the time of authentication. Furthermore, the control-compliant outlet 123 holds identification information such as an appliance ID and key information necessary for authentication. By using these functions and information, the control-compliant outlet 123 is enabled to be authenticated by the power management apparatus 11. Additionally, the type of authentication may be mutual authentication using a random number, or public key authentication using a pair of a secret key and a public key.

Furthermore, the control-compliant outlet 123 may also have state display means for displaying success/failure of authentication with the power management apparatus 11 and a state during authentication (hereinafter, authentication state). In this case, the state display means provided in the control-compliant outlet 123 may display the authentication states of the electric vehicle 124, the control-compliant appliance 125, and the outlet expansion apparatus 127 connected to the control-compliant outlet 123. Furthermore, this state display means may also display whether an appliance connected to the control-compliant outlet 123 is the non-control-compliant appliance 126 or not. Additionally, this state display means is configured from an indicator lamp such as a LED or a small bulb, or a display device such as an LCD or an ELD As has been described, power is supplied via the power distribution apparatus 121 by control by the power management apparatus 11 to the control-compliant outlet 123 for which authentication by the power management apparatus 11 has been successful. On the other hand, supply of power to the control-compliant outlet 123 for which authentication has failed is stopped by control by the power management apparatus 11. As such, with power supply being controlled according to the success/failure of authentication, an unauthorized power supply outlet can be prevented from connecting to the power distribution apparatus 121. It becomes possible also to easily detect a power supply outlet fraudulently connected to the power distribution apparatus 121. Furthermore, in the case the state display means is provided in the control-compliant outlet 123, the authentication state of the control-compliant outlet 123 can be easily grasped, and authentication failure and breakdown of the control-compliant outlet 123 can be easily distinguished.

Now, the form of the control-compliant outlet 123 is not limited to the form of a power point for connecting a power plug. For example, a control-compliant outlet 123 that has a built-in coil that supplies power by using electromagnetic induction as with a reader/writer for a non-contact IC card, and that has a surface form without the form of a power point can also be realized. In such a case, as with a non-contact IC card, a coil for generating an induced electromotive force from a magnetic field generated by the control-compliant outlet 123 is provided in the electric vehicle 124, the control-compliant appliance 125, and the outlet expansion apparatus 127. According to such a configuration, supplying or receiving of power without the use of a power plug is made possible. Additionally, in the case of using electromagnetic induction, exchange of information using modulation of magnetic field is made possible between the control-compliant outlet 123 and the electric vehicle 124, the control-compliant appliance 125, or the outlet expansion apparatus 127.

Furthermore, the control-compliant outlet 123 has a function of measuring the amount of power supplied to the electric vehicle 124, the control-compliant appliance 125, or the outlet expansion apparatus 127 connected to the terminal. Furthermore, the control-compliant outlet 123 has a function of notifying the measured amount of power to the power management apparatus 11. Also, the control-compliant outlet 123 may have a function of acquiring the primary information from the electric vehicle 124, the control-compliant appliance 125, or the outlet expansion apparatus 127 that is connected to the terminal and of transmitting the acquired primary information to the power management apparatus 11. As such, with the information which has been measured or acquired by the control-compliant outlet 123 transmitted to the power management apparatus 11, it becomes possible for the power management apparatus 11 to grasp power status or to perform power supply control for each individual control-compliant outlet 123.

Electric Vehicle 124

Next, the function of the electric vehicle 124 will be summarized. The electric vehicle 124 includes a battery for storing power. The electric vehicle 124 also includes a driving mechanism that is driven using power discharged from the battery. In the case the electric vehicle 124 is an electric vehicle or a plug-in hybrid electric vehicle, this driving mechanism will include a motor, a gear, a shaft, wheels, tires, and the like, for example. The driving mechanisms of other electric vehicles 124 will at least include a motor. Furthermore, the electric vehicle 124 includes a power plug used at the time of charging the battery. Power can be received by connecting this power plug to the control-compliant outlet 123. Incidentally, in the case of a method where the control-compliant outlet 123 supplies power by using the electromagnetic induction, a coil that generates an induced electromotive force when placed in a magnetic field is provided in the electric vehicle 124.

The electric vehicle 124 also has various functions necessary for being authenticated by the power management apparatus 11. For example, the electric vehicle 124 has a communication function for exchanging information with the power management apparatus 11. This communication function is realized by cable communication by a power line or a signal line, or by providing the electric vehicle 124 with a communication module for wireless communication. The electric vehicle 124 also has a computational function for performing computation necessary at the time of authentication. Furthermore, the electric vehicle 124 holds identification information such as an appliance ID and key information necessary for authentication. By using these functions and information, the electric vehicle 124 is enabled to be authenticated by the power management apparatus 11. Additionally, the type of authentication may be mutual authentication using a random number, or public key authentication using a pair of a secret key and a public key.

Furthermore, the electric vehicle 124 also has a function of transmitting, to the power management apparatus 11, appliance battery information relating to a battery that is mounted, such as a remaining battery level, a charge amount, and a discharge amount. User information relating to a user owning the electric vehicle 124, and appliance information relating to fuel efficiency, performance, or the like, of the electric vehicle 124 are also transmitted to the power management apparatus 11. With these pieces of information transmitted to the power management apparatus 11 from the electric vehicle 124, it becomes possible for the power management apparatus 11 to carry out processes such as billing using the user information, and taxation based on the user information and the appliance information. For example, a process of imposing an environmental tax calculated based on the amount of $CO_2$ emissions, a process of displaying a mileage based on the remaining battery level, and the like, will be able to be carried out by the power management apparatus 11.

Additionally, it is also conceivable to use the battery of the electric vehicle 124 instead of the power storage apparatus 128. For example, the battery of the electric vehicle 124 may be used instead of the power storage apparatus 128 when it is temporarily not possible to use the power storage apparatus 128, such as when the power storage apparatus 128 is broken down or is being exchanged. Furthermore, since the electric vehicle 124 is itself movable, it can carry external power as a material. That is, it can be used as a movable power storage apparatus 128. Due to such advantage, it may also be useful to have the electric vehicle 124 act as back-up power supply in case of disaster or emergency. Such usage can, of course, be realized within the framework of the local power management system 1 according to the present embodiment.

Control-Compliant Appliance 125

Next, the function of the control-compliant appliance 125 will be summarized. The control-compliant appliance 125 has various functions necessary for being authenticated by the power management apparatus 11. For example, the control-compliant appliance 125 has a communication function for exchanging information with the power management apparatus 11. This communication function is realized by cable communication by a power line or a signal line, or by providing the control-compliant appliance 125 with a communication module for wireless communication. The control-compliant appliance 125 also has a computational function for performing computation necessary at the time of authentication. Furthermore, the control-compliant appliance 125 holds identification information such as an appliance ID and key information necessary for authentication. By using these functions and information, the control-compliant appliance 125 is enabled to be authenticated by the power management apparatus 11. Additionally, the type of authentication may be mutual authentication using a random number, or public key authentication using a pair of a secret key and a public key.

Furthermore, the control-compliant appliance 125 also has a function of transmitting, to the power management apparatus 11, appliance battery information relating to a battery that is mounted, such as a remaining battery level, a charge amount, and a discharge amount. User information relating to a user owning the control-compliant appliance 125, and appliance information relating to the type, performance, or the like, of the control-compliant appliance 125 are also transmitted to the power management apparatus 11. With these pieces of information transmitted to the power management apparatus 11 from the control-compliant appliance 125, it becomes possible for the power management apparatus 11 to carry out processes such as billing using the user information, and taxation based on the user information and the appliance information. For example, a process of imposing an environmental tax calculated based on the amount of $CO_2$ emissions, a display process for recommending an appliance with higher environmental performance, and the like, will be able to be carried out by the power management apparatus 11.

Non-Control-Compliant Appliance 126, Outlet Expansion Apparatus 127

Next, the functions of the non-control-compliant appliance 126 and the outlet expansion apparatus 127 will be summarized. Unlike the control-compliant outlet 123, the electric vehicle 124, and the control-compliant appliance 125 described above, the non-control-compliant appliance 126 does not possess a function necessary to be authenticated by the power management apparatus 11. That is, the non-control-compliant appliance 126 is an existing home electric appliance, an existing video appliance, or the like. The non-control-compliant appliance 126, which does not pass authentication, is not enabled to be subjected to power management by the power management apparatus 11, and in some cases, is not enabled to receive power. Therefore, to enable use of the non-control-compliant appliance 126 in the local power management system 1, delegate means for performing authentication becomes necessary.

The outlet expansion apparatus 127 undertakes two roles. One role is a function of performing delegate authentication such that the non-control-compliant appliance 126 is enabled to be used in the local power management system 1. The other role is a function of increasing the number of appliances to be connected to the control-compliant outlet 123. One or more terminals to be connected with the power plug of the electric terminal 124, the control-compliant appliance 125, or the non-control-compliant appliance 126 is provided to the outlet expansion apparatus 127. When using the outlet expansion apparatus 127 provided with a plurality of terminals, the number of the electric vehicles 124, the control-compliant appliances 125, and the non-control-compliant appliances 126 that can be connected to the control-compliant outlet 123 can be increased. That is, the outlet expansion apparatus 127 functions as a power strip having an advanced function.

In the foregoing, the functions of the control-compliant outlet 123, the electric vehicle 124, the control-compliant appliance 125, the non-control-compliant appliance 126, and the outlet expansion apparatus 127 have been briefly summarized. Incidentally, the functions described above are not the only functions of the control-compliant outlet 123, the electric vehicle 124, the control-compliant appliance 125, the non-control-compliant appliance 126, and the outlet expansion apparatus 127. Taking these functions as basics, functions necessary for operation of power management by the power management apparatus 11 described below will be further supplemented.

Communication Function

Here, a communication function of the power management apparatus 11, the control-compliant outlet 123, the electric vehicle 124, the control-compliant appliance 125, the outlet expansion apparatus 127, or the like, within the local power management system 1 will be described with reference to FIG. 3. As shown in FIG. 3, in the local power management system 1, short-range wireless communication, wireless LAN, power line communication, or the like, is used, for example. For example, ZigBee is an example of the short-range wireless communication. Also, PLC is an example of the power line communication.

As shown in FIG. 2, in the local power management system 1, the control-compliant outlet 123 and appliances connected to the control-compliant outlet 123 are connected to the power distribution apparatus 121 by power lines. Thus, a communication network based on the power line communication can be easily constructed by using these power lines. On the other hand, in the case of using the short-range wireless communication, a communication network can be constructed by connecting each appliance in an ad-hoc manner, as shown in FIG. 3. Also, in the case of using the wireless LAN, each appliance can be directly connected to the power management apparatus 11. Accordingly, a necessary communication network can be constructed within the local power management system 1 by using any of the communication methods.

However, as shown in FIG. 3, the non-control-compliant appliance 126 is sometimes not enabled to be connected to the power management apparatus 11 by using the communication network. Thus, in the case of using the non-control-compliant appliance 126, the non-control-compliant appliance 126 has to be connected to the outlet expansion apparatus 127. Additionally, even in the case of using a non-control compliant outlet not having the communication function nor an authentication function, connection to the power management apparatus 11 via the communication network is enabled by using the function of the electric vehicle 124, the control-compliant appliance 125, or the outlet expansion apparatus 127, if the electric vehicle 124, the control-compliant appliance 125, or the outlet expansion apparatus 127 is connected to the non-control compliant outlet. Of course, in the case the non-control-compliant appliance 126 is connected to the non-control compliant outlet, connection to the communication network is not enabled, and thus control by the power management apparatus 11 is not enabled.

Incidentally, the power information gathering apparatus 4 may be included, as a connection destination, in the communication network constructed within the local power management system 1, as shown in FIG. 3. Also, information may be exchanged between the electric vehicle 124 or the control-compliant appliance 125 and the power information gathering apparatus 4 by using this communication network. Of course, the power management apparatus 11 and the power information gathering apparatus 4 may exchange information by using this communication network. As such, the structure of the communication network constructed within the local power management system 1 should be appropriately set according to the mode of embodiment. Additionally, this communication network is to be constructed by a sufficiently secure communication channel. Also, a mechanism that allows to guarantee security of information flowing through the communication channel should be provided.

Specific Examples of Appliances and Various Apparatuses

Here, specific examples of some structural elements of the local power management system 1 will be introduced with reference to FIG. 4. As shown in FIG. 4, structural elements that possibly exchange information with the power management apparatus 11 include, for example, the electric vehicle 124, the control-compliant appliance 125 (a smart appliance), the non-control-compliant appliance 126 (a legacy appliance), the power storage apparatus 128, the first power generating apparatus 129, the second power generating apparatus 130, and the like.

As the electric vehicle 124, an electric vehicle and a plug-in hybrid electric vehicle can be given as specific examples, for example. Also, as the control-compliant appliance 125 and the non-control-compliant appliance 126, a home appliance, a personal computer, a mobile phone, and a video appliance can be given as specific examples, for example. As the power storage apparatus 128, a lithium-ion rechargeable cell, a NAS rechargeable cell, and a capacitor can be given as specific examples, for example. Also, as the first power generating apparatus 129, a photovoltaic apparatus, a wind power generating apparatus, and a geothermal power generating apparatus can be given as specific examples, for example. Furthermore, as the second power generating apparatus 130, a fuel cell, a natural gas power generating apparatus, and a biomass power generating apparatus can be given as specific examples, for example. As described, various apparatuses and appliances are used as the structural elements of the local power management system 1.

In the foregoing, the configuration of the managed block 12 has been described. However, the function of each structural element included in the managed block 12 is not limited to that described above. The function of each structural element is supplemented as necessary for power management by the power management apparatus 11. Additionally, a supplementary function of each structural element will be described in detail in the explanation of the configuration of the power management apparatus 11 and other structural elements to be described later.

Configuration of External Server

Figure 5:
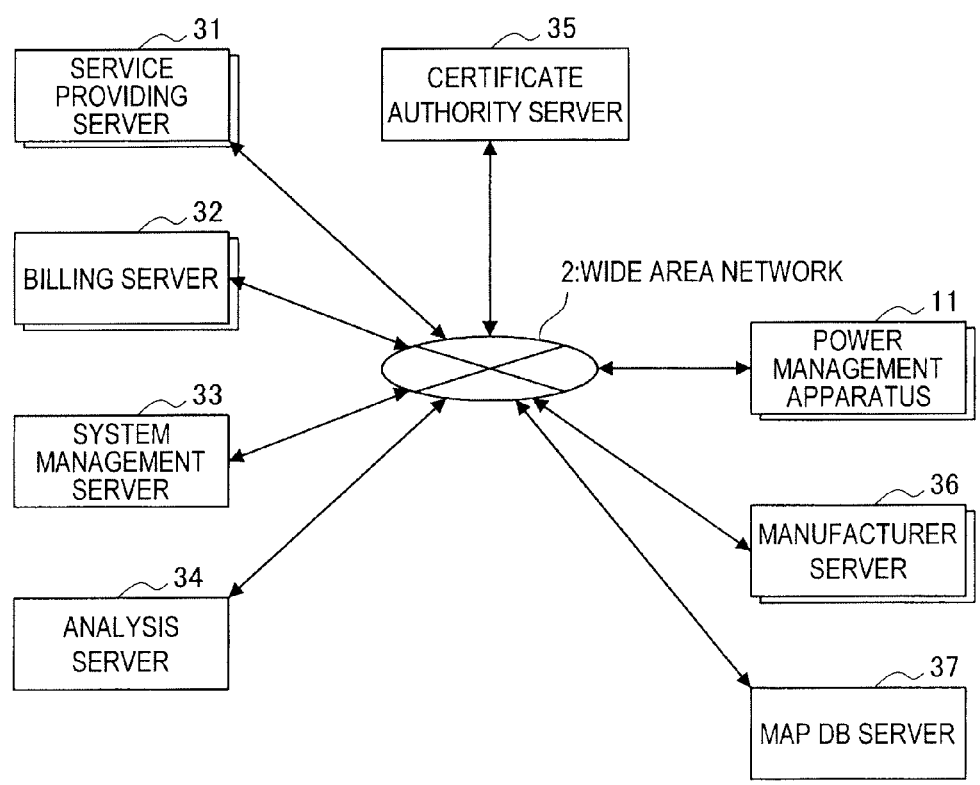
FIG. 5 is a diagram useful in explaining specific examples of external servers.

Next, the configuration of the external server 3 will be described with reference to FIG. 5. As shown in FIG. 5, as the external server 3, a service providing server 31, a billing server 32, a system management server 33, an analysis server 34, a certificate authority server 35, a manufacturer server 36, and a map DB server 37 are used, for example.

The service providing server 31 has a function of providing a service that uses a function of the power management apparatus 11 or the like. The billing server 32 has a function of providing the power management apparatus 11 with billing information according to the power consumed in the local power management system 1, and requesting a user to settle the usage fee, based on information on the amount of power managed by the power management apparatus 11. Also, the billing server 32 carries out, in cooperation with the service providing server 31, a billing process on a service used by a user. Additionally, the billing process may be carried out for an owner user of the electric vehicle 124, the control-compliant appliance 125, or the like, that consumed power, or may be carried out for a user of the power management apparatus 11 managing information on the power consumed.

The system management server 33 has a function of managing the entire power management system shown in FIG. 1 or of managing the power management system on a regional basis. For example, as shown in FIG. 6, the system management server 33 grasps a usage status in the local power management system 1 of a user #1, a usage status in the local power management system 1 of a user #2, and a usage status in the local power management system 1 of a user #3, and provides the billing server 32 or the like with necessary information.

Figure 6:
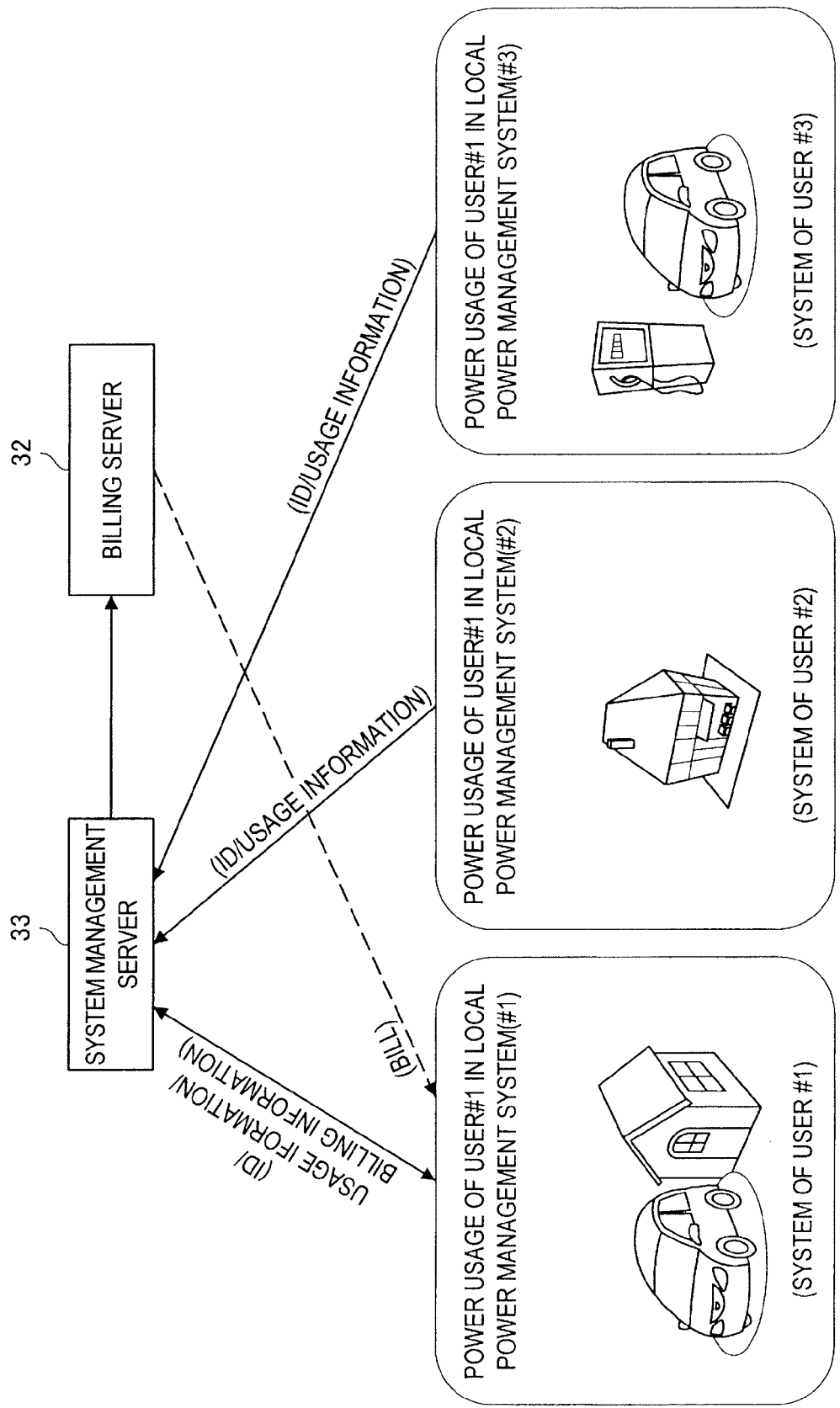
FIG. 6 is a diagram useful in explaining one function of a system management server.

In the example of FIG. 6, a case is assumed where the user #1 used power in the local power management systems 1 of the user #1 himself/herself, the user #2, and the user #3. In this case, an appliance ID of the user #1 that consumed power and usage information (power consumption or the like) are gathered by the system management server 33, and user information of the user #1 and the usage information are transmitted from the system management server 33 to the billing server 32. Furthermore, the system management server 33 calculates billing information (billed amount, or the like) based on the gathered usage information, and provides the same to the user #1. For its part, the billing server 32 charges the user #1 for a sum corresponding to the billing information.

As described, with the system management server 33 exercising general control over a plurality of local power management systems 1, a mechanism is realized of billing a user who has used power even if the user has used power in the local power management system 1 of another user. Especially, charging of the electric vehicle 124 is, in many cases, performed outside the local power management system 1 managed by oneself. In such a case, if the function described above of the system management server 33 is used, fee can be reliably billed to the user of the electric vehicle 124.

The analysis server 34 has a function of analyzing information gathered by the power management apparatus 11, or information that another server connected to the wide area network 2 holds. For example, in the case of optimizing region-based power supply control, the amount of information gathered from the local power management systems 1 will be huge, and to calculate an optimal control method for each local power management system 1 by analyzing the information, tremendous amount of computation will have to be performed. Such computation is burdensome to the power management apparatus 11, and thus is carried out by using the analysis server 34. Additionally, the analysis server 34 can also be used for other various computational processes. Furthermore, the certificate authority server 35 is for authenticating a public key, and for issuing a public key certificate.

The manufacturer server 36 is managed by the manufacturer of an appliance. For example, the manufacturer server 36 of the electric vehicle 124 holds information relating to the design of the electric vehicle 124. Similarly, the manufacturer server 36 of the control-compliant appliance 125 holds information relating to the design of the control-compliant appliance 125. Furthermore, the manufacturer server 36 holds information for identifying each manufactured appliance, such as each electric vehicle 124 and each control-compliant appliance 125. The manufacturer server 36 has a function of identifying the electric vehicle 124 or the control-compliant appliance 125 located within each local power management system 1 by using these pieces of information and cooperating with the power management apparatus 11. By using this function, the power management apparatus 11 can carry out authentication of the electric vehicle 124 or the control-compliant appliance 125, or detect connection of an unauthorized appliance.

The map DB server 37 holds a map database. Accordingly, a server or the power management apparatus 11 connected to the wide area network 2 can access the map DB server 37 and use the map database. For example, in a case a user used power outside his/her local power management system 1, the system management server 33 can search the usage location from the map database and provide the user with information on the usage location together with billing information. As described, there are various types of external server 3, and in addition to the server configuration illustrated here, different types of external servers 3 can also be added as appropriate.

Configuration of Power Management Apparatus

In the foregoing, an overall picture of the power management system according to the present embodiment has been described. In the following, the configuration of the power management apparatus 11 mainly in charge of power management in the power management system will be described with reference to FIGS. 7 to 9.

Overview of Function

Figure 7:
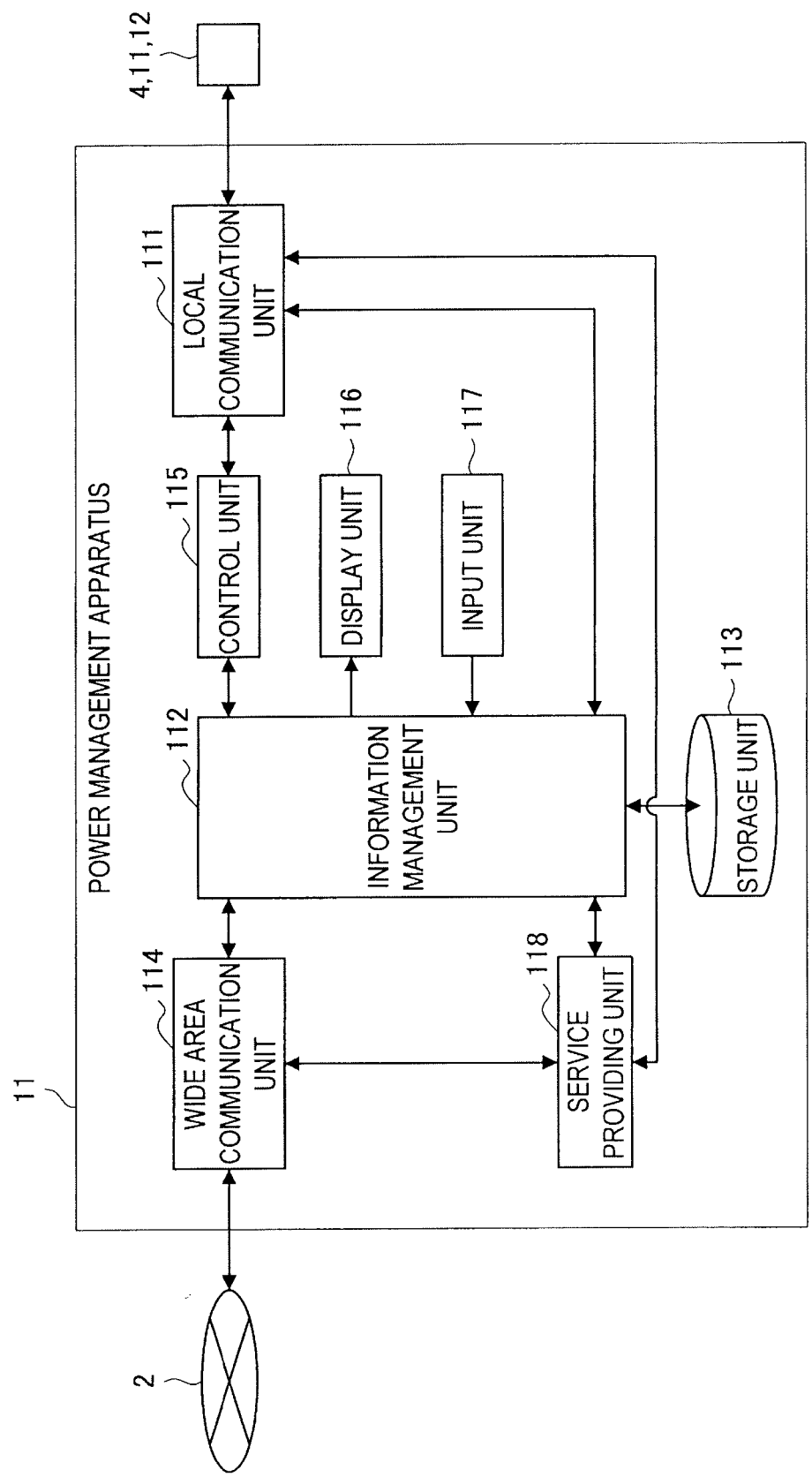
FIG. 7 is a diagram useful in explaining the functional configuration of a power management apparatus according to an embodiment of the present invention.

First, an overall functional configuration of the power management apparatus 11 will be described with reference to FIG. 7. As shown in FIG. 7, the power management apparatus 11 includes a local communication unit 111, an information management unit 112, a storage unit 113, a wide area communication unit 114, a control unit 115, a display unit 116, an input unit 117, and a service providing unit 118.

The local communication unit 111 is communication means for communicating via a communication network constructed within the local power management system 1. The information management unit 112 is means for managing appliance information of each structural element included in the local power management system 1 and information relating to power. Also, the authentication process for the control-compliant outlet 123, the electric vehicle 124, the control-compliant appliance 125, the outlet expansion apparatus 127, or the like, is carried out by the information management unit 112. The storage unit 113 is storage means for holding information used for authentication and information used for power management. The storage unit 113 stores key information relating to a key pair composed of a secret key and a public key held by the power management apparatus 11, a common key, or the like, various digital signatures or certificates, various databases, or history information. The wide area communication unit 114 is communication means for exchanging information with an external system and server via the wide area network 2.

The control unit 115 is control means for controlling operation of each structural element included in the local power management system 1. The display unit 116 is display means for displaying information relating to power consumed in the local power management system 1, the user information, the billing information, other types of information relating to power management, information relating to power management outside the local power management system 1, information relating to power trading, and the like. Additionally, as the display means, an LCD, an ELD or the like is used, for example. The input unit 117 is input means for a user to input information. Additionally, as the input unit 117, a keyboard, a button, or the like is used, for example. Furthermore, it is also possible to construct a touch panel by combining the display unit 116 and the input unit 117. The service providing unit 118 is means for realizing, at the power management apparatus 11, various services and functions and providing the same to a user while operating in concert with an external system, server, or the like.

As described, the power management apparatus 11 includes the communication means (the local communication unit 111, the wide area communication unit 114) for exchanging information with an appliance, an apparatus, a system, a server, or the like, within or outside the local power management system 1. Furthermore, the power management apparatus 11 includes the control means (the control unit 115) for controlling an appliance or an apparatus within the local power management system 1. Also, the power management apparatus 11 includes information management means (the information management unit 112) that gathers information from an appliance, an apparatus, a system, a server, or the like, within or outside the local power management system 1, and provides a service or authenticates an appliance or an apparatus within the local power management system 1 by using the information. Also, the power management apparatus 11 includes the display means (the display unit 116) for displaying information relating to power within or outside the local power management system 1.

To safely and efficiently manage power within the local power management system 1, first, an appliance, an apparatus, or the like, within the local power management system 1 has to be correctly identified. Also, to safely and efficiently manage power within the local power management system 1, analysis of the information relating to power within and outside the local power management system 1 and performance of appropriate power control are also necessary. The function of the information management unit 112 is used for management of information performed to fulfill the above. Accordingly, the function of the information management unit 112 will be described in greater detail. Additionally, the function of the control unit 115 is used for control of a specific appliance, apparatus, or the like.

Details of Function

Figure 8:
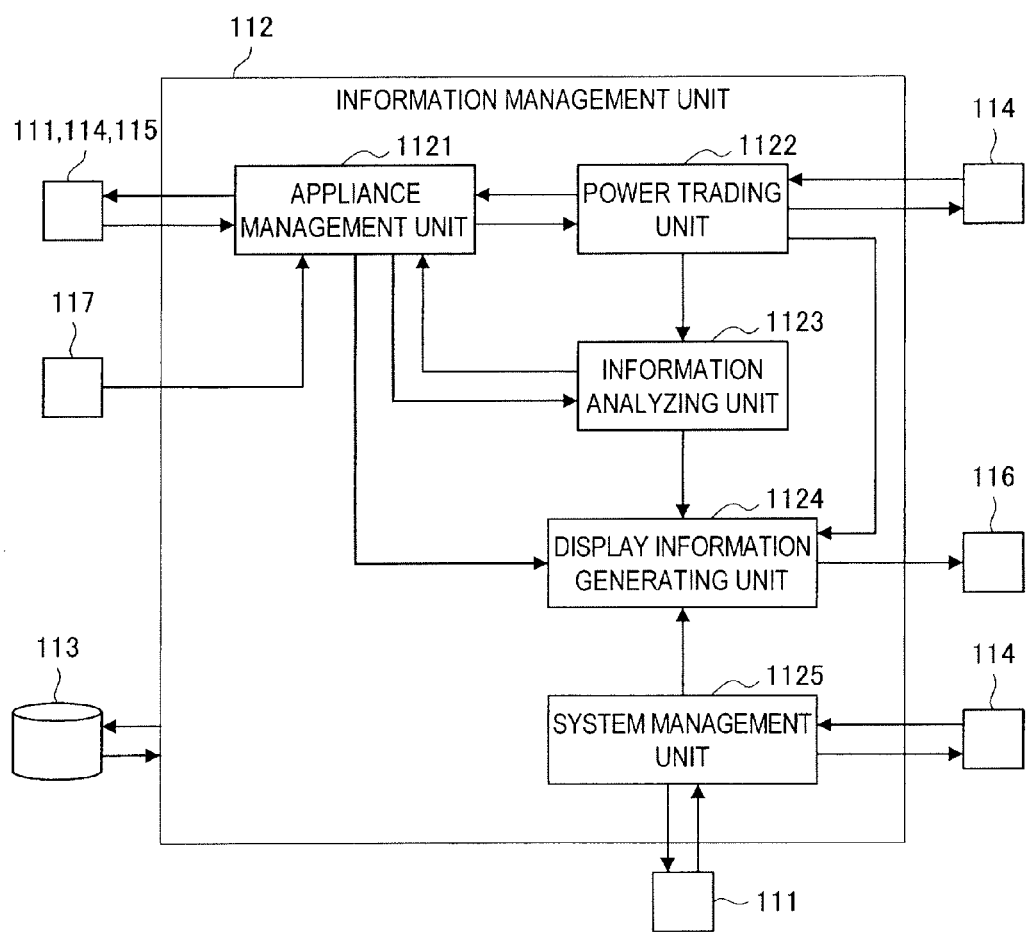
FIG. 8 is a diagram useful in explaining the detailed functional configuration of an information management unit.

In the following, a functional configuration of the information management unit 112 will be described in detail with reference to FIGS. 8 and 9. FIG. 8 shows a detailed functional configuration of the information management unit 112. FIG. 9 shows a main function of each structural element of the information management unit 112.

As shown in FIG. 8, the information management unit 112 includes an appliance management unit 1121, a power trading unit 1122, an information analyzing unit 1123, a display information generating unit 1124, and a system management unit 1125.

Appliance Management Unit 1121

As shown in FIG. 9, the appliance management unit 1121 is means for managing an appliance, an apparatus, or the like, within the local power management system 1. For example, the appliance management unit 1121 performs, for the control-compliant outlet 123, the electric vehicle 124, the control-compliant appliance 125, the outlet expansion apparatus 127, or the like, registration, authentication, management of an appliance ID, management of operation settings and service settings, grasping of an operational state and a usage state, gathering of environmental information, and the like. Additionally, gathering of environmental information is carried out by using the environmental sensor 131 installed in the managed block 12. Moreover, the environmental information is information relating to temperature, humidity, weather, wind direction, wind velocity, landform, region, weather forecast, and the like, and information obtained by analysis thereof.

Power Trading Unit 1122

As shown in FIG. 9, the power trading unit 1122 performs acquisition of market trading data or individual trading data in the electricity market, timing control of execution of trading, execution of trading, management of trade log, and the like. Additionally, the market trading data is information relating to market price and trading conditions in the electricity market. Moreover, the individual trading data is information relating to transaction price and trading conditions determined at the time of an individual trade between a power supplier and a neighborhood consumer or the like. The timing control of execution of trading is automatic control of placing a buy order for a predetermined amount at a timing the power purchase price falls below a predetermined value or placing a sell order for a predetermined amount at a timing the power sell price rises above a predetermined value, for example.

Information Analyzing Unit 1123

As shown in FIG. 9, the information analyzing unit 1123 performs analysis of power generation data, analysis of power storage data, learning of life pattern, and analysis of power consumption data. Furthermore, the information analyzing unit 1123 performs, based on the analyses, estimation of power consumption pattern, estimation of power storage pattern, estimation of power discharge pattern, and estimation of power generation pattern. Additionally, analysis and learning by the information analyzing unit 1123 are performed by using time-series data of the amount of power generation by the first power generating apparatus 129 or the second power generating apparatus 130 within the local power management system 1, time-series data of charge/discharge amount or power storage amount of the power storage apparatus 128, or time-series data of the amount of power supplied from the power supplier system 5, for example.

Furthermore, estimation by the information analyzing unit 1123 is performed by using, as data for learning, the time-series data or an analysis result obtained by analyzing the time-series data, and by using an estimation formula obtained based on a predetermined machine learning algorithm. For example, by using a genetic learning algorithm (see JP-A-2009-48266, for example), the estimation formula can be automatically constructed. Also, by inputting the past time-series data or analysis result to the estimation formula, an estimation result can be obtained. Furthermore, by sequentially inputting calculated estimation results to the estimation formula, time-series data can be estimated.

Furthermore, the information analyzing unit 1123 performs calculation of present or future $CO_2$ emissions, calculation of power supply pattern for reducing the power consumption (power saving pattern), calculation of power supply pattern for reducing $CO_2$ emissions (low $CO_2$ emissions pattern), and calculation or recommendation of appliance configuration, appliance arrangement or the like capable of reducing the power consumption and the $CO_2$ emissions in the local power management system 1. The $CO_2$ emissions are calculated based on the total power consumption or the power consumption distinguished for each power generation method.

In the case of using the total power consumption, approximately average $CO_2$ emissions are calculated. On the other hand, in the case of using the power consumption distinguished for each power generation method, comparatively accurate $CO_2$ emissions are calculated. Additionally, by at least distinguishing between power supplied from the outside, power generated by the first power generating apparatus 129 and power generated by the second power generating apparatus 130, more accurate $CO_2$ emissions can be calculated than when the total power consumption is used. Tax, such as carbon tax, and billing are, in many cases, determined according to the $CO_2$ emissions. Thus, it is assumed that enabling accurate calculation of the $CO_2$ emissions will increase a sense of fairness among users and contribute to widespread use of power generating means based on renewable energy.

Display Information Generating Unit 1124

As shown in FIG. 9, the display information generating unit 1124 generates display information to be displayed on the display unit 116, by adjusting the format of information relating to an appliance, an apparatus or the like within the local power management system 1, information relating to power, information relating to environment, information relating to power trading, information relating to an analysis result or an estimation result by the information analyzing unit 1123, or the like. For example, the display information generating unit 1124 generates display information for displaying information indicating the amount of power in a graph format, or generates display information for displaying market data in a table format. Also, the display information generating unit 1124 generates a graphical user interface (GUI) used for display of various types of information or input of information. These pieces of display information generated by the display information generating unit 1124 are displayed on the display unit 116.

System Management Unit 1125

As shown in FIG. 9, the system management unit 1125 performs management/update of version of firmware, which is a program for controlling basic operation of the power management apparatus 11, restricts access thereto, and takes antivirus measures, for example. Also, in the case a plurality of power management apparatuses 11 are installed in the local power management system 1, the system management unit 1125 exchanges information with another power management apparatuses 11, and performs control such that a plurality of power management apparatuses 11 operate in cooperation with each other. For example, the system management unit 1125 manages the attribute (for example, priority ranks of control processes on an appliance, an apparatus, or the like) of each power management apparatus 11. Furthermore, the system management unit 1125 performs state control of each power management apparatus 11 relating to participation in a cooperative operation or withdrawal from the cooperative operation.

In the foregoing, the functional configuration of the power management apparatus 11 has been described. Additionally, the functional configuration of the power management apparatus 11 described here is only an example, and functions other than the above may be added as necessary.

(1-3) Content Displayed on Display Unit

Next, the content displayed on the display unit will be described more specifically with reference to FIGS. 10 to 13. FIGS. 10 to 13 are diagrams useful in explaining the content displayed on the display unit.

Figure 10:
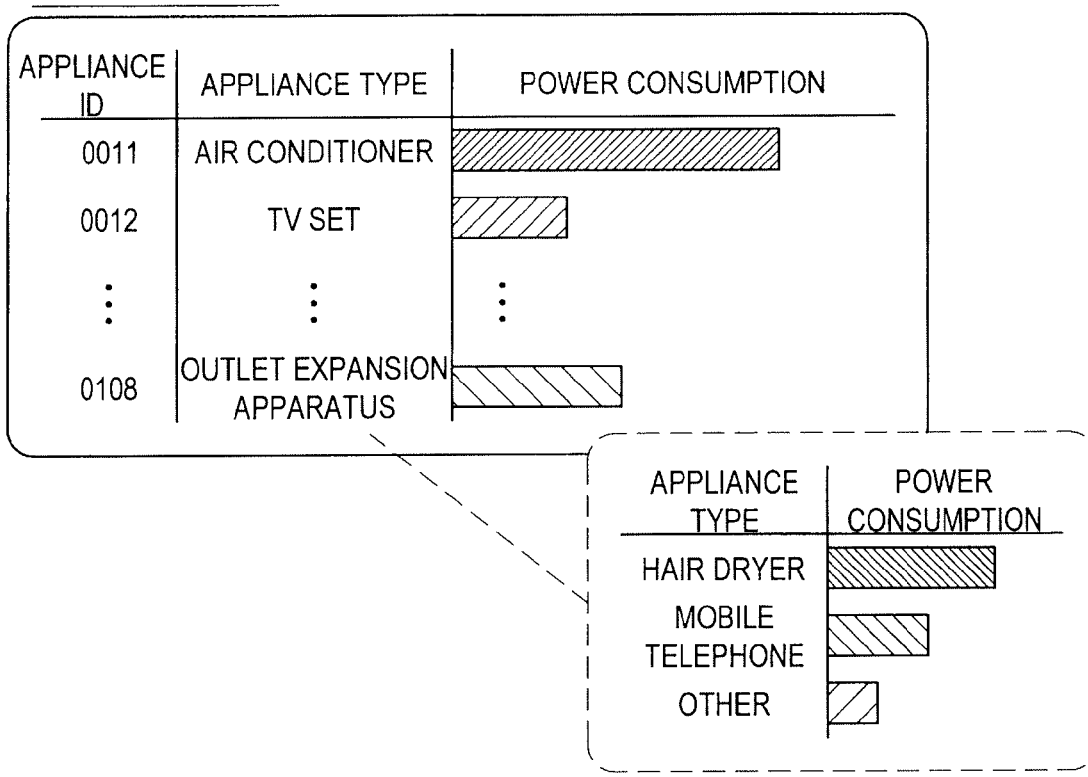
FIG. 10 is a diagram useful in explaining the content displayed on a display unit.

As described earlier, various information is displayed on the display unit 116 of the power management apparatus 11. For example, as shown in FIG. 10, a list of appliances that have been registered in the power management apparatus 11 is displayed together with the power consumption of each appliance on the display unit of the power management apparatus 11. Here, the power consumption may be displayed as a numeric value or, as shown in FIG. 10, in the form of a bar graph, for example. For an apparatus, such as an outlet expansion apparatus, to which a plurality of appliances can be connected, by selecting an "OUTLET EXPANSION APPARATUS" area on the display, it is possible to grasp the power consumption of the individual appliances connected to the outlet expansion apparatus.

Figure 11:
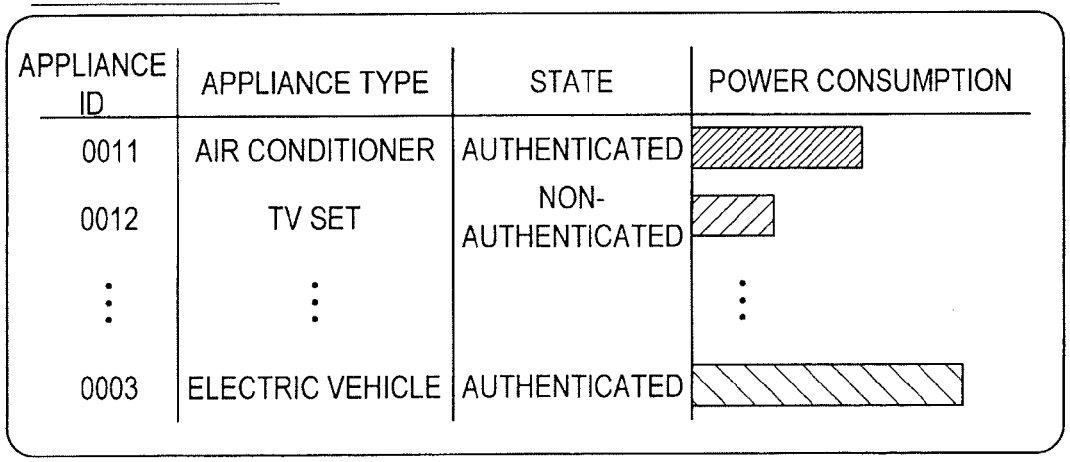
FIG. 11 is a diagram useful in explaining the content displayed on the display unit.
Figure 14:
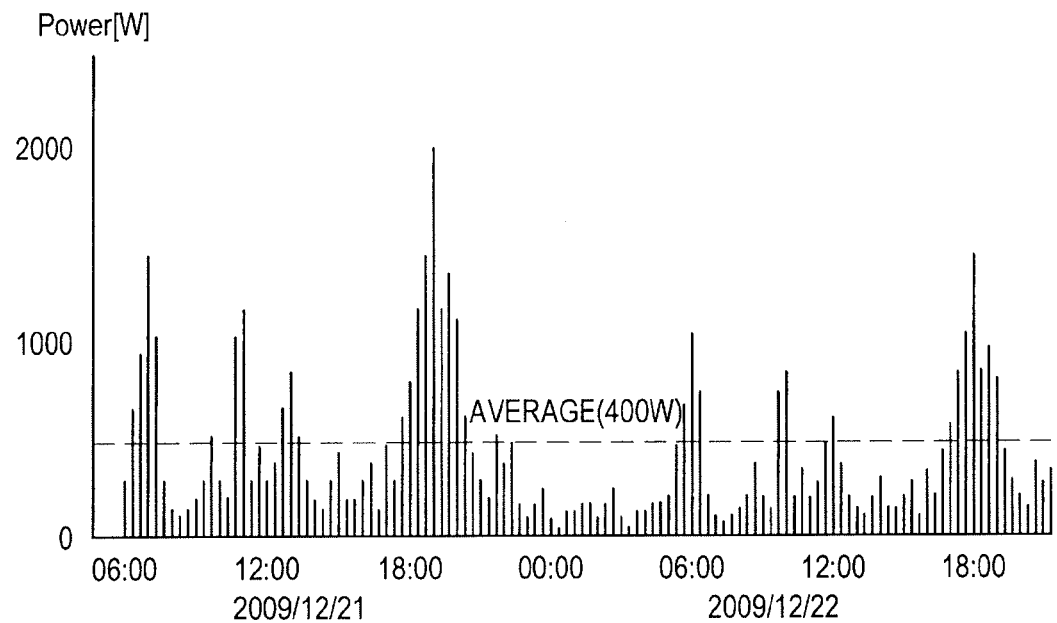
FIG. 14 is a graph useful in explaining a time-series pattern of power consumption.
Figure 15:
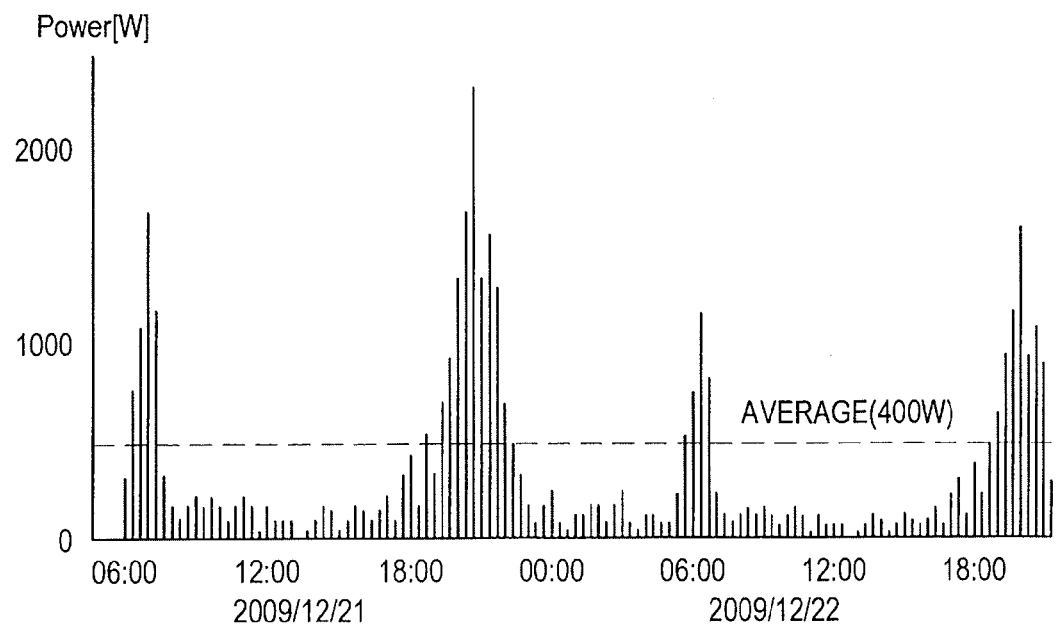
FIG. 15 is a graph useful in explaining a time-series pattern of power consumption.

As shown in FIG. 11, the display unit 116 may also display an authentication state of the appliances connected to the power management apparatus 11. By displaying such information, it becomes possible for the user of the power management apparatus 11 to easily distinguish which appliances have been authenticated, which can increase the efficiency of user maintenance.

In addition, as shown in FIG. 12, a list of power consumption and billed amounts for each usage location may be displayed on the display unit 116. By displaying such information, it is possible for the user to easily grasp whether standby power is being unnecessarily consumed, for example.

As shown in FIG. 13, it is also possible to distinguish between the types of power that have been used (that is, whether the power is power used outside the system or power used within the system) in the display of power consumption on the display unit 116.

(1-4) Concealing Power Consumption Pattern

Here, a method of concealing a power consumption pattern will be described with reference to FIGS. 14 to 18.

The power consumption pattern of the managed block 12 reflects the lifestyle pattern of the user. As one example, in the power consumption pattern illustrated in FIG. 14, peaks appear throughout the day. From this power consumption pattern, it can be understood that the user was at home throughout the day. Also since the consumption peaks have mostly vanished by around 0:00 (midnight), it can be understood that the user went to bed at around midnight. Meanwhile, in the power consumption pattern illustrated in FIG. 15, although large peaks appear around 7:00 and at 21:00, few peaks appear at other times of the day. This power consumption pattern suggests that the user leaves the house at around 7:00 and is absent until close to 21:00.

In this way, the power consumption pattern reflects the lifestyle pattern of the user. If such power consumption pattern were known by a malicious third party, such third party could then misuse the power consumption pattern. As examples, the third party could attempt to enter the home while the user is out, conduct high-pressure sales visits when the user is at home, or commit a robbery while the user is asleep.

For this reason, it is necessary to strictly manage information on power consumption or to provide an arrangement for concealing the power consumption pattern. As described earlier, information on the amount of power supplied from the power supplier system 5 is gathered by the power information gathering apparatus 4 that is managed by the power supplier. This means that a time-series pattern on power consumption by the managed block 12 will be exposed to at least the power supplier.

For this reason, out of the above measures, it is preferable to provide an arrangement for concealing the power consumption pattern to prevent the lifestyle pattern of a user from being discovered by a third party. One way to conceal a power consumption pattern is to create discrepancies between the time-series pattern of the amount of power supplied from the power supplier system 5 and the user's lifestyle pattern. For example, the power supplier system 5 could supply power when the user is not at home, or the local system could stop receiving power from the power supplier system 5 when the user is at home.

Such measures are realized using the power storage apparatus 128. For example, supplied power received from the power supplier system 5 when the user is not at home may be stored in the power storage apparatus 128 and power stored in the power storage apparatus 128 may be used when the user is at home to suppress the amount of power supplied from the power supplier system 5. To further increase security, it would be preferable to carry out charging/discharging control of the power storage apparatus 128 to make the power consumption pattern a specified pattern and thereby mostly eradicate the characteristics that appear in the power consumption pattern due to the user's lifestyle pattern.

Averaging

Figure 16:
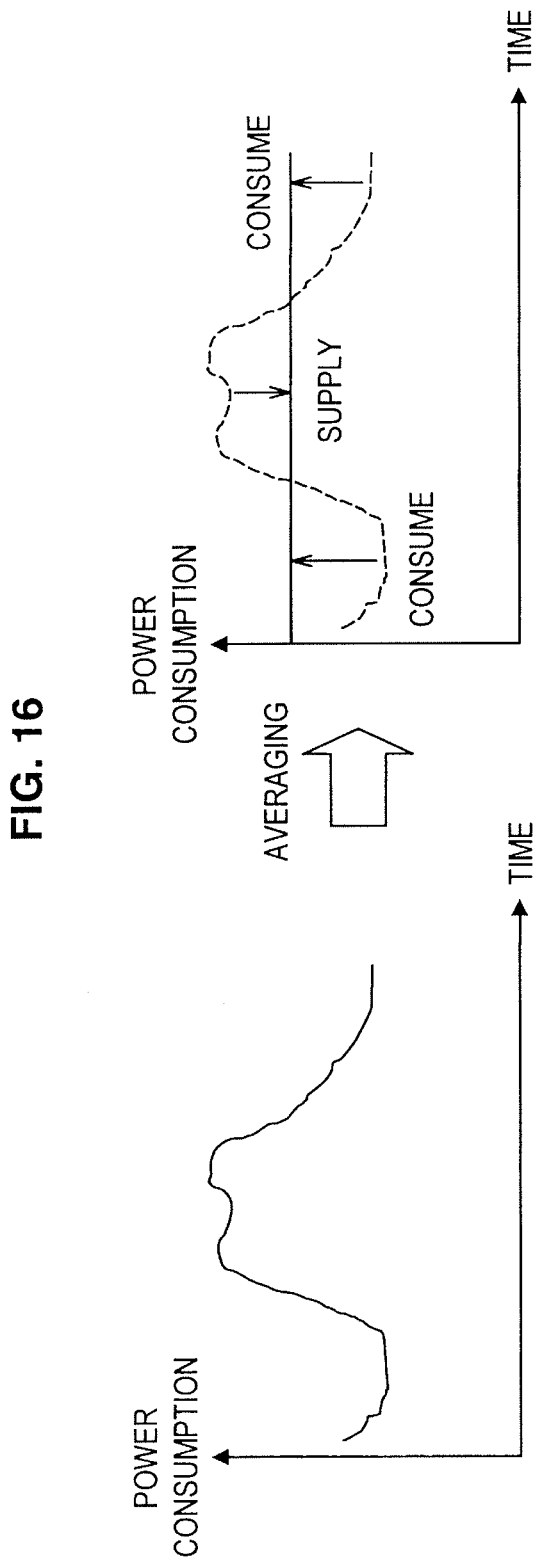
FIG. 16 is a diagram useful in explaining a method of concealing a power consumption pattern.

As shown in FIG. 16, one conceivable example is a method that carries out charging/discharging control of the power storage apparatus 128 to make the power consumption constant. To make the power consumption a constant value, the power stored in the power storage apparatus 128 may be increased when the power consumption is below the constant value and discharging of the power storage apparatus 128 may be increased when the power consumption is above the constant value. Such control is carried out by the power management apparatus 11. In addition to charging/discharging control of the power storage apparatus 128, it is possible to trade power between power consumers and/or to carry out charging/discharging control using a battery of the electric vehicle 124 or the like. In this way, by making the power consumption constant, it is possible to eradicate the characteristics that appear in the power consumption pattern due to the user's lifestyle pattern. As a result, it is possible to eradicate the risk of the user suffering from criminal behavior due to misuse of a power consumption pattern.

Complicating

Figure 17:
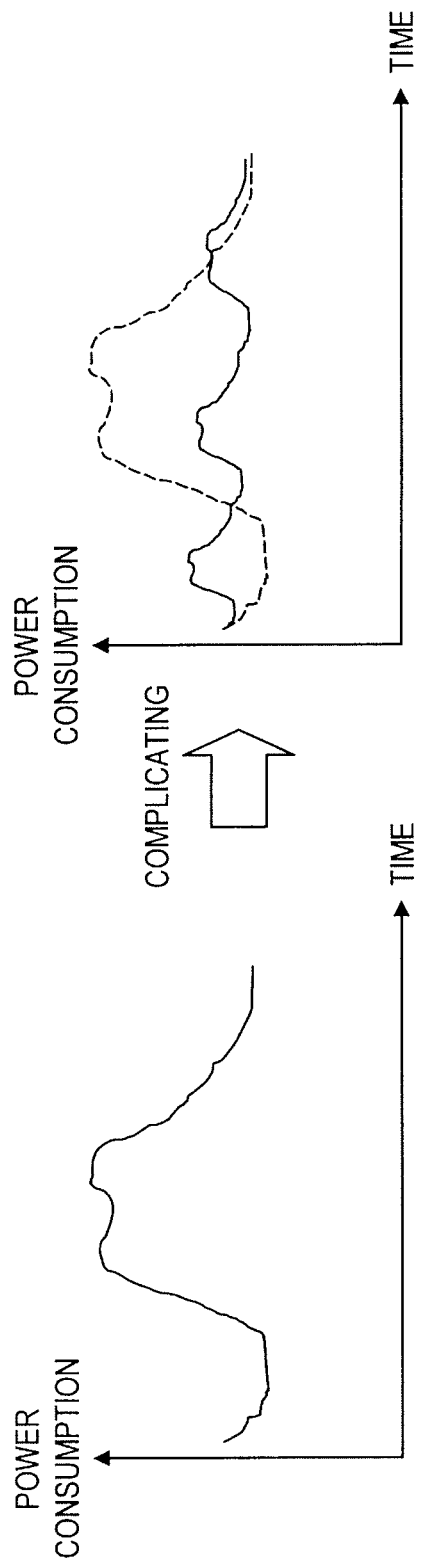
FIG. 17 is a diagram useful in explaining a method of concealing a power consumption pattern.

Note that so long as there is a discrepancy between the power consumption pattern and the lifestyle pattern, it is not necessary to set the power consumption at a constant value. To make the power consumption a constant value, a power storage apparatus 128 with sufficient capacity to absorb peaks in power consumption would be necessary. However, a power storage apparatus 128 with such large capacity is costly and it is not realistic to provide such an apparatus in an ordinary household merely to conceal a power consumption pattern. For this reason, a method of creating a discrepancy between the power consumption pattern and the lifestyle pattern using a power storage apparatus 128 of smaller capacity is preferable. As shown in FIG. 17, one conceivable example of such a method complicates (i.e., increases the complexity of) the power consumption pattern.

One conceivable method of complicating a power consumption pattern so as to produce comparatively small peaks and troughs throughout the pattern is described below. Although a large-capacity power storage apparatus 128 would be necessary to suppress a large peak to close to the average value, comparatively small peaks can be generated and moved using a storage apparatus with much smaller capacity. Although it is possible to complicate a power consumption pattern in units of one day, it is also effective to complicate a power consumption pattern so as to produce a different power consumption pattern every day and/or to eradicate cycles based on days of the week or month. An arrangement that complicates of the timing of events such as going out, coming home, going to bed, and getting up that are especially liable to misuse is also capable of sufficiently suppressing dishonest behavior without excessively complicating charging/discharging control of the power storage apparatus 128.

Patternizing

Figure 18:
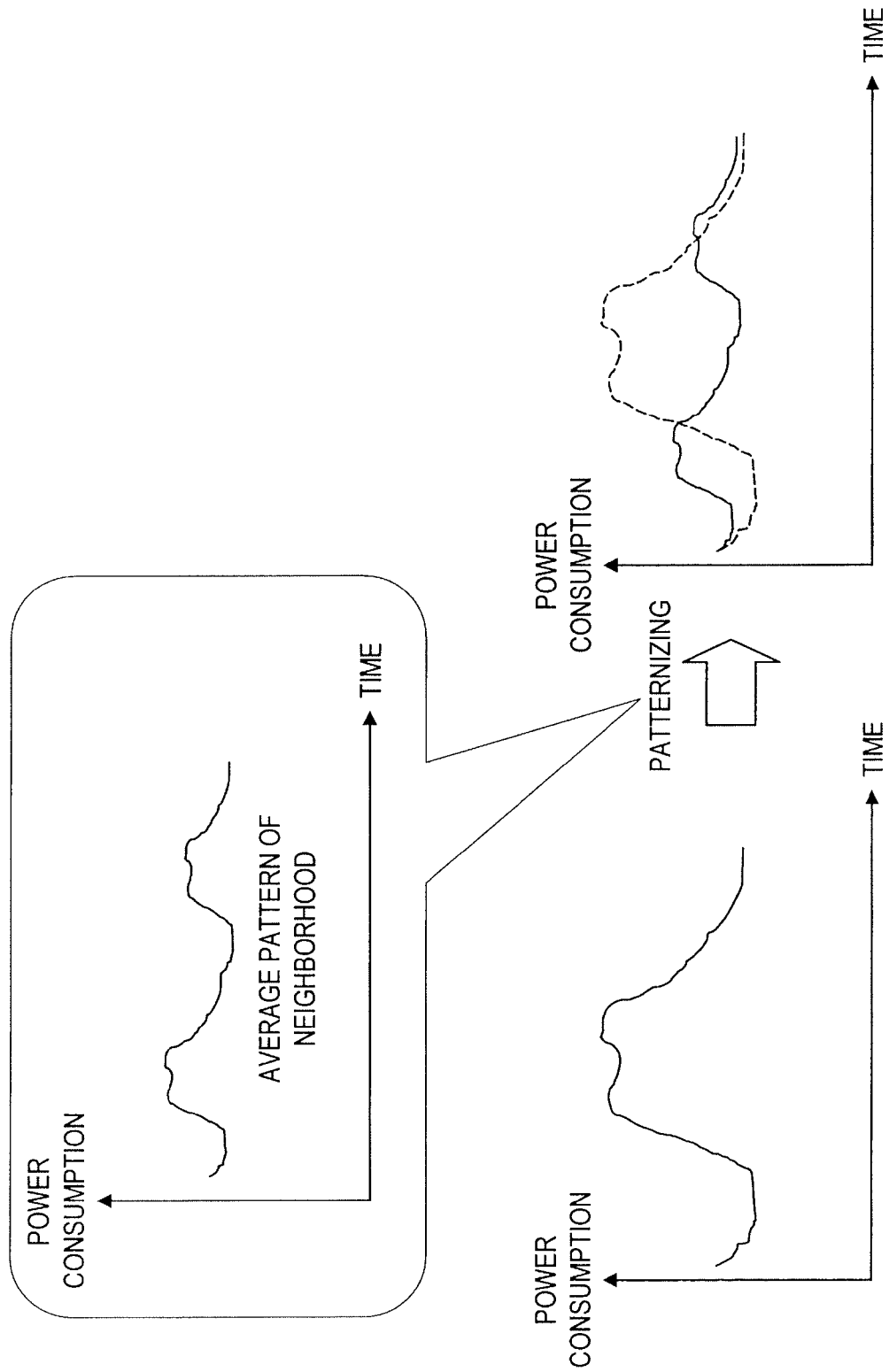
FIG. 18 is a diagram useful in explaining a method of concealing a power consumption pattern.

Also, as shown in FIG. 18, a method that controls the power consumption pattern so as to substantially match the average pattern in the neighborhood is also conceivable. The average pattern in the neighborhood is obtained based on the lifestyle patterns of other people. This means that little power control should be necessary to make the power consumption pattern of a specific user match the average pattern in the neighborhood. Compared to when the power consumption is controlled to become a constant value, it should be possible to conceal the lifestyle pattern of a specific user using a power storage apparatus 128 of low capacity. When power consumption is controlled in this way, power information is exchanged between power management apparatuses 11 in the neighborhood. The average pattern in the neighborhood is calculated using the functions of the information analyzing unit 1123 or the functions of the analysis server 34. Charging/discharging control is implemented for the power storage apparatus 128 based on the calculated average pattern.

(1-5) Various Control by Power Management Apparatus

Various control operations carried out by the power management apparatus 11 of the local power management system 1 described above will now be described in brief with reference to FIG. 19. FIG. 19 is a diagram useful in explaining an overview of various control by the power management apparatus.

The power management apparatus 11 carries out control as shown in FIG. 19 over the power distribution apparatus 121, the control-compliant outlet 123, the electric vehicle 124, the control-compliant appliance 125, the outlet expansion apparatus 127, and the like that are to be managed. That is, the power management apparatus 11 carries out various control operations over the appliances to be managed, such as power storage control, averaging control, trading control, power supply switching control, abnormality switching control, restoration control, authentication/registration control, information gathering/information processing control, external access control, and service linking control. Out of such control, charging control is control relating to power usage and storage, such as using power generated by various types of power generating apparatuses within a managed block during the day and using external power during the night.

As illustrated in FIG. 19, the power management apparatus 11 implements such control by referring to information relating to power sources, information relating to priority rankings, information relating to control conditions (parameters), and the like.

As shown in FIG. 19, for example, the information relating to power sources is information relating to power sources that the local power management system 1 to which the power management apparatus 11 belongs is capable of using. As illustrated in FIG. 19, such power sources can be roughly classified into external power and household power (or "system internal power"). The external power is power supplied from outside the local power management system 1, and as one example may be standard power supplied from a power supplying company or the like. System internal power is power managed inside the local power management system 1, and as examples may be power stored in the power storage apparatus, power generated by a power generating apparatus, power stored in the electric vehicle, and power stored in a battery module. Note that the expression "power stored in the power storage apparatus" here refers not only to power stored in a so-called dedicated power storage apparatus but also includes power stored in a battery or the like provided in an apparatus that is capable of being controlled by the power management apparatus 11, such as a computer, a household electrical appliance, or a mobile telephone. The power management apparatus 11 is also capable of using such information to store information showing which power source supplied the power stored in the power storage apparatus.

As shown in FIG. 19, for example, the information relating to priority rankings is information setting priority rankings for supplying power. If the supplying of power stops to a refrigerator that functions to keep food and drink fresh or a security-related appliance that maintains security in the system, or if power used for lighting or controlling appliances stops, it may become difficult to achieve such functions, which can adversely affect the user. Accordingly, the power management apparatus 11 is capable of supplying unrestricted power to such appliances to guarantee that such functions are maintained. The power management apparatus 11 is also capable of suppressing power usage by appropriately controlling the supplying of power to appliances (such as a television or air conditioner) whose priority ranking is set at "POWER SAVING MODE". The power management apparatus 11 is also capable of setting a "POWER OFF" priority ranking, and as one example it is possible to implement control so that the power of a recharger is normally off. Note that the priority rankings shown in FIG. 19 are mere examples and the priority rankings provided in the power management apparatus 11 are not limited to the examples shown in FIG. 19.

As shown in FIG. 19, for example, the information relating to control conditions is information setting the control conditions of the power management apparatus 11. As one example, such control conditions are roughly classified into conditions relating to the usage environment of power, conditions relating to the usage period of power, conditions relating to power usage mode, and conditions relating to abnormalities, for example. As shown in FIG. 19, it is possible to set more detailed condition items for the respective conditions. Note that the control conditions shown in FIG. 19 are mere examples and the control conditions provided in the power management apparatus 11 are not limited to the examples shown in FIG. 19.

Based on such information, the power management apparatus 11 implements control as shown in FIG. 19 over the respective appliances in the system 1. By doing so, the power management apparatus 11 is capable of carrying out charging control over the respective appliances being managed, controlling the operation of appliances, and updating the firmware of devices. For example, the power management apparatus 11 is capable of carrying out control such as "Start function of rice cooker at XX o'clock". It is also possible to link such control to a power estimating function that is another function provided in the power management apparatus 11 and start functions during a time zone where power is cheap. The power management apparatus 11 is also capable of operating in concert with a server provided outside the system 1 so as to provide a variety of services to a user. For example, an externally provided server is capable of using output information outputted by the power management apparatus 11 to provide services and the like that make it possible to easily check whether family members who live apart have a normal power usage state (that is, such family members are living as normal with no health problems).

Such control is capable of being implemented by not only the power management apparatus 11 but also by the control-compliant outlet 123, the outlet expansion apparatus 127, and the like provided in the power management system 1, for example.

To carry out such control, the power management apparatus 11 stores information such as the information shown in FIG. 20 and also registers such information in the system management server 33 provided outside the system 1. FIG. 20 is a diagram useful in explaining various information managed by the power management apparatus 11.

As illustrated in FIG. 20, the power management apparatus 11 stores information such as an identification number (ID) assigned to the apparatus, information relating to the manufacturer, model number, and the like, a date of registration in the system, and a status. In addition, the power management apparatus 11 stores information such as the user name, address, telephone number, billing information (information relating to a bank account and the like), and emergency contact of the user who owns the power management apparatus 11. The power management apparatus 11 also stores information relating to an ID, manufacturer name, model number, registration date, status, and the like assigned to the power distribution apparatus 121 present in the system 1. In addition, the power management apparatus 11 stores information relating to an ID, manufacturer name, model number, registration date, status, and the like assigned to the various types of control-compliant appliance 125 present in the system 1.

By storing such information, it becomes possible for the power management apparatus 11 to send requests for acquisition of various information and/or for the provision of various services to a server provided outside the system 1. For example, the power management apparatus 11 is capable of referring to manufacturer information for a certain control-compliant appliance 125, accessing a server managed by such manufacturer, and acquiring various information relating to the control-compliant appliance 125 from the accessed server.

Note that aside from the control-compliant appliances 125 (i.e., the power distribution apparatus 121, the control-compliant outlet 123, the electric vehicle 124, the outlet expansion apparatus 127, the power storage apparatus 128, and the power generating apparatuses 129, 130) that are capable of being controlled by the power management apparatus 11, there are also cases where non-control-compliant appliances and/or non-control compliant outlets that are apparatuses that are not capable of being controlled are present in the local power management system 1. For this reason, the power management apparatus 11 selects the method of exchanging information, the method of controlling power supply, and the like in accordance with what type of apparatus (control-compliant appliance or non-control-compliant appliance) is connected to what type of outlet (control compliant outlet or non-control compliant outlet). Note that as described below, unless stated otherwise, the expression "control-compliant appliance 125" also includes appliance types that can be controlled, such as the control-compliant outlet 123, the electric vehicle 124, the outlet expansion apparatus 127, the power storage apparatus 128, and the like.

FIG. 21 is a diagram useful in explaining combinations of communication means, authentication means, and power supplying control set in accordance with the type of outlet and type of connected appliance. As should be clear from FIG. 21, the combinations of a type of outlet and a type of connected appliance connected to such outlet are roughly classified into four patterns.

When a control-compliant appliance 125 is connected to a control-compliant outlet 123, the power management apparatus 11 is capable of communication with and control over both the control-compliant outlet 123 and the control-compliant appliance 125. Accordingly, when a connected appliance transmits power information to the power management apparatus 11, the connected appliance (that is, the control-compliant appliance 125) may transmit the power information to the power management apparatus 11 using ZigBee, for example. The control-compliant outlet 123 may use ZigBee or PLC, for example, to transmit power information to the power management apparatus 11. In addition, during authentication of a connected appliance, the connected appliance (control-compliant appliance 125) is capable of using ZigBee, for example, to carry out authentication with the power management apparatus 11. Regarding control over the supplying of power to a connected appliance, it is possible for the power management apparatus 11 to transmit a control command to the power distribution apparatus 121. In some cases, it is also possible for the control-compliant outlet 123 to carry out limited control over the supplying of power to a connected appliance.

When a non-control-compliant appliance 126 is connected to a control-compliant outlet 123, it may not be possible for the connected appliance to carry out the authentication process with the power management apparatus 11. This means that in this case, there is no way for the connected appliance and the power management apparatus 11 to carry out appliance authentication. The communication of power information in this case may be carried out via ZigBee or PLC, for example, from the control-compliant outlet 123 to which the non-control-compliant appliance 126 is connected. Regarding control over the supplying of power to the connected appliance, it is possible for the power management apparatus 11 to transmit control commands to the power distribution apparatus 121. Also, in some cases, it is possible for the control-compliant outlet 123 to carry out limited control over the supplying of power to the connected appliance.

When a control-compliant appliance 125 is connected to a non-control-compliant outlet, it is possible for the connected appliance to use ZigBee, for example, to carry out an appliance authentication process with the power management apparatus 11 and to transmit power information to the power management apparatus 11. Also, regarding control over the supplying of power to the connected appliance, it is possible for the power management apparatus 11 to transmit control commands to the power distribution apparatus 121.

When a non-control-compliant appliance 126 is connected to a non-control-compliant outlet, it may not be possible for the connected appliance to carry out the appliance authentication process with the power management apparatus 11 or to transmit power information to the power management apparatus 11. Also, since it may not be possible to control the supplying of power to the connected appliance, the power management apparatus 11 constantly supplies power to the connected appliance.

(1-6) Configuration of Appliance Management Unit

Figure 22:
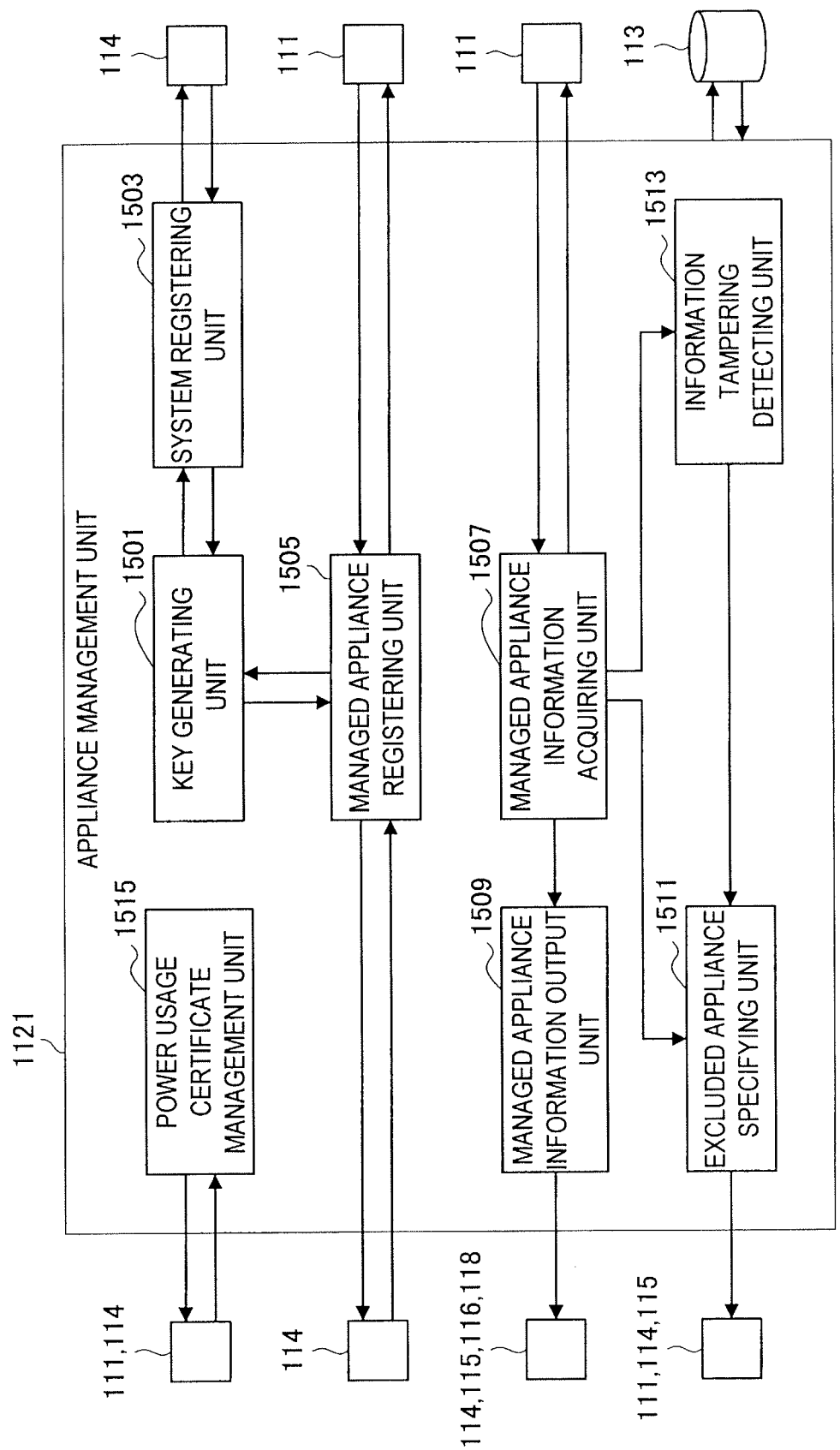
FIG. 22 is a block diagram showing the configuration of an appliance management unit.

The control over appliances described above is carried out based on various information acquired by the information management unit 112 provided in the power management apparatus 11. The detailed configuration of an appliance management unit 1121 provided in the information management unit 112 of the power management apparatus 11 will now be described in detail with reference to FIG. 22. FIG. 22 is a block diagram showing the configuration of the appliance management unit 1121 according to the present embodiment.

The appliance management unit 1121 mainly includes a key generating unit 1501, a system registering unit 1503, a managed appliance registering unit 1505, a managed appliance information acquiring unit 1507, a managed appliance information output unit 1509, an excluded appliance specifying unit 1511, an information tampering detecting unit 1513, and a power usage certificate management unit 1515.

As one example, the key generating unit 1501 may be realized by a CPU (Central Processing Unit), a ROM (Read Only Memory), a RAM (Random Access Memory), and the like. The key generating unit 1501 generates various types of key, such as a public key, secret key, or common key, for use in the local power management system 1 and various types of key, such as a public key, secret key, or common key for use in communication between the local power management system 1 and apparatuses provided outside the system 1. The key generating unit 1501 uses public parameters that have been disclosed by the system management server 33 or the certificate authority server 35, for example, to generate various parameters for use when such keys are generated or to generate the keys themselves. The key generating unit 1501 stores the generated parameters or keys securely in the storage unit 113 or the like.

A key generation process carried out by the key generating unit 1501 is implemented in accordance with a request from the system registering unit 1503 or the managed appliance registering unit 1505, described later. Once the key generation process has ended, the key generating unit 1501 may output the generated key or the like to the processing unit (the system registering unit 1503 or the managed appliance registering unit 1505) that made the request. The key generating unit 1501 may inform the processing unit (the system registering unit 1503 or the managed appliance registering unit 1505) that made the request that the key generating process has ended so that the processing unit may then acquire the generated key or the like from a specific location (for example, the storage unit 113).

The protocol when the key generating unit 1501 implements the key generating process is not limited to a specified protocol, and it is possible to use a protocol set within the local power management system 1 or decided by agreement with a server, for example.

The system registering unit 1503 is realized by a CPU, a ROM, a RAM, and the like, for example. The system registering unit 1503 is a processing unit that carries out processing that registers, via the wide area communication unit 114, the power management apparatus 11 itself in the system management server 33 that manages the local power management system 1.

The system registering unit 1503 first connects via the wide area communication unit 114 to the system management server 33 and implements a specific authentication process with the system management server 33. Next, the system registering unit 1503 transmits specified registration information to the system management server 33 to register the power management apparatus 11 itself in the system management server 33.

One example of the registration information that the system registering unit 1503 transmits to the system management server 33 is the information shown in FIG. 20.

A specific example of the registration process implemented by the system registering unit 1503 will be described in detail later.

The managed appliance registering unit 1505 is realized by a CPU, a ROM, a RAM, and the like, for example. The managed appliance registering unit 1505 carries out communication with the control-compliant outlet 123, the electric vehicle 124, the control-compliant appliance 125, the outlet expansion apparatus 127, the power storage apparatus 128, the power generating apparatuses 129, 130, and the like that are capable of communicating via the local communication unit 111 and registers appliances with which communication has been established as managed appliances. When such control-compliant apparatuses are connected to a power point (the control-compliant outlet 123, the outlet expansion apparatus 127, the non-control-compliant outlet) and/or are switched on, the managed appliance registering unit 1505 carries out a specified authentication process with such apparatuses and carries out a specified registration process after authentication.

The managed appliance registering unit 1505 acquires information on an identification number (appliance ID) that is unique to the apparatus, a manufacturer name, a model number, power usage, an ID of a connected outlet, and the like as registration information from a control-compliant apparatus. The managed appliance registering unit 1505 registers the acquired registration information in a database that is stored in the storage unit 113 or the like. The managed appliance registering unit 1505 also transmits the acquired registration information via the wide area communication unit 114 to the system management server 33 to register the information in the system management server 33.

The detailed configuration of the managed appliance registering unit 1505 will be described in more detail later. A specific example of the registration process that is implemented by the managed appliance registering unit 1505 will also be described in detail later.

The managed appliance information acquiring unit 1507 is realized by a CPU, a ROM, a RAM, and the like, for example. The managed appliance information acquiring unit 1507 acquires various information via the local communication unit 111 from managed appliances registered in the power management apparatus 11. As shown in FIG. 8, for example, information showing the operation state of an appliance, information showing the usage state of the appliance, environmental information, power information, and the like can be given as examples of the information acquired from a managed appliance. The managed appliance information acquiring unit 1507 is also capable of acquiring various information aside from the information mentioned above from a managed appliance.

The managed appliance information acquiring unit 1507 is also capable of transferring the various information acquired from a managed appliance to the managed appliance information output unit 1509 and the excluded appliance specifying unit 1511, described later. If the appliance management unit 1121 includes the information tampering detecting unit 1513, the managed appliance information acquiring unit 1507 may transfer the various information acquired from a managed appliance to the information tampering detecting unit 1513.

The managed appliance information output unit 1509 is realized by a CPU, a ROM, a RAM, and the like, for example. The managed appliance information output unit 1509 outputs the various information that the managed appliance information acquiring unit 1507 has acquired from a managed appliance to a specified processing unit of the power management apparatus 11 and/or outputs the information via the wide area communication unit 114 to an apparatus provided outside the power management apparatus 11. Also, as described later, if a managed appliance embeds data for detecting whether information has been tampered with into the information, the managed appliance information output unit 1509 acts as a mediator when such information in which the data has been embedded is transferred to the analysis server 34.

The excluded appliance specifying unit 1511 is realized by a CPU, a ROM, a RAM, and the like, for example. The excluded appliance specifying unit 1511 specifies managed appliances to be excluded from the local power management system 1 based on the various information obtained by the managed appliance information acquiring unit 1507 from the managed appliances. The excluded appliances may be decided based on various information that has been acquired or may be decided based on an inability to acquire information that should normally be available. The method of specifying the excluded appliances is not limited to a specific method and it is possible to use an arbitrary method.

The information tampering detecting unit 1513 is realized by a CPU, a ROM, a RAM, and the like, for example. If data for detecting whether the information has been tampered with is embedded in the information acquired by the managed appliance information acquiring unit 1507 from a managed appliance, the information tampering detecting unit 1513 verifies such data and detects whether the information has been tampered with. An electronic watermark can be given as one example of such data embedded in the information.

On detecting that the information has been tampered with, the information tampering detecting unit 1513 may inform the excluded appliance specifying unit 1511 of such result. By doing so, the excluded appliance specifying unit 1511 becomes able to exclude an appliance where tampering with information has occurred from the system 1.

The tampering detection process implemented by the information tampering detecting unit 1513 will be described in detail later.

The power usage certificate management unit 1515 is realized by a CPU, a ROM, a RAM, and the like, for example. In the local power management system 1 that includes the power management apparatus 11, in some cases power may be supplied to a control-compliant appliance 125 or the like that does not belong to the system 1. To do so, as described below, the control-compliant appliance 125 or the like from outside the system 1 in which the supplying of power was received issues a power usage certificate to the power management apparatus 11 that manages the system in which the supplying of power was received. A power usage certificate is a certificate that has a specific format that shows that the supplying of power has been received. The power usage certificate management unit 1515 manages the issued power usage certificates and verifies whether the issued power usage certificates are official certificates. When an issued power usage certificate is an official certificate, the power usage certificate management unit 1515 is capable of using the power usage certificate to carry out control over billing relating to the supplied power.

The process carried out by the power usage certificate management unit 1515 will be described in detail later.

Configuration of Managed Appliance Registering Unit

Figure 23:
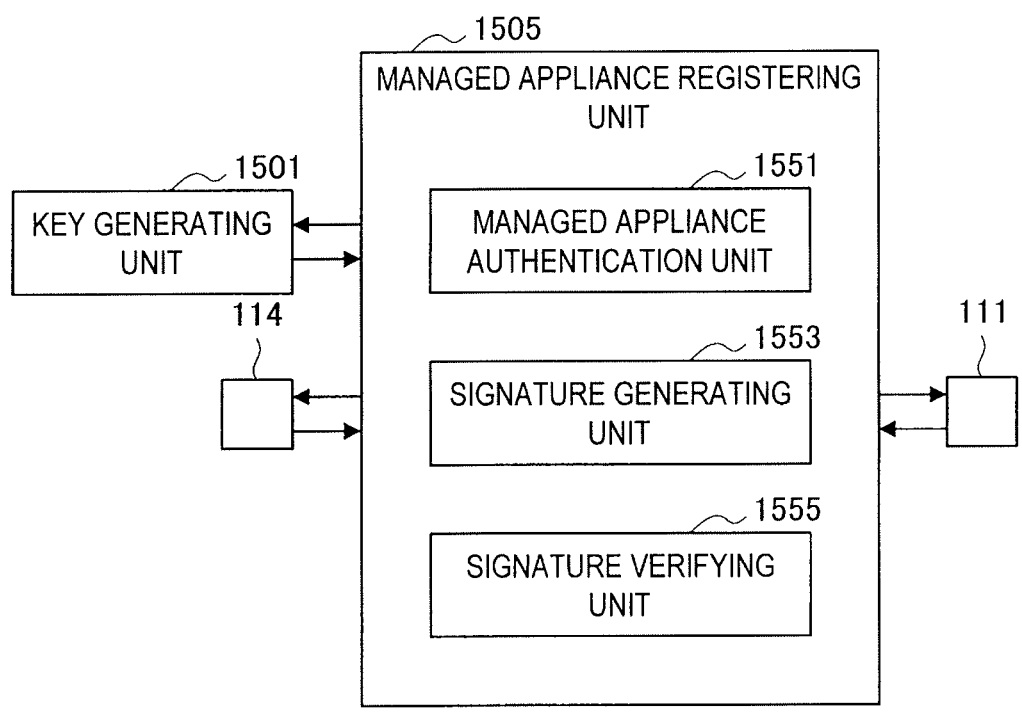
FIG. 23 is a block diagram showing the configuration of a managed appliance registering unit.

Next, the configuration of the managed appliance registering unit 1505 will be described in detail with reference to FIG. 23. FIG. 23 is a block diagram useful in explaining the configuration of the managed appliance registering unit 1505.

As shown in FIG. 23, the managed appliance registering unit 1505 includes a managed appliance authentication unit 1551, a signature generating unit 1553, and a signature verifying unit 1555.

The managed appliance authentication unit 1551 is realized by a CPU, a ROM, a RAM, and the like, for example. If a control-compliant appliance 125 or the like that is not registered in the local power management system 1 managed by the power management apparatus 11 is connected, the managed appliance authentication unit 1551 uses the key or the like generated by the key generating unit 1501 to authenticate the control-compliant appliance 125 or the like that is not registered. This authentication process may be a public key authentication process using a public key or may be a common key authentication process using a common key. By acting in concert with the signature generating unit 1553 and the signature verifying unit 1555 described later, the managed appliance authentication unit 1551 carries out the authentication process and registration process for the managed appliance.

The signature generating unit 1553 is realized by a CPU, a ROM, a RAM, and the like, for example. The signature generating unit 1553 uses the key or the like generated by the key generating unit 1501 to generate a specific signature (digital signature) and/or certificate for the control-compliant appliance 125 or the like that is carrying out the authentication process. The signature generating unit 1553 registers information relating to the generated signature and/or certificate in a database stored in the storage unit 113 or the like and transmits the generated signature and/or certificate via the local communication unit 111 to the control-compliant appliance 125 or the like that is carrying out the authentication process.

The signature verifying unit 1555 is realized by a CPU, a ROM, a RAM, and the like, for example. The signature verifying unit 1555 uses the key or the like generated by the key generating unit 1501 to verify the signature (digital signature) and/or certificate transmitted to the power management apparatus 11 by the control-compliant appliance 125 or the like that is carrying out the authentication process. If the verification of the signature and/or certificate has succeeded, the signature verifying unit 1555 registers information relating to the signature and/or certificate for which verification succeeded in a database stored in the storage unit 113 or the like. If the verification of the signature and/or certificate has failed, the signature verifying unit 1555 may cancel the authentication process.

A specific example of the authentication process and registration process implemented on a managed appliance by the managed appliance registering unit 1505, the managed appliance authentication unit 1551, the signature generating unit 1553, and the signature verifying unit 1555 acting in concert will be described in detail later.

Configuration of Information Tampering Detecting Unit

Figure 24:
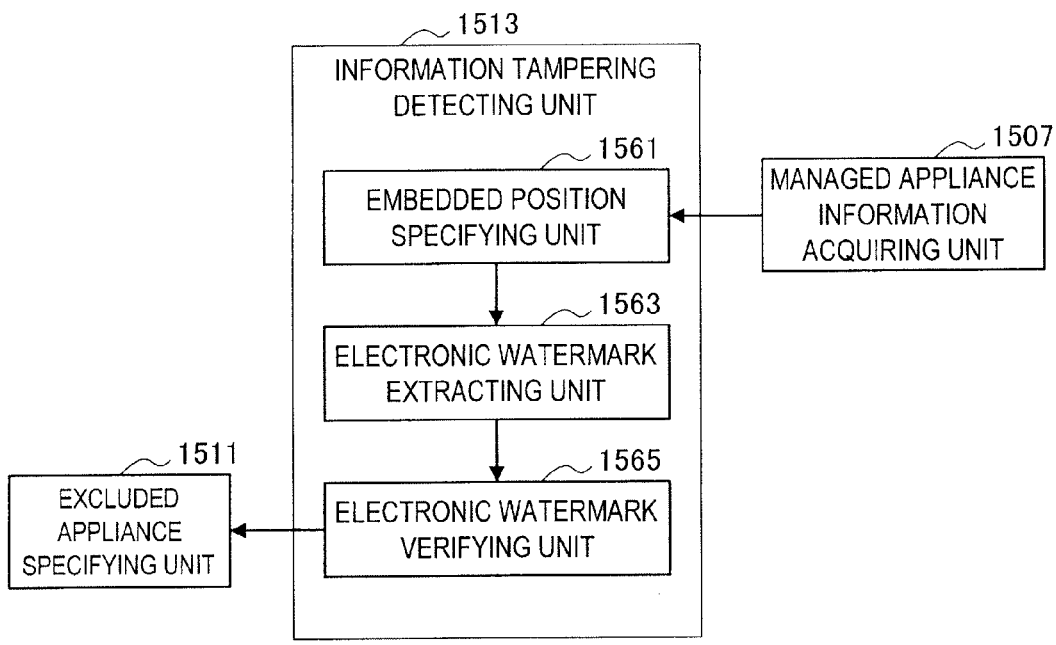
FIG. 24 is a block diagram showing the configuration of an information tampering detecting unit.

Next, the configuration of the information tampering detecting unit 1513 will be described in detail with reference to FIG. 24. FIG. 24 is a block diagram useful in explaining the configuration of the information tampering detecting unit 1513.

As shown in FIG. 24, the information tampering detecting unit 1513 also includes an embedded position specifying unit 1561, an electronic watermark extracting unit 1563, and an electronic watermark verifying unit 1565.

With the local power management system 1 according to the present embodiment, it is possible to embed, into physical data such as current, voltage, temperature, and humidity, or into various information calculated using such physical data, electronic watermark data that is suited to such information. By verifying the electronic watermark data, apparatuses in the local power management system 1 and various types of server that are capable of two-way communication with the local power management system 1 are capable of detecting whether the physical data (which hereinafter includes various information calculated using physical data) has been tampered with.

The embedded position specifying unit 1561 is realized by a CPU, a ROM, a RAM, and the like, for example. By analyzing the physical data in which the electronic watermark has been embedded using a predetermined signal processing circuit, the embedded position specifying unit 1561 specifies the embedded position of the electronic watermark information in accordance with the characteristics of a signal corresponding to the data. On specifying the embedded position of the electronic watermark information, the embedded position specifying unit 1561 informs the electronic watermark extracting unit 1563 of information relating to the specified embedded position. Note that if the embedded position of the electronic watermark is determined in advance between a control-compliant appliance 125 or the like and the power management apparatus 11, it may not be necessary to carry out the specifying process for the embedded position.

The electronic watermark extracting unit 1563 is realized by a CPU, a ROM, a RAM, and the like, for example. The electronic watermark extracting unit 1563 extracts the electronic watermark information from the physical data based on information relating to the embedded position provided by the embedded position specifying unit 1561. The electronic watermark extracting unit 1563 transfers the electronic watermark extracted from the physical data to the electronic watermark verifying unit 1565, described later.

The electronic watermark verifying unit 1565 is realized by a CPU, a ROM, a RAM, and the like, for example. The electronic watermark verifying unit 1565 first generates electronic watermark information based on shared information shared with the control-compliant appliance 125 or the like and physical data extracted by the electronic watermark extracting unit 1563. To generate the electronic watermark information, a hash function, a pseudorandom number generator, public key encryption, common key encryption, another encryption primitive (for example, a message authentication code (MAC)), or the like is used. After this, the electronic watermark verifying unit 1565 compares the generated electronic watermark information and the electronic watermark information extracted by the electronic watermark extracting unit 1563.

If the generated electronic watermark information and the extracted electronic watermark information are the same, the electronic watermark verifying unit 1565 judges that the physical data or the like generated by the control-compliant appliance 125 or the like has not been tampered with. Meanwhile, if the generated electronic watermark information and the extracted electronic watermark information are not the same, the electronic watermark verifying unit 1565 judges that the physical data has been tampered with.

If the physical data has been tampered with, the electronic watermark verifying unit 1565 informs the excluded appliance specifying unit 1511. By doing so, the excluded appliance specifying unit 1511 becomes able to exclude a control-compliant appliance 125 or the like whose operation may have been modified from the local power management system 1.

This completes the detailed description of the configuration of the appliance management unit 1121.

(1-7) Configuration of Information Analyzing Unit

Figure 25:
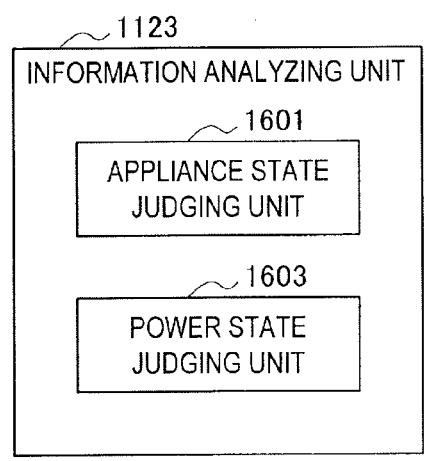
FIG. 25 is a block diagram showing the configuration of an information analyzing unit.

Next, the configuration of the information analyzing unit 1123 will be described in detail. FIG. 25 is a block diagram useful in explaining the configuration of the information analyzing unit.

The information analyzing unit 1123 is a processing unit that generates secondary information, such as that shown in FIG. 8, which is an analysis result of various data and is based on information acquired by or generated by the appliance management unit 1121. As shown in FIG. 25, for example, the information analyzing unit 1123 includes an appliance state judging unit 1601 and a power state judging unit 1603.

The appliance state judging unit 1601 is realized by a CPU, a ROM, a RAM, and the like, for example. Based on various managed appliance information acquired by the appliance management unit 1121, the appliance state judging unit 1601 judges the appliance states of the respective managed appliances. When, as a result of the judging, the state of a managed appliance is judged to be abnormal, the appliance state judging unit 1601 informs the user of the abnormality via the display unit 116 and also requests the control unit 115 to control the managed appliance judged to be in the abnormal state.

The power state judging unit 1603 is realized by a CPU, a ROM, a RAM, and the like, for example. The power state judging unit 1603 judges the power state in the local power management system 1 whose power state is managed by the power management apparatus 11 based on the power information obtained by the appliance management unit 1121 from various apparatuses. When, as a result of the judging, the state of a managed appliance is judged to be abnormal, the power state judging unit 1603 informs the user of the abnormality via the display unit 116 and also requests the control unit 115 to control the managed appliance judged to be in the abnormal state.

This completes the description of one example of the functions of the power management apparatus 11 according to the present embodiment. The various component elements described above may be configured using general-purpose parts and circuits or may be configured using hardware that is dedicated to the functions of the respective component elements. Alternatively, the functions of the respective component elements may all be carried out by a CPU or the like. Accordingly, it is possible to change the configuration in use as appropriate in accordance with the prevailing technical level when implementing the present embodiment.

Note that a computer program for realizing the functions of the power management apparatus according to the above embodiment may be created and installed in a personal computer or the like. It is also possible to provide a computer-readable recording medium on which such a computer program is stored. As examples, the recording medium may be a magnetic disk, an optical disc, a magneto-optical disc, or a flash memory. The computer program mentioned above may also be distributed via a network, for example, without using a recording medium.

(1-8) Configuration of Control-Compliant Appliance

Figure 26:
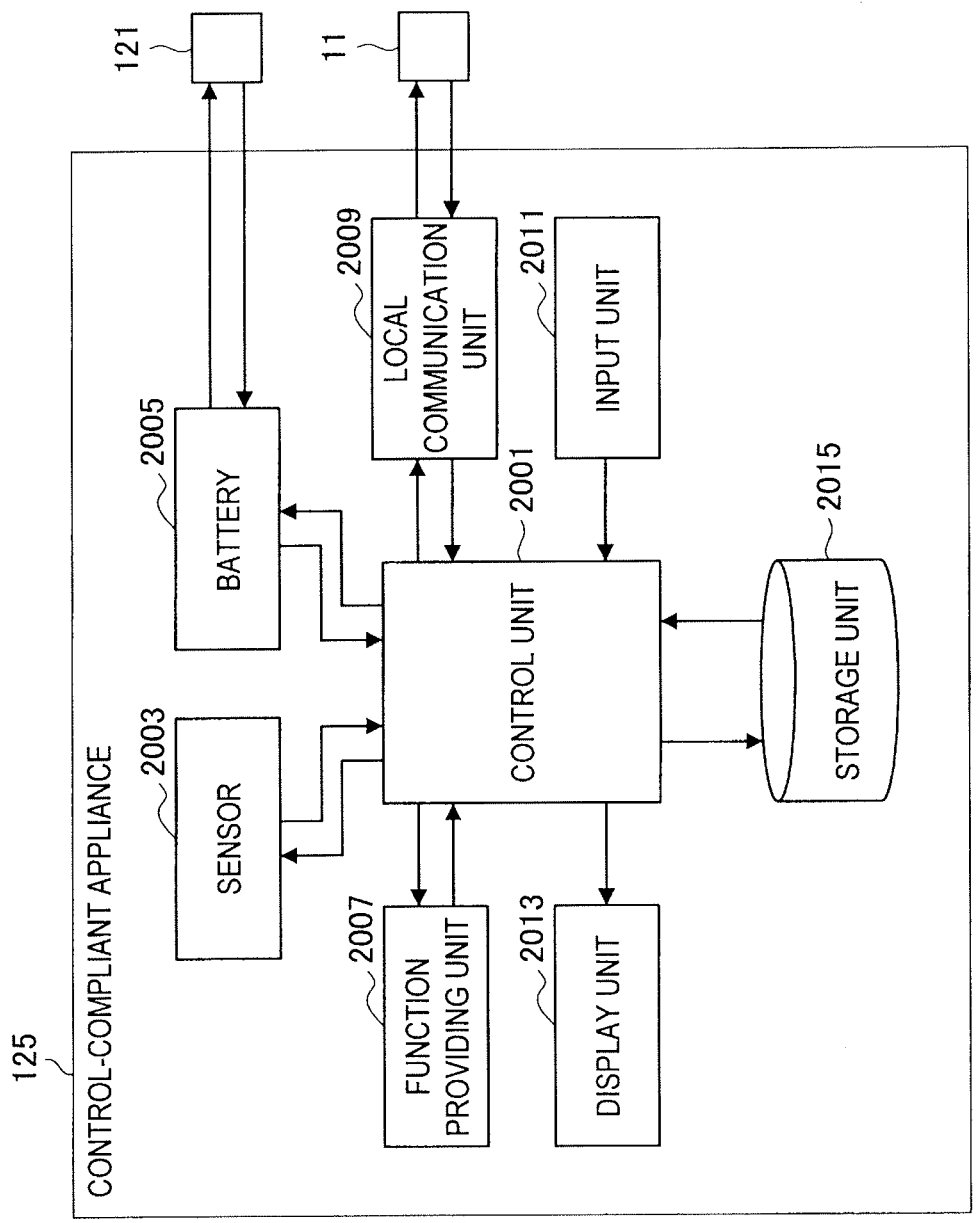
FIG. 26 is a block diagram showing the configuration of a control-compliant appliance.

Next, the configuration of a control-compliant appliance according to the present embodiment will be described in detail with reference to FIG. 26. FIG. 26 is a block diagram useful in explaining the configuration of a control-compliant appliance according to the present embodiment.

As illustrated in FIG. 26, the control-compliant appliance 125 mainly includes a control unit 2001, a sensor 2003, a battery 2005, a function providing unit 2007, a local communication unit 2009, an input unit 2011, a display unit 2013, a storage unit 2015, and the like.

The control unit 2001 is realized by a CPU, a ROM, a RAM, and the like, for example. The control unit 2001 is a processing unit that carries out execution control over processing units provided in the control-compliant appliance 125. As described earlier, the control unit 2001 also transmits primary information and the like relating to the control-compliant appliance 125 to the power management apparatus 11. In addition, when the supplying of power has been received from a power management appliance in which the control-compliant appliance 125 is temporarily registered, the control unit 2001 generates a power usage certificate as described later. Note that the configuration of the control unit 2001 will be described in detail later.

The sensor 2003 is composed of a current sensor or voltage sensor that monitors the state of a battery or a sensor capable of acquiring various physical data, such as a temperature sensor, humidity sensor, barometer, or the like that monitors the peripheral environment at the setup location of the control-compliant appliance 125. Based on control by the control unit 2001, the sensor 2003 measures various physical data at specified time intervals or at arbitrary timing and outputs the obtained physical data to the control unit 2001 as sensor information.

The battery 2005 is a power storage apparatus provided in the control-compliant appliance 125, is composed of one or a plurality of cells, and supplies the power necessary for the control-compliant appliance 125 to operate. Power is supplied to the battery 2005 by external power or the power generating apparatuses 129, 130 present in the system 1 and is stored in the battery 2005. The battery 2005 is controlled by the control unit 2001 and outputs various physical data to the control unit 2001 as battery information at specified time intervals or at arbitrary timing.

Note that although FIG. 26 shows an example where the control-compliant appliance 125 is equipped with the battery 2005, depending on the type of control-compliant appliance 125, a configuration may be used where no battery 2005 is provided and power is supplied directly to the control-compliant appliance 125.

The function providing unit 2007 is realized by a CPU, a ROM, a RAM, and various devices or the like, for example. The function providing unit 2007 is a processing unit that realizes a specified function (for example, a rice cooking function, a refrigeration function, or a function that records and executes various content) provided by the control-compliant appliance 125 to the user. The function providing unit 2007 provides such functions to the user based on control by the control unit 2001.

The local communication unit 2009 is realized by a CPU, a ROM, a RAM, and a communication apparatus or the like, for example. The local communication unit 2009 is communication means for communicating via a communication network constructed inside the local power management system 1. The local communication unit 2009 is capable of communicating with the power management apparatus 11 according to the present embodiment via the communication network constructed inside the local power management system 1.

The input unit 2011 is realized by a CPU, a ROM, a RAM, and an input apparatus or the like, for example. The input unit 2011 is an input device for enabling the user to input information. Note that as examples, a keyboard, buttons, or the like is used as the input unit 2011. It is also possible to combine the display unit 2013, described later, and the input unit 2011 to construct a touch panel.

The display unit 2013 is realized by a CPU, a ROM, a RAM, and an output apparatus or the like, for example. The display unit 2013 is a display device for displaying information relating to power consumption by the control-compliant appliance 125, user information, billing information, other information relating to power management, information relating to power management outside the local power management system 1, information relating to power trading, and the like. Note that as examples, an LCD, an ELD, or the like is used as the display device.

The storage unit 2015 is one example of a storage apparatus provided in the control-compliant appliance 125. The storage unit 2015 stores identification information that is unique to the control-compliant appliance 125, information relating to various keys held by the control-compliant appliance 125, various digital signatures and/or certificates held by the control-compliant appliance 125, and the like. Various history information may also be recorded in the storage unit 2015. In addition, various parameters and intermediate progress of processing that should be stored when the control-compliant appliance 125 according to the present embodiment carries out processing or various databases or the like are recorded as appropriate in the storage unit 2015. The various processing units of the control-compliant appliance 125 are also capable of freely reading from and writing into the storage unit 2015.

Configuration of Control Unit—Part 1

This completes the description of the overall configuration of a control-compliant appliance 125 according to the present embodiment. The configuration of the control unit 2001 of a control-compliant appliance 125 will now be described in detail with reference to FIG. 27.

Figure 27:
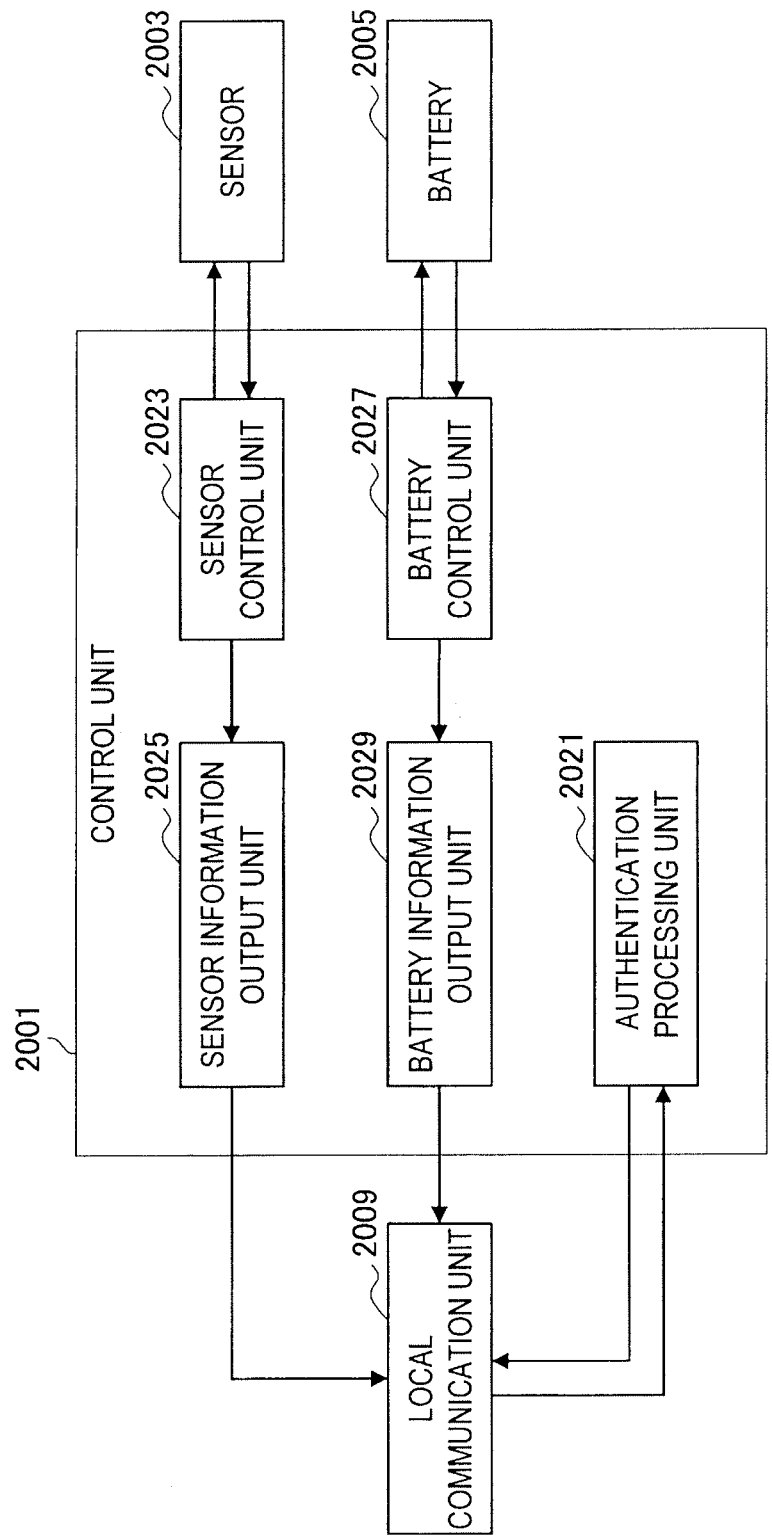
FIG. 27 is a block diagram showing the configuration of a control unit of the control-compliant appliance.

As illustrated in FIG. 27, the control unit 2001 of a control-compliant appliance 125 includes an authentication processing unit 2021, a sensor control unit 2023, a sensor information output unit 2025, a battery control unit 2027, and a battery information output unit 2029.

The authentication processing unit 2021 is realized by a CPU, a ROM, a RAM, and the like, for example. The authentication processing unit 2021 carries out an authentication process together with the power management apparatus 11 based on a specified protocol and also carries out processing that registers a control-compliant appliance 125 in the power management apparatus 11. When carrying out processing with the power management apparatus 11, the authentication processing unit 2021 is capable of using the various keys stored in the storage unit 2015 or the like, digital signatures or certificates provided by the manufacturer when the control-compliant appliance 125 was manufactured, and various parameters and the like. The authentication process implemented by the authentication processing unit 2021 is not limited to any specified process and it is possible to use any arbitrary process in accordance with the content and configuration of the system 1.

The sensor control unit 2023 is realized by a CPU, a ROM, a RAM, and the like, for example. The sensor control unit 2023 is a processing unit that controls the sensor 2003 provided in the control-compliant appliance 125. The sensor control unit 2023 carries out control over the sensor 2003 according to a specified method, acquires physical data measured by the sensor 2003 at specified time intervals or at arbitrary timing and outputs the physical data to the sensor information output unit 2025, described later.

The sensor information output unit 2025 is realized by a CPU, a ROM, a RAM, and the like, for example. The sensor information output unit 2025 outputs sensor information outputted from the sensor control unit 2023 via the local communication unit 2009 to the power management apparatus 11. The sensor information output unit 2025 may also implement preprocessing, such as a noise reduction process and a digitizing process, when outputting the sensor information. The sensor information output unit 2025 may use the information acquired from the sensor control unit 2023 to generate various types of secondary information and output such information as sensor information.

The battery control unit 2027 is realized by a CPU, a ROM, a RAM, and the like, for example. The battery control unit 2027 is a processing unit that controls the battery 2005 provided in the control-compliant appliance 125. The battery control unit 2027 uses the power stored in the battery 2005 to cause the control-compliant appliance 125 to function and depending on the state, supplies the power stored in the battery 2005 to outside the control-compliant appliance 125. The battery control unit 2027 carries out control over the battery 2005 according to a specified method, acquires physical data measured by the battery 2005 at specified time intervals or at arbitrary timing and outputs the physical data to the battery information output unit 2029, described later.

The battery information output unit 2029 is realized by a CPU, a ROM, a RAM, and the like, for example. The battery information output unit 2029 outputs battery information outputted from the battery control unit 2027 via the local communication unit 2009 to the power management apparatus 11. When outputting the battery information, the battery information output unit 2029 may also implement preprocessing, such as a noise reduction process and a digitizing process, when outputting the battery information. The battery information output unit 2029 may also generate various secondary information using information acquired from the battery control unit 2027 and output the secondary information as the battery information.

Configuration of Control Unit—Part 2

The control unit 2001 of a control-compliant appliance 125 may have the configuration described below instead of the configuration shown in FIG. 27. Another configuration of the control unit 2001 provided in a control-compliant appliance 125 will now be described in detail with reference to FIG. 28.

Figure 28:
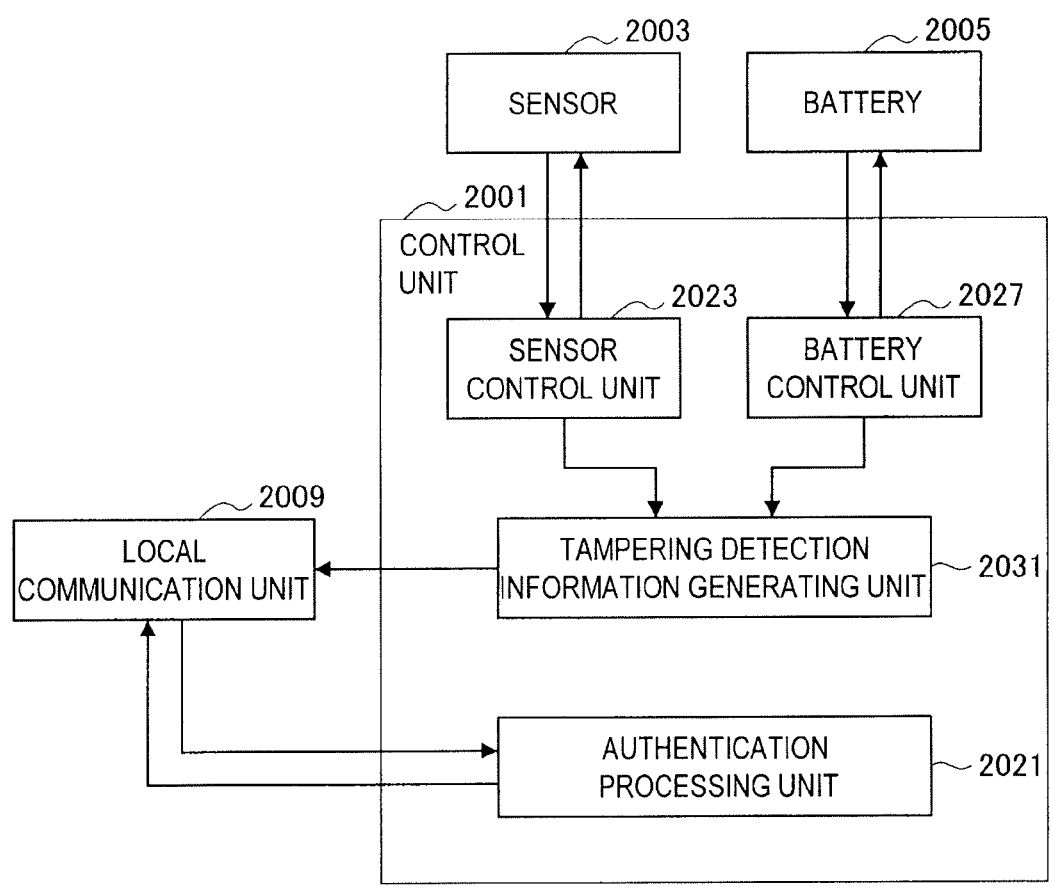
FIG. 28 is a block diagram showing the configuration of a control unit of the control-compliant appliance.

As illustrated in FIG. 28, the control unit 2001 of a control-compliant appliance 125 may include the authentication processing unit 2021, the sensor control unit 2023, the battery control unit 2027, and a tampering detection information generating unit 2031.

Since the authentication processing unit 2021 shown in FIG. 28 has the same configuration as the authentication processing unit 2021 shown in FIG. 27 and achieves the same effect, detailed description thereof is omitted. Similarly, aside from outputting the sensor control information and the battery information to the tampering detection information generating unit 2031, the sensor control unit 2023 and the battery control unit 2027 shown in FIG. 28 have the same configuration and achieve the same effects as the corresponding processing units shown in FIG. 27. Accordingly, detailed description thereof is omitted.

The tampering detection information generating unit 2031 is realized by a CPU, a ROM, a RAM, and the like, for example. The tampering detection information generating unit 2031 generates tampering detection information for use in detecting whether information has been tampered with based on the sensor information outputted from the sensor control unit 2023 and the battery information outputted from the battery control unit 2027. The tampering detection information generating unit 2031 transmits the generated tampering detection information via the local communication unit 2009 to the power management apparatus 11. The power management apparatus 11 may also transfer the tampering detection information generated by the tampering detection information generating unit 2031 to various servers, such as the analysis server 34, provided outside the local power management system 1.

Configuration of Tampering Detection Information Generating Unit

Figure 29:
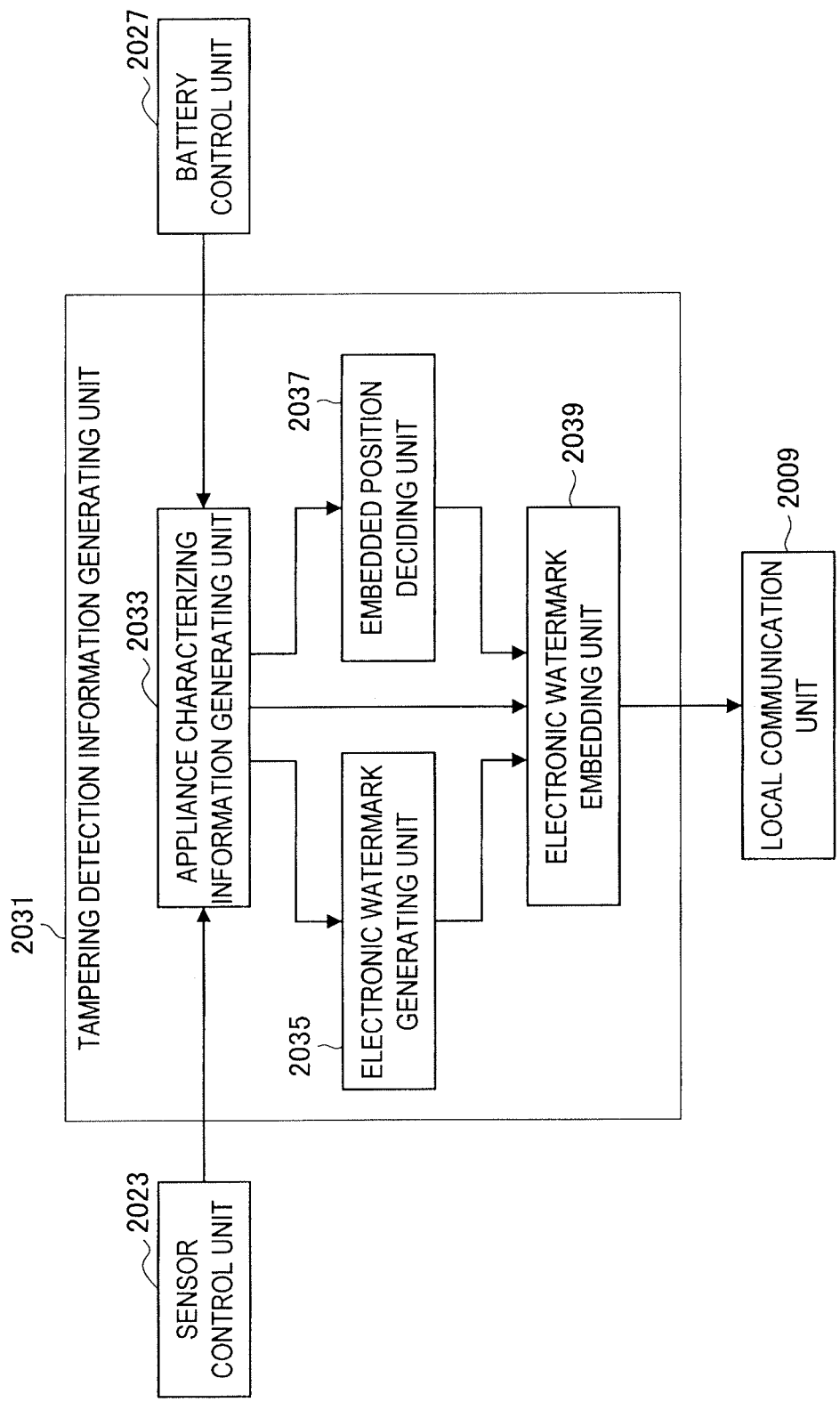
FIG. 29 is a block diagram showing the configuration of a tampering detection information generating unit.

The detailed configuration of the tampering detection information generating unit 2031 will now be described with reference to FIG. 29. FIG. 29 is a block diagram useful in explaining the configuration of the tampering detection information generating unit.

As illustrated in FIG. 29, the tampering detection information generating unit 2031 further includes an appliance characterizing information generating unit 2033, an electronic watermark generating unit 2035, an embedded position deciding unit 2037, and an electronic watermark embedding unit 2039.

The appliance characterizing information generating unit 2033 is realized by a CPU, a ROM, a RAM, and the like, for example. The appliance characterizing information generating unit 2033 generates appliance characterizing information that is characterizing amount information which characterizes the control-compliant appliance 125 based on the sensor information and the battery information outputted from the sensor control unit 2023 and the battery control unit 2027. The appliance characterizing information generating unit 2033 may use the sensor information and the battery information themselves as the appliance characterizing information or may use information newly generated using the sensor information and the battery information as the appliance characterizing information. The appliance characterizing information generating unit 2033 outputs the generated appliance characterizing information to the embedded position deciding unit 2037 and the electronic watermark embedding unit 2039, described later.

Note that the appliance characterizing information generating unit 2033 may verify the inputted sensor information and the battery information before generating the appliance characterizing information. In such case, the appliance characterizing information generating unit 2033 may refer to a database or the like stored in the storage unit 2015 or the like to acquire a range of values that can be taken by physical data such as the sensor information and the battery information and judge whether the obtained physical data is present within such range. Also, the appliance characterizing information generating unit 2033 may analyze the obtained physical data and confirm that the control-compliant appliance 125 is not exhibiting abnormal behavior. If, by carrying out such verification, the appliance characterizing information generating unit 2033 has detected abnormal behavior or that the validity of the physical data is be confirmed, the appliance characterizing information generating unit 2033 may inform the user of such state via the display unit 2013.

The electronic watermark generating unit 2035 is realized by a CPU, a ROM, a RAM, and the like, for example. The electronic watermark generating unit 2035 uses shared information, such as information relating to key information and identification numbers, that is shared between the control-compliant appliance 125 and the power management apparatus 11 or an external server such as the analysis server 34 to generate electronic watermark information to be used as tampering detection information.

As examples, the electronic watermark information generated by the electronic watermark generating unit 2035 can be generated using the shared information itself, a pseudorandom string generated based on the shared information, information generated using a unique value, such as ID information, that is unique to the control-compliant appliance 125, and the like. If the method of generating and embedding the electronic watermark information or the embedding of the electronic watermark information itself are not made known to third parties, it becomes possible by using electronic watermark information generated using such information to detect tampering with the information.

It is also possible to transfer physical data in which electronic watermark information generated by the method described below has been embedded via the power management apparatus 11 to an external server such as the analysis server 34. Meanwhile, there is also the risk that the power management apparatus 11 that acts as an intermediary apparatus will have been taken over by a malicious third party or the like. In such case, the third party that has taken over the power management apparatus 11 could conceivably engage in illegal behavior such as reusing tampering detection information from before the takeover to prevent genuine users, administrators of external servers, and the like from noticing the takeover. For this reason, by regularly generating the electronic watermark information using time information in addition to information such as that described above, the electronic watermark generating unit 2035 is capable of detecting developments such as the power management apparatus 11 being taken over in the manner described above.

To generate the electronic watermark information, the electronic watermark generating unit 2035 is capable of using a variety of techniques, such as a hash function, public key encryption, a pseudorandom number generator, common key encryption, another encryption primitive (MAC), or the like. In such case, the data size of the outputted electronic watermark information is set at m bits.

In this way, the electronic watermark generating unit 2035 according to the present embodiment generates the electronic watermark information using physical data and does not use the physical data itself as the electronic watermark information.

The electronic watermark generating unit 2035 outputs the generated electronic watermark information to the electronic watermark embedding unit 2039, described later.

The embedded position deciding unit 2037 is realized by a CPU, a ROM, a RAM, and the like, for example. The embedded position deciding unit 2037 analyzes the appliance characterizing information transferred from the appliance characterizing information generating unit 2033 and determines the embedded position for the tampering detection information in the appliance characterizing information. More specifically, out of the appliance characterizing information, the embedded position deciding unit 2037 decides a region with large values that are equal to or greater than a specified threshold, a region with high dispersion, a region corresponding to a noise region, a high-frequency domain when data on a frequency domain is handled, or the like as the embedded position. If the electronic watermark information is embedded into a region in the data such as a region with high noise and a region with a high SN ratio, there is little effect on the overall tendencies (for example, the statistical properties) of the appliance characterizing information. This means that by using such regions as the embedded position of the electronic watermark information, it becomes unnecessary to transmit the electronic watermark information separately to the appliance characterizing information and possible even for a power management apparatus 11 that only has a function for receiving the appliance characterizing information to detect tampering.

The embedded position deciding unit 2037 outputs position information relating to the decided embedded position to the electronic watermark embedding unit 2039, described later. Note that when the embedded position of the electronic watermark information is decided in advance, this process does not have to be carried out.

The electronic watermark embedding unit 2039 is realized by a CPU, a ROM, a RAM, and the like, for example. The electronic watermark embedding unit 2039 embeds the electronic watermark information generated by the electronic watermark generating unit 2035 in the appliance characterizing information generated by the appliance characterizing information generating unit 2033 based on the position information relating to the embedded position received from the embedded position deciding unit 2037. By doing so, appliance characterizing information in which the electronic watermark information has been embedded is generated.

The electronic watermark embedding unit 2039 may subject the appliance characterizing information in which the electronic watermark information has been embedded to verification once again. By carrying out such verification, it becomes possible, when the information contains values that exceed a range of values that can be taken by the appliance characterizing information or when abnormal behavior is clearly indicated, for the tampering detection information generating unit 2031 to repeat the process that embeds the electronic watermark information. Also, when the number of embedding attempts is equal to or above a predetermined threshold, the electronic watermark embedding unit 2039 may inform the user via the display unit 2013.

Note that when time information is used to verify not only whether information has been tampered with but also whether the power management apparatus 11 has been taken over, such time information may be incorporated as part of the electronic watermark information as described above or such time information may be embedded in the appliance characterizing information separately to the electronic watermark information.

This completes the description of one example of the functions of the control-compliant appliance 125 according to the present embodiment. The various component elements described above may be configured using general-purpose parts and circuits or may be configured using hardware that is dedicated to the functions of the respective component elements. Alternatively, the functions of the respective component elements may all be carried out by a CPU or the like. Accordingly, it is possible to change the configuration in use as appropriate in accordance with the prevailing technical level when implementing the present embodiment.

For example, in FIG. 26, a case is shown where the battery 2005 is integrally formed with the control-compliant appliance 125, but the battery may also be separately formed from the control-compliant appliance 125.

Also, in addition to the processing units shown in FIG. 26, the control-compliant appliance 125 may further include a communication function such as a wide area communication unit.

Note that a computer program for realizing the functions of the control-compliant appliance according to the above embodiment may be created and installed in a personal computer or the like. It is also possible to provide a computer-readable recording medium on which such a computer program is stored. As examples, the recording medium may be a magnetic disk, an optical disc, a magneto-optical disc, or a flash memory. The computer program mentioned above may also be distributed via a network, for example, without using a recording medium.

(1-9) Configuration of Power Storage Apparatus

Figure 30:
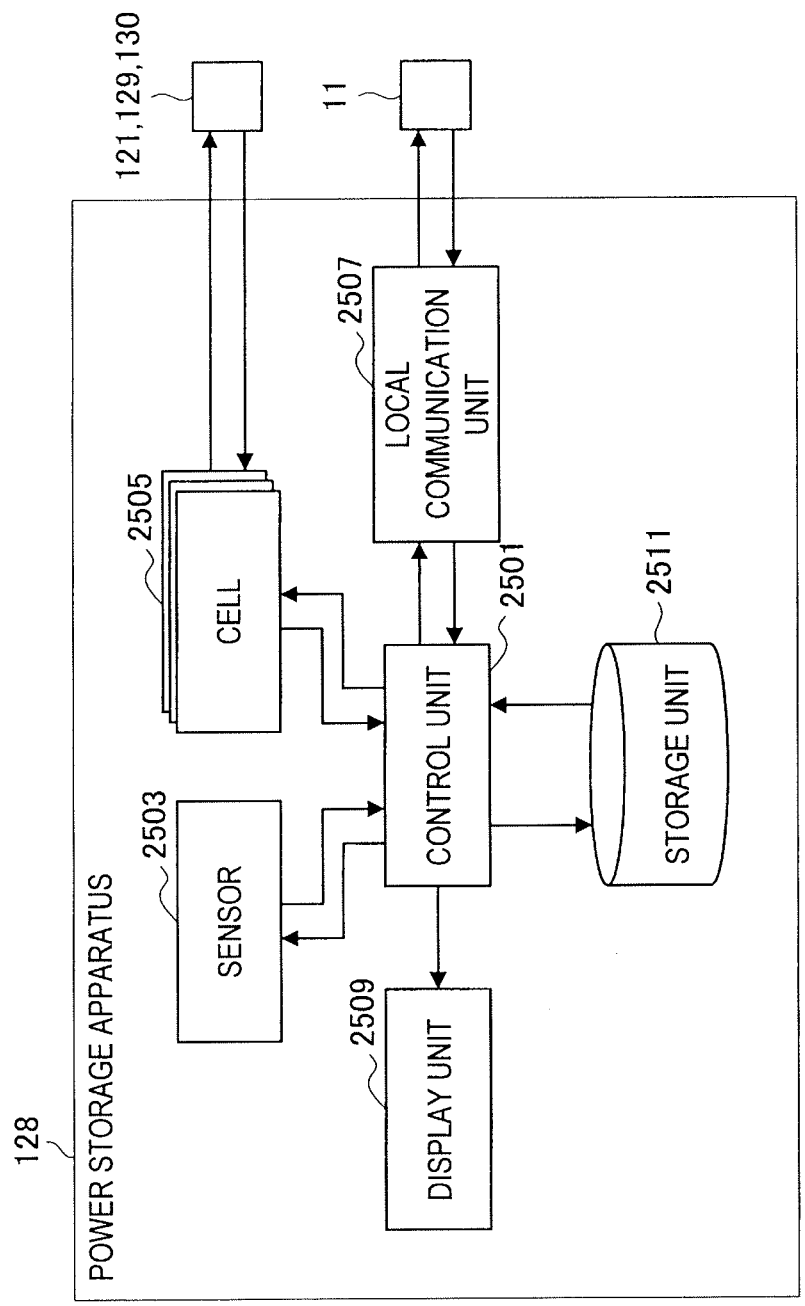
FIG. 30 is a block diagram showing the configuration of a power storage apparatus.

Next, the configuration of the power storage apparatus 128 according to the present embodiment will be described in detail with reference to FIG. 30. FIG. 30 is a block diagram useful in explaining the configuration of the power storage apparatus according to the present embodiment.

As illustrated in FIG. 30, the power storage apparatus 128 mainly includes a control unit 2501, a sensor 2503, a cell 2505, a local communication unit 2507, a display unit 2509, a storage unit 2511, and the like.

The control unit 2501 is realized by a CPU, a ROM, a RAM, and the like, for example. The control unit 2501 is a processing unit that carries out execution control over processing units provided in the control-compliant appliance 125. The control unit 2501 also transmits primary information and the like described earlier relating to the control-compliant appliance 125 to the power management apparatus 11. Furthermore, if a problem such as breakdown occurs in the cell 2505 described later, the control unit 2501 carries out reconfiguring of cells (rearrangement of the cell configuration). Note that the configuration of the control unit 2501 will be described in detail later.

The sensor 2503 is composed of a current sensor or voltage sensor that monitors the state of the cell 2505 or a sensor capable of acquiring various physical data, such as a temperature sensor, humidity sensor, barometer, or the like that monitors the peripheral environment at the setup location of the power storage apparatus 128. Based on control by the control unit 2501, the sensor 2503 measures various physical data at specified time intervals or at arbitrary timing and outputs the obtained physical data to the control unit 2501 as sensor information.

The cell 2505 is a power storage device provided in the power storage apparatus 128, is composed of one or a plurality of cells, and supplies power to the power storage apparatus 128 and apparatuses provided outside the power storage apparatus 128. Power is supplied to the cell 2505 by external power or the power generating apparatuses 129, 130 present in the system 1 and is stored in the cell 2505. The cell 2505 is controlled by the control unit 2501 and outputs various physical data to the control unit 2501 as cell information at specified time intervals or at arbitrary timing.

The local communication unit 2507 is realized by a CPU, a ROM, a RAM, and a communication apparatus or the like, for example. The local communication unit 2009 is communication means for communicating via a communication network constructed inside the local power management system 1. The local communication unit 2507 is capable of communicating with the power management apparatus 11 according to the present embodiment via the communication network constructed inside the local power management system 1.

The display unit 2509 is realized by a CPU, a ROM, a RAM, and an output apparatus or the like, for example. The display unit 2509 is a display device for displaying information relating to power consumption by the power storage apparatus 128, user information, billing information, other information relating to power management, information relating to power management outside the local power management system 1, information relating to power trading, and the like. Note that as examples, an LCD, an ELD, or the like is used as the display device.

The storage unit 2511 is one example of a storage apparatus provided in the power storage apparatus 128. The storage unit 2511 stores identification information that is unique to the power storage apparatus 128, information relating to various keys held by the power storage apparatus 128, various digital signatures and/or certificates held by the power storage apparatus 128, and the like. Various history information may also be recorded in the storage unit 2511. In addition, various parameters and intermediate progress of processing that should be stored when the power storage apparatus 128 according to the present embodiment carries out processing or various databases or the like are recorded as appropriate in the storage unit 2511. The various processing units of the power storage apparatus 128 are also capable of freely reading from and writing into the storage unit 2511.

Configuration of Control Unit—Part 1

This completes the description of the overall configuration of a power storage apparatus 128 according to the present embodiment. The configuration of the control unit 2501 of a power storage apparatus 128 will now be described in detail with reference to FIG. 31.

Figure 31:
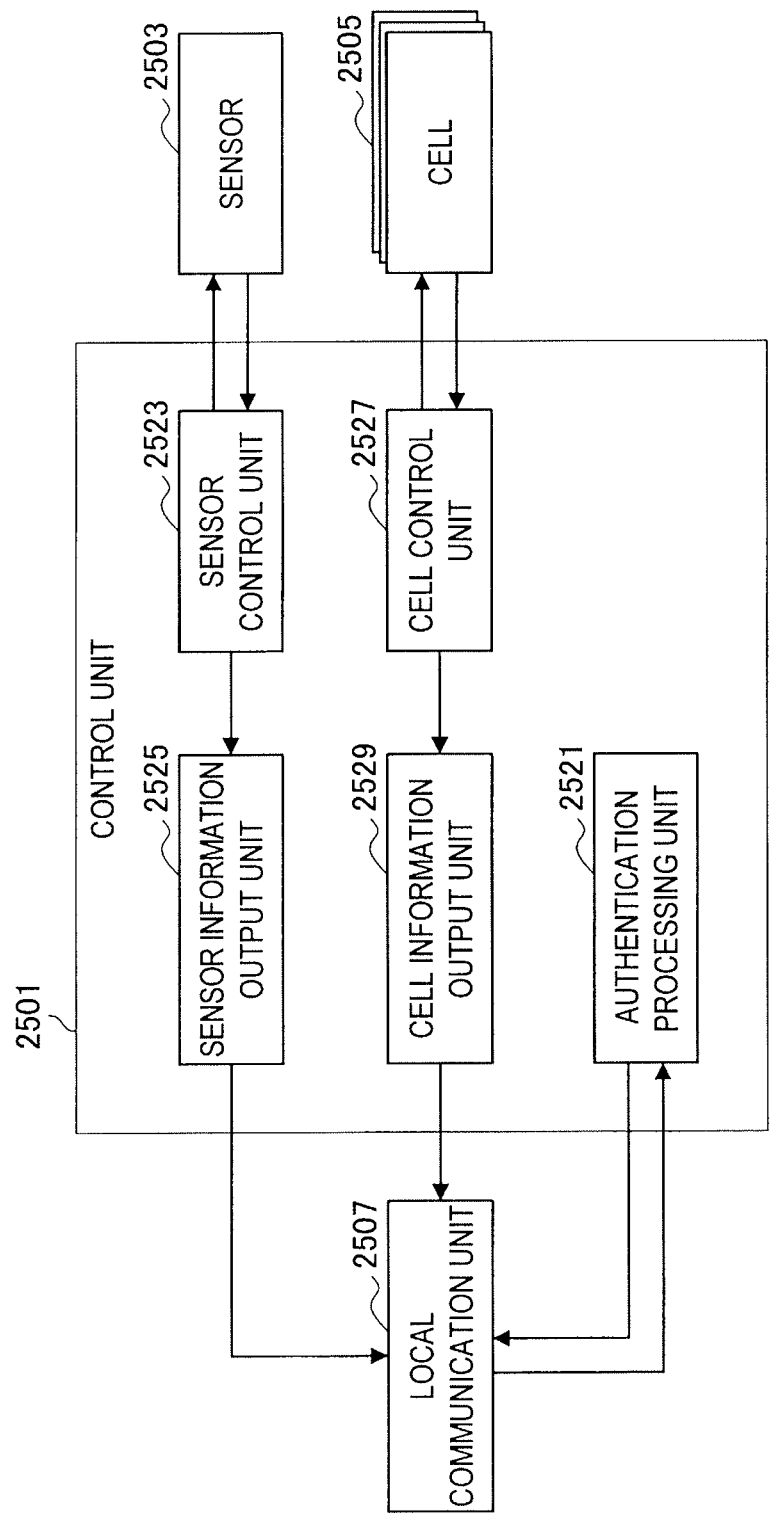
FIG. 31 is a block diagram showing the configuration of a control unit of the power storage apparatus.

As illustrated in FIG. 31, the control unit 2501 of a power storage apparatus 128 includes an authentication processing unit 2521, a sensor control unit 2523, a sensor information output unit 2525, a cell control unit 2527, and a cell information output unit 2529.

The authentication processing unit 2521 is realized by a CPU, a ROM, a RAM, and the like, for example. The authentication processing unit 2521 carries out an authentication process together with the power management apparatus 11 based on a specified protocol and also carries out processing that registers a power storage apparatus 128 in the power management apparatus 11. When carrying out processing with the power management apparatus 11, the authentication processing unit 2521 is capable of using the various keys stored in the storage unit 2515 or the like, digital signatures or certificates provided by the manufacturer when the power storage apparatus 128 was manufactured, and various parameters and the like. The authentication process implemented by the authentication processing unit 2521 is not limited to any specified process and it is possible to use any arbitrary process in accordance with the content and configuration of the system 1.

The sensor control unit 2523 is realized by a CPU, a ROM, a RAM, and the like, for example. The sensor control unit 2523 is a processing unit that controls the sensor 2503 provided in the power storage apparatus 128. The sensor control unit 2523 carries out control over the sensor 2503 according to a specified method, acquires physical data measured by the sensor 2503 at specified time intervals or at arbitrary timing and outputs the physical data to the sensor information output unit 2525, described later.

The sensor information output unit 2525 is realized by a CPU, a ROM, a RAM, and the like, for example. The sensor information output unit 2525 outputs sensor information outputted from the sensor control unit 2523 via the local communication unit 2509 to the power management apparatus 11.

The sensor information output unit 2525 may also implement preprocessing, such as a noise reduction process and a digitizing process, when outputting the sensor information. The sensor information output unit 2525 may use the information acquired from the sensor control unit 2523 to generate various types of secondary information and output such information as sensor information.

The cell control unit 2527 is realized by a CPU, a ROM, a RAM, and the like, for example. The cell control unit 2527 is a processing unit that controls the cell 2505 provided in the power storage apparatus 128. The cell control unit 2527 uses the power stored in the cell 2505 to cause the power storage apparatus 128 to function and depending on the state, supplies the power stored in the cell 2505 to outside the power storage apparatus 128. The cell control unit 2527 carries out control over the cell 2505 according to a specified method, acquires physical data measured by the cell 2505 at specified time intervals or at arbitrary timing and outputs the physical data to the cell information output unit 2529, described later.

The cell information output unit 2529 is realized by a CPU, a ROM, a RAM, and the like, for example. The cell information output unit 2529 outputs cell information outputted from the cell control unit 2527 via the local communication unit 2509 to the power management apparatus 11. The cell information output unit 2529 may also implement preprocessing, such as a noise reduction process and a digitizing process, when outputting the cell information. The cell information output unit 2529 may use the information acquired from the cell control unit 2527 to generate various types of secondary information and output such information as cell information.

Configuration of Control Unit—Part 2

The control unit 2501 of a power storage apparatus 128 may have the configuration described below instead of the configuration shown in FIG. 31. Another configuration of the control unit 2501 provided in a power storage apparatus 128 will now be described in detail with reference to FIG. 32.

Figure 32:
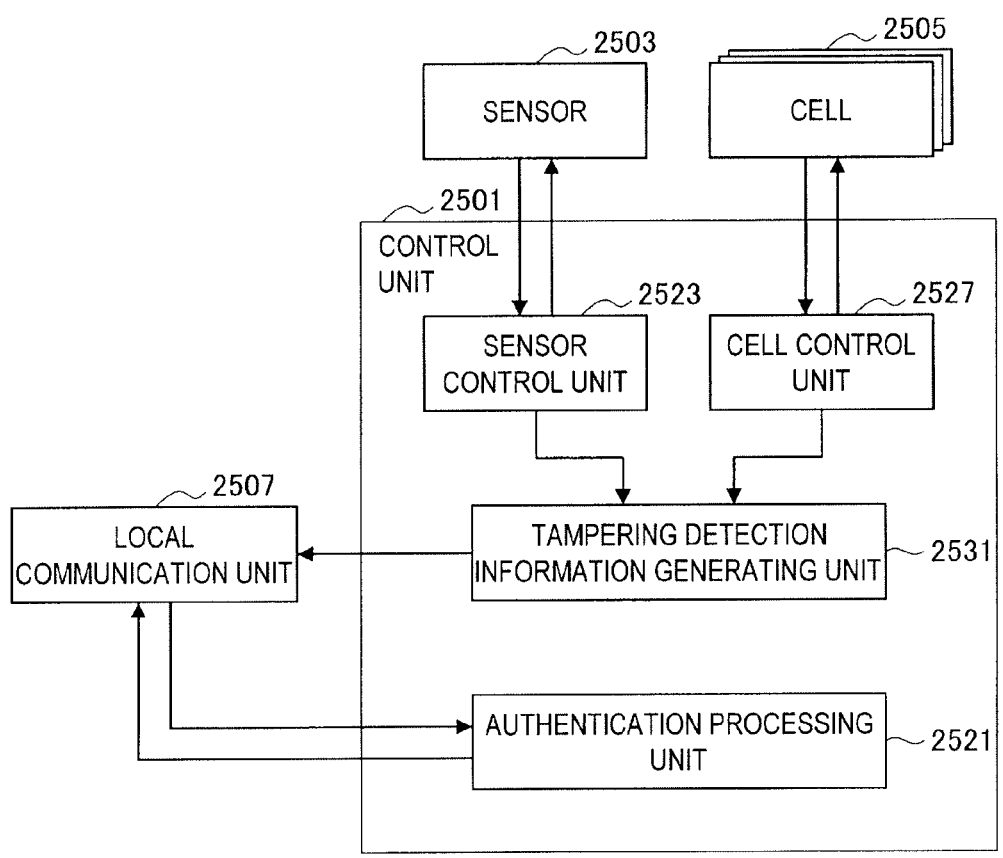
FIG. 32 is a block diagram showing the configuration of a control unit of the power storage apparatus.

As illustrated in FIG. 32, the control unit 2501 of a power storage apparatus 128 may include the authentication processing unit 2521, the sensor control unit 2523, the cell control unit 2527, and a tampering detection information generating unit 2531.

Since the authentication processing unit 2521 shown in FIG. 32 has the same configuration as the authentication processing unit 2521 shown in FIG. 31 and achieves the same effect, detailed description thereof is omitted. Similarly, aside from outputting the sensor control information and the cell information to the tampering detection information generating unit 2531, the sensor control unit 2523 and the cell control unit 2527 shown in FIG. 32 have the same configuration and achieve the same effects as the corresponding processing units shown in FIG. 31. Accordingly, detailed description thereof is omitted.

The tampering detection information generating unit 2531 is realized by a CPU, a ROM, a RAM, and the like, for example. The tampering detection information generating unit 2531 generates tampering detection information for use in detecting whether information has been tampered with based on the sensor information outputted from the sensor control unit 2523 and the cell information outputted from the cell control unit 2527. The tampering detection information generating unit 2531 transmits the generated tampering detection information via the local communication unit 2509 to the power management apparatus 11. The power management apparatus 11 may also transfer the tampering detection information generated by the tampering detection information generating unit 2531 to various servers, such as the analysis server 34, provided outside the local power management system 1.

Configuration of Tampering Detection Information Generating Unit

Figure 33:
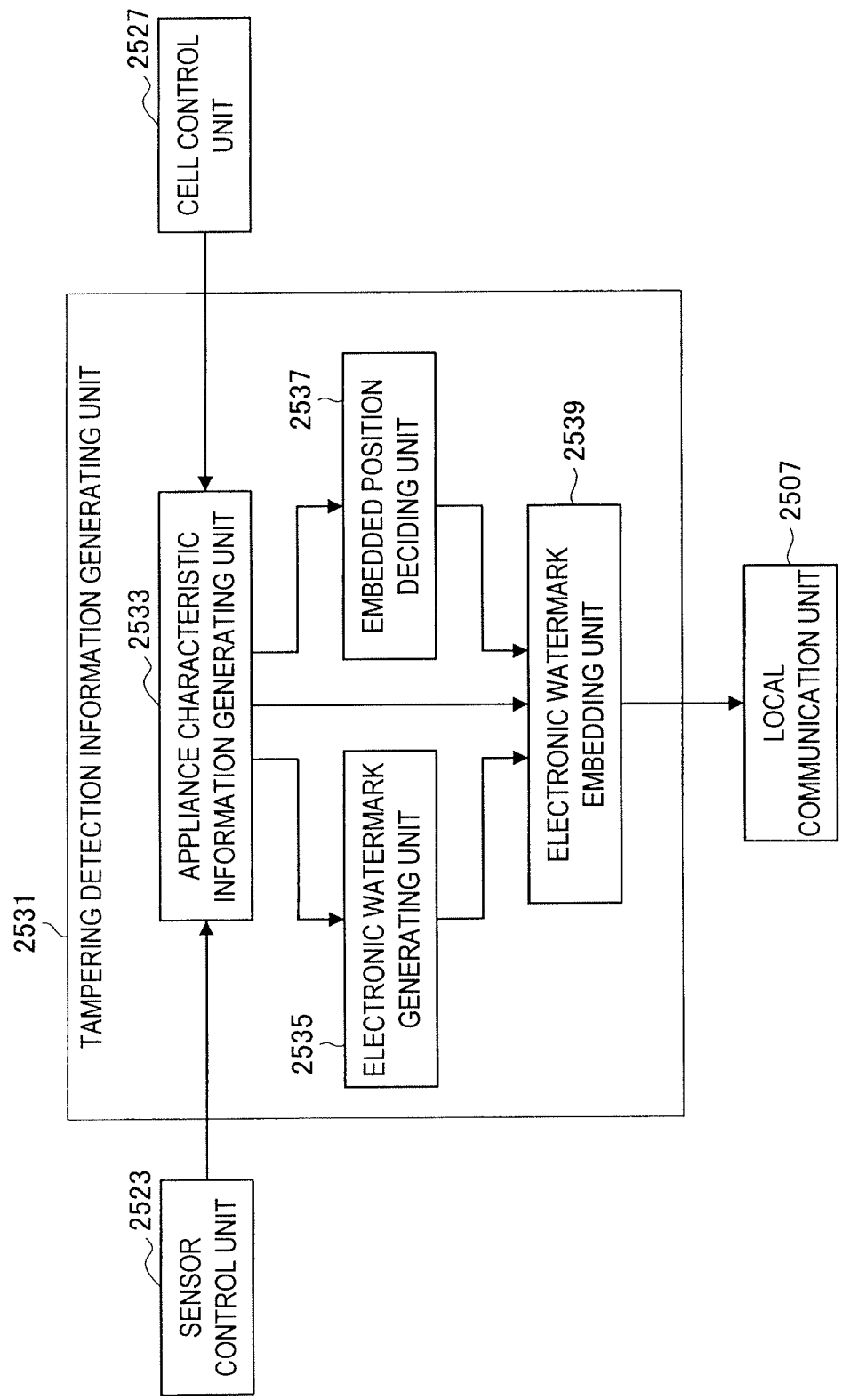
FIG. 33 is a block diagram showing the configuration of a tampering detection information generating unit.

The detailed configuration of the tampering detection information generating unit 2031 will now be described with reference to FIG. 33. FIG. 33 is a block diagram useful in explaining the configuration of the tampering detection information generating unit.

As illustrated in FIG. 33, the tampering detection information generating unit 2531 further includes an appliance characterizing information generating unit 2533, an electronic watermark generating unit 2535, an embedded position deciding unit 2537, and an electronic watermark embedding unit 2539.

Aside from generating the appliance characterizing information based on the sensor information outputted from the sensor control unit 2523 and the cell information outputted from the cell control unit 2527, the appliance characterizing information generating unit 2533 has the same function and achieve the same effects as the appliance characterizing information generating unit 2033 shown in FIG. 29. Accordingly, detailed description thereof is omitted.

Furthermore, the electronic watermark generating unit 2535, the embedded position deciding unit 2537 and the electronic watermark embedding unit 2539 have the same function and achieve the same effects as the corresponding processing units shown in FIG. 29. Accordingly, detailed description thereof is omitted.

This completes the description of one example of the functions of the power storage apparatus 128 according to the present embodiment. The various component elements described above may be configured using general-purpose parts and circuits or may be configured using hardware that is dedicated to the functions of the respective component elements. Alternatively, the functions of the respective component elements may all be carried out by a CPU or the like. Accordingly, it is possible to change the configuration in use as appropriate in accordance with the prevailing technical level when implementing the present embodiment.

For example, in addition to the processing units shown in FIG. 30, the power storage apparatus 128 may further include a communication function such as a wide area communication unit.

Note that a computer program for realizing the functions of the power storage apparatus according to the above embodiment may be created and installed in a personal computer or the like having the power storage apparatus. It is also possible to provide a computer-readable recording medium on which such a computer program is stored. As examples, the recording medium may be a magnetic disk, an optical disc, a magneto-optical disc, or a flash memory. The computer program mentioned above may also be distributed via a network, for example, without using a recording medium.

(1-10) Specific Examples of Method of Embedding and Method of Verifying Electronic Watermark Information Specific examples of a method of embedding and a method of verifying the electronic watermark information will now be described in detail.

In the intelligent, networked, and digitized local power management system 1, the power management apparatus 11 communicates with the various appliances and batteries about power usage by the respective appliances in the system so as to optimize power usage in the entire system. By doing so, the power management apparatus 11 monitors the sensor information from the respective appliances/batteries and states such as a date/time, power price, temperature, and whether the user is at home or out, and carries out control such as setting operation modes and maximum currents of respective appliances in accordance with such states. It also becomes possible to benefit from a variety of services such as control from outside the home via the power management apparatus 11, to enact high security measures supported by a security check server, and optimization.

When doing so, since it becomes possible to access to the appliances and batteries from outside, there are increased security threats such as abnormal operation commands sent to appliances or batteries, attacks to a household power management apparatus or appliances or batteries launched from another power management apparatus, DoS attacks, and information leaks. Conceivable countermeasures to such threats include traffic management by the power management apparatus 11, antivirus measures, and installing a firewall. To deal with unknown attacks, it is assumed that sensor information and execution command information for appliances or batteries are sent to a security check server such as the analysis server 34 and a physical simulation or learning theory is used to estimate the extent of danger and/or detect illegal usage.

However, since such countermeasures have a premise that the power management apparatus is operating normally, when the control function of the power management apparatus 11 has been compromised by an external attacker, such defenses will be ineffective. Also, since the appliances and batteries will probably have comparatively weak defenses due to the costs of manufacturing and management, in a state where the control function of the power management apparatus 11 has been compromised, the appliances and batteries that can be realistically imagined will be defenseless. In addition, although an attack where an illegal power management apparatus acts as a legitimate power management apparatus, tampers with physical data, and transmits such data to a security check server would be conceivable, since it is difficult for a service to distinguish between an illegal power management apparatus and a valid power management apparatus, it would be difficult to detect such attack. Since an attack on an appliance or battery has a higher risk of causing major damage compared to a conventional attack on a computer, it is necessary to provide not only the power management apparatus but also the appliances and batteries with a security function of a certain level.

For this reason, in the present embodiment, as described earlier, it is possible to insert an electronic watermark for preventing illegal tampering into the physical data obtained from sensors and the like of appliances and batteries. By using this method, it is possible to detect attacks even when the physical data has been tampered with by an attacker on a communication path. Also, even when the control function of a power management apparatus has been compromised, by regularly transmitting electronic watermark information that includes time information to a security check server, it is possible to detect through cooperation with services that the control function has been compromised. In addition, by using the electronic watermark information, it is unnecessary to transmit authentication information, such as a MAC, separately to the physical data, which makes it possible to use a power management apparatus that is capable of only receiving physical data.

The method of embedding and the method of verifying electronic watermark information will now be described more specifically by giving an example. Note that in the following explanation, it is assumed that the electronic watermark information is embedded into physical data (appliance characterizing information) obtained at a certain time. The physical data is time-series data composed of n data, and the value of the physical data at a time k (where $0 \leq k \leq n-1$) is expressed as $X_k$. The physical data values at each time are subjected to discretization after being acquired from a sensor or the like and are set as r bit data. The data size of the electronic watermark information is set at m bits.

Method of Embedding and Method of Verifying Electronic Watermark Information Using Shared Information A method of embedding and method of verifying electronic watermark information that uses shared information will now be described in detail by giving specific examples.
Specific Example 1

First, a method of embedding electronic watermark information carried out by the control-compliant appliance 125 or the like will be described.

First, the embedded position deciding unit 2037 of the tampering detection information generating unit 2031 uses a specified signal processing circuit or the like to select p data with large values out of the appliance characterizing information that is physical data or the like. After this, the electronic watermark embedding unit 2039 uses a specified embedding process circuit or the like to successively insert the electronic watermark information generated based on the shared information into a q(k) bit part counting from the least significant bit (LSB) of the selected p appliance characterizing information in time series order. Here, q(k) is a value that fulfills Condition a given below.

Expression 1

$$1 \leq q(k) \leq r-1,\ 0 \leq k \leq p-1,\ \sum_{k=0}^{p-1} q(k) = m \qquad \text{(Condition a)}$$

In some cases, values of the selected p appliance characterizing information after the electronic watermark information has been embedded will be equal to or lower than values from the $p+1^{th}$ data onwards. In such a case, the appliance characterizing information generating unit 2033 of the tampering detection information generating unit 2031 corrects the data aside from the embedded position of the electronic watermark information so that the values from the $p+1^{th}$ value onwards are below a lowest value of the appliance characterizing information after the embedding of the p electronic watermark information. The tampering detection information generating unit 2031 updates the electronic watermark information based on the values after correction and repeats the embedding process until the condition is satisfied.

Next, a method of verifying the electronic watermark information carried out by an information tampering detecting unit of the power management apparatus 11 or of a security check server such as the analysis server 34 will be described.

The embedded position specifying unit of the information tampering detecting unit uses a specified signal processing circuit or the like to specify p positions of data with large values out of the appliance characterizing information that is physical data or the like. Next, the electronic watermark extracting unit uses position information expressing the specified data position and a specified embedded extracting circuit or the like to successively extract values of q(k) bits counting from the LSB of the selected p appliance characterizing information in a time series. After this, an electronic watermark verification unit generates electronic watermark information based on shared information such as key information stored in a storage unit or the like and compares the generated information with the electronic watermark information extracted by the electronic watermark extracting unit.
Specific Example 2

First, a method of embedding the electronic watermark information implemented by the control-compliant appliance 125 will be described.

First, the embedded position deciding unit 2037 of the tampering detection information generating unit 2031 uses a specified signal processing circuit or the like to carry out a discrete Fourier transform expressed by Equation 101 below or a discrete cosine transform expressed by Equation 102 below to convert the appliance characterizing information (physical data) $(X_0, X_1, \ldots, X_{n-1})$ in a time domain to a data string $(Y_0, Y_1, \ldots, Y_{n-1})$ in a frequency domain.

Expression 2

$$y_j = \sum_{k=0}^{n-1} x_k e^{-\frac{2\pi i}{n} jk}, \quad j = 0, \ldots, n-1 \quad \text{(Equation 101)}$$

$$y_j \begin{cases} \frac{\sqrt{2}}{n} \sum_{k=0}^{n-1} x_k & (j=0) \\ \frac{2}{n} \sum_{k=0}^{n-1} x_k \cos\frac{(2k+1)j\pi}{2n} & (j \neq 0) \end{cases} \quad \text{(Equation 102)}$$

After this, the embedded position deciding unit 2037 selects p high frequency components (i.e., components where j is large in Equations 101 and 102) in order from the high frequencies. Next, the electronic watermark embedding unit 2039 uses a specified embedding processing circuit or the like to successively insert the electronic watermark information generated based on the shared information into a q(k) bit part counting from the least significant bit LSB of the selected p frequency domain data. Here, "q(k)" is a value that satisfies Condition a given above.

Here, as the method of embedding when a discrete Fourier transform is used, it is possible to use any arbitrary method, such as assigning uniformly to both real numbers and complex numbers or assigning with priority to large values.

Next, the electronic watermark embedding unit 2039 uses a specified signal processing circuit or the like to subject data in a frequency domain after the embedding of the electronic watermark information to an inverse discrete Fourier transform expressed by Equation 103 or to an inverse discrete cosine transform expressed by Equation 104 to restore the data to a data string in a time domain.

Expression 3

$$x_k = \frac{1}{n}\sum_{j=0}^{n-1} y_j e^{\frac{2\pi i}{n} jk}, \quad k = 0, \ldots, n-1 \quad \text{(Equation 103)}$$

$$x_k = \frac{1}{\sqrt{2}} y_0 + \sum_{j=1}^{n-1} y_j \cos\frac{(2k+1)j\pi}{2n}, \quad \text{(Equation 104)}$$

$$k = 0, \ldots n-1$$

Next, a method of verifying the electronic watermark information implemented by the information tampering detecting unit of either the power management apparatus 11 or a security check server such as the analysis server 34 will be described.

The embedded position specifying unit of the information tampering detecting unit first uses a specified signal processing circuit or the like to carry out the discrete Fourier transform expressed by Equation 101 above or the discrete cosine transform expressed by Equation 102 above to convert the appliance characterizing information (physical data) $(X_0, X_1, \ldots, X_{n-1})$ in a time domain to a data string $(Y_0, Y_1, \ldots, Y_{n-1})$ in a frequency domain. Next, the embedded position specifying unit selects p high frequency components (i.e., components where j is large in Equations 101 and 102) in order from the high frequencies. By doing so, it is possible to specify the position at which the electronic watermark information was embedded. After this, the electronic watermark extracting unit uses the position information showing the position of the specified data and successively extracts q(k) bit values counting from the least significant bit LSB of the selected p appliance characterizing information using a predetermined embedded extracting circuit or the like. An electronic watermark verifying unit then generates electronic watermark information based on shared information such as key information stored in a storage unit or the like, and compares the generated electronic watermark information with the electronic watermark information extracted by the electronic watermark extracting unit.

Specific Example 3

First, a method of embedding the electronic watermark information implemented by the control-compliant appliance 125 or the like will be described.

First, the appliance characterizing information generating unit 2033 of the tampering detection information generating unit 2031 generates difference data $S_k = X_k - X_{k-1}$ ($1 \leq k \leq n-1$) based on the appliance characterizing information $X_k$. Next, the embedded position deciding unit 2037 selects a p−1 consecutive data string $S_k (t \leq k \leq t+p-2, 1 \leq t \leq n-p+1)$ so that the sum of p−1 consecutive difference data is below a specified threshold σ and the selected p−1 data have the highest sum of squares out of a consecutive data string that satisfies such condition.

After this, the electronic watermark embedding unit 2039 uses a specified embedding processing circuit or the like to successively insert the electronic watermark information generated based on the shared information into a q(k) bit part counting from the least significant bit LSB of the selected p appliance characterizing information $X_k (t-1 \leq k \leq t+p-2)$ in time series order. Here, "q(k)" is a value that satisfies Condition a given above.

Regarding the consecutive difference data of the p selected appliance characterizing information after embedding of the electronic watermark information, there may be cases where it is no longer true that the sum is below the threshold a and/or the sum of squares is the highest out of a consecutive data string that satisfies such condition. In such a case, the appliance characterizing information generating unit 2033 of the tampering detection information generating unit 2031 corrects the data aside from the embedded position of the electronic watermark information so that the conditions given above are true. The tampering detection information generating unit 2031 updates the electronic watermark information based on the values after correction and repeats the embedding process until the conditions above are true.

Next, a method of verifying the electronic watermark information implemented by the power management apparatus 11 and an information tampering detecting unit of a security check server such as the analysis server 34 will be described.

The embedded position specifying unit of the information tampering detecting unit first generates difference data $S_k = X_k - X_{k-1}$ ($1 \leq k \leq n-1$) for the appliance characterizing information $X_k$. Next, the embedded position specifying unit selects a p−1 consecutive data string $S_k$ (t≤k≤t+p−2, 1≤t≤n−p+1) where the sum of the p−1 consecutive difference data is below a predetermined threshold σ and a sum of squares is highest out of a consecutive data string that satisfies such condition. By doing so, it is possible to specify the position where the electronic watermark information was embedded.

After this, an electronic watermark extracting unit uses position information expressing the position of the specified data and a specified embedded extracting circuit or the like to successively extract values of a q(k) bit part counting from the LSB of the selected p appliance characterizing information (t−1≤k≤t+p−2) in time series order. Next, the electronic watermark verifying unit generates electronic watermark information based on shared information such as key information stored in a storage unit or the like and compares the generated electronic watermark information with the electronic watermark information extracted by the electronic watermark extracting unit.

Method of Embedding and Method of Verifying Electronic Watermark Information using Shared Information and Time Information Specific examples of a method of embedding and method of verifying electronic watermark information that uses shared information have been described above. Next, a method of embedding and a method of verifying electronic watermark information that uses shared information and time information will be described by giving specific examples.

Note that since electronic watermark information that uses shared information and time information can also be used to detect whether the power management apparatus 11 has been taken over, the verification of such information is normally carried out by a security check server such as the analysis server 34.

Note that when verifying electronic watermark information that uses time information, the security check server such as the analysis server 34 changes the method of verifying in accordance with how the time information is embedded. That is, if the time information was embedded together with the electronic watermark information, the embedded time information is extracted and used in a data generation process during verification. If the time information is not embedded, the electronic watermark information is generated using time information decided in advance or one or a plurality of time information selected based on an estimated acquisition time for the appliance characterizing information.

Specific Example 1

First, a method of embedding the electronic watermark information implemented by the control-compliant appliance 125 or the like will be described.

The electronic watermark generating unit 2035 of the tampering detection information generating unit 2031 uses a specified circuit or the like to generate m bit electronic watermark information for each appliance characterizing information based on an r−m (1≤m≤r−1) bit string counting from a most significant bit (MSB) of n appliance characterizing information (physical data), shared information such as key information, time information, and in some cases other information.

After this, the embedded position deciding unit 2037 uses a specified embedding circuit or the like to embed the electronic watermark information generated for each appliance characterizing information in an m bit part starting from the LSB of the appliance characterizing information. In this case, the data size of the entire electronic watermark information is nm bits.

Next, the method of verifying electronic watermark information implemented by an information tampering detecting unit of a security check server such as the analysis server 34 will be described.

First, an electronic watermark extracting unit of the information tampering detecting unit uses a specified embedded extracting circuit to extract m bits of data counting from the LSB of each of n appliance characterizing information as the electronic watermark information. Next, the electronic watermark verifying unit generates m bit electronic watermark information for each appliance characterizing information based on an r−m (1≤m≤r−1) bit string counting from the MSB of the n appliance characterizing information, shared information such as key information, time information, and data used by the embedding side. After this, the electronic watermark verifying unit generates electronic watermark information based on shared information such as key information stored in a storage unit or the like and compares the generated electronic watermark information with the electronic watermark information extracted by the electronic watermark extracting unit.

Note that although data in a time domain has been described in the above explanation, it is also possible to use the same equations on data on a frequency domain produced by converting appliance characterizing information such as physical data via a discrete Fourier transform or a discrete cosine transform.

Specific Example 2

First, a method of embedding the electronic watermark information implemented by the control-compliant appliance 125 or the like will be described.

The embedded position deciding unit 2037 of the tampering detection information generating unit 2031 uses a specified signal processing circuit or the like to select p data with large values out of the appliance characterizing information that is physical data or the like.

After this, the electronic watermark generating unit 2035 generates m bit electronic watermark information based on every bit (nr−m bits) aside from q(k) bits counting from the LSB of the selected p appliance characterizing information, shared information such as key information, time information, and in some cases other information. Here, "q(k)" is a value that satisfies Condition a given above.

Next, the electronic watermark embedding unit 2039 uses a specified embedding processing circuit or the like to successively insert the generated electronic watermark information into a q(k) bit part counting from the LSB of the selected p appliance characterizing information in time series order.

In some cases, values of the selected p appliance characterizing information after the electronic watermark information has been embedded will be equal to or lower than values from the p+1th data onwards. In such a case, the appliance characterizing information generating unit 2033 of the tampering detection information generating unit 2031 corrects the data aside from the embedded position of the electronic watermark information so that the values from the p+1th value onwards are below a lowest value of the appliance characterizing information after the embedding of the p electronic watermark information. The tampering detection information generating unit 2031 updates the electronic watermark information based on the values after correction and repeats the embedding process until the condition is satisfied.

Next, the method of verifying electronic watermark information implemented by an information tampering detecting unit of a security check server such as the analysis server 34 will be described.

The embedded position specifying unit of the information tampering detecting unit uses a specified signal processing circuit or the like to specify p positions of data with large values out of the appliance characterizing information that is physical data or the like. Next, the electronic watermark extracting unit uses position information expressing the specified data position and a specified embedded extracting circuit or the like to successively extract values of q(k) bits counting from the LSB of the selected p appliance characterizing information in a time series.

Next, the electronic watermark verifying unit generates m bit electronic watermark information based on every bit (nr−m bits) of the portion where the electronic watermark information is not embedded, shared information such as key information, time information, and data used by the embedding side. Then, the electronic watermark verifying unit compares the electronic watermark information extracted by the electronic watermark extracting unit and the electronic watermark information that has been generated.

Specific Example 3

First, a method of embedding the electronic watermark information implemented by the control-compliant appliance 125 or the like will be described.

First, the embedded position deciding unit 2037 of the tampering detection information generating unit 2031 uses a specified signal processing circuit or the like to carry out a discrete Fourier transform expressed by Equation 101 above or a discrete cosine transform expressed by Equation 102 above to convert the appliance characterizing information (physical data) $(X_0, X_1, \ldots, X_{n-1})$ in a time domain to a data string $(Y_0, Y_1, \ldots, Y_{n-1})$ in a frequency domain.

After this, the embedded position deciding unit 2037 selects p high frequency components (i.e., components where j is large in Equations 101 and 102) in order from the high frequencies.

After this, the electronic watermark generating unit 2035 generates m bit electronic watermark information based on every bit (nr−m bits) aside from q(k) bits counting from the LSB of the selected p appliance characterizing information, shared information such as key information, time information, and in some cases other information. Here, "q(k)" is a value that satisfies Condition a given above.

Next, the electronic watermark embedding unit 2039 uses a specified embedding processing circuit or the like to successively insert the electronic watermark information generated based on the shared information into a q(k) bit part counting from the least significant bit LSB of the selected p frequency domain data.

Here, as the method of embedding when a discrete Fourier transform is used, it is possible to use any arbitrary method, such as assigning uniformly to both real numbers and complex numbers or assigning with priority to large values.

Next, the electronic watermark embedding unit 2039 uses a specified signal processing circuit or the like to subject data in a frequency domain after the embedding of the electronic watermark information to an inverse discrete Fourier transform expressed by Equation 103 or to an inverse discrete cosine transform expressed by Equation 104 to restore the data to a data string in a time domain.

Next, the method of verifying electronic watermark information implemented by an information tampering detecting unit of a security server such as the analysis server 34 will be described.

The embedded position specifying unit of the information tampering detecting unit first uses a specified signal processing circuit or the like to carry out the discrete Fourier transform expressed by Equation 101 above or the discrete cosine transform expressed by Equation 102 above to convert the appliance characterizing information (physical data) $(X_0, X_1, \ldots, X_{n-1})$ in a time domain to a data string $(Y_0, Y_1, \ldots, Y_{n-1})$ in a frequency domain. Next, the embedded position specifying unit selects p high frequency components (i.e., components where j is large in Equations 101 and 102) in order from the high frequencies. By doing so, it is possible to specify the position at which the electronic watermark information was embedded. After this, the electronic watermark extracting unit uses the position information showing the position of the specified data and successively extracts q(k) bit values counting from the least significant bit LSB of the selected p appliance characterizing information using a predetermined embedded extracting circuit or the like.

Next, the electronic watermark verifying unit generates m bit electronic watermark information based on every bit (nr−m bits) of the portion where the electronic watermark information is not embedded, shared information such as key information, time information, and data used by the embedding side. Then, the electronic watermark verifying unit compares the electronic watermark information extracted by the electronic watermark extracting unit and the electronic watermark information that has been generated.

Specific Example 4

First, a method of embedding the electronic watermark information implemented by the control-compliant appliance 125 or the like will be described.

First, the appliance characterizing information generating unit 2033 of the tampering detection information generating unit 2031 generates difference data Sk=Xk−Xk−1 ($1 \leq k \leq n-1$) based on the appliance characterizing information Xk. Next, the embedded position deciding unit 2037 selects a p−1 consecutive data string Sk($t \leq k \leq t+p-2$, $1 \leq t \leq n-p+1$) so that the sum of p−1 consecutive difference data is below a specified threshold σ and the selected p−1 data have the highest sum of squares out of a consecutive data string that satisfies such condition.

After this, the electronic watermark generating unit 2035 generates m bit electronic watermark information based on every bit (nr−m bits) aside from q(k) bits counting from the LSB of the selected p appliance characterizing information, shared information such as key information, time information, and in some cases other information. Here, "q(k)" is a value that satisfies Condition a given above.

Next, the electronic watermark embedding unit 2039 uses a specified embedding processing circuit or the like to successively insert the electronic watermark information generated based on the shared information into a q(k) bit part counting from the least significant bit LSB of the selected p frequency domain data.

Regarding the consecutive difference data of the p selected appliance characterizing information after embedding of the electronic watermark information, there may be cases where it is no longer true that the sum is below the threshold a and/or the sum of squares is the highest out of a consecutive data string that satisfies such condition. In such a case, the appliance characterizing information generating unit 2033 of the tampering detection information generating unit 2031 corrects the data aside from the embedded position of the electronic watermark information so that the conditions given above are true. The tampering detection information generating unit 2031 updates the electronic watermark information based on the values after correction and repeats the embedding process until the conditions above are true.

Next, a method of verifying the electronic watermark information implemented by the power management apparatus 11 and an information tampering detecting unit of a security check server such as the analysis server 34 will be described.

The embedded position specifying unit of the information tampering detecting unit first generates difference data $Sk=Xk-Xk-1$ ($1 \le k \le n-1$) for the appliance characterizing information Xk. Next, the embedded position specifying unit selects a p−1 consecutive data string Sk ($t \le k \le t+p-2$, $1 \le t \le n-p+1$) where the sum of the p−1 consecutive difference data is below a predetermined threshold σ and a sum of squares is highest out of a consecutive data string that satisfies such condition. By doing so, it is possible to specify the position where the electronic watermark information was embedded.

After this, an electronic watermark extracting unit uses position information expressing the position of the specified data and a specified embedded extracting circuit or the like to successively extract values of a q(k) bit part counting from the LSB of the selected p appliance characterizing information ($t-1 \le k \le t+p-2$) in time series order.

Next, the electronic watermark verifying unit generates m bit electronic watermark information based on every bit (nr−m bits) of the portion where the electronic watermark information is not embedded, shared information such as key information, time information, and data used by the embedding side. Then, the electronic watermark verifying unit compares the electronic watermark information extracted by the electronic watermark extracting unit and the electronic watermark information that has been generated.

A method of embedding and method of verifying electronic watermark information that use shared information and a method of embedding and method of verifying electronic watermark information that use shared information and time information have been described above while giving specific examples. By using such methods in the local power management system 1 according to the present embodiment, it is possible to detect developments such as whether information has been tampered with and whether a power management apparatus has been taken over.

Note that although a case where electronic watermark information is embedded into a region with large values has been specifically described in the above explanation, it is also possible to implement the same processing when the electronic watermark information is embedded in a region with high dispersion, a noise region, or the like.

(1-11) Method of Registering Power Management Apparatus

Figure 34:
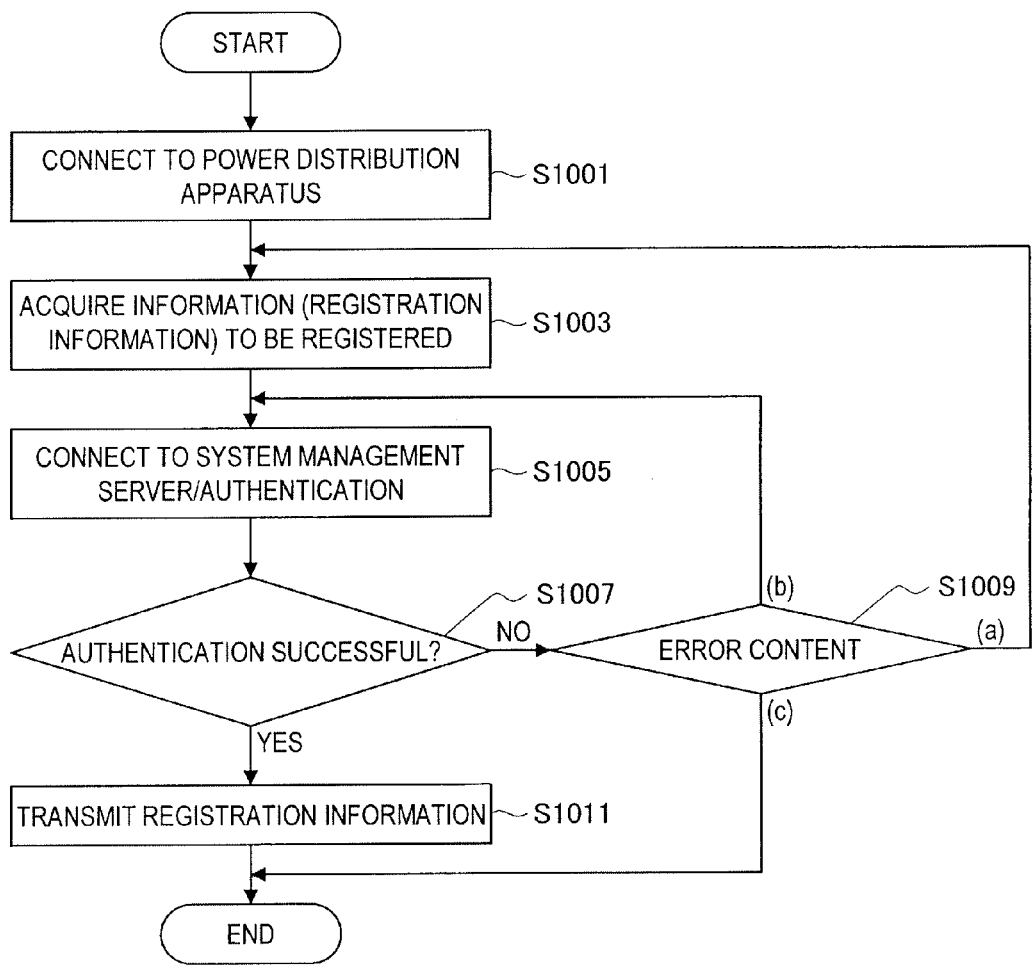
FIG. 34 is a flowchart useful in explaining a method of registering a power management apparatus.
Figure 35:
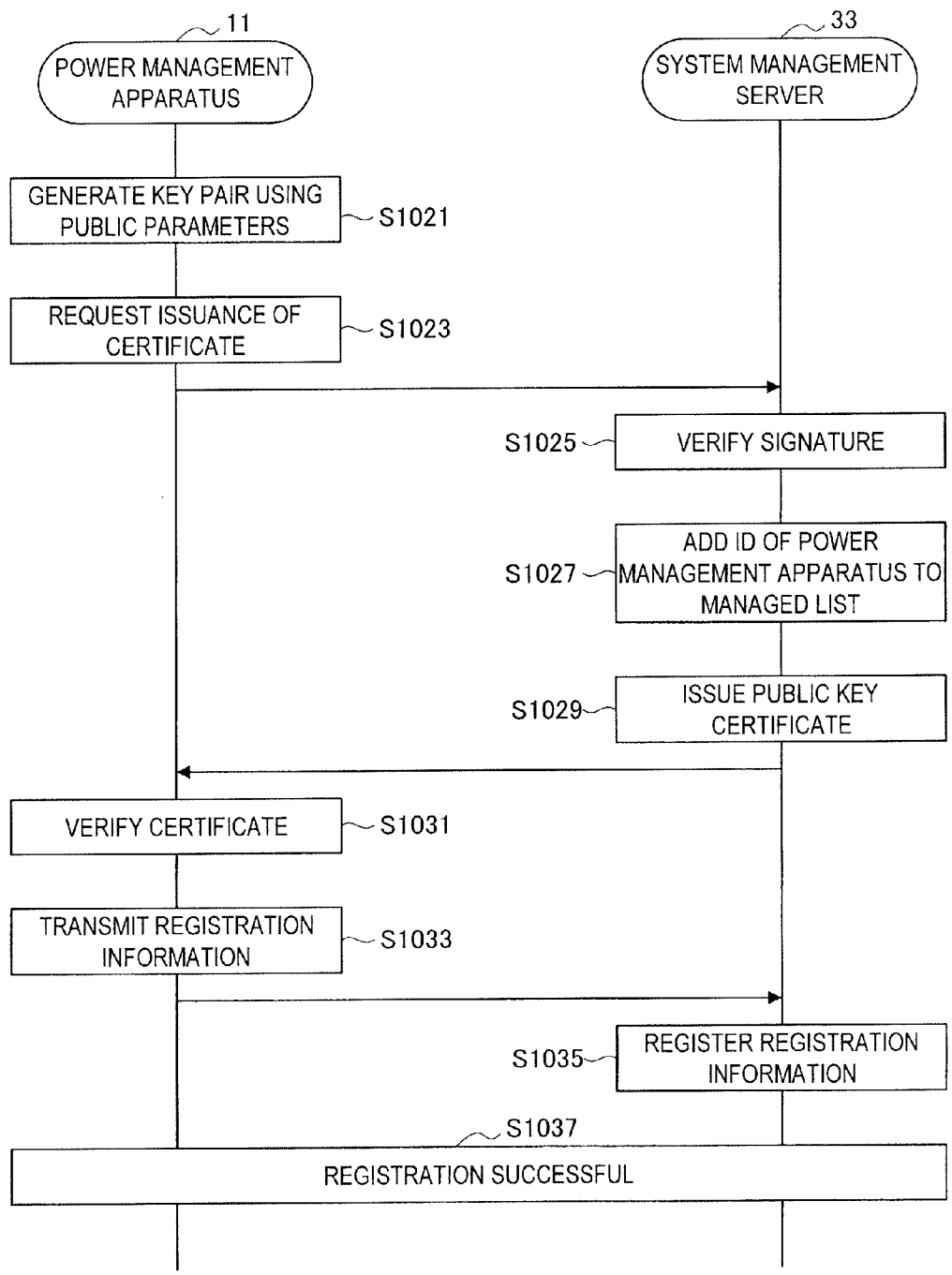
FIG. 35 is a flowchart useful in explaining a specific example of a method of registering a power management apparatus.

Next, a method of registering a power management apparatus implemented by the power management apparatus 11 will be described in order of the processing flow with reference to FIGS. 34 and 35. FIG. 34 is a flowchart useful in explaining a method of registering a power management apparatus according to the present embodiment. FIG. 35 is a flowchart useful in explaining a specific example of the method of registering a power management apparatus according to the present embodiment.

First the overall flow of the registering method of the power management apparatus 11 will be described with reference to FIG. 34.

The appliance management unit 1121 of the power management apparatus 11 first connects the power distribution apparatus 121 set up in the local power management system 1 (step S1001). More specifically, the appliance management unit 1121 acquires a digital signature, a certificate, or the like, which was stored in the power distribution apparatus 121 when the power distribution apparatus 121 was manufactured, from the power distribution apparatus 121, and recognizes the power distribution apparatus 121 automatically or via online recognition. The recognition process and registration process for the power distribution apparatus 121 are carried out according to the flow of a recognition process and registration process for a control-compliant appliance 125 or the like, described later.

After this, the appliance management unit 1121 displays a message asking the user for a content of information to be registered (registered information) on the display unit 116 provided in the power management apparatus 11. The user operates the input unit 117 such as a touch panel or a keyboard provided in the power management apparatus 11 and inputs the content of registration information, such as that shown in FIG. 20, into the power management apparatus 11. By doing so, the appliance management unit 1121 is capable of acquiring the registration information (step S1003).

Next, the appliance management unit 1121 connects to the system management server 33 via the wide area communication unit 114 and authentication is carried out by the system management server 33 (step S1005). Although it is possible to connect to the system management server 33 and carry out the authentication process using any arbitrary technique, as one example, public key encryption is used.

In the authentication process carried out by the system management server 33, the system management server 33 informs the power management apparatus 11 of the authentication result. The appliance management unit 1121 refers to the received authentication result and judges whether the authentication succeeded (step S1007).

When the authentication process by the system management server 33 failed, the appliance management unit 1121 determines an error content written in the authentication result (step S1009). In a case (a) where the registration information is incomplete, the appliance management unit 1121 returns to step S1003, asks for the content of the incomplete registration information, and acquires the correct content. In a case (b) where the registration information is not incomplete but the authentication failed, the appliance management unit 1121 connects to the system management server 33 and the authentication process is carried out again. Also, in a case (c) where the authentication has failed for a specified number of consecutive iterations or more, the appliance management unit 1121 cancels the registration of the power management apparatus 11.

Meanwhile, when the authentication process carried out by the system management server 33 has succeeded, the appliance management unit 1121 transmits the acquired registration information officially to the system management server 33 (step S1011) and has the power management apparatus 11 registered in a database of the system management server 33.

By carrying out processing according to the flow described above, the appliance management unit 1121 of the power management apparatus 11 is capable of registering the power management apparatus 11 itself in the system management server 33. Note that when registration of the power management apparatus 11 has succeeded, the power management apparatus 11 regularly communicates with the system management server 33 and checks a current state.

Specific Example of Method of Registering Power Management Apparatus

Next, a specific example of a method of registering a power management apparatus will be described with reference to FIG. 35. FIG. 35 shows an example of a method of registering a power management apparatus using public key encryption.

Note that it is assumed that before the following explanation begins, the power management apparatus 11 has acquired openly available system parameters (public parameters) according to an arbitrary method. It is also assumed that identification information (ID) that is unique to the power management apparatus and a digital signature of identification information generated by the system management server 33 have been stored in the apparatus by the manufacturer, for example. In addition, it is assumed that the system management server 33 has a public key and a secret key that are unique to the system management server 33.

When the user of the power management apparatus 11 has carried out an operation that starts the registration process for a power management apparatus, the key generating unit 1501 of the appliance management unit 1121 uses the public parameters to generate a key pair composed of a public key and a secret key (step S1021). The key generating unit 1501 stores the generated key pair in the storage unit 113 or the like.

Next, the system registering unit 1503 encrypts the identification information of the power management apparatus, the digital signature of the identification information, and the generated public key using the public key of the system management server 33. After this, the system registering unit 1503 transmits the generated cryptogram via the wide area communication unit 114 to the system management server 33 as a certificate issuance request (step S1023).

On acquiring the certificate issuance request transmitted from the power management apparatus 11, the system management server 33 first verifies the validity of the signature appended to the digital signature (step S1025). More specifically, the system management server 33 uses the secret key that is concealed by the server to verify whether the digital signature appended to the identification information of the power management apparatus is valid.

If the verification has failed, the system management server 33 transmits an authentication result showing that the authentication failed to the power management apparatus 11. Meanwhile, if the verification has succeeded, the system management server 33 adds the identification information of the power management apparatus 11 to a managed list in a database stored by the system management server 33 (step S1027).

Next, the system management server 33 issues a public key certificate for the public key generated by the power management apparatus 11 (step S1029) and transmits the generated public key certificate to the power management apparatus 11.

On receiving the public key certificate transmitted from the system management server 33, the system registering unit 1503 of the power management apparatus 11 verifies the public key certificate (step S1031). If the verification of the public key certificate succeeds, the system registering unit 1503 transmits registration information to the system management server 33 (step S1033). Note that such transmission of the registration information is carried out using encrypted communication.

On receiving the registration information transmitted from the power management apparatus 11, the system management server 33 registers the received registration information in the managed list (step S1035). By doing so, the process for registering the power management apparatus 11 carried out by the power management apparatus 11 and the system management server 33 is regarded as having succeeded (step S1037).

A specific example of the process for registering the power management apparatus 11 has been described above. Note that the specific example of the registration method described above is merely one example, and the registration process according to the present embodiment is not limited to the above example.

(1-12) Method of Registering Control-Compliant Appliance

Figure 36:
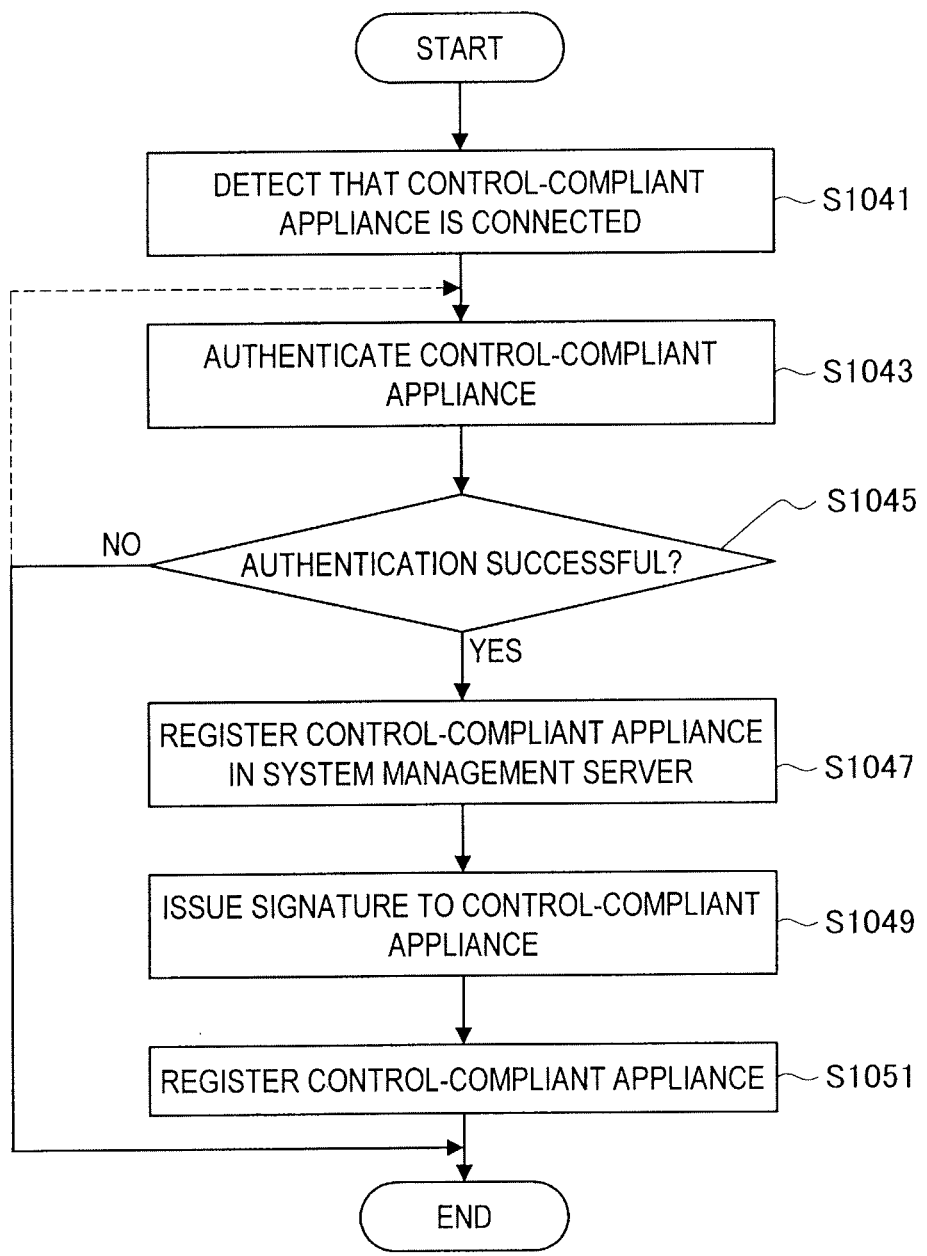
FIG. 36 is a flowchart useful in explaining a method of registering a control-compliant appliance.
Figure 37:
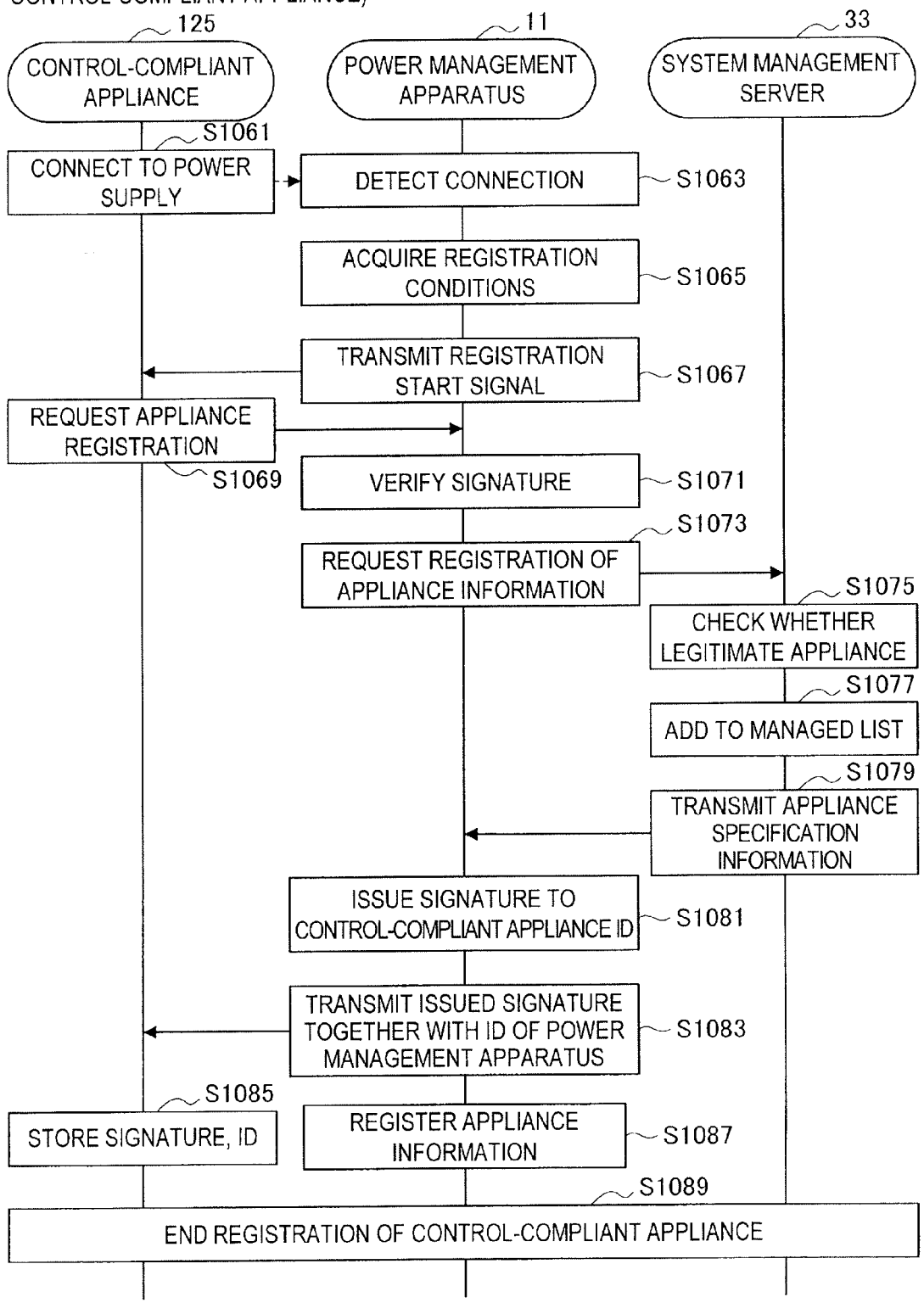
FIG. 37 is a flowchart useful in explaining a specific example of a method of registering a control-compliant appliance.
Figure 38:
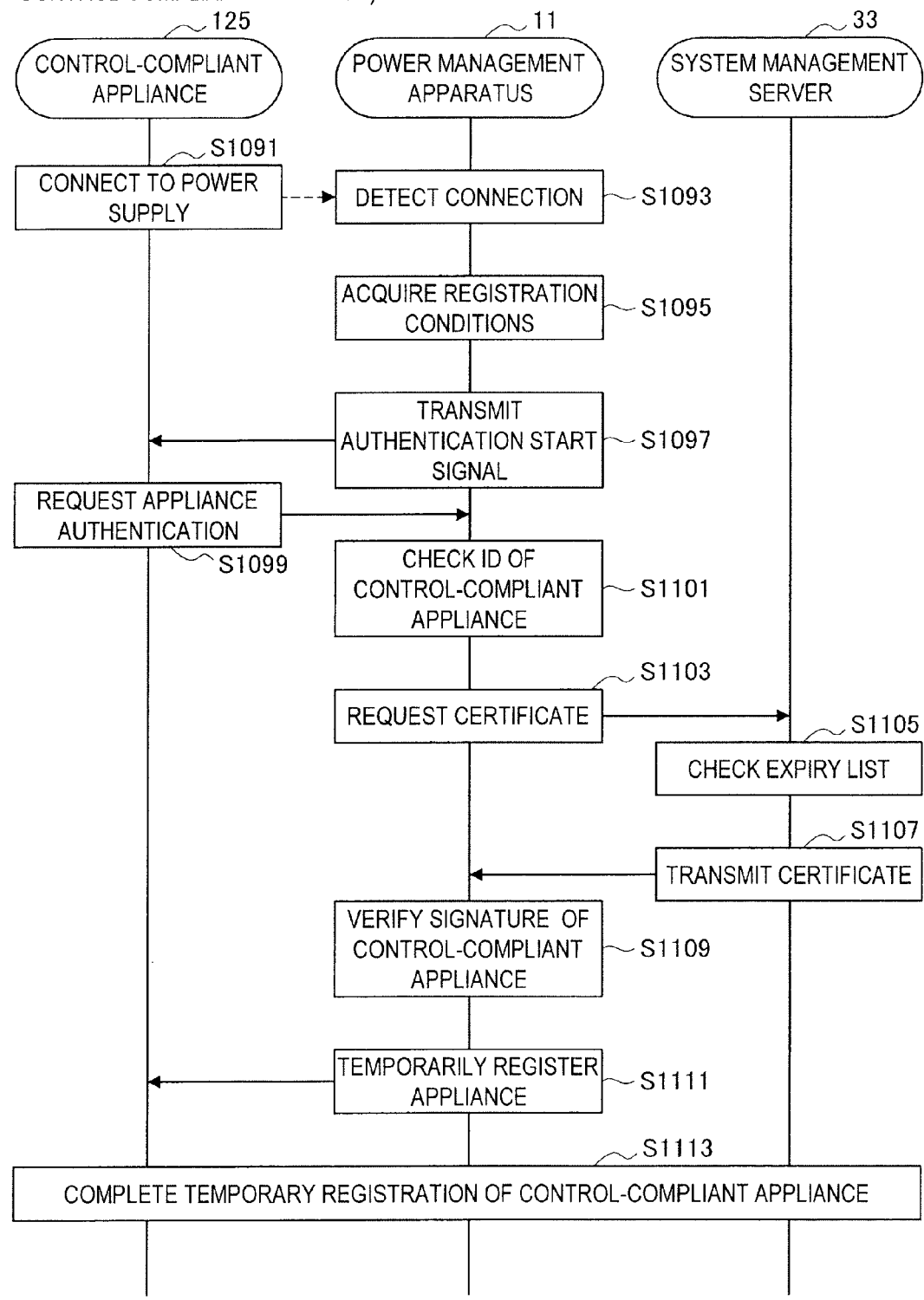
FIG. 38 is a flowchart useful in explaining a specific example of a method of registering a control-compliant appliance.

Next, the method of registering a control-compliant appliance 125 in the power management apparatus 11 will be described with reference to FIGS. 36 to 38. FIG. 36 is a flowchart useful in explaining a method of registering a control-compliant appliance according to the present embodiment. FIGS. 37 and 38 are flowcharts useful in explaining specific examples of the method of registering a control-compliant appliance according to the present embodiment.

Note that this method of registering will be described with the control-compliant appliance 125 as an example of a managed appliance managed by the power management apparatus 11. The method of registering described below is carried out in the same way when registering the electric vehicle 124, the power storage apparatus 128, the first power generating apparatus 129, and the second power generating apparatus 130 in the power management apparatus 11.

First, the overall flow of the method of registering the control-compliant appliance 125 will be described with reference to FIG. 36.

When a control-compliant appliance 125 that is not registered is connected to the local power management system 1 managed by the power management apparatus 11, the appliance management unit 1121 of the power management apparatus 11 detects that the control-compliant appliance 125 is connected to the system (step S1041). More specifically, the power management apparatus 11 itself may detect that the control-compliant appliance 125 is connected or the power distribution apparatus 121 or a power point (the control-compliant outlet 123 or the outlet expansion apparatus 127) may detect that the control-compliant appliance 125 is connected and inform the power management apparatus 11. As a result of this process, the power management apparatus 11 is able to grasp information (position information) relating to the outlet to which the control-compliant appliance 125 is connected.

Next, the appliance management unit 1121 implements an authentication process on the control-compliant appliance 125 that is newly connected. This authentication process may be carried out using any arbitrary technique, for example, public key encryption. By carrying out the authentication process, the appliance management unit 1121 acquires information such as that shown in FIG. 20 from the control-compliant appliance 125.

If the authentication of the control-compliant appliance 125 has failed, the appliance management unit 1121 ends the registration process for the control-compliant appliance 125. Note that if the appliance management unit 1121 decides to attempt to authenticate the control-compliant appliance 125, instead of the registration process being suddenly terminated, the processing may return to step S1043 where the authentication process is repeated.

Meanwhile, when the authentication of the control-compliant appliance 125 has succeeded, the appliance management unit 1121 registers the control-compliant appliance 125 via the wide area communication unit 114 in the system management server 33 (step S1047). Next, the appliance management unit 1121 issues a signature (digital signature), certificate, or the like to the control-compliant appliance 125 for which the authentication succeeded (step S1049). After this, the appliance management unit 1121 registers the control-compliant appliance 125 in a management database stored in the storage unit 113 or the like (step S1051).

Specific Example of Method of Registering Control-Compliant Appliance

Next, a specific example of a method of registering a control-compliant appliance will be described with reference to FIGS. 37 and 38. FIGS. 37 and 38 show an example of method of registering a control-compliant appliance that uses public key encryption.

Note that it is assumed that before the following explanation begins, the power management apparatus 11 has acquired openly available system parameters (public parameters) according to an arbitrary method. It is also assumed that identification information (ID) that is unique to the power management apparatus and a digital signature of identification information generated by the system management server 33 have been stored in the apparatus by the manufacturer, for example, and that a key pair composed of a public key and a secret key are also stored in the apparatus. It is further assumed that the system management server 33 stores a public key and a secret key that are unique to the system management server 33. Finally, it is assumed that identification information (ID) that is unique to the control-compliant appliance 125 and a digital signature generated by the system management server 33 have been stored inside the control-compliant appliance 125 by the manufacturer, for example.

First, a specific example of a method of initially registering a control-compliant appliance will be described with reference to FIG. 37.

When a control-compliant appliance 125 is connected to the system 1 (more specifically, when the control-compliant appliance 125 is connected to a control-compliant outlet 123 or the like) (step S1061), in the procedure described earlier, the managed appliance registering unit 1505 of the power management apparatus 11 detects that the control-compliant appliance 125 has been connected (step S1063).

Next, the managed appliance registering unit 1505 acquires registration conditions such as a priority ranking shown in FIG. 19 (step S1065). More specifically, the managed appliance registering unit 1505 displays a message asking the user for the registration conditions on the display unit 116 provided in the power management apparatus 11. The user operates the input unit 117, such as a touch panel or a keyboard, provided in the power management apparatus 11 and inputs registration conditions such as those shown in FIG. 19, into the power management apparatus 11.

After this, the managed appliance registering unit 1505 transmits a registration start signal via the local communication unit 111 to the control-compliant appliance 125 (step S1067).

The authentication processing unit 2021 of the control-compliant appliance 125 that received the registration start signal transmits the identification information (ID) that is unique to the appliance and the digital signature generated by the system management server 33 to the power management apparatus 11 as an appliance registration request (step S1069).

The managed appliance registering unit 1505 that received the appliance registration request uses the public key of the system management server 33 to verify the validity of the received digital signature (step S1071). When the verification has failed, the managed appliance registering unit 1505 transmits an authentication result showing that the authentication failed to the control-compliant appliance 125. Meanwhile, when the verification succeeded, the managed appliance registering unit 1505 requests the system management server 33 to register the identification information of the control-compliant appliance 125 and/or appliance information including the manufacturer name, model number, and the like of the control-compliant appliance 125 (step S1073).

On receiving the registration request, the system management server 33 confirms whether the control-compliant appliance 125 included in the registration request is a legitimate appliance (that is, an appliance that has already been registered) (step S1075). When the control-compliant appliance 125 is a legitimate appliance, the system management server 33 adds the received appliance information to a managed list in a database stored in the system management server 33 (step S1077).

After this, the system management server 33 acquires information (appliance specification information) relating to the specification of the registered control-compliant appliance 125 from various databases stored by the system management server 33 itself or from a server belonging to the manufacturer or the like and transmits the acquired information to the power management apparatus 11 (step S1079).

The managed appliance registering unit 1505 of the power management apparatus 11 then issues a signature (certificate) for the identification information (ID) of the control-compliant appliance using a key held by the managed appliance registering unit 1505 itself (step S1081). After this, the managed appliance registering unit 1505 transmits the issued signature together with the identification information (ID) of the power management apparatus 11 to the control-compliant appliance 125 (step S1083).

The authentication processing unit 2021 of the control-compliant appliance 125 stores the received signature and identification information (ID) of the power management apparatus 11 in a specified location such as the storage unit 2015 (step S1085). The managed appliance registering unit 1505 of the power management apparatus 11 registers the appliance information of the control-compliant appliance 125 in a management database stored in the storage unit 113 or the like (step S1087). By doing so, the process for initially registering a control-compliant appliance 125 is regarded as having succeeded (step S1089).

FIG. 37 shows a process where the control-compliant appliance 125 is officially registered (initially registered) in the power management apparatus 11. However, as one example, there may also be cases where a user wishes to register a control-compliant appliance 125, which has already been registered in the power management apparatus 11 at the user's home, temporarily in a power management apparatus 11 provided at a friend's house. For this reason, the power management apparatus 11 according to the present embodiment is provided with a registration process for temporarily registering a control-compliant appliance 125 that has already been initially registered in another power management apparatus 11. A process for temporarily registering a control-compliant appliance 125 will now be described with reference to FIG. 38.

Note that it is assumed that before the following explanation begins, the power management apparatus 11 has acquired openly available system parameters (public parameters) according to an arbitrary method. It is also assumed that identification information (ID) that is unique to the power management apparatus and a digital signature of identification information generated by the system management server 33 have been stored in the apparatus by the manufacturer, for example, and that a key pair composed of a public key and a secret key is also stored in the apparatus. In addition, it is assumed that the system management server 33 has a public key and a secret key that are unique to the system management server 33. Finally, it is assumed that identification information (ID) that is unique to the control-compliant appliance 125 and a digital signature generated by the system management server 33 have been stored inside the control-compliant appliance 125 by the manufacturer, for example, and that identification information (ID) and a signature of a registered power management apparatus have also been stored in the control-compliant appliance 125.

When the control-compliant appliance 125 is connected to the system 1 (more specifically, when the control-compliant appliance 125 is connected to a control-compliant outlet 123 or the like) (step S1091), in the procedure described earlier, the managed appliance registering unit 1505 of the power management apparatus 11 detects that the control-compliant appliance 125 has been connected (step S1093).

Next, the managed appliance registering unit 1505 acquires registration conditions such as a priority ranking shown in FIG. 19 (step S1095). More specifically, the managed appliance registering unit 1505 displays a message asking the user for the registration conditions on the display unit 116 provided in the power management apparatus 11. The user operates the input unit 117, such as a touch panel or a keyboard, provided in the power management apparatus 11 and inputs registration conditions such as those shown in FIG. 19, into the power management apparatus 11.

Next, the managed appliance registering unit 1505 transmits a registration start signal via the local communication unit 111 to the control-compliant appliance 125 (step S1097).

The authentication processing unit 2021 of the control-compliant appliance 125 that received the registration start signal transmits the identification information (ID) of the registered power management apparatus 11, the provided signature, and the identification information (ID) that is unique to the control-compliant appliance 125 to the power management apparatus 11 as an appliance registration request (step S1099).

The managed appliance registering unit 1505 that received the appliance registration request checks the identification information (ID) that is unique to the control-compliant appliance 125 and is included in the appliance registration request (step S1101). After this, based on the identification information (ID) that is unique to the control-compliant appliance 125, the managed appliance registering unit 1505 requests the system management server 33 for the certificate of the control-compliant appliance 125 (step S1103).

After confirming that the control-compliant appliance 125 that requested the certificate is not an appliance included in an expiry list (step S1105), the system management server 33 transmits the requested certificate to the power management apparatus 11 (step S1107).

The managed appliance registering unit 1505 of the power management apparatus 11 verifies the signature (a signature acquired from the registered power management apparatus 11) possessed by the control-compliant appliance 125 (step S1109). When verification of the signature has succeeded, the managed appliance registering unit 1505 registers the control-compliant appliance 125 temporarily in the power management apparatus 11 (step S1111). By doing so, the power management apparatus 11 is capable of temporarily registering the control-compliant appliance 125 that has already been registered in another power management apparatus 11.

(1-13) Method of Registering Control-Compliant Outlet

Figure 39:
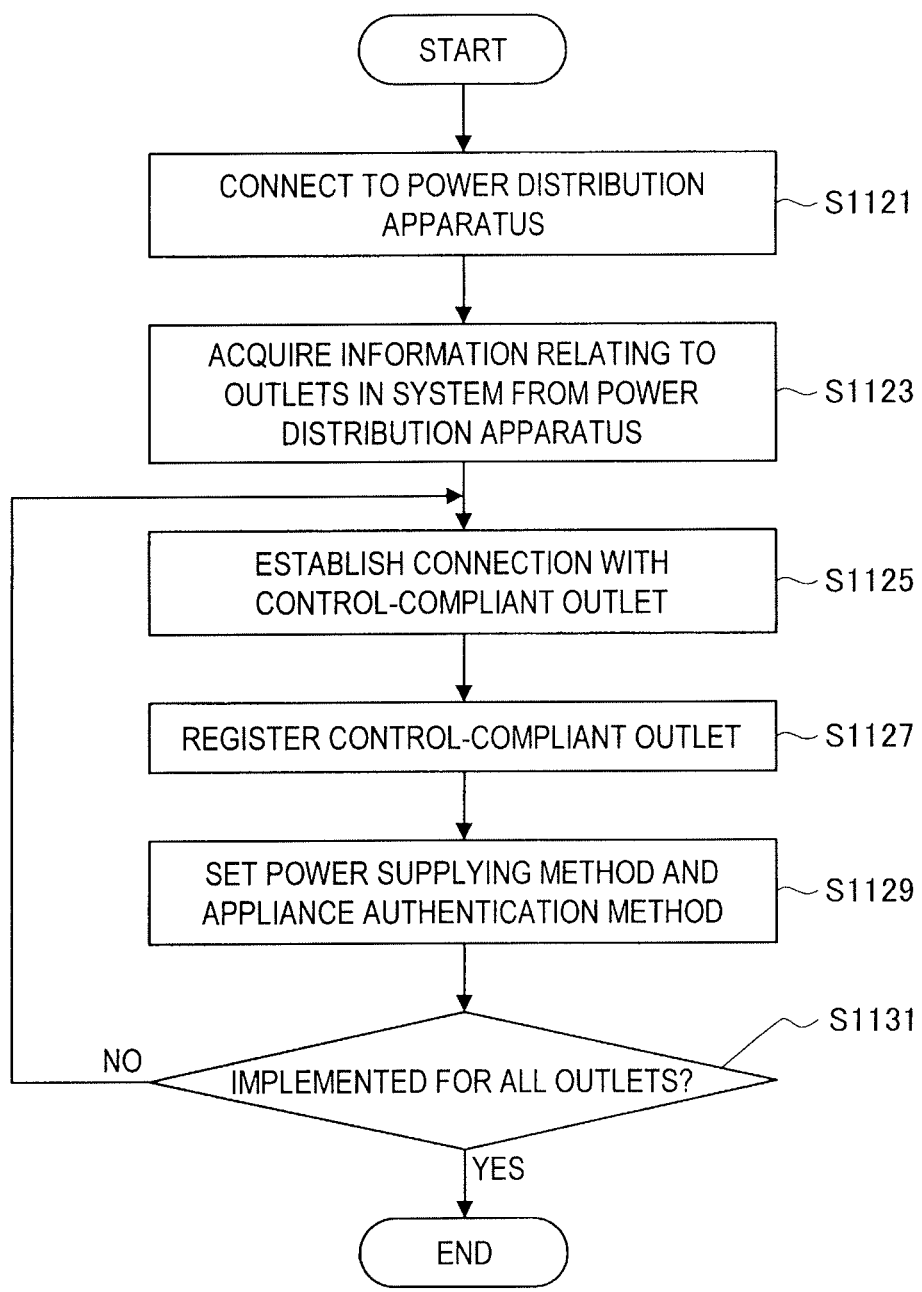
FIG. 39 is a flowchart useful in explaining a method of registering a control-compliant outlet.

Next, the method of registering a control-compliant outlet 123 in the power management apparatus 11 will be described with reference to FIG. 39. FIG. 39 is a flowchart useful in explaining a method of registering a control-compliant outlet according to the present embodiment.

Note that although the following description uses the control-compliant outlet 123 as an example, this method of registering can be carried out in the same way for the outlet expansion apparatus 127.

The appliance management unit 1121 of the power management apparatus 11 first connects to the power distribution apparatus 121 (step S1121) and acquires information relating to outlets present in the system 1 from the power distribution apparatus 121 (step S1123). The expression "information relating to outlets" refers to information such as an indication of control-compliant outlet or non-control-compliant outlet, identification information (ID) of a control-compliant outlet, a manufacturer name and model number, a specification such as amount of supplied power and supply limit, position information of an outlet inside the system, and the like.

Next, the managed appliance registering unit 1505 of the appliance management unit 1121 establishes a connection with a control-compliant outlet present in the system (step S1125). After this, the managed appliance registering unit 1505 registers the control-compliant outlet with which a connection has been established in a management database stored in the storage unit 113 or the like (step S1127).

Next, the managed appliance registering unit 1505 confirms the power supplying control method and appliance authentication means such as those shown in FIG. 21, and sets such information in the management database. By doing so, when a control-compliant appliance 125 or a non-control-compliant appliance 126 is connected to the control-compliant outlet 123, the power management apparatus 11 is capable of carrying out an appropriate power supplying control and appliance authentication process.

Next, the managed appliance registering unit 1505 judges whether the process has been implemented for every outlet (control-compliant outlet) (step S1131). When a control-compliant outlet for which the process has not been implemented is present, the managed appliance registering unit 1505 returns to step S1125 and the processing continues. When the process has been implemented for every control-compliant outlet, the managed appliance registering unit 1505 ends the processing normally.

This completes the description of the processes for registering the respective apparatuses in the local power management system 1 according to the present embodiment.

(1-14) Billing Process for Temporarily Registered Control-Compliant Appliance

Figure 40:
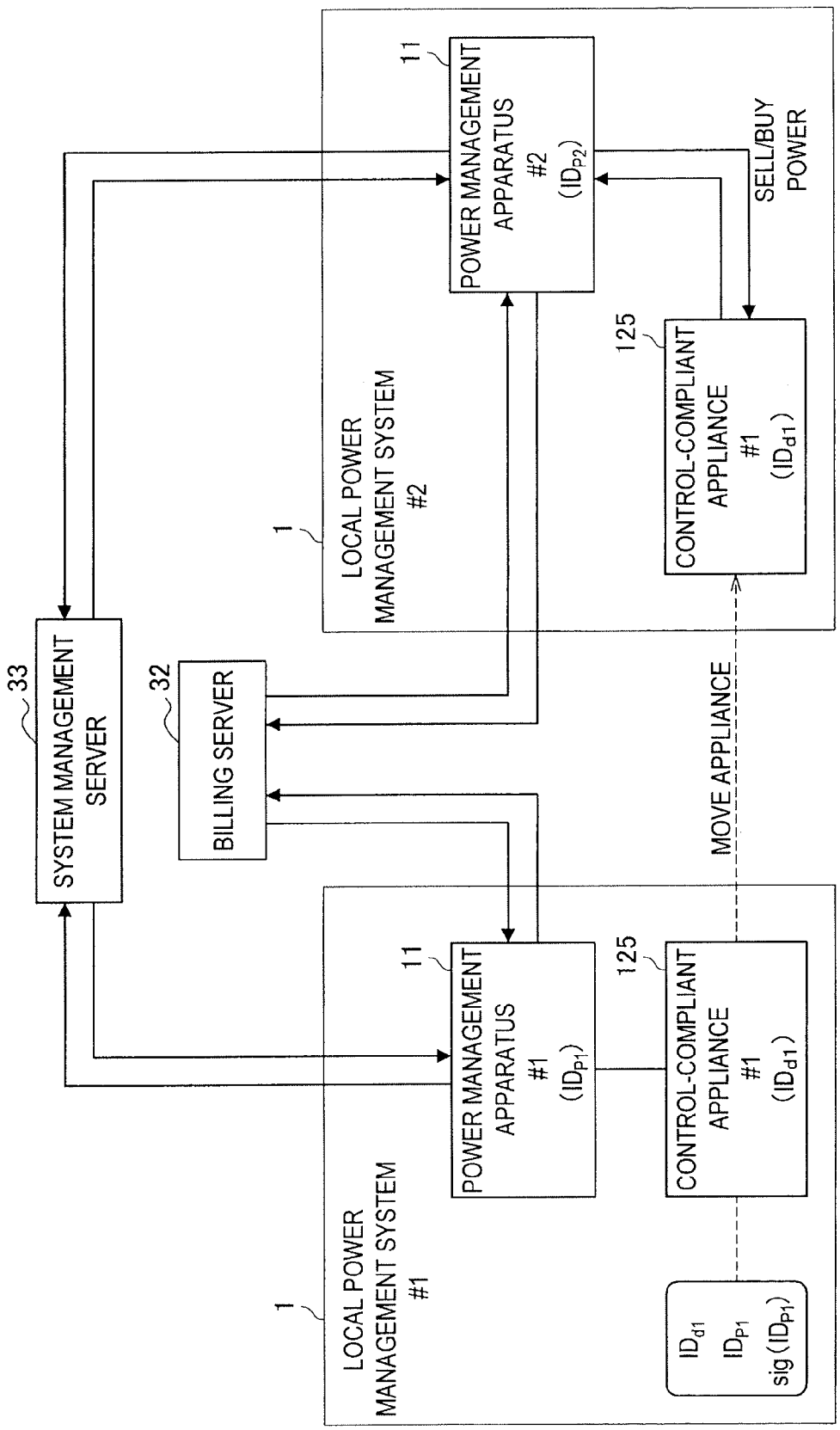
FIG. 40 is a diagram useful in explaining a billing process of a control-compliant appliance that has been temporarily registered.
Figure 41:
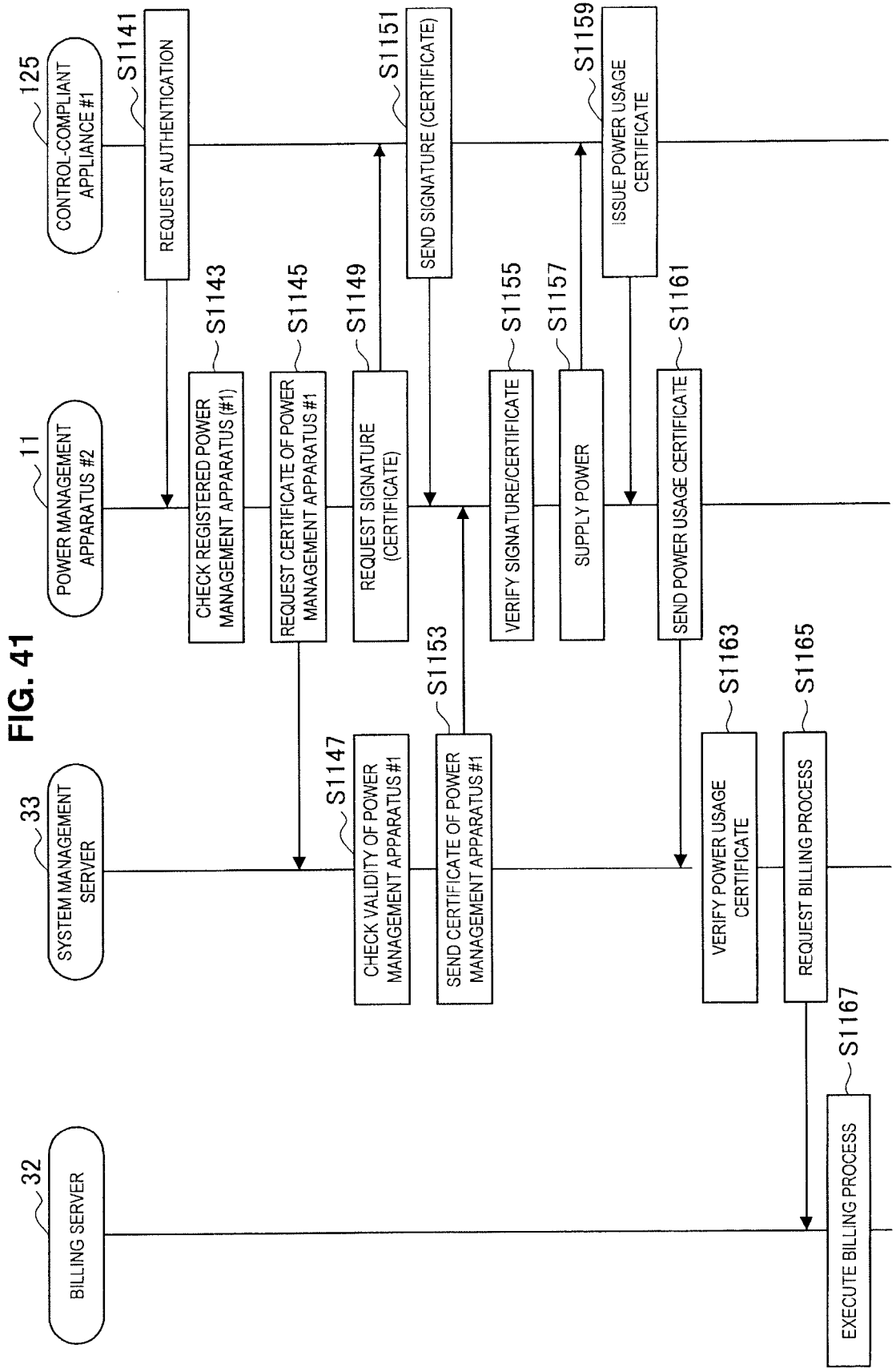
FIG. 41 is a flowchart useful in explaining a billing process of a control-compliant appliance that has been temporarily registered.

A billing process for a temporarily registered control-compliant appliance will now be described with reference to FIGS. 40 and 41. FIG. 40 is a diagram useful in explaining a billing process for a temporarily registered control-compliant appliance. FIG. 41 is a flowchart useful in explaining a billing process for a temporarily registered control-compliant appliance.

As described above, a state can be imagined where a control-compliant appliance 125 that has already been registered in a certain power management apparatus 11 is temporarily registered in another power management apparatus 11 that manages a different local power management system 1. When doing so, a situation may occur where the temporarily registered control-compliant appliance 125 receives the supplying of power from such different local power management system 1 under the control of the other power management apparatus 11.

This situation is shown in FIG. 40. As shown in FIG. 40, a control-compliant appliance #1 that belongs to a local power management system #1 is already registered in the power management apparatus #1. The control-compliant appliance #1 has received, from the power management apparatus #1, the identification information ($ID_{P1}$) of the power management apparatus #1 and the digital signature ($sig(ID_{P1})$) of the power management apparatus #1 on the identification information of the control-compliant appliance #1. Here, a situation is imagined where the control-compliant appliance #1 is temporarily registered in a local power management system #2 (for example, a public power supplying station or the like) that is managed by a power management apparatus #2 and the control-compliant appliance #1 receives the supplying of power from the local power management system #2. Here, it is assumed that the system management server 33 has grasped the identification information ($ID_{P1}$) of the power management apparatus #1 and the identification information ($ID_{P2}$) of the power management apparatus #2.

It is preferable for the fee for such power usage to be billed to the power management apparatus #1 in which the control-compliant appliance#1 is registered and for the power management apparatus #1 to implement a specified billing process with the billing server 32. This arrangement is only possible when the appliance stores a public key and a secret key, and when such information is not stored, the power management apparatus #2 will end up supplying power to the control-compliant appliance #1 free of charge. Note that even when a key pair composed of the public key and the secret key is stored, the supplying of power free of charge may be permitted depending on what settings have been made.

A potential problem in this situation is that when the power management apparatus #1 is an illegal apparatus, even if power is supplied to the control-compliant appliance #1 by the power management apparatus #2, the billing of the fee may be invalid. For this reason, in the present embodiment, before the supplying of power to the control-compliant appliance #1 is permitted, the power management apparatus #2 confirms the validity of the power management apparatus #1 and that the control-compliant appliance #1 is officially registered in the power management apparatus #1. Such confirmation operations should preferably also be carried out for safety even when the power management apparatus #2 supplies power free of charge. That is, the power management apparatus #2 uses the signature of the power management apparatus #1 and/or certificates or the like to verify the relationship between the power management apparatus #1 and the control-compliant appliance #1 whenever power is supplied and also enquires to the system management server 33 to check the validity of the power management apparatus #1 and the control-compliant appliance #1.

Also, in the present embodiment, regarding billing of a fee, as described below with reference to FIG. 41, it is possible to realize a safe billing process by incorporating the exchanging of the supplying of power and a power usage certificate that officially proves that power has been used.

The flow of a billing process for a control-compliant appliance that has been temporarily registered will now be described with reference to FIG. 41. Note that the following process is mainly carried out by the control unit 2001 of the control-compliant appliance 125 and the appliance management unit 1121 of the power management apparatus 11.

First the control-compliant appliance #1 requests the power management apparatus #2 to carry out the authentication process (step S1141). When requesting authentication, the control-compliant appliance #1 transmits the identification information ($ID_{P1}$) of the power management apparatus #1, the identification information ($ID_{d1}$) of the control-compliant appliance #1, and digital signatures for $ID_{P1}$ and $ID_{d1}$ that are stored in the control-compliant appliance #1 to the power management apparatus #2.

The power management apparatus #2 checks whether the received identification information ($ID_{d1}$) of the control-compliant appliance is present in a managed list managed by the power management apparatus #2 itself. The power management apparatus #2 also checks whether the identification information ($ID_{P1}$) of the power management apparatus #1 is present in a certificate list stored by the power management apparatus #2. By doing so, the power management apparatus #2 checks the power management apparatus #1 (step S1143).

If the identification information of the power management apparatus #1 is not present in the certificate list stored by the power management apparatus #2, the power management apparatus #2 requests the system management server 33 for the certificate of the power management apparatus #1 (step S1145). In accordance with the request for the certificate, the power management apparatus #1 may inform the system management server 33 of the identification information of the control-compliant appliance #1.

By checking whether the power management apparatus #1 is not in an expiry list, the system management server 33 checks the validity of the power management apparatus #1 (step S1147). If the identification information of the power management apparatus #1 is included in the expiry list, the system management server 33 informs the power management apparatus #2 of this and the power management apparatus #2 ends the processing in error.

Meanwhile, the power management apparatus #2 requests the control-compliant appliance #1 for a certificate issued by the power management apparatus #1 or a digital signature generated by the power management apparatus #1 (step S1149). On receiving this request, the control-compliant appliance #1 sends a digital signature ($sig(ID_{P1})$) provided from the power management apparatus #1 to the power management apparatus #2 (step S1151).

When the system management server 33 has confirmed the validity of the power management apparatus #1, the system management server 33 sends the certificate of the power management apparatus #1 stored in the system management server 33 to the power management apparatus #2 (step S1153).

The power management apparatus #2 verifies a digital signature and/or certificate transmitted from the control-compliant appliance #1 (step S1155), and when the verification succeeds, permits the supplying of power to the control-compliant appliance #1. At this time, the power management apparatus #2 informs the control-compliant appliance #1 of whether power is subject to a fee or is free of charge. If the power is free of charge, the following steps are not carried out.

Since the verification has succeeded, the power management apparatus #2 supplies power to the control-compliant appliance #1 for a specified time (step S1157).

The control-compliant appliance #1 that has received the supplying of power generates a message relating to power usage as evidence to prove that power has been consumed for a specified time, and transmits the message to the power management apparatus #2 appended with a signature (step S1159). The message relating to power usage to which the signature has been appended is a power usage certificate. Note that the processing in step S1157 and step S1159 should preferably be repeatedly carried out at fixed intervals until the power management apparatus #2 stops the supplying of power or the control-compliant appliance #1 is disconnected from the power network (the local power management system).

The power management apparatus #2 transmits the power usage certificate acquired from the power management apparatus #1 to the system management server 33 having added the identification information ($ID_{P2}$) of the power management apparatus #2 and the certificate of the appliance (step S1161).

The system management server 33 verifies whether "the control-compliant appliance #1 has purchased power from the power management apparatus #2". This verification is carried out by verifying the power usage certificate using the certificate of the appliance (step S1163).

When verification of the power usage certificate succeeds, the system management server 33 requests the billing server 32 to carry out the billing process (step S1165). After this, the billing server 32 carries out the billing process in accordance with the content of the request from the system management server 33 (step S1167).

By carrying out such processing, it is possible to realize a safe billing process function that can be expanded to a public station.

Note that out of the control-compliant appliances and the like managed by the power management apparatus 11, it would be conceivably possible for the electric vehicle 124 or the like that is equipped with a large-capacity battery to sell the power stored in the battery to another power network (local power management system). Such situation could also be handled using the procedure shown in FIG. 41. In such a case, the power management apparatus 11 receives power from the electric vehicle 124 or the like and the power management apparatus 11 issues a power usage certificate to the electric vehicle 124 or the like. Here, it is preferable for the power management apparatus 11 that has purchased the power to be fundamentally in charge of the sending of the power usage certificate to the system management server 33.

It is also conceivable for a power management apparatus 11 that has received the supplying of power to do so illegally, for example, by not sending a power usage certificate to the system management server 33. In this case, such illegal activity can be detected by having the power management apparatus 11 in which the electric vehicle 124 or the like is registered send a power usage certificate stored in the electric vehicle 124 or the like to the system management server 33.

(1-15) Modification to Method of Registering Control-Compliant Appliance

Here, an example modification to the method of registering a control-compliant appliance described earlier will be described in detail with reference to FIGS. 42 to 48. FIGS. 42 to 47 are diagrams useful in explaining a modification to the method of registering a control-compliant appliance, and FIG. 48 is a flowchart useful in explaining a modification to the method of registering a control-compliant appliance.

As described earlier, in the local power management system 1, authentication is carried out for appliances and batteries with aims such as preventing power from being supplied to illegal appliances and illegal batteries and preventing illegal appliances and illegal batteries from connecting to the system. The aim of the example modification to the method of registering a control-compliant appliance according to the present embodiment described below is to provide a method of registering that is capable of efficiently carrying out authentication of a control-compliant appliance or a power storage apparatus including a plurality of batteries.

In the following explanation, as illustrated in FIG. 24, a case where the power management apparatus 11 authenticates and registers eight control-compliant appliances 125 indicated as "A" to "H" is considered.

In the method described above, a one-to-one authentication process carried out between the power management apparatus 11 and one control-compliant appliance 125 is repeated a total of eight times for the control-compliant appliances 125. In this case, when authenticating a single control-compliant appliance 125, the following processes are carried out. That is, first the power management apparatus 11 transmits a challenge message including a random number to the control-compliant appliance 125. Next, the control-compliant appliance 125 generates a response message by performing an action on the challenge message using a key stored by the control-compliant appliance 125, and sends the response message in reply. After this, the power management apparatus 11 verifies whether the received response message is correct.

Here, authentication methods can be roughly classified into two types composed of (i) methods that use a secret key used in public key encryption as the key when performing the action to generate the response message from the challenge message so that the response message is a digital signature, and (ii) methods that use common key encryption using a key shared between the power management apparatus 11 and the control-compliant appliance 125.

This example modification focuses on an authentication method that uses a digital signature as indicated by (i) above. This is because such authentication methods include methods that are capable of using techniques known as batch verification and aggregate signatures.

Here, the expression "batch verification" refers to a verification technique that is capable of carrying out verification on a plurality of digital signatures collectively in a single operation, with the verification algorithm outputting "verification successful" only when all of the digital signatures are correct. By using this technique, it is possible to increase computational efficiency compared to when verification is carried out separately for individual digital signatures.

Specific examples of batch verification processing are the methods disclosed in D. Naccache et al., "Can D. S. A be improved? Complexity trade-offs with the digital signature standard," Proceedings of Eurocrypt 94, Lecture Notes in Computer Science Vol. 950, Springer-Verlag, 1994, and M. Bellare et al., "Fast Batch Verification for Modular Exponentiation and Digital Signatures," Proceedings of Eurocrypt 98, Lecture Notes in Computer Science Vol. 1403, Springer-Verlag, 1998. In the present modification, by using batch verification processing, the computational efficiency can be improved. Such techniques include techniques that are capable of collectively verifying signatures generated by a plurality of signatories in response to respectively different messages.

The expression "aggregate signature" refers to a technique that is capable of aggregating a plurality of signatures into a single signature, and when a verification process is carried out on the aggregated signatures, the verification algorithm outputs "verification successful" only when all of the signatures are correct. Here, the plurality of signatures may be generated by a plurality of signatories in response to respectively different messages.

Specific examples of aggregate signatures are the methods disclosed in D. Boneh et al., "Aggregate and Verifiably Encrypted Signatures from Bilinear Maps," Proceedings Eurocrypt 2003, Lecture Notes in Computer Science Vol. 2656, Springer-Verlag, 2003, and D. Boneh et al., "A Survey of Two Signature Aggregation Techniques," CryptoBytes Vol. 6, No. 2, 2003. In this modification, by using an aggregate signature, the computational efficiency can be improved.

Figure 42:
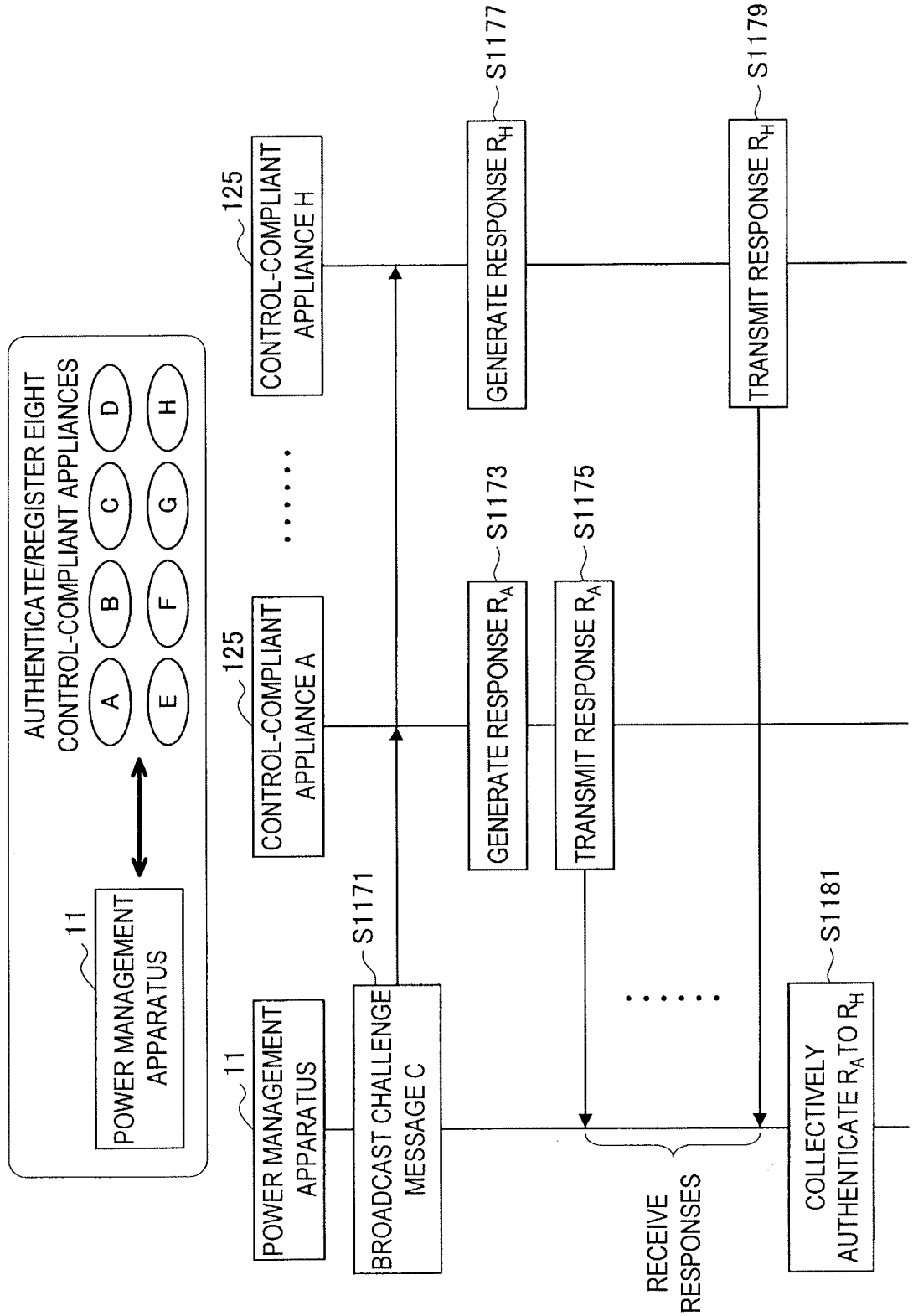
FIG. 42 is a diagram useful in explaining a modification to the method of registering a control-compliant appliance.

Here, as shown in FIG. 42, a case where the power management apparatus 11 authenticates eight control-compliant appliances 125 is considered. In a normal method where one-to-one authentication is repeated, a total of eight authentication processes are implemented, but by using a batch verification process or an aggregate signature, it is possible to improve the computational efficiency as shown in the lower part of FIG. 42.

Note that the authentication process described below is mainly carried out by the appliance management unit 1121 of the power management apparatus 11 and the control unit 2001 of the control-compliant appliance 125.

First, the power management apparatus 11 transmits a challenge message C to the control-compliant appliances A to H (step S1171). Since it is not necessary during such transmission to send individual messages to the respective control-compliant appliances, broadcasting may be used if the communication network is an environment that allows broadcasting.

The control-compliant appliances A to H respectively use secret keys for public key encryption that are held in the appliances on the challenge message C to generate response messages to the challenge message C and send the generated response messages in reply to the power management apparatus 11.

For example, on receiving the challenge message C, the control-compliant appliance A uses the secret key stored by the control-compliant appliance A to generate the response message RA in reply to the challenge message C (step S1173). After this, the control-compliant appliance A transmits the generated response message RA to the power management apparatus 11 (step S1175).

Similarly, on receiving the challenge message C, the control-compliant appliance H uses the secret key stored by the control-compliant appliance H to generate the response message RH in reply to the challenge message C (step S1177). Next, the control-compliant appliance H transmits the generated response message RH to the power management apparatus 11 (step S1179).

More specifically, the response messages RA to RH are digital signatures of the respective control-compliant appliances A to H on the challenge message C.

During this time, the power management apparatus 11 waits for the response messages from the control-compliant appliances A to H for which the authentication process is being implemented. The power management apparatus 11 gathers response messages from the eight control-compliant appliances, collectively authenticates all of the response messages RA to RH (step S1181), and verifies whether all of the response messages are correct. This verification may be carried out by a batch verification process or may be carried out by aggregating the eight response messages into a single digital signature using an aggregate signature technique and carrying out verification on the resulting digital signature.

Note that although the power management apparatus 11 is assumed to already know the public key of each control-compliant appliance to simplify the above explanation, the control-compliant appliances A to H may transmit their respective public key certificates to the power management apparatus 11 together with the response messages.

Here, a public key certificate is a digital signature of the certificate authority server 35 on identification information (ID) and/or public keys of appliances. This means that it is possible to efficiently carry out verification using a technique such as batch verification or an aggregate signature.

When the response messages from the respective control-compliant appliances sent in reply to the challenge message from the power management apparatus 11 have been gathered and the response messages are collectively verified, in many cases all of the response messages will be correct and the verification result will be "successful". In such case, since the power management apparatus 11 has confirmed the validity of all of the control-compliant appliances A to H, processing may be carried out as normal.

However, in some cases "verification failed" is outputted during a collective verification process carried out on n appliances. This means that at least one abnormal appliance is present among the n control-compliant appliances. Accordingly, it is important for the power management apparatus 11 to specify the control-compliant appliances that are abnormal and carry out separate processing for such abnormal appliances, in addition to carrying out a new collective verification process on the appliances that are normal.

Appliances that are abnormal may be specified by repeatedly dividing the group of control-compliant appliances that was subjected to collective verification into smaller groups. Two specific methods of doing so are described below with reference to FIGS. 43 and 44.

A first strategy is a method that specifies a minimum of one appliance that is abnormal, with the number of iterations (computational load) necessary to do so being given as $O(\log 2n)$.

A second strategy is a method for specifying all of the abnormal appliances, with the number of iterations necessary to do so being given as $O(n)$.

Methods based on the respective strategies will now be described in detail.

Figure 43:
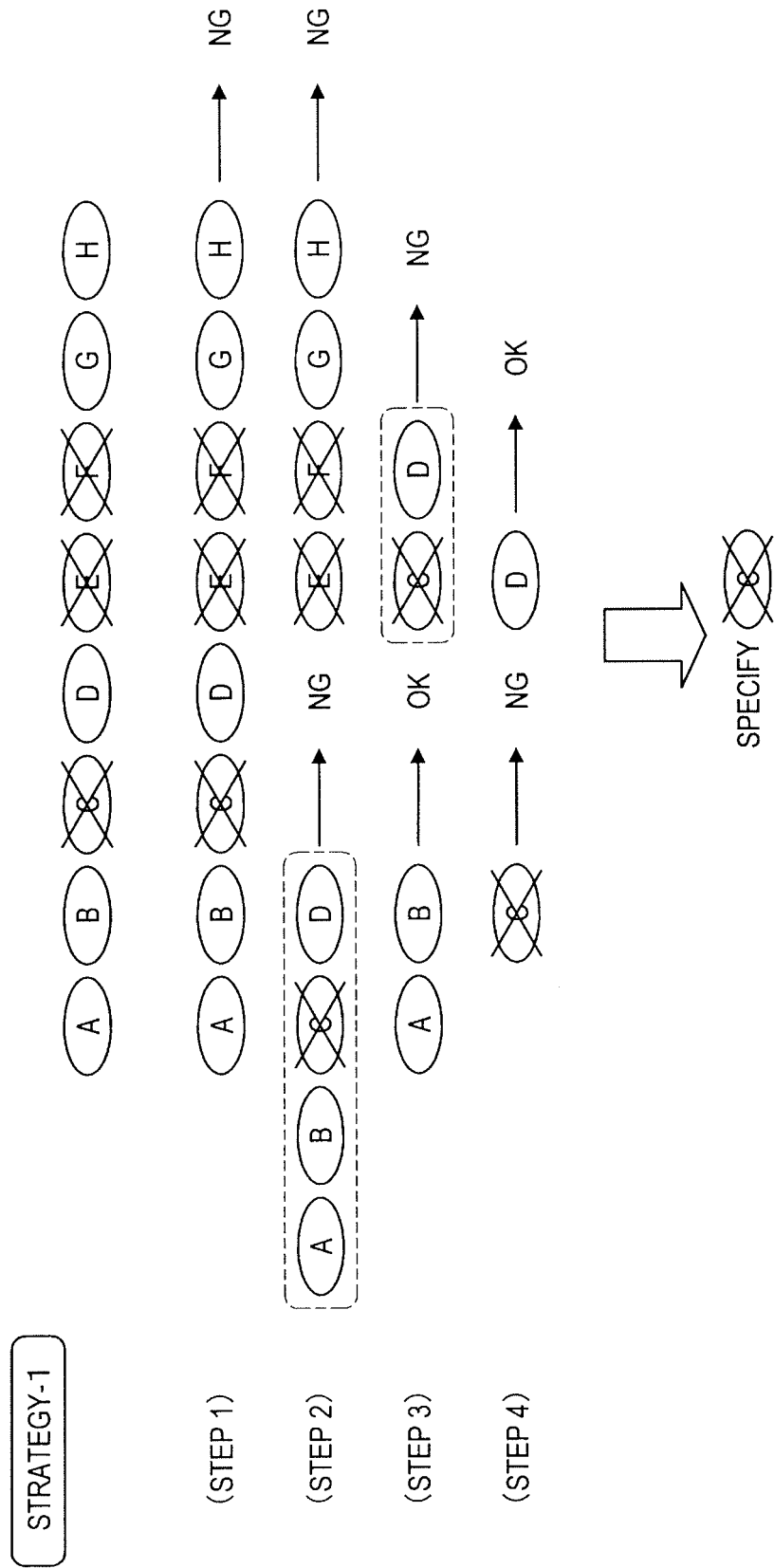
FIG. 43 is a diagram useful in explaining a modification to the method of registering a control-compliant appliance.

Strategy 1 is a method that selects one group (for example, a group with the smallest number of component elements) out of the groups for which the collective verification result is "failed" and repeatedly carries out collective verification until only one control-compliant appliance is included in a group. FIG. 43 shows an example of this method. In FIG. 43, three control-compliant appliances C, E, and F out of the control-compliant appliances A to H are abnormal.

As step 1, the power management apparatus 11 transmits a challenge message to all eight of the control-compliant appliances and carries out collective verification on the eight control-compliant appliances. If the verification result is "failed", the power management apparatus 11 proceeds to step 2 where the single group composed of eight control-compliant appliances is divided into two groups.

In the example shown in FIG. 43, the power management apparatus 11 divides the group into a group composed of the control-compliant appliances A to D and a group composed of the control-compliant appliances E to H, and transmits a challenge message to the respective groups. After this, the power management apparatus 11 carries out collective verification on the obtained response messages in group units. In the example shown in FIG. 43, the result of the collective verification is "verification failed" for both groups.

Next, as step 3, the power management apparatus 11 selects the next group to be divided out of the present groups (in FIG. 43, the group of the control-compliant appliances ABCD and the group of the control-compliant appliances EFGH) for which the verification result was "failed" (i.e., out of both groups). In the example shown in FIG. 43, the power management apparatus 11 selects the group composed of the control-compliant appliances ABCD and further divides the group. In the example shown in FIG. 43, the group composed of the control-compliant appliances ABCD is divided into two groups of two appliances in the form of a group composed of the control-compliant appliances AB and a group composed of the control-compliant appliances CD.

The power management apparatus 11 then transmits a challenge message to the two groups of two appliances and carries out collective verification on the received response messages. In the example shown in FIG. 43, since the verification result of the group composed of the control-compliant appliances AB is "succeeded", it is confirmed that the control-compliant appliances A, B are both normal. Meanwhile, since the verification result of the group composed of the control-compliant appliances CD is "failed", it is understood that at least one of the control-compliant appliances C, D is abnormal.

Next, as step 4, the power management apparatus 11 divides the group composed of the control-compliant appliances CD into groups of single appliances and carries out an authentication process on each group. By doing so, the power management apparatus 11 can specify that the control-compliant appliance C is abnormal.

In the example shown in FIG. 43, it is possible to specify one control-compliant appliance that is abnormal out of eight control-compliant appliances in steps on four levels. In general terms, if the number of control-compliant appliances is n, a binary tree with n leaf nodes can be easily envisaged, but by dividing into groups so that the number of component elements is approximately halved, it is possible to complete the processing in $\log_2(n+1)$ steps that is the height of the binary tree. Since the verification process is carried out on a maximum of two groups in one step, the number of iterations of the verification process is given as $O(\log_2 n)$.

Next, strategy 2 will be described.

Figure 44:
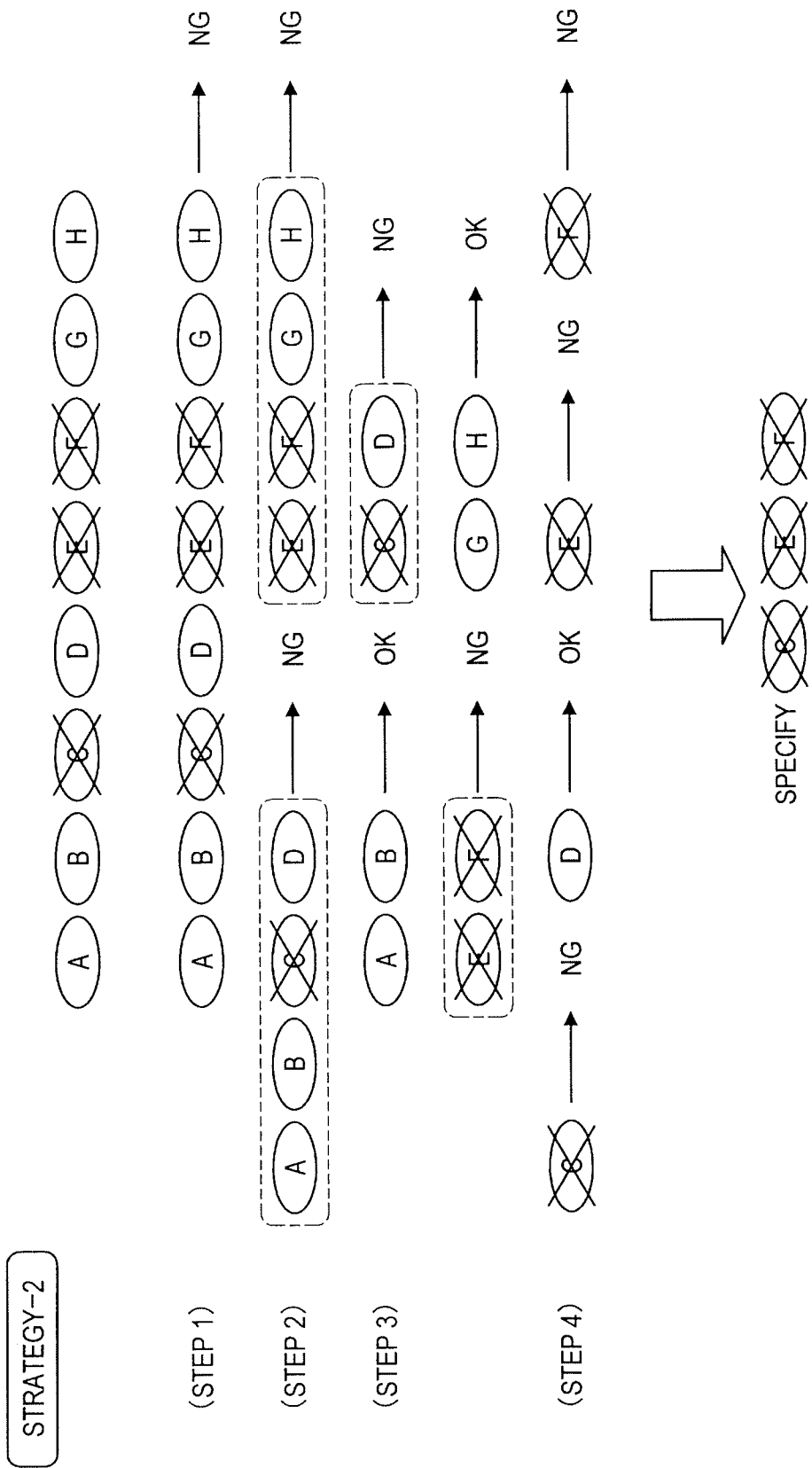
FIG. 44 is a diagram useful in explaining a modification to the method of registering a control-compliant appliance.

Strategy 2 is a method for detecting all abnormal appliances. FIG. 44 shows an example of this method. In FIG. 44, three control-compliant appliances C, E, and F out of the control-compliant appliances A to H are abnormal.

As step 1, the power management apparatus 11 transmits a challenge message to all eight of the control-compliant appliances and carries out collective verification on the eight control-compliant appliances. If the verification result is "failed", the power management apparatus 11 proceeds to step 2 where the single group composed of eight control-compliant appliances is divided into two groups.

In the example shown in FIG. 44, the power management apparatus 11 divides the group into a group composed of the control-compliant appliances A to D and a group composed of the control-compliant appliances E to H, and transmits a challenge message to the respective groups. After this, the power management apparatus 11 carries out collective verification on the obtained response messages in group units. In the example shown in FIG. 44, the result of the collective verification is "verification failed" for both groups.

In strategy 2, as step 3, the authentication process is repeated on all of the groups for which the verification "failed" in the preceding step. In the example shown in FIG. 44, the group composed of the control-compliant appliances ABCD is divided into a group composed of the control-compliant appliances AB and a group composed of the control-compliant appliances CD. The power management apparatus 11 also divides the group composed of the control-compliant appliances EFGH into a group composed of the control-compliant appliances EF and a group composed of the control-compliant appliances GH. After this, the power management apparatus 11 implements a verification process separately on the resulting four groups.

In the example shown in FIG. 44, the verification result is "succeeded" for the group composed of the control-compliant appliances AB and the group composed of the control-compliant appliances GH, and is "failed" for the group composed of the control-compliant appliances CD and the group composed of the control-compliant appliances EF.

Next, in step 4, the power management apparatus 11 divides the group composed of the control-compliant appliances CD for which verification failed into a group composed of the control-compliant appliance C and a group composed of the control-compliant appliance D. In the same way, the power management apparatus 11 divides the group composed of the control-compliant appliances EF for which verification failed into a group composed of the control-compliant appliance E and a group composed of the control-compliant appliance F. The power management apparatus 11 then carries out an authentication process individually on the new four groups.

As a result, as shown in FIG. 44, the authentication ends in "succeeded" for the control-compliant appliance D and in "failed" for the other three control-compliant appliances. By doing so, the power management apparatus 11 is capable of specifying all of the control-compliant appliances C, E, and F that are abnormal.

The number of steps in strategy 2 is four in the same way as in strategy 1, but in an $I^{th}$ step, a verification process is carried out on 2I-1 groups. In this method, in some case, such as when abnormal appliances and normal appliances are alternately aligned, the verification process will be carried out on every appliance, so that the number of verification iterations is 2n. This means that the computational load for strategy 2 is O(n).

However, the power management apparatus 11 is a device that grasps the types of control-compliant appliance and the like are connected to the local power management system 1. This is because such information is necessary to control which appliances are to be supplied with power. That is, when the user introduces an appliance into a local power management system 1 in the home, for example, a process that registers the appliance in the power management apparatus 11 is carried out. Accordingly, as described earlier, the power management apparatus 11 manages a list of the registered appliances.

Here, in the local power management system 1, it is assumed that the eight appliances, control-compliant appliance A to control-compliant appliance H, have been registered in the power management apparatus 11, but as a result of authentication, it has become known that the control-compliant appliance C is abnormal.

In this case, the power management apparatus 11 deletes the control-compliant appliance C from the managed list or marks the control-compliant appliance C as temporarily unusable. By doing so, the power management apparatus 11 is capable of excluding the control-compliant appliance C in advance from authentication during the next iteration of authentication, which enables a corresponding reduction to be made in the load of the authentication process. For example, if the seven control-compliant appliances aside from the control-compliant appliance C are normal, it is possible to confirm this in a single authentication carried out on the seven control-compliant appliances.

Also, if the power management apparatus 11 has been informed, via a user indication, that an appliance has been repaired and is back to normal, or if a "succeeded" result is obtained by the power management apparatus 11 regularly or irregularly attempting to authenticate the appliances that are abnormal, the power management apparatus 11 may correct the managed list managed by the power management apparatus 11 so that appliances that were previously excluded from the authentication are treated as normal.

Authentication of Batteries

In many cases, a plurality of battery cells are provided inside a battery casing. By combining such plurality of cells, it is possible for a battery to produce a variety of outputs.

Figure 45:
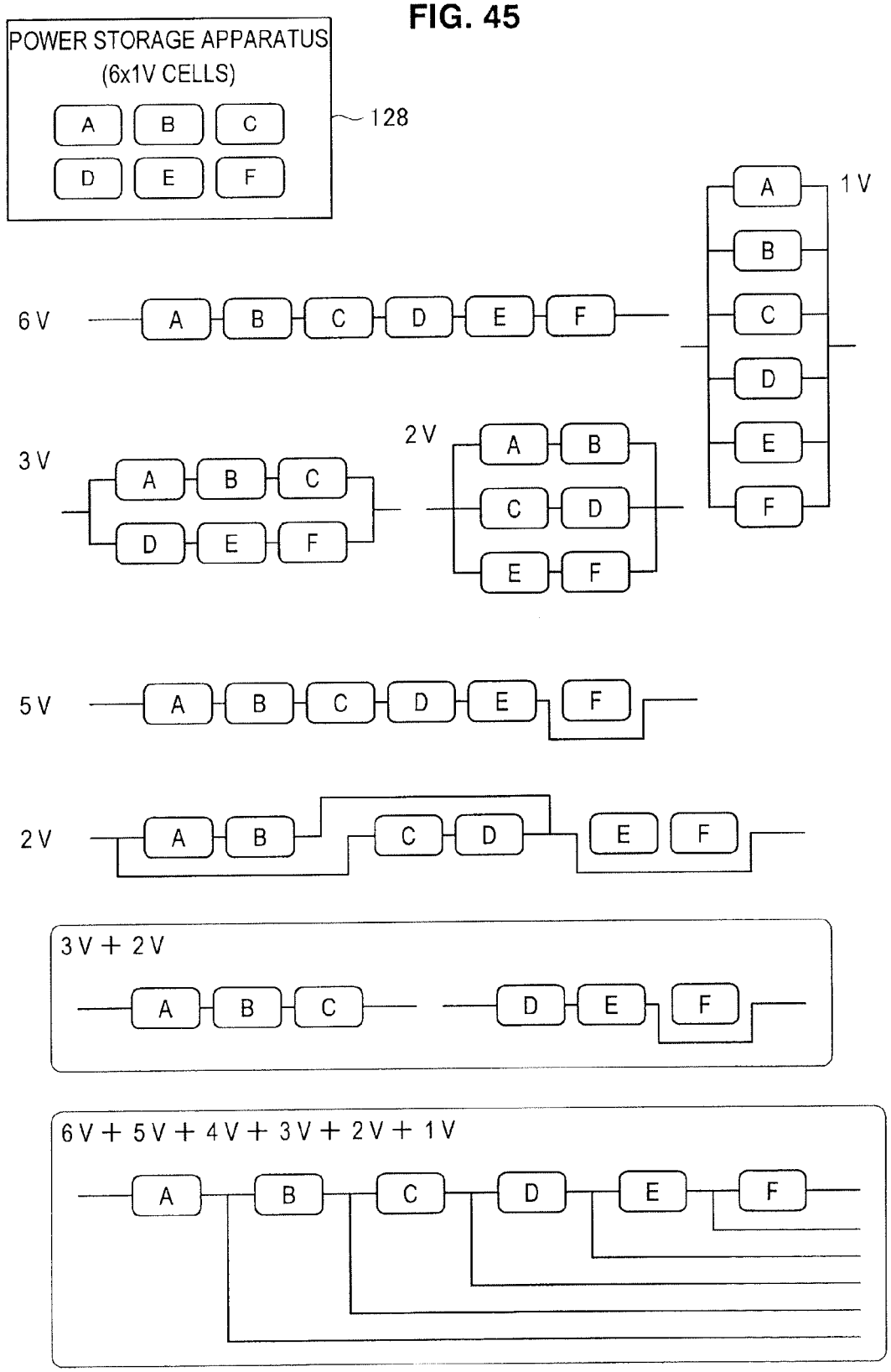
FIG. 45 is a diagram useful in explaining a modification to the method of registering a control-compliant appliance.

For example, FIG. 45 shows an example of a power storage apparatus 128 equipped with six 1V battery cells. As shown in FIG. 45, such cells A to F are capable of being combined so as to output various voltages. If arrangements where some of the cells are not used and/or where the power storage apparatus 128 is provided with not one but a plurality of pairs of output terminals are also considered, it is possible to achieve an even larger number of output variations.

If a battery includes failed cells and/or cells that have been illegally manufactured, there is an increased risk not only of the desired output not being achieved but also of accidents such as fire occurring during charging or the like. For this reason, it is important to carry out authentication on the individual battery cells to confirm that each cell (and moreover the battery itself) is normal.

Figure 46:
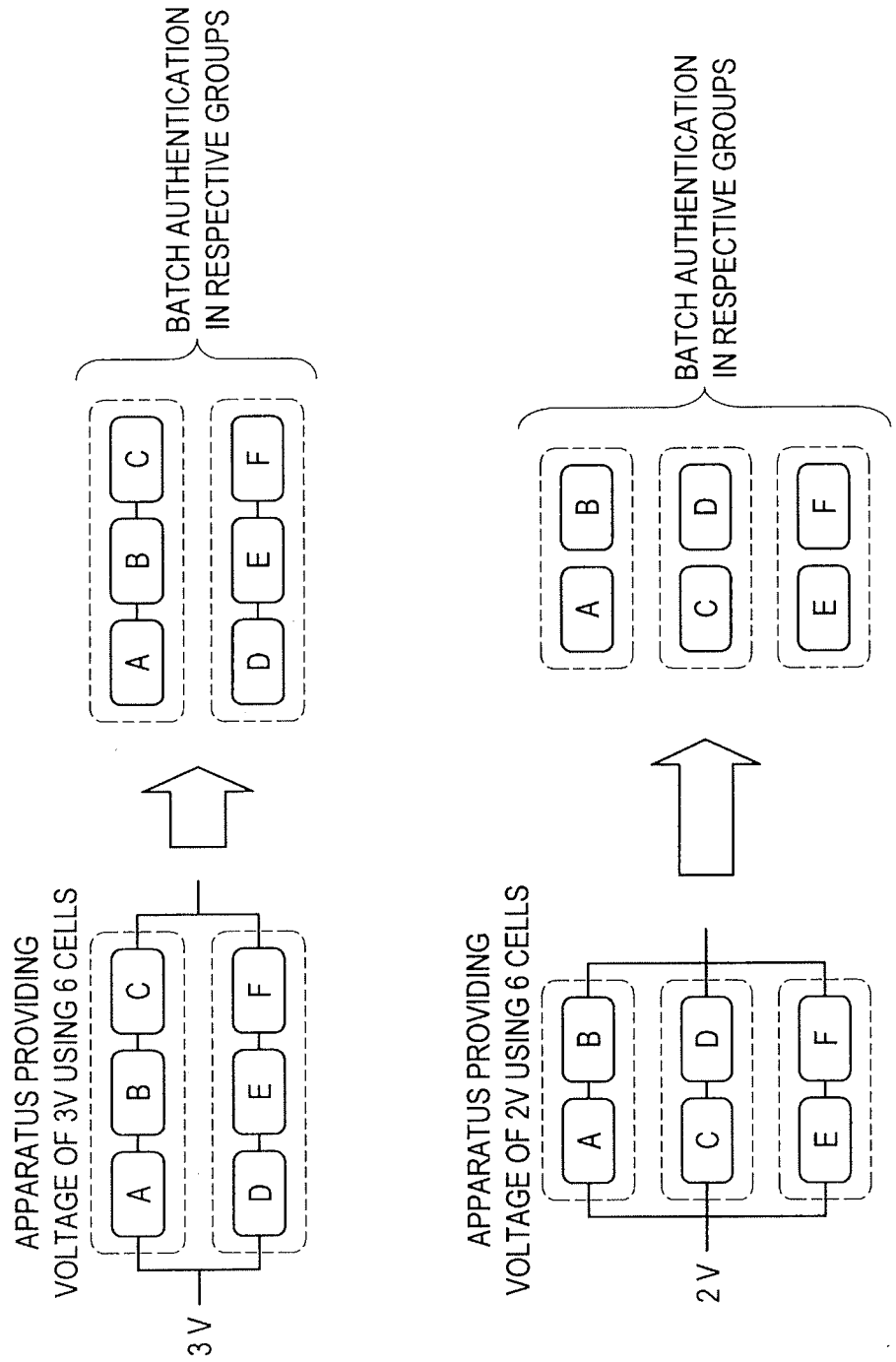
FIG. 46 is a diagram useful in explaining a modification to the method of registering a control-compliant appliance.

Here, it would be conceivably possible for the power management apparatus 11 or a control unit of a battery to authenticate the individual cells. When doing so, as shown in FIG. 46, it would be conceivable to use six cells in combinations of three cells to obtain an output of 3V. Here, by normally repeating a process where the power management apparatus 11 or the control unit of a battery authenticates one cell, it is possible for the control unit of the battery to grasp the states of all of the cells in advance. The power management apparatus 11 is capable of acquiring the cell configuration of the battery from an external server or the like based on a model number or the like registered in the power management apparatus 11.

In a case where a 3V voltage is desired, even with a low ampacity, it is possible to carry out authentication on the three cells A and B and C (or D and E and F) and use such cells as a battery. In such case, three verification processes are carried out.

However, by carrying out collective verification of ABC (or DEF) using a technique such as batch verification or an aggregate signature described earlier, it is possible to grasp whether it is possible to use the cells as a 3V battery via a single verification process, thereby improving the efficiency of the authentication process. In addition, if the verification "succeeded" is given for at least one of the group composed of ABC and the group composed of DEF, it is possible to easily grasp that the cells can be used as a battery.

In addition, when there is a group for which the authentication result is "failed", by successively dividing the group using the methods described earlier, it is possible to specify the abnormal cells.

As shown in FIG. 46, when a voltage of 2V is desired, collective authentication may be carried out on the groups AB, CD, EF where two cells are connected in series.

In this way, by dividing the cells to be authenticated into groups in accordance with the combinations of the battery cells, it is possible to improve the efficiency of the authentication process.

Figure 47:
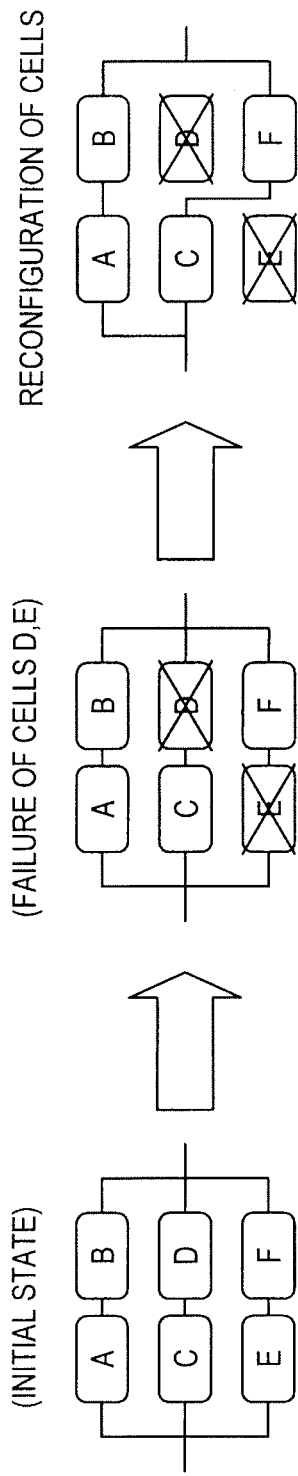
FIG. 47 is a diagram useful in explaining a modification to the method of registering a control-compliant appliance.
Figure 48:
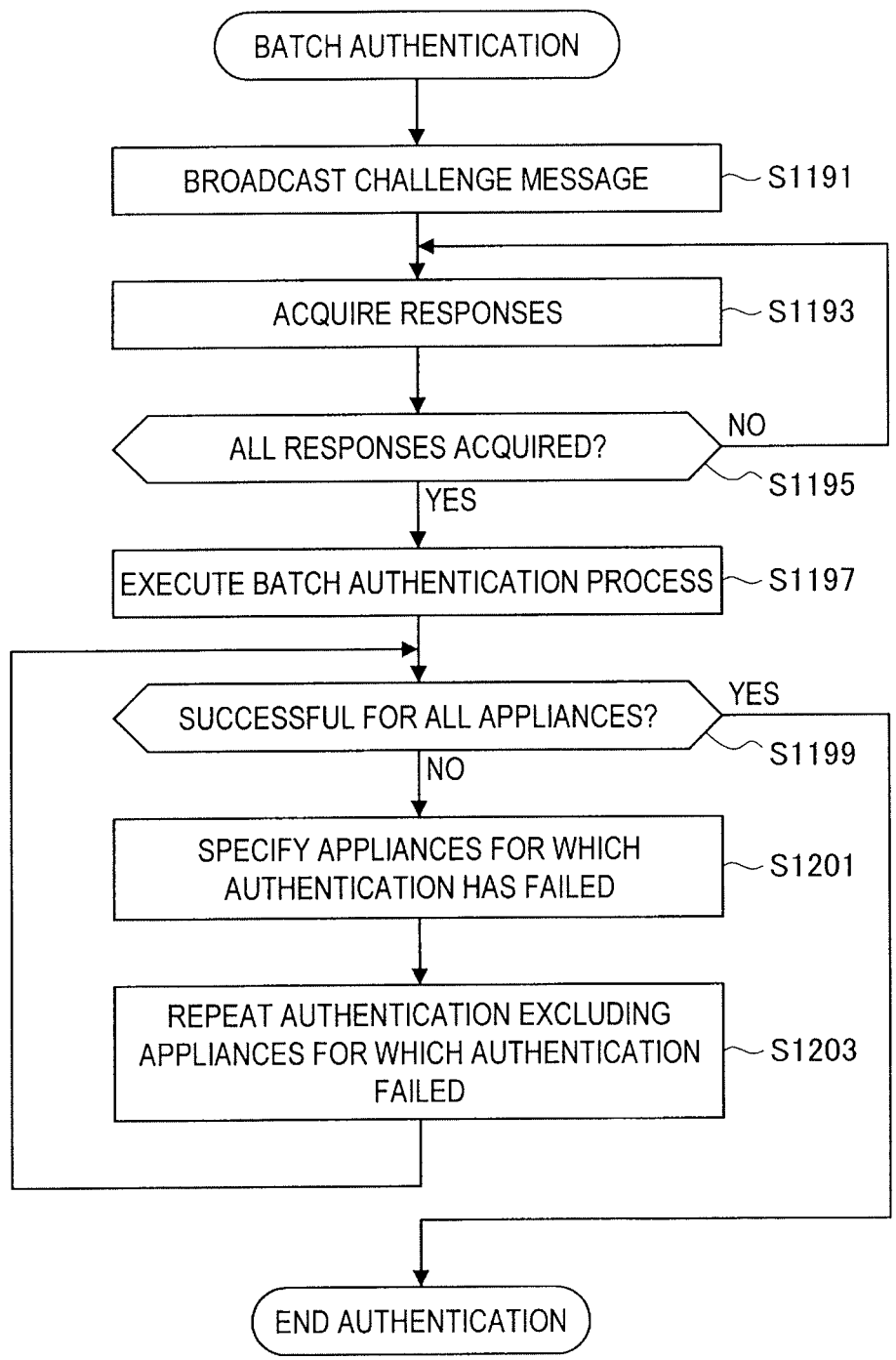
FIG. 48 is a flowchart useful in explaining a modification to the method of registering a control-compliant appliance.

It is assumed here that as shown in (the initial state in) FIG. 47, six battery cells are used to produce a voltage of 2V. Here, it is assumed that all of the six cells are normal in an initial state but an authentication result of "failed" is given when authentication is carried out at a given time.

The power management apparatus 11 and the control unit of the battery are capable of using strategy 2 described earlier to specify all of the cells that are abnormal. As a result, as shown in the center of FIG. 47, it is assumed here that cell D and cell E have been specified as abnormal.

In this case, the control unit of the battery or the power management apparatus 11 is capable of switching the wiring that connects the battery cells to reconfigure the cells as shown in the right on FIG. 47. By doing so, it is possible to use only normal cells to configure a combination that is capable of being used as a battery. If reconfiguring were not carried out, the normal cells C and F would be unavoidably wasted, but by carrying out reconfiguration, it is possible to use resources without waste. This reconfiguring of cells can be achieved by the control unit of the battery or the power management apparatus 11 accurately grasping the states of the respective cells and reconfiguring the connections between the cells in accordance with the authentication result.

The overall flow of batch authentication of control-compliant appliances described above is shown in FIG. 48.

First, the appliance management unit 1121 of the power management apparatus 11 generates a challenge message and broadcasts the challenge message to all of the control-compliant appliances 125 to be authenticated (step S1191). By doing so, the control unit 2001 of each control-compliant appliance 125 generates a response message in reply to the challenge message and sends back the generated response message to the power management apparatus 11.

In the power management apparatus 11, the response messages transmitted from the control-compliant appliances 125 are awaited, and when a response message is transmitted from a control-compliant appliance 125, the power management apparatus 11 acquires the transmitted response message (step S1193).

Here, the appliance management unit 1121 of the power management apparatus 11 judges whether all of the response messages have been acquired (step S1195). If some of the response messages have not been acquired, the appliance management unit 1121 returns to step S1193 and awaits further response messages.

Meanwhile, if response messages have been acquired from all of the control-compliant appliances 125, the appliance management unit 1121 implements a batch authentication process (step S1197). If the batch authentication process succeeds for all of the control-compliant appliances, the appliance management unit 1121 judges that the authentication succeeded and the batch authentication process ends normally.

If the batch authentication process has not succeeded for all of the control-compliant appliances 125, the appliance management unit 1121 specifies the control-compliant appliances for which the authentication failed in accordance with strategy 1 or strategy 2 described earlier (step S1201). After this, the appliance management unit 1121 repeats the authentication process excluding the appliances for which the authentication failed (step S1203), returns to step S1199, and judges whether the batch authentication process succeeded.

By carrying out processing in the flow described above, it is possible in the present example modification to efficiently authenticate the control-compliant appliances.

The above explanation describes a method that carries out authentication efficiently by grouping control-compliant appliances and power storage apparatuses using a batch verification or aggregate signature technique out of public key encryption-based digital signature techniques. However, although public key encryption has a merit compared to common key encryption in that it is possible to use digital signatures and the like generated using individual secret keys, there is also a demerit in that the computational load is normally extremely large.

To overcome such demerit, it is conceivably possible to use both public key encryption and common key encryption. More specifically, the power management apparatus 11 carries out authentication of the control-compliant appliances and the like based on public key encryption. It is assumed that the power management apparatus (or the control unit of the battery or the like) then provides common keys on 1:1 basis (i.e., a different key for each control-compliant appliance) for use by the power management apparatus (or the control unit of the battery or the like) and control-compliant appliances to control-compliant appliances and/or power storage apparatuses for which authentication based on public key encryption was successful.

Such common keys have a valid period such as one day or one hour, with such common keys being used for authentication processes carried out by the power management apparatus 11 on control-compliant appliances during the valid period. Also, after the valid period of a common key has ended, the authentication process is carried out again using public key encryption and a new common key is established between the power management apparatus and the control-compliant appliance.

By using this method, it is possible to carry out a process that uses public key encryption whose computational load is large only once an hour or once a day and to use common key encryption whose processing load is light for authentication that is carried out frequently.

Note that instead of using a common key on a 1:1 basis between the power management apparatus 11 and a certain control-compliant appliance 125, it is also possible to share a single group key between a power management apparatus and a plurality of control-compliant appliances to be authenticated by the power management apparatus and to use the group key as a common key in subsequent authentication processes.

This completes the description of the method of registering control-compliant appliances according to the present example modification.

A process carried out by the power management apparatus for a managed appliance where an abnormality has occurred will now be described in detail while giving specific examples.

(1-16) Operation of Power Management Apparatus for Managed Appliance where Abnormality has Occurred Operation of a power management apparatus for a managed appliance where an abnormality has occurred will now be described in detail with reference to FIGS. 49 to 52 using specific examples. FIGS. 49 to 52 are flowcharts useful in explaining the operation of the power management apparatus for a managed appliance where an abnormality has occurred.

Figure 49:
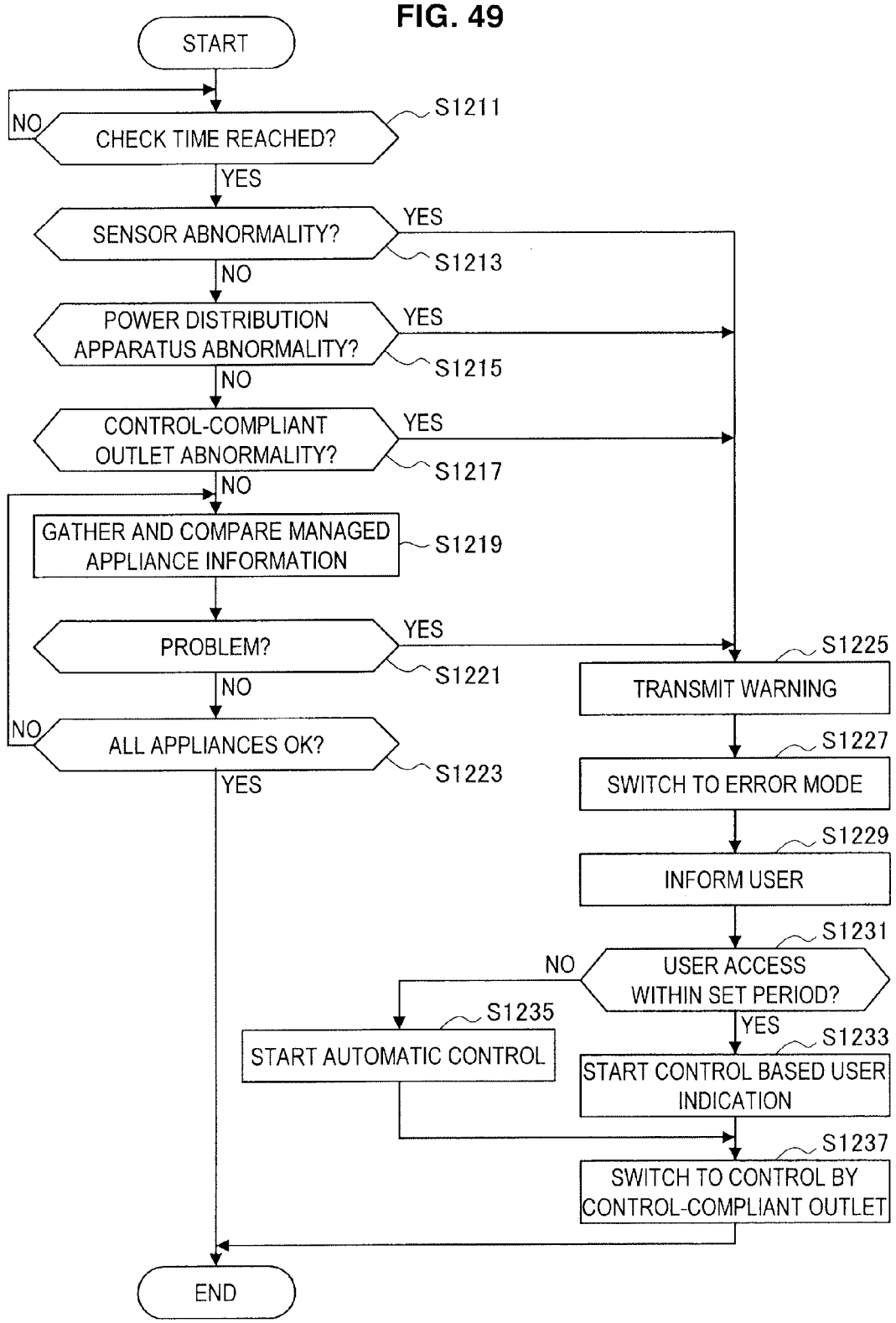
FIG. 49 is a flowchart useful in explaining the operation of a power management apparatus for a managed appliance where an abnormality has occurred.

First, the overall flow of the operation of the power management apparatus for a managed appliance where an abnormality has occurred will be described with reference to FIG. 49.

The appliance management unit 1121 of the power management apparatus 11 refers to time information relating to the present time or information relating to how much time has elapsed since a previous operation confirmation process was carried out and judges whether a time (check time) when the operation confirmation process is to be carried out on managed appliances has been reached (step S1211). If the check time has not been reached, the appliance management unit 1121 returns to step S1211 and awaits the check time to be reached.

Also, when the check time has been reached, the managed appliance information acquiring unit 1507 of the appliance management unit 1121 judges whether sensor information that reports the occurrence of an abnormality has been received from each control-compliant appliance 125 (step S1213). If sensor information that reports the occurrence of an abnormality has been received, the appliance management unit 1121 implements step S1225, described later.

If sensor information that reports the occurrence of an abnormality has not been received, the managed appliance information acquiring unit 1507 judges whether appliance information that reports the occurrence of an abnormality has been received from the power distribution apparatus 121 (step S1215). If appliance information that reports the occurrence of an abnormality has been received, the appliance management unit 1121 implements step S1225, described later.

If appliance information that reports the occurrence of an abnormality in the power distribution apparatus has not been received, the managed appliance information acquiring unit 1507 judges whether appliance information that reports the occurrence of an abnormality has been received from the control-compliant outlet 123 (which hereinafter includes the outlet expansion apparatus 127) (step S1217). If it is judged that an abnormality has occurred, the appliance management unit 1121 implements step S1225, described later.

Note that by carrying out the processing in step S1215 and step S1217, the power management apparatus 11 is capable of judging whether an abnormality has occurred in the non-control-compliant appliance 126 that is not capable of direct communication with the power management apparatus 11.

Next, the managed appliance information acquiring unit 1507 gathers appliance information such as sensor information, battery information, and cell information from the respective control-compliant appliances and the like and transfers the appliance information to the appliance state judging unit 1601 and the power state judging unit 1603 of the information analyzing unit 1123. The appliance state judging unit 1601 and the power state judging unit 1603 compare the appliance information with the history or model examples of the transferred information (step S1219). By doing so, the power management apparatus 11 is able to detect abnormalities that have occurred at a control-compliant appliance or the like. The managed appliance information acquiring unit 1507 and/or the appliance state judging unit 1601 are also capable of detecting that an abnormality has occurred at a control-compliant appliance or the like from the non-reception of information that should have been received.

The appliance management unit 1121 refers to the result of the gathering/comparison process for the appliance information and judges whether a problem has occurred (step S1221). If a problem has occurred, the appliance management unit 1121 implements step S1225, described later.

Also, if it has been judged from the result of the gathering/comparison process for the appliance information that a problem has not occurred, the appliance state judging unit 1601 judges whether no problems have occurred for any of the appliances (step S1223). If, as a result of the judgment, verification has not been completed for some of the apparatuses, the appliance management unit 1121 and the information analyzing unit 1123 return to step S1219 and continue the verification process. When verification has been completed for all of the appliances, the appliance management unit 1121 ends the verification process for the operation of the managed appliances.

Here, when an abnormality has been detected by the verification process described above, the information analyzing unit 1123 displays a warning on the display unit 116 (step S1225). The power management apparatus 11 switches to an operation mode (error mode) used when an abnormality has been detected (step S1227).

After this, the appliance management unit 1121 transmits a warning message to a registered telephone number or registered mail address of the user to inform the user that an abnormality has occurred (step S1229). After this, the appliance management unit 1121 judges whether there has been a user access to the power management apparatus 11 within a set period (step S1231). If there has been a user access within the set period, the control unit 115 of the power management apparatus 11 starts operation control of the control-compliant appliance based on a user indication (step S1233). Meanwhile, if there has not been a user access within a set period, the control unit 115 of the power management apparatus 11 starts automatic control (step S1235). After this, the control unit 115 of the power management apparatus 11 switches the operation mode to control by the control-compliant outlet (step S1237) and ends the processing when an abnormal operation has been detected.

The specific processing implemented depending on the type of apparatus for which an abnormality has occurred will now be described in brief.

When Abnormality has Occurred at Power Management Apparatus

Figure 50:
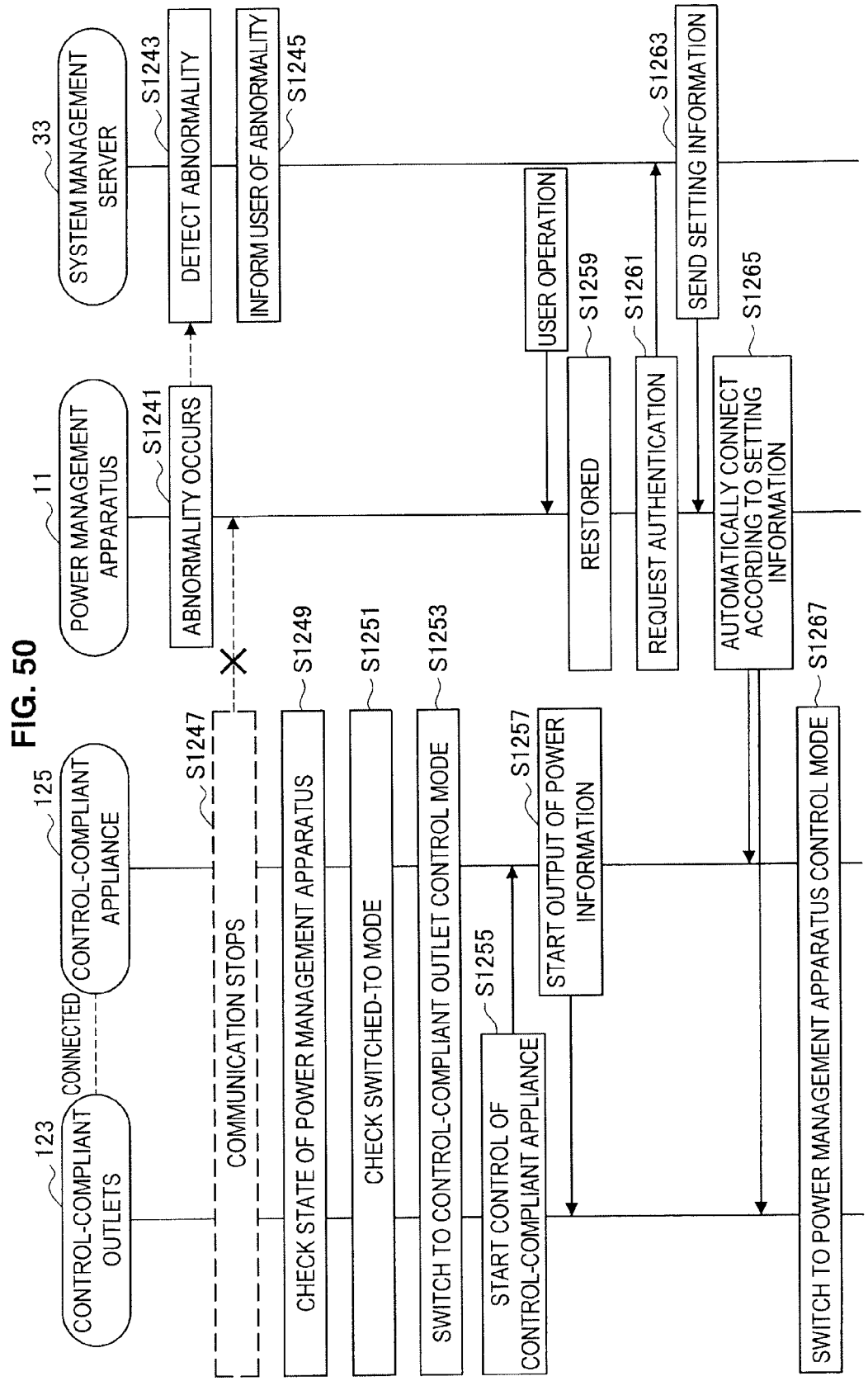
FIG. 50 is a flowchart useful in explaining the operation of a power management apparatus for a managed appliance where an abnormality has occurred.

First, the operation when an abnormality has occurred at the power management apparatus 11 itself will be described in brief with reference to FIG. 50.

Note that it is assumed that before the following explanation begins, the user has already set what kind of control is to be carried out when an abnormality occurs at the power management apparatus 11 (as examples, control by a control-compliant outlet or control that supplies power in a steady state). It is also assumed that the power management apparatus 11 regularly backs up various information, such as history information, identification information (ID) of managed appliances, and setting conditions, in the system management server 33 provided outside the local power management system 1.

When some kind of abnormality has occurred at the power management apparatus 11 itself (step S1241) and the power management apparatus 11 itself stops working, since the regular communication with the power management apparatus 11 will stop, it is possible for the system management server 33 to detect that an abnormality has occurred at the power management apparatus 11 (step S1243).

After this, the system management server 33 refers to the emergency contact or the like that has been registered and informs the user that an abnormality has occurred (step S1245).

Since regular communication with the power management apparatus 11 is disabled (step S1247), the control-compliant outlet 123 and the control-compliant appliance 125 also detect the possibility that an abnormality has occurred at the power management apparatus 11. After this, the control-compliant outlet 123 and the control-compliant appliance 125 check the state of the power management apparatus 11 (step S1249), and on grasping that an abnormality has occurred at the power management apparatus 11, the control-compliant outlet 123 and the control-compliant appliance 125 check which mode is to be switched to (step S1251). After this, the control-compliant outlet 123 and the control-compliant appliance 125 switch to control-compliant outlet control mode (step S1253).

More specifically, the control-compliant outlet 123 starts controlling the control-compliant appliance 125 and the non-control-compliant appliance 126 (step S1255) and the control-compliant appliance 125 starts outputting power information to the control-compliant outlet 123 (step S1257). If an abnormality is detected in the power information acquired from the control-compliant appliance 125, the control-compliant outlet 123 is also capable of implementing control, such as stopping the supplying of power.

At this point, it is assumed that the power management apparatus 11 has been restored due to the user who has been contacted from the system management server 33 reactivating the power management apparatus 11 or carrying out some kind of operation manually on the power management apparatus 11 (step S1259).

At this point, the appliance management unit 1121 of the restored power management apparatus 11 requests the system management server 33 to implement the authentication process (step S1261). If the authentication of the power management apparatus 11 succeeds, the system management server 33 acquires setting information that has been backed up and sends the setting information to the power management apparatus 11 (step S1263).

The power management apparatus 11 that has received the setting information automatically connects to the control-compliant outlet 123 and the control-compliant appliance 125 that are managed apparatuses in accordance with the received setting information (step S1265), and informs such appliances that the power management apparatus 11 has been restored.

After this, the control-compliant outlet 123 and the control-compliant appliance 125 switch to power management apparatus control mode (step S1267) and thereafter normal control is carried out by the power management apparatus 11.

When Abnormality has Occurred at Control-Compliant Outlet

Figure 51:
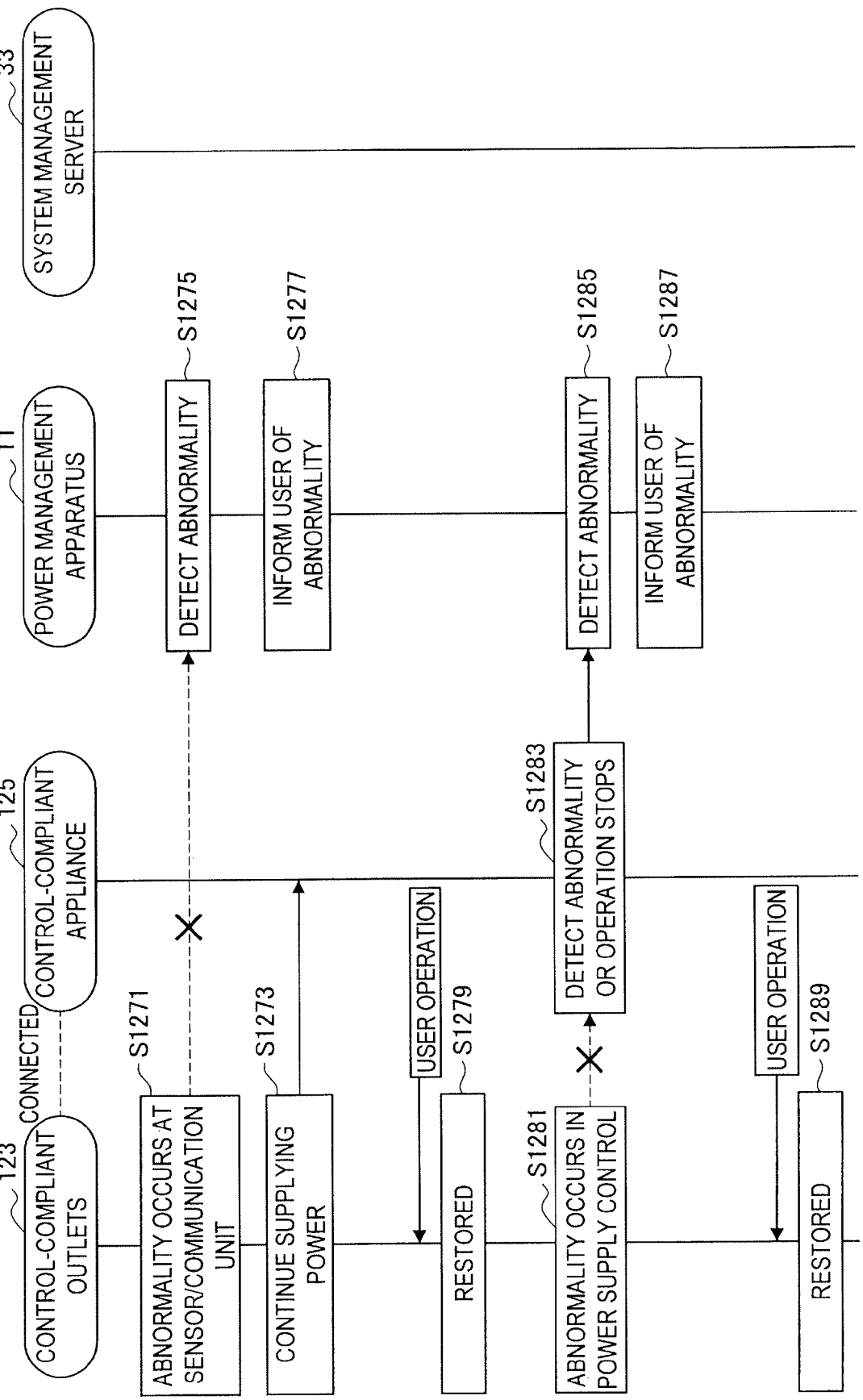
FIG. 51 is a flowchart useful in explaining the operation of a power management apparatus for a managed appliance where an abnormality has occurred.

Next, the operation when an abnormality has occurred at a control-compliant outlet 123 will be described in brief with reference to FIG. 51.

First, it is assumed that an abnormality has occurred at least one of a sensor or a communication unit of the control-compliant outlet 123 (step S1271). In this case, since the supplying of power from the control-compliant outlet 123 to a connected control-compliant appliance 125 is maintained (step S1273), it is difficult for the power management apparatus 11 to directly detect the abnormality. However, by determining that appliance information from the control-compliant outlet 123 that should be regularly received has not been received or the like, the power management apparatus 11 is able to detect that an abnormality has occurred at the control-compliant outlet 123 (step S1275).

The information analyzing unit 1123 of the power management apparatus 11 that detected the abnormality informs the user that an abnormality has occurred at the control-compliant outlet 123 (step S1277). More specifically, the power management apparatus 11 informs the user that an abnormality has occurred by displaying that an abnormality has occurred on the display unit 116, emitting a warning sound, or transmitting a message to a telephone number or e-mail address registered by the user.

By carrying out an arbitrary operation manually on the control-compliant outlet 123 for which a problem has occurred, the user that has been informed restores the control-compliant outlet 123 to a functioning state (step S1279).

Here, it is assumed that an abnormality has occurred for the power supply control of the control-compliant outlet 123 (step S1281). In this case, the control-compliant appliance 125 is capable of detecting that an abnormality has occurred at the control-compliant outlet 123 and in some cases, it is also possible for the control-compliant appliance 125 to stop receiving the supplying of power and therefore stop operating (step S1283). As a result, due to the control-compliant appliance 125 informing the power management apparatus 11 that an abnormality has occurred at the control-compliant outlet 123 or due to regular communication stopping because of the operation of the control-compliant appliance 125 stopping, the power management apparatus 11 detects that an abnormality has occurred (step S1285).

The information analyzing unit 1123 of the power management apparatus 11 that has detected the abnormality informs the user that an abnormality has occurred at the control-compliant outlet 123 (step S1287). More specifically, the power management apparatus 11 informs the user that an abnormality has occurred by displaying that an abnormality has occurred on the display unit 116, emitting a warning sound, or transmitting a message to a telephone number or e-mail address registered by the user.

By carrying out an operation manually on the control-compliant outlet 123 for which a problem has occurred, the user that has been informed restores the control-compliant outlet 123 to a functioning state (step S1289).

When Abnormality has Occurred at Power Distribution Apparatus

Figure 52:
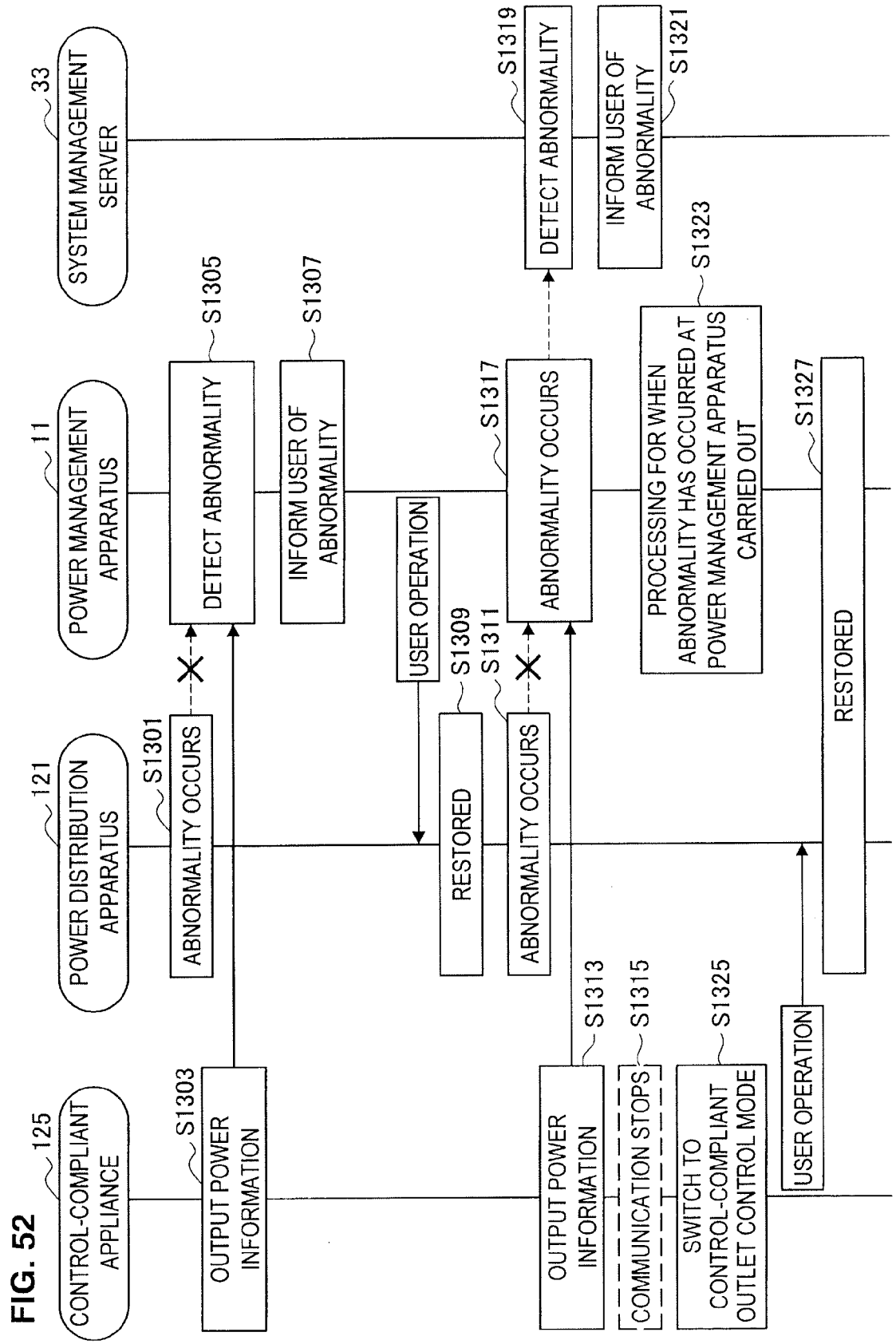
FIG. 52 is a flowchart useful in explaining the operation of a power management apparatus for a managed appliance where an abnormality has occurred.

Next, the operation when an abnormality has occurred at the power distribution apparatus 121 will be described in brief with reference to FIG. 52.

When an abnormality has occurred at the power distribution apparatus 121 (step S1301), the power distribution apparatus 121 informs the power management apparatus 11 that an abnormality has occurred and/or regular communication from the power distribution apparatus 121 stops. Also, when an abnormality has occurred at the power distribution apparatus 121, there is the possibility of a problem occurring for the supplying of power to a control-compliant appliance 125. For this reason, an abnormality may also occur in the power information (step S1303) transmitted regularly by the control-compliant appliance 125. From such information, the information analyzing unit 1123 of the power management apparatus 11 can detect that an abnormality has occurred at the power distribution apparatus 121 (step S1305).

The information analyzing unit 1123 of the power management apparatus 11 that has detected the abnormality informs the user that an abnormality has occurred at the power distribution apparatus 121 (step S1307). More specifically, the power management apparatus 11 informs the user that an abnormality has occurred by displaying that an abnormality has occurred on the display unit 116, emitting a warning sound, or transmitting a message to a telephone number or e-mail address registered by the user.

By carrying out an operation manually on the power distribution apparatus 121 for which a problem has occurred, the user that has been informed restores the power distribution apparatus 121 to a functioning state (step S1309).

An abnormality occurs again at the power distribution apparatus 121 (step S1311), and the power distribution apparatus 121 informs the power management apparatus 11 that an abnormality has occurred and/or regular communication from the power distribution apparatus 121 stops. Also, when an abnormality has occurred at the power distribution apparatus 121, there is the possibility of a problem occurring for the supplying of power to the control-compliant appliance 125. For this reason, an abnormality may also occur for the power information (step S1313) transmitted regularly by the control-compliant appliance 125. Due to such information, it is assumed that an abnormality also occurs in the power management apparatus 11 itself (step S1317).

Here, the break in regular communication with the power management apparatus 11 makes it possible for the system management server 33 to detect that an abnormality has occurred at the power management apparatus 11 (step S1319).

After this, the system management server 33 refers to the emergency contact or the like that has been registered and informs the user that an abnormality has occurred (step S1321).

In this case, at the power management apparatus 11, a process described earlier that is carried out when an abnormality has occurred in the power management apparatus is implemented (step S1323). In response to the abnormality occurring at the power management apparatus 11, the control-compliant appliance 125 switches to control-compliant outlet control mode (step S1325).

Here, by carrying out an operation manually on the power distribution apparatus 121 for which a problem has occurred, the user that has been informed restores the power distribution apparatus 121 to a functioning state (step S1327). Also, due to the operation carried out when an abnormality occurred at the power management apparatus, the power management apparatus 11 is also restored to a functioning state (step S1327).

This completes the description of the operation of the power management apparatus 11 when an abnormality has occurred for a managed apparatus such as a control-compliant outlet 123 or a control-compliant appliance 125.

Figure 53:
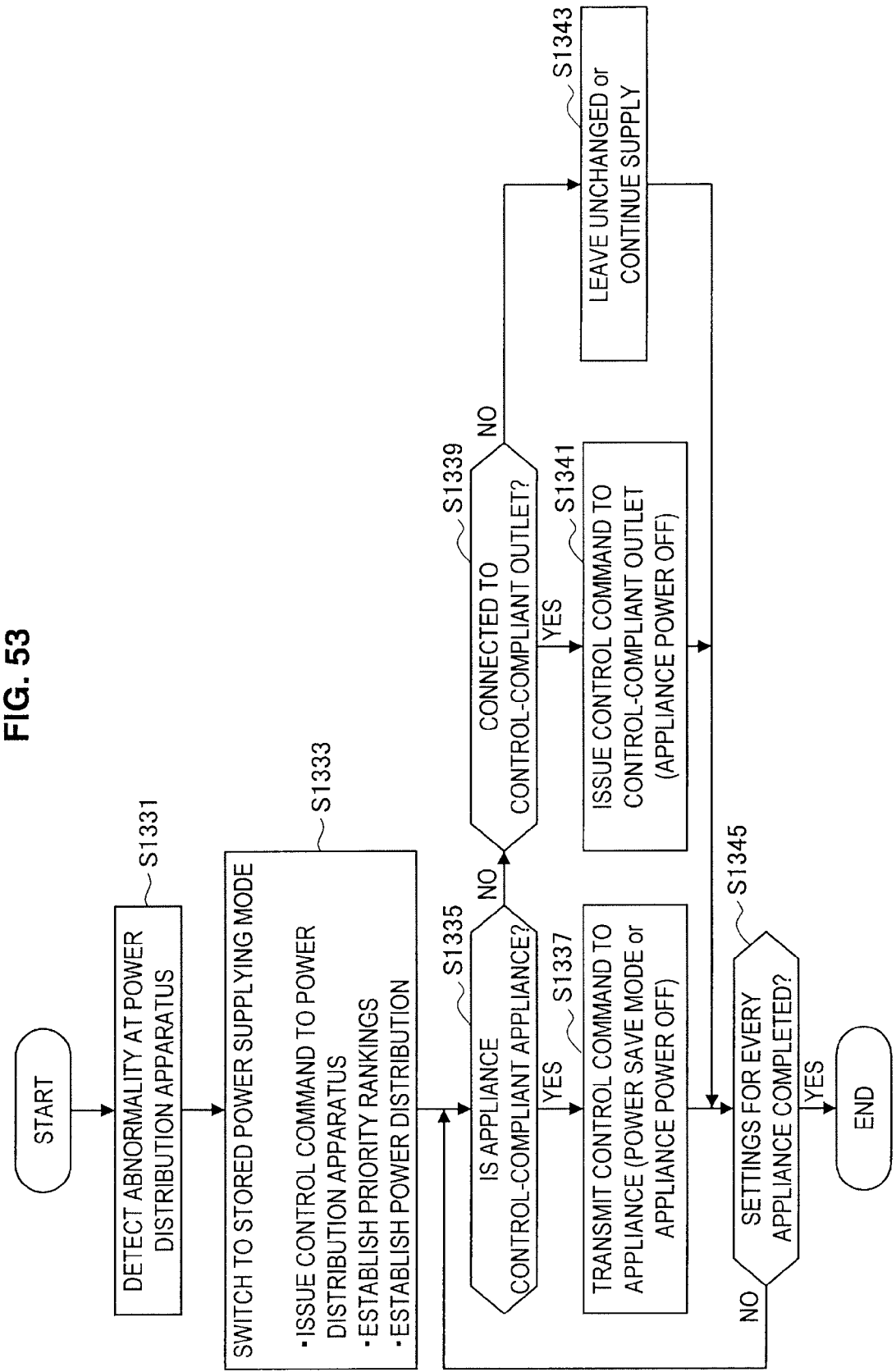
FIG. 53 is a flowchart useful in explaining the operation of a power management apparatus when an abnormality has occurred in the power state.
Figure 54:
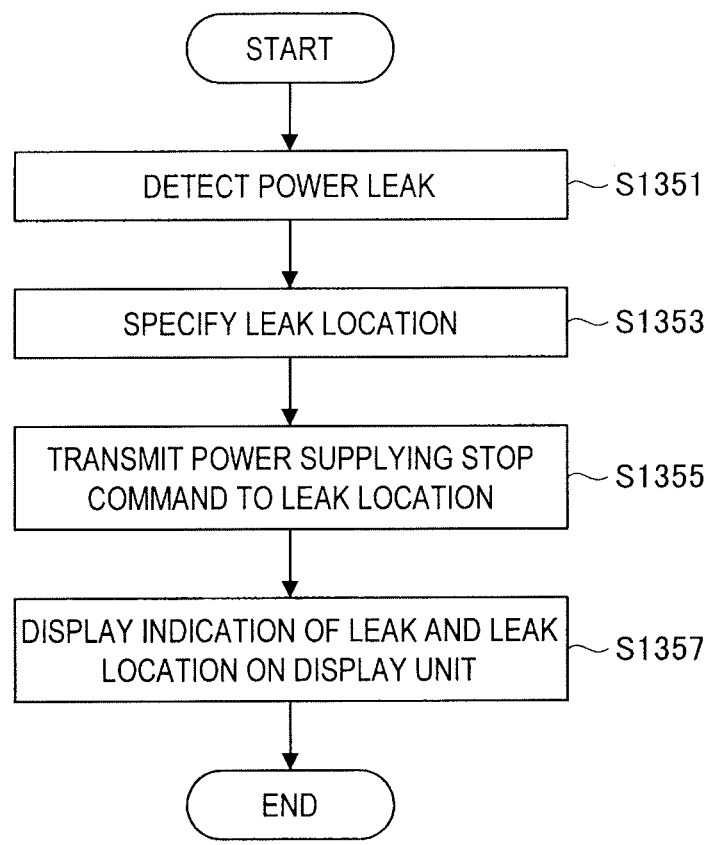
FIG. 54 is a flowchart useful in explaining the operation of a power management apparatus when an abnormality has occurred in the power state.

(1-17) Operation of Power Management Apparatus when Abnormality has Occurred in Power State Next, the operation of the power management apparatus 11 when an abnormality, such as a power cut or a leak, has occurred in the power state in the local power management system 1 will be described with reference to FIGS. 53 and 54. FIGS. 53 and 54 are flowcharts useful for explaining the operation of the power management apparatus when an abnormality has occurred in the power state.

Operation of Power Management Apparatus During Power Cut

First, the operation of the power management apparatus when a power cut has occurred will be described in brief with reference to FIG. 53.

When an abnormality has occurred for external power and a power cut occurs, the supplying of external power to the power distribution apparatus 121 stops. As a result, due to the power distribution apparatus 121 informing the power management apparatus 11 that a power cut has occurred or appliance information including an abnormality being transmitted from the power distribution apparatus 121, the power management apparatus 11 can detect the abnormality at the power distribution apparatus 121 (step S1331).

On detecting that a power cut has occurred, the power state judging unit 1603 of the information analyzing unit 1123 switches the current mode to a power supplying mode (stored power supplying mode) that uses the power generating apparatuses 129, 130 and the power storage apparatus 128 (step S1333). More specifically, the control unit 115 of the power management apparatus 11 transmits a control command to the power distribution apparatus 121 for switching from external power to power that is capable of being supplied within the system 1. The appliance management unit 1121 starts processing that determines priorities for supplying power and/or determines amounts of power to be distributed based on information set in advance. The information analyzing unit 1123 also informs the user that a power cut has occurred via the display unit 116 or the like.

The appliance management unit 1121 first judges whether an appliance to be supplied power is a control-compliant appliance 125 (step S1335). If the appliance to be supplied power is a control-compliant appliance 125, the appliance management unit 1121 transmits a control command to the appliance via the control unit 115 (step S1337). More specifically, the control unit 115 transmits a control command that requests power save mode or power off to the control-compliant appliance 125 in question.

Meanwhile, if the appliance to be supplied power is not a control-compliant appliance 125 (that is, a non-control-compliant appliance 126), the appliance management unit 1121 judges whether the appliance to be supplied power is connected to a control-compliant outlet 123 (including the outlet expansion apparatus 127) (step S1339). If the appliance to be supplied power is connected to a control-compliant outlet 123, the appliance management unit 1121 transmits a control command to the control-compliant outlet 123 via the control unit 115 (step S1341). More specifically, the control unit 115 transmits a control command that requests power off for the appliance to be supplied power (that is, the stopping of the supplying of power to the non-control-compliant appliance 126) to the control-compliant outlet 123.

If the appliance to be supplied power is not connected to a control-compliant outlet 123, since the power management apparatus 11 is not able to control the supplying of power to the appliance to be supplied power, the power management apparatus 11 leaves the appliance as it is or continues the present supplying of power (step S1343).

When this determination has ended, the appliance management unit 1121 judges whether the setting of every appliance has been completed (step S1345). If the settings of one or more appliances have not been completed, the power management apparatus 11 returns to step S1335 and continues the processing. Meanwhile, if the settings of all of the appliances have been completed, the power management apparatus 11 ends the processing during a power cut.

Operation of Power Management Apparatus During a Leak

Next, the operation of the power management apparatus when a power leak has occurred will be described in brief with reference to FIG. 54.

When a power leak occurs, it is expected that the tendency of power usage will change compared to before the leak occurred. Accordingly, by comparing a history of past power usage with the present power usage, the power state judging unit 1603 of the information analyzing unit 1123 in the power management apparatus 11 is capable of detecting that a power leak has occurred (step S1351). Also, for appliances present in the system 1, the power state judging unit 1603 calculates a power usage theoretical value based on a theoretical value of the power usage of control-compliant appliances 125 and estimated power usage of the non-control-compliant appliances 126, and by comparing the actual power usage and the power usage theoretical value, it is possible to detect a power leak. Note that the estimated power usage of the non-control-compliant appliance 126 can be estimated from past usage.

Also, the occurrence of a power leak may be detected not only by the power management apparatus 11 but also by the analysis server 34 such as a security check server that is present outside the local power management system 1. This means that in some cases when a power leak has occurred, the analysis server 34 informs the power management apparatus 11 of the leak.

When the occurrence of a leak has been detected, the power management apparatus 11 specifies the leak location using an arbitrary method (step S1353) and the control unit 115 transmits a power supplying stop command to the leak location (step S1355). The information analyzing unit 1123 also displays information relating to the occurrence of the leak and the leak location on the display unit 116 (step S1357).

By carrying out such processing, even when an abnormality has occurred for the power state such as a power cut or a power leak, the power management apparatus 11 is capable of maintaining various aspects of security inside the local power management system 1.

Figure 55:
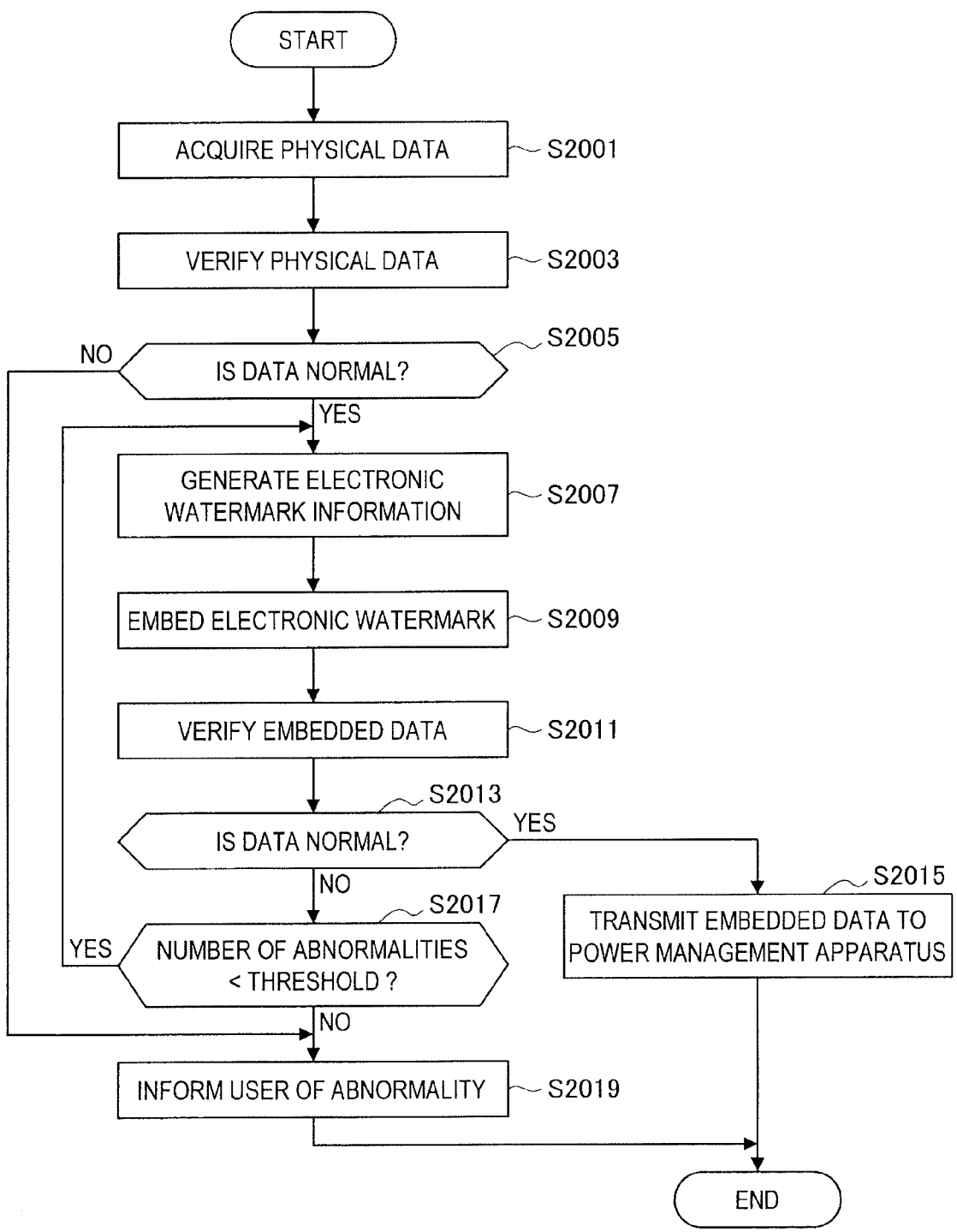
FIG. 55 is a flowchart useful in explaining a method of embedding electronic watermark information.
Figure 56:
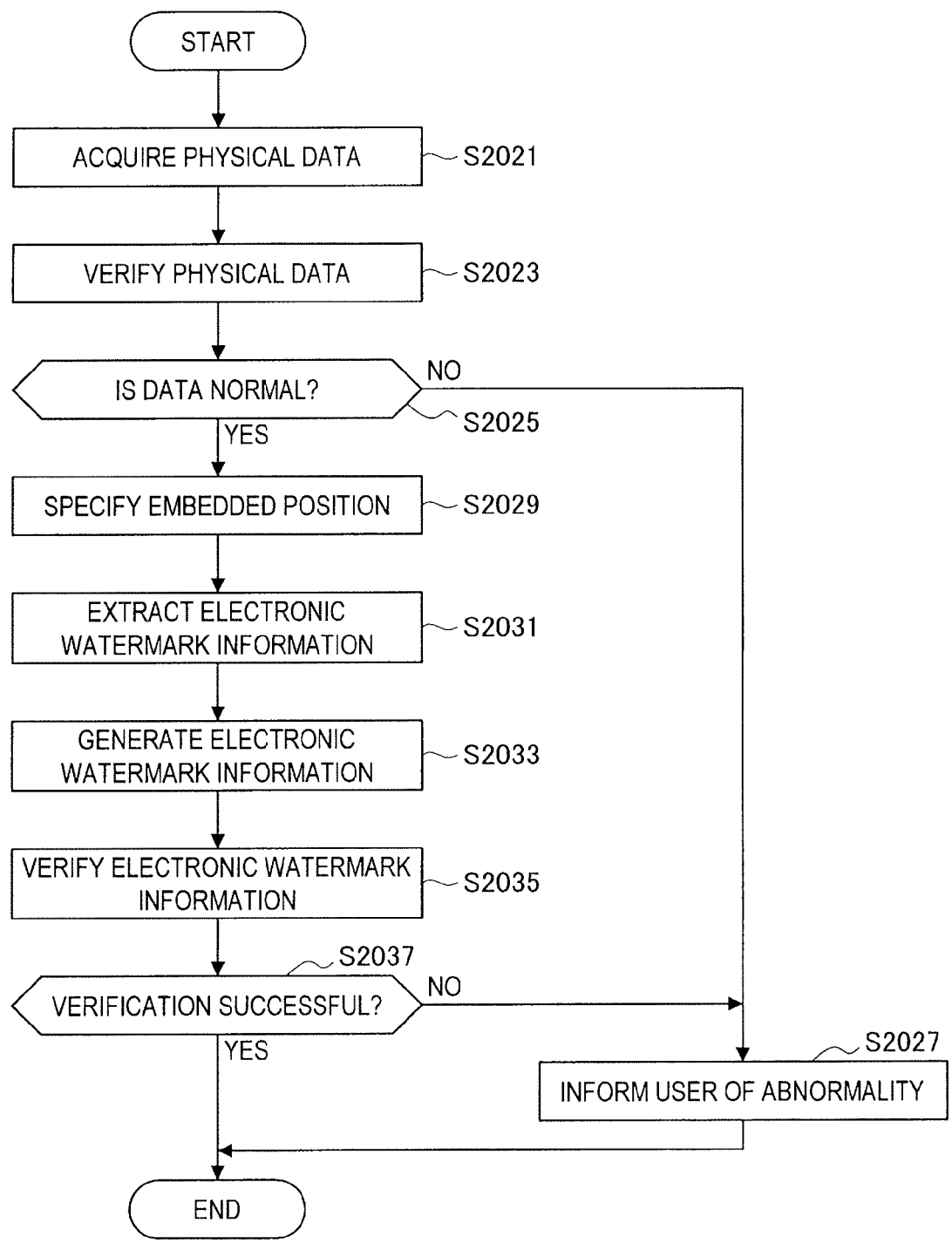
FIG. 56 is a flowchart useful in explaining a method of verifying electronic watermark information.
Figure 57:
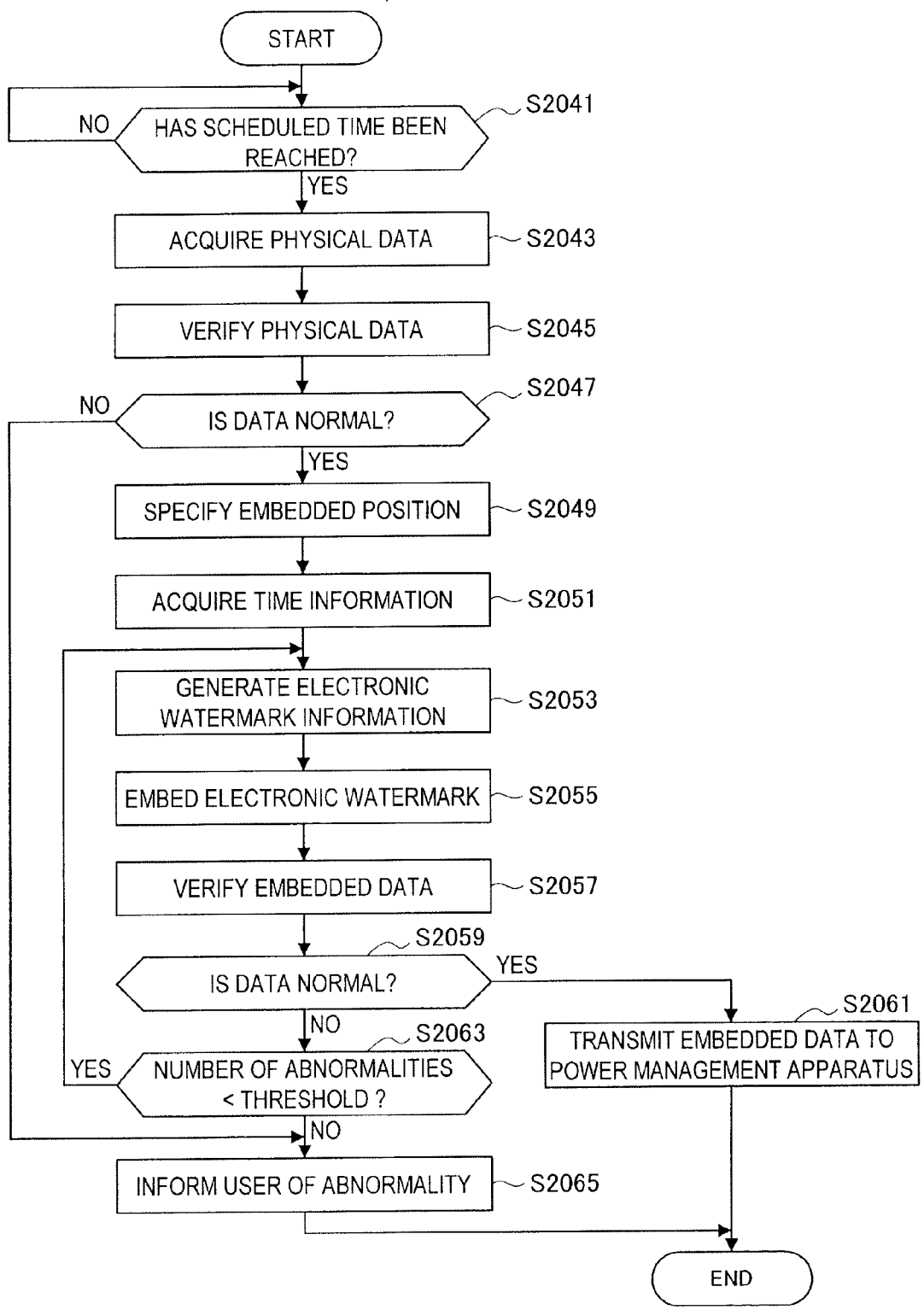
FIG. 57 is a flowchart useful in explaining a method of embedding electronic watermark information.
Figure 58:
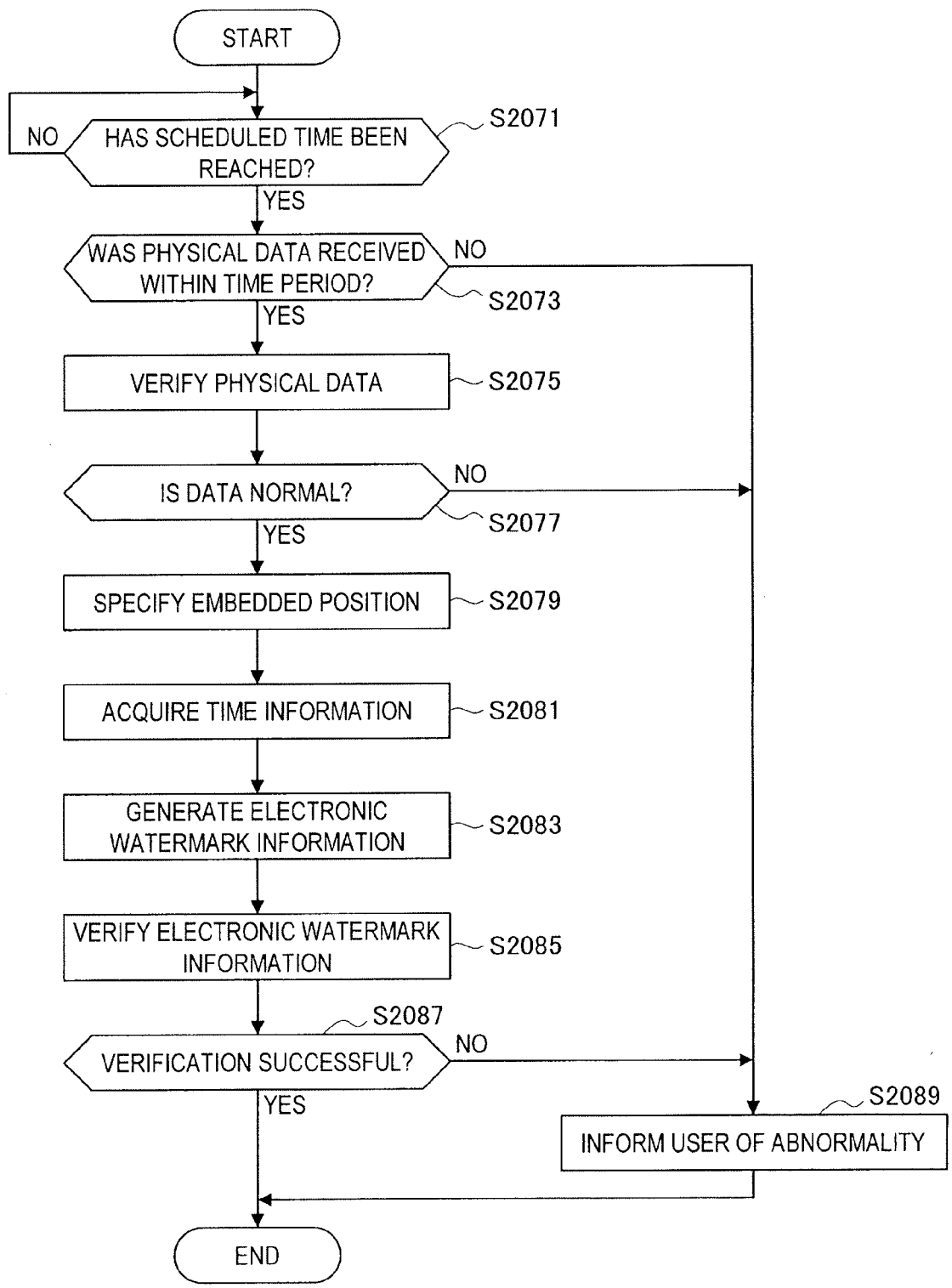
FIG. 58 is a flowchart useful in explaining a method of verifying electronic watermark information.

(1-18) Flow of Method of Embedding and Method of Verifying Electronic Watermark Information Next, the flow of a method of embedding and method of verifying electronic watermark information carried out in the local power management system 1 according to the present embodiment will be described with reference to FIGS. 55 to 58. FIGS. 55 and 57 are flowcharts useful in explaining the method of embedding the electronic watermark information according to the present embodiment. FIGS. 56 and 58 are flowcharts useful in explaining the method of method verifying the electronic watermark information according to the present embodiment.

Method of Embedding and Method of Verifying Electronic Watermark Information that Uses Shared Information First, the flow of the method of embedding and method of verifying electronic watermark information that uses shared information will be described with reference to FIGS. 55 and 56. Note that a case where the physical data itself is used as the appliance characterizing information is described below.

Flow of Method of Embedding

First, a method of embedding implemented by the tampering detection information generating unit 2031 of the control-compliant appliance 125 will be described with reference to FIG. 55.

The appliance characterizing information generating unit 2033 of the tampering detection information generating unit 2031 in the control-compliant appliance 125 first acquires physical data from the sensor control unit 2023 and the battery control unit 2027 (step S2001). After this, the appliance characterizing information generating unit 2033 carries out verification on the acquired physical data (step S2003). Next, the appliance characterizing information generating unit 2033 judges whether the acquired physical data is normal (step S2005).

If the verification finds that a value of the physical data exceeds a range of values that can be taken by the physical data or shows what is clearly abnormal behavior, the appliance characterizing information generating unit 2033 reports an abnormality (step S2019).

After it has been confirmed via the verification that the physical data is normal, the electronic watermark generating unit 2035 generates electronic watermark information based on the physical data and the shared data (step S2007) and outputs the generated electronic watermark information to the electronic watermark embedding unit 2039. The embedded position deciding unit 2037 analyzes the physical data, determines an embedded position of the electronic watermark information that is suitable for the physical data and informs the electronic watermark embedding unit 2039 of information relating to the decided embedded position.

After this, the electronic watermark embedding unit 2039 embeds the electronic watermark information in the physical data based on information relating to the embedded position (step S2009). Next, the electronic watermark embedding unit 2039 carries out verification on the physical data in which the electronic watermark information has been embedded (such physical data is hereinafter referred to as "embedded data") (step S2011). After this, the electronic watermark embedding unit 2039 checks the verification result (step S2013).

If the embedded data is normal, the electronic watermark embedding unit 2039 transmits the embedded data to the power management apparatus 11 (step S2015). The power management apparatus 11 transmits the received embedded data to the analysis server 34 outside the local power management system 1.

Meanwhile, if an abnormality has been found in the embedded data, the electronic watermark embedding unit 2039 judges whether the number of times an abnormality has occurred is under a specified threshold (step S2017). If the number of times an abnormality has occurred is under a specified threshold, the tampering detection information generating unit 2031 returns to step S2007 and the processing continues. Meanwhile, if the number of times an abnormality has occurred is equal to or greater than a specified threshold, the tampering detection information generating unit 2031 reports an abnormality (step S2019).

Note that if the embedded position of the electronic watermark information is decided in advance, the process that decides the embedded position, the process that verifies the physical data in step S2003 to step S2005, and the process that verifies the embedded data in steps S2011 to steps S2019 can be omitted.

Flow of Method of Verifying

Next, the method of verifying the electronic watermark information implemented by an information tampering detecting unit in the analysis server 34 such as a security check server will be described with reference to FIG. 56. Note that although a method of verification carried out on the analysis server 34 is described below, the same method may be carried out by an information tampering detecting unit of a power management apparatus.

An embedded position specifying unit of an information tampering detecting unit of the analysis server 34 acquires the physical data in which the electronic watermark information is embedded (step S2021). After this, the embedded position specifying unit verifies the acquired physical data (step S2023). Next, the embedded position specifying unit judges whether the acquired physical data is normal (step S2025).

If the verification finds that a value of the physical data exceeds a range of values that can be taken by the physical data or shows what is clearly abnormal behavior, the embedded position specifying unit reports an abnormality (step S2027).

After it has been confirmed via the verification that the physical data is normal, the embedded position specifying unit analyzes the physical data, specifies the position at which the electronic watermark information was embedded (step S2029), and informs the electronic watermark extracting unit of position information relating to the embedded position.

Next, the electronic watermark extracting unit extracts the electronic watermark information from the physical data based on the received position information relating to the embedded position (step S2031) and outputs the extracted electronic watermark information to the electronic watermark verification unit.

After this, the electronic watermark verification unit generates electronic watermark information based on the physical data and the shared data (step S2033) and verifies the electronic watermark information by comparing the extracted electronic watermark information with the generated electronic watermark information (step S2035). If the verification of the electronic watermark information based on the comparison has failed, the electronic watermark verification unit informs the power management apparatus 11 of an abnormality (step S2027). Also, if the verification of the electronic watermark information based on the comparison has succeeded, the electronic watermark verification unit reports that the verification succeeded and the processing ends normally.

Note that if the embedded position of the electronic watermark information is decided in advance, the process that verifies the physical data in step S2023 to step S2025, and the process that specifies the embedded position (step S2029) can be omitted.

Method of Embedding and Method of Verifying Electronic Watermark Information that Uses Time Information and Shared Information Next, a method of embedding and method of verifying electronic watermark information that uses time information and shared information will be described with reference to FIGS. 57 and 58. Note that a case where the physical data itself is used as the appliance characterizing information is described below.

Flow of Method of Embedding

First, a method of embedding implemented by the tampering detection information generating unit 2031 of the control-compliant appliance 125 will be described with reference to FIG. 57.

Note that it is assumed that the control-compliant appliance 125 transmits the physical data in which the electronic watermark information has been embedded regularly via the power management apparatus 11 to the analysis server 34 and that the data transmission timing is decided in advance between the control-compliant appliance 125 and the analysis server 34.

The tampering detection information generating unit 2031 of the control-compliant appliance 125 judges whether the scheduled data transmission time has been reached (step S2041). If the scheduled transmission time has not been reached, the tampering detection information generating unit 2031 awaits the scheduled time to be reached. If the scheduled transmission time has been reached, the appliance characterizing information generating unit 2033 acquires the physical data from the sensor control unit 2023 and the battery control unit 2027 (step S2043). After this, the appliance characterizing information generating unit 2033 verifies the acquired physical data (step S2045). Next, the appliance characterizing information generating unit 2033 judges whether the acquired physical data is normal (step S2047).

If the verification finds that a value of the physical data exceeds a range of values that can be taken by the physical data or shows what is clearly abnormal behavior, the appliance characterizing information generating unit 2033 reports an abnormality (step S2065).

After it has been confirmed via the verification that the physical data is normal, the embedded position deciding unit 2037 analyzes the physical data, determines an embedded position of the electronic watermark information that is suitable for the physical data (step S2049), and informs the electronic watermark embedding unit 2039 of information relating to the decided embedded position.

Next, the electronic watermark generating unit 2035 acquires time information showing the present time or a transmission scheduled time (step S2051). After this, the electronic watermark generating unit 2035 generates the electronic watermark information based on the physical data, time information, and shared information (step S2053), and outputs the generated electronic watermark information to the electronic watermark embedding unit 2039.

After this, the electronic watermark embedding unit 2039 embeds the electronic watermark information in the physical data based on information relating to the embedded position (step S2055). Next, the electronic watermark embedding unit 2039 verifies the physical data in which the electronic watermark information is embedded (such physical data is hereinafter referred to as "embedded data") (step S2057). After this, the electronic watermark embedding unit 2039 checks the verification result (step S2059).

If the embedded data is normal, the electronic watermark embedding unit 2039 transmits the embedded data to the power management apparatus 11 (step S2061). The power management apparatus 11 transmits the received embedded data to the analysis server 34 outside the local power management system 1.

Meanwhile, if an abnormality has been found in the embedded data, the electronic watermark embedding unit 2039 judges whether the number of times an abnormality has occurred is under a specified threshold (step S2063). If the number of times an abnormality has occurred is under a specified threshold, the tampering detection information generating unit 2031 returns to step S2053 and the processing continues. Meanwhile, if the number of times an abnormality has occurred is equal to or greater than a specified threshold, the tampering detection information generating unit 2031 reports an abnormality (step S2065).

Note that if the embedded position of the electronic watermark information is decided in advance, the process that decides the embedded position, the process that verifies the physical data in step S2045 to step S2047, and the process that verifies the embedded data in steps S2057 to steps S2063 can be omitted.

Flow of Method of Verifying

Next, the method of verifying the electronic watermark information implemented by an information tampering detecting unit in the analysis server 34 such as a security check server will be described with reference to FIG. 58.

Note that it is assumed that the control-compliant appliance 125 transmits the physical data in which the electronic watermark information has been embedded regularly via the power management apparatus 11 to the analysis server 34 and that the data transmission timing is decided in advance between the control-compliant appliance 125 and the analysis server 34.

The information tampering detecting unit of the analysis server judges whether the scheduled data transmission time has been reached (step S2071). If the scheduled transmission time has not been reached, the information tampering detecting unit awaits the scheduled time to be reached. If the scheduled transmission time has been reached, the information tampering detecting unit attempts to acquire physical data transmitted from the control-compliant appliance 125 via the power management apparatus 11. Here, the information tampering detecting unit judges whether the physical data can be received within a specified time period (step S2073).

If the physical data has not been received within the specified time period, the information tampering detecting unit informs the user of the power management apparatus 11 of an abnormality (step S2089). Meanwhile, if physical data has been received within the predetermined time period, the embedded position specifying unit verifies the acquired physical data (step S2075). After this, the embedded position specifying unit judges whether the acquired physical data is normal (step S2077).

If the verification finds that a value of the physical data exceeds a range of values that can be taken by the physical data or shows what is clearly abnormal behavior, the embedded position specifying unit reports an abnormality (step S2089).

After it has been confirmed via the verification that the physical data is normal, the embedded position specifying unit analyzes the physical data, specifies the position at which the electronic watermark information was embedded (step S2079), and informs the electronic watermark extracting unit of position information relating to the embedded position. The electronic watermark extracting unit extracts the electronic watermark information from the physical data based on the position information relating to the embedded position and outputs the extracted electronic watermark information to the electronic watermark verification unit.

After this, the electronic watermark verification unit obtains time information showing the present time or transmission scheduled time (step S2081).

After this, the electronic watermark verification unit generates electronic watermark information based on the physical data, the time information, and the shared data (step S2083) and compares the extracted electronic watermark information with the generated electronic watermark information to verify the electronic watermark information (step S2085). If the verification of the electronic watermark information based on the comparison has failed, the electronic watermark verification unit reports an abnormality (step S2089). Also, if the verification of the electronic watermark information based on the comparison has succeeded, the electronic watermark verification unit reports that the verification succeeded and the processing ends normally.

Note that if the embedded position of the electronic watermark information is decided in advance, the process that verifies the physical data in step S2075 to step S2077, and the process that specifies the embedded position (step S2079) can be omitted.

By carrying out the processing described above, it is possible to detect an abnormality when the control function of a power management apparatus 11 positioned between the analysis server 34 and the control-compliant appliance 125 has been compromised. By using the electronic watermark information, it is also possible to detect tampering with the physical data carried out by an attacker on a communication path. In addition, the power management apparatus 11 merely mediates the transferring of the physical data, and it is possible to detect tampering with the physical data on the path between the analysis server 34 and the control-compliant appliance 125 without having to transmit or receive special data for preventing tampering.

Even when the control function of the power management apparatus 11 has been compromised, it is possible to prevent attacks where an attacker tampers with the physical data. In addition, by using this method, it is possible to append a function for detecting tampering to the physical data without the statistical nature of the physical data being lost.

(1-19) Role of Analysis Server

The power management apparatus 11 that functions as a power center in the local power management system 1 is connected to various control-compliant appliances and the like that are equipped with batteries. The power management apparatus 11 controls the distributing of power by controlling the power distribution apparatus 121 based on power information obtained from the various appliances. The power management apparatus 11 is capable of grasping the power consumption of appliances connected to the system 1 in real time and collectively manages the power usage state inside the system 1 including power produced by home generation of natural energy, such as photovoltaic generation. The power management apparatus 11 is also capable of visualizing power consumption, which is expected to lead to the user suppressing wasteful consumption of energy.

However, since the local power management system 1 is a network system that controls a local power network, it is important to use security techniques in the system configuration and services. In recent years, for appliances that are equipped with batteries, it has become commonplace for users to replace the battery cells with inferior products and/or use counterfeit chips that bypass authentication with the appliance. This can lead to problems, such as the drop in quality causing fires. The "batteries" handled by the local power management system 1 according to the present embodiment include various apparatuses such as power storage apparatuses and electric vehicles present in the system, and it is important to maintain safety for such apparatuses.

The following are some conceivable examples of external attacks that can be implemented on the power management apparatus 11 that forms an interface between the outside of the local power management system 1 and the inside of the system 1.

the introduction of illegal commands (a virus) that cause an appliance or battery to operate abnormally taking over control of the power management apparatus a Trojan horse attack an attack on another appliance or system via the power management apparatus a DoS attack To protect against such external attacks, the measures listed below have been used in the past.

preventing illegal operations that are predicted in advance detecting viruses using a virus pattern file defined in advance monitoring behavior of execution files and detecting illegal files to protect against unknown attacks However, since such measures are used in response to behavior on a computer, it is difficult to use such measures to monitor a physical device such as a battery, and it is therefore difficult to say such measures provide sufficient protection. Also, since it is thought that the batteries and appliances that can be connected to the power management apparatus will be frequently updated, there is a high probability that the countermeasures against attacks will become extremely complex and it will be difficult to imagine the content of attacks in advance.

One countermeasure against counterfeit batteries is to incorporate an authentication chip into a battery module and to only connect to batteries whose quality is guaranteed. However, in recent years, techniques for invalidating the functions of an authentication chip have advanced and cases where counterfeit chips bypass authentication are becoming widespread. If a battery state (voltage, current, remaining charge, or the like) transmitted via an appliance from a counterfeit chip mounted on inferior battery cells is not correct (i.e., if the digital information is erroneous), the power management apparatus will not be capable of correctly controlling the power network, resulting in a high risk of accidents. In this situation, the operation of the appliance should be stopped or the problematic batteries should be excluded, but there is no existing technology to achieve such a mechanism.

For the above reason, a technique for avoiding attacks (virus infections) on appliances/batteries connected to the power management apparatus or system and the risks that accompany battery deterioration or counterfeit products is necessary. A method that is capable of detecting the presence of the kind of attacks described above on the system or deterioration and the like of batteries using sensor information, which is outputted from the batteries or appliances connected to the system, and various types of history information is described below.

The method of detecting the presence of attacks and deterioration and the like of batteries described below mainly uses physical data such as sensor information and the like outputted from the respective appliances and history information to make judgments using calculating physical estimates and high-speed judgments using a heuristic statistical method. By doing so, it is possible to detect unknown attacks and to avoid risks from the outset.

In the present embodiment, the analysis server 34 provided outside the local power management system 1 is used as an apparatus for detecting attacks and avoiding risks. It is assumed that one of the functions of the analysis server 34 is a function that carries out a security check on the local power management systems. Accordingly, the analysis server 34 described below is a server that functions as a security check server.

The analysis server 34 realizes the functions listed below based on sensor information of various appliances and batteries transmitted from a power management apparatus, execution command information, appliance/battery information registered in advance in the analysis server 34, usage environment information, and usage history information.

exclude copies that bypass authentication and batteries that have deteriorated and whose operation is dangerous protect against heuristic external attacks verify validity via an estimate based on the present state, inputs, and information on external environment generate and update a virus definition file used by an anti-virus system in the power management apparatus Also, as described above, the analysis server 34 is capable of being further equipped with a function that verifies tampering detection information (electronic watermark information) embedded in appliance characterizing information transmitted from various appliances and batteries. By using the tampering detection information, it is also possible to check whether a power management apparatus has been taken over.

Here, voltage, current, temperature, humidity, time, usage appliance information, user, and the like can be given as examples of the sensor information mentioned above, and instruction commands, execution files, appliance/battery parameters and the like can be given as examples of execution command information. Also, manufacturer, model number, manufacturer number, and the like can be given as examples of the appliance/battery information registered in advance in the analysis server 34, and family information, location, owned appliance information, and the like can be given as examples of the usage environment information. Past appliance/battery sensor information, execution command information, usage time, usage frequency, and the like can be given as examples of the usage history information mentioned above.

(1-20) Configuration of Analysis Server

Figure 59:
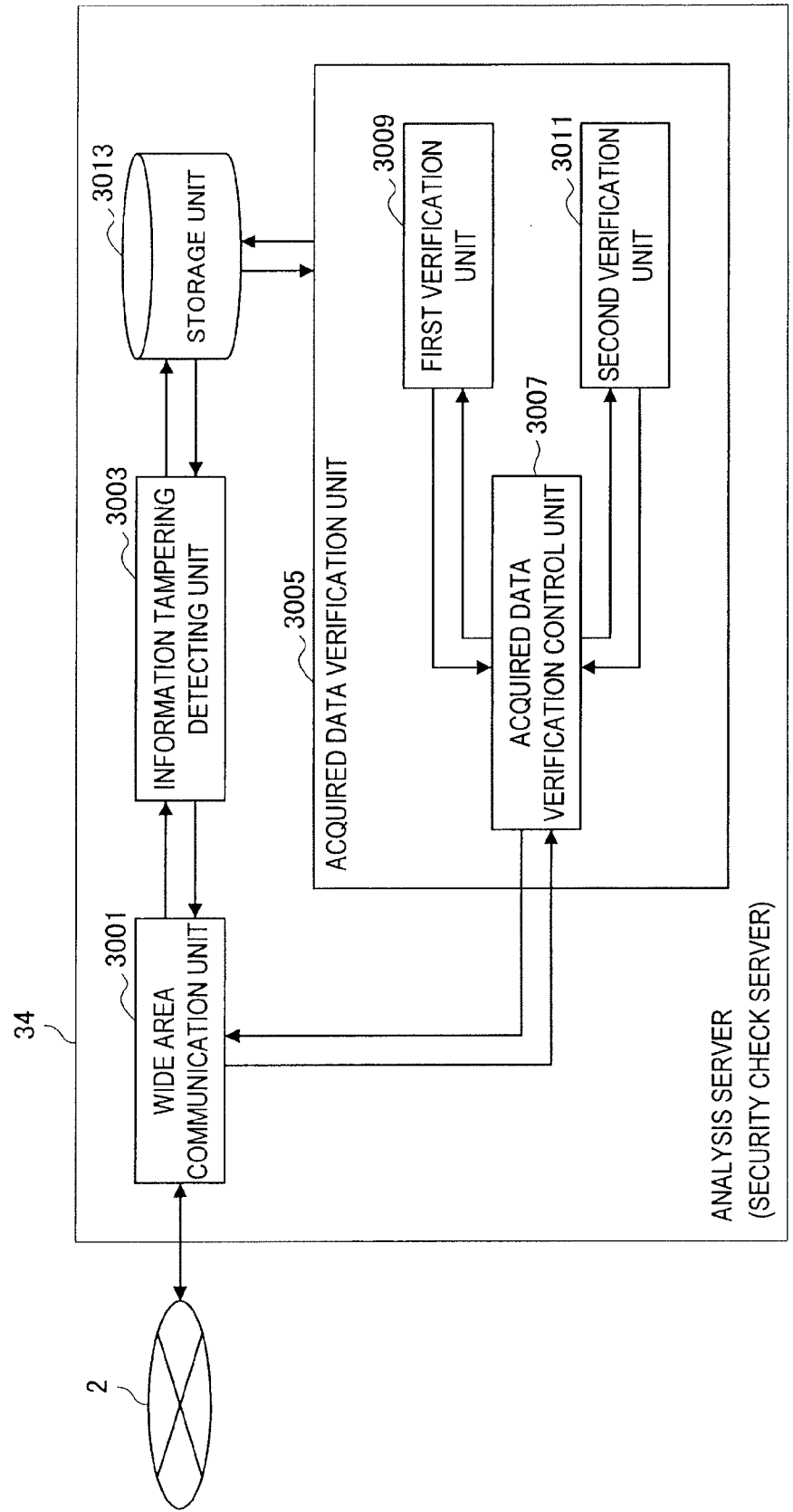
FIG. 59 is a block diagram useful in explaining the configuration of an analysis server.
Figure 60:
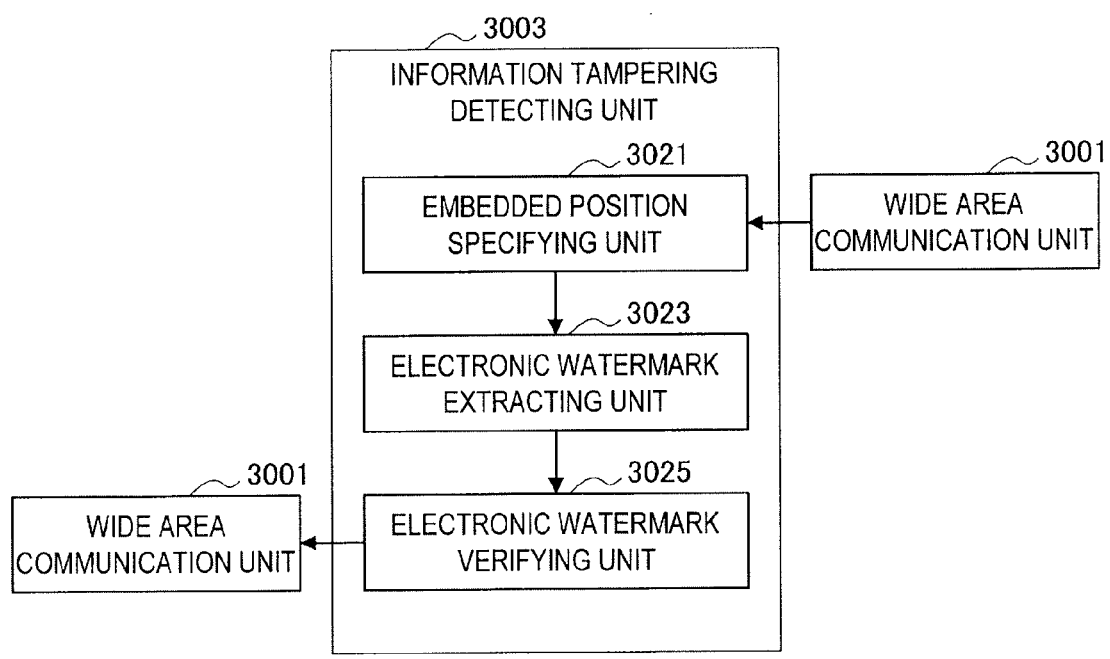
FIG. 60 is a block diagram showing the configuration of an information tampering detecting unit of the analysis server.
Figure 61:
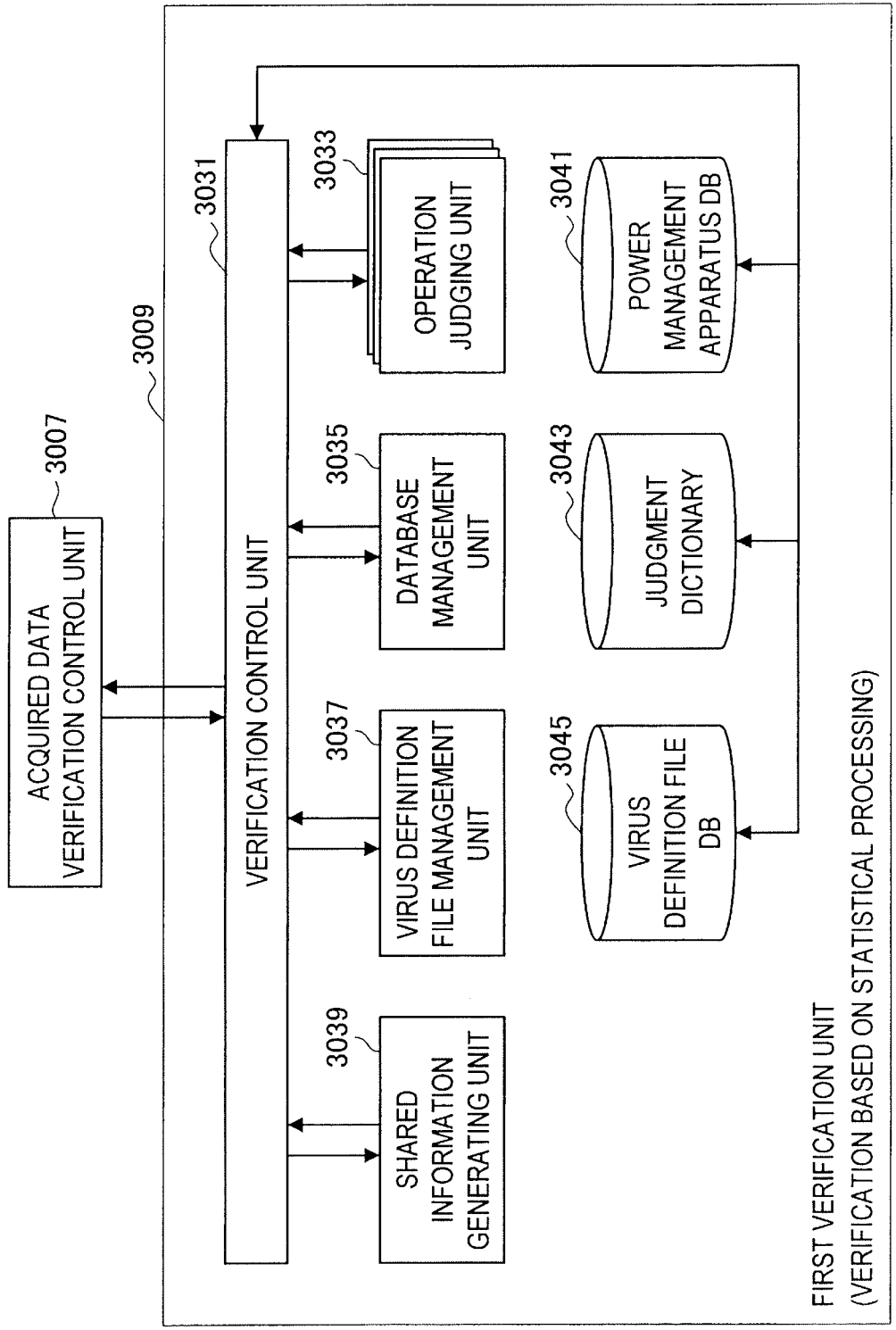
FIG. 61 is a block diagram showing the configuration of a first verification unit of the analysis server.
Figure 62:
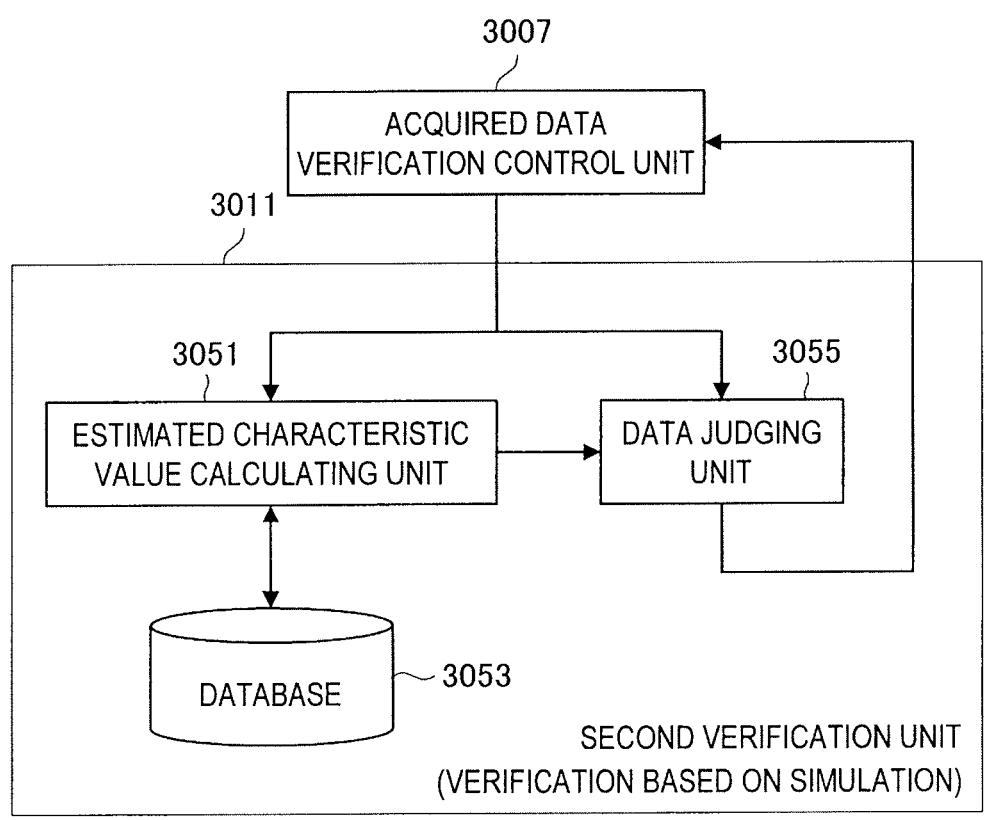
FIG. 62 is a block diagram showing the configuration of a second verification unit of the analysis server.

Next, the configuration of the analysis server 34 that is a security check server according to the present embodiment will be described in detail with reference to FIGS. 59 to 62. FIG. 59 is a block diagram useful in explaining the configuration of an analysis server according to the present embodiment. FIG. 60 is a block diagram useful in explaining the configuration of an information tampering detecting unit included in the analysis server according to the present embodiment. FIG. 61 is a block diagram useful in explaining the configuration of a first verification unit included in the analysis server according to the present embodiment. FIG. 62 is a block diagram useful in explaining the configuration of a second verification unit included in the analysis server according to the present embodiment.

Overall Configuration of Analysis Server

First, the overall configuration of the analysis server 34 according to the present embodiment will be described with reference to FIG. 59.

As illustrated in FIG. 59, the analysis server 34 according to the present embodiment mainly includes a wide area communication unit 3001, an information tampering detecting unit 3003, an acquired data verification unit 3005, and a storage unit 3013.

The wide area communication unit 3001 is communication means for exchanging information between the local power management system 1 and another server or the like via a wide area network 2.

The information tampering detecting unit 3003 is realized by a CPU, a ROM, a RAM, and the like, for example. When data for detecting whether information has been tampered with is embedded in the information acquired by the analysis server 34 from the power management apparatus 11, the information tampering detecting unit 3003 verifies the data and detects whether the information has been tampered with. Here, an electronic watermark can be given as one example of data embedded in such information.

When tampering with the information has been detected, the information tampering detecting unit 3003 informs the power management apparatus 11 or the user himself/herself of the detection result. By doing so, the power management apparatus 11 or the user of the power management apparatus 11 is capable of excluding the appliance where tampering with information has occurred from inside the system 1.

The acquired data verification unit 3005 is realized by a CPU, a ROM, a RAM, and the like, for example. The acquired data verification unit 3005 verifies various information acquired from the power management apparatus 11 and as described earlier, is a processing unit that provides various functions for protecting the power management apparatus 11 from external attacks.

As shown in FIG. 59, the acquired data verification unit 3005 further includes an acquired data verification control unit 3007, a first verification unit 3009, and a second verification unit 3011.

The acquired data verification control unit 3007 carries out control when various data acquired by the analysis server 34 from the power management apparatus 11 is analyzed and verified. More specifically, the acquired data verification control unit 3007 judges how to combine verification by the first verification unit 3009 and verification by the second verification unit 3011 described later to analyze and verify the acquired data. Accordingly, the first verification unit 3009 and the second verification unit 3011 described later carry out various verification processing under the control of the acquired data verification control unit 3007.

The first verification unit 3009 is realized by a CPU, a ROM, a RAM, and the like, for example. The first verification unit 3009 analyzes and verifies various types of information acquired by the analysis server 34 using a heuristic method based on statistical processing.

The first verification unit 3009 mainly has the two functions described below.

(i) A function that detects the presence of attacks to the power management apparatus, abnormalities at a battery or various appliances or sensors by comparing the data acquired from a power management apparatus with data acquired from another power management apparatus that has a similar power usage environment.

(ii) A function that detects the presence of attacks to the power management apparatus, abnormalities at a battery or various appliances or sensors in data acquired from a power management apparatus from a comparison with previous usage history data.

To realize the function (i) given above, the first verification unit 3009 uses the "battery model number/ID information and power status information, history" and "appliance model number/ID information and sensor information such as temperature, history" or "execution file of power management apparatus" acquired from the power management apparatus 11 being verified. The first verification unit 3009 uses not only the information mentioned above acquired from the power management apparatus being verified but also the information mentioned above acquired from other power management apparatuses 11 that are not being verified. By comparing and verifying such data, the first verification unit 3009 determines whether there has been an attack on the power management apparatus being verified and/or whether there is an abnormality at a battery/appliance or sensor.

To realize the function (ii) given above, the first verification unit 3009 acquires the "battery model number/ID information and power status information" and "appliance model number/ID information and sensor information such as temperature" or "execution file of power management apparatus" from the power management apparatus 11 being verified. The first verification unit 3009 also uses the "battery power status information history", "sensor information history of appliances", and "execution file history of power management apparatus" of the power management apparatus 11 being verified. By comparing and verifying such data, the first verification unit 3009 determines whether there has been an attack on the power management apparatus being verified and/or whether there is an abnormality at a battery/appliance or sensor.

The first verification unit 3009 further includes a function that verities the command information in the "execution file of the power management apparatus" and is operable when the command information is determined to be abnormal to extract a virus pattern from the command information determined to be abnormal. The first verification unit 3009 uses the extracted virus pattern and generates a virus definition file relating to such virus.

On determining that there is an abnormality in the sensor information of the appliance, the execution file, the command information, or the like, the first verification unit 3009 may share such information with the second verification unit 3011 or may transmit such information to the second verification unit 3011. By sharing or transmitting such information, it becomes possible for the second verification unit to update the parameters used in a simulation and possible to further improve the simulation precision.

The second verification unit 3011 is realized by a CPU, a ROM, a RAM, and the like, for example. The second verification unit 3011 analyzes and verifies the various information acquired by the analysis server 34 by simulation (calculating physical estimates) using the acquired data.

The second verification unit 3011 mainly includes a function that detects an abnormality at the battery/appliance or sensor through a highly precise judgment achieved by calculating estimates of physical amounts.

The second verification unit 3011 acquires "battery model number/ID information and power status information, history" and "appliance model number/ID information and sensor information such as temperature, history" in the system 1 from the power management apparatus 11 being verified. In addition, the second verification unit 3011 acquires electrical specifications and characteristic information of the batteries/appliances from the power management apparatus 11 being verified. The second verification unit 3011 carries out simulation based on the acquired appliance information, electrical specifications and characteristic information, and also the usage history information to calculate indices (hereinafter, "normal operating ranges") showing that such appliances are operating appropriately. The second verification unit 3011 compares and verifies the calculated normal operating ranges and the various data mentioned above that has been acquired and judges whether there has been an attack on the power management apparatus being verified and whether there is an abnormality at a battery/appliance or sensor.

The storage unit 3013 is one example of a storage apparatus provided in the analysis server 34 according to the present embodiment. The storage unit 3013 stores information relating to various keys stored by the analysis server 34, and various digital signatures, certificates, and the like stored by the analysis server 34. Various history information may also be recorded in the storage unit 3013. In addition, the storage unit 3013 may also store, as appropriate, various parameters and intermediate progress of processing that should be stored during processing by the analysis server 34 according to the present embodiment, or various databases and the like. The various processing units of the analysis server 34 are capable of freely reading from and writing into the storage unit 3013

Configuration of Information Tampering Detecting Unit

Next, the configuration of the information tampering detecting unit 3003 will be described with reference to FIG. 60.

As shown in FIG. 60, the information tampering detecting unit 3003 also includes an embedded position specifying unit 3021, an electronic watermark extracting unit 3023, and an electronic watermark verifying unit 3025.

With the local power management system 1 according to the present embodiment, it is possible to embed, into physical data such as current, voltage, temperature, and humidity, or into various information calculated using such physical data, electronic watermark data that is suited to such information. By verifying the electronic watermark data, the analysis server 34 that is capable of two-way communication with the local power management system 1 are capable of detecting whether the physical data (which hereinafter includes various information calculated using physical data) has been tampered with.

The embedded position specifying unit 3021 is realized by a CPU, a ROM, a RAM, and the like, for example. By analyzing the physical data in which the electronic watermark has been embedded using a predetermined signal processing circuit, the embedded position specifying unit 3021 specifies the embedded position of the electronic watermark information in accordance with the characteristics of a signal corresponding to the data. On specifying the embedded position of the electronic watermark information, the embedded position specifying unit 3021 informs the electronic watermark extracting unit 3023 of information relating to the specified embedded position. Note that if the embedded position of the electronic watermark is determined in advance between a control-compliant appliance 125 or the like and the analysis server 34, it may not be necessary to carry out the specifying process for the embedded position.

The electronic watermark extracting unit 3023 is realized by a CPU, a ROM, a RAM, and the like, for example. The electronic watermark extracting unit 3023 extracts the electronic watermark information from the physical data based on information relating to the embedded position provided by the embedded position specifying unit 3021. The electronic watermark extracting unit 3023 transfers the electronic watermark extracted from the physical data to the electronic watermark verifying unit 3025, described later.

The electronic watermark verifying unit 3025 is realized by a CPU, a ROM, a RAM, and the like, for example. The electronic watermark verifying unit 3025 first generates electronic watermark information based on shared information shared with the control-compliant appliance 125 or the like and physical data extracted by the electronic watermark extracting unit 3023. To generate the electronic watermark information, a hash function, a pseudorandom number generator, common key encryption, shared key encryption (for example, a message authentication code (MAC)), or the like is used. After this, the electronic watermark verifying unit 3025 compares the generated electronic watermark information and the electronic watermark information extracted by the electronic watermark extracting unit 3023.

If the generated electronic watermark information and the extracted electronic watermark information are the same, the electronic watermark verifying unit 3025 judges that the physical data or the like generated by the control-compliant appliance 125 or the like has not been tampered with. Meanwhile, if the generated electronic watermark information and the extracted electronic watermark information are not the same, the electronic watermark verifying unit 3025 judges that the physical data has been tampered with.

If the physical data has been tampered with, the electronic watermark verifying unit 3025 informs the power management apparatus 11 or the user himself/herself. By doing so, the power management apparatus 11 or the user himself/herself become able to exclude a control-compliant appliance 125 or the like whose operation may have been modified from the local power management system 1.

Furthermore, if the electronic watermark information is generated by using not only the physical data and the shared information but also the time information, it becomes possible also to verify whether the power management apparatus managing the local power management system 1 is taken over or not, as described earlier.

Configuration of First Verifying Unit

Next, the configuration of the first verification unit 3009 will be described in detail with reference to FIG. 61.

As described above, the first verification unit 3009 extracts characterizing amounts based on sensor information and execution command information of batteries and appliances transmitted from the power management apparatus 11, information on the batteries and appliances registered in advance in the analysis server 34, usage environment information, and usage history information. After this, the first verification unit 3009 detects differences and abnormalities at high speed based on the extracted characterizing amounts.

As shown in FIG. 61, the first verification unit 3009 includes a verification control unit 3031, an operation judging unit 3033, a database management unit 3035, a virus definition file management unit 3037, and a shared information generating unit 3039. The first verification unit 3009 further includes a power management apparatus database 3041, a judgment dictionary 3043, and a virus definition file database 3045.

The verification control unit 3031 is realized by a CPU, a ROM, a RAM, and the like, for example. The verification control unit 3031 controls a heuristic verification process that uses the statistical processing carried out by the first verification unit 3009 and functions in cooperation with various processing units of the first verification unit 3009.

The operation judging unit 3033 is realized by a CPU, a ROM, a RAM, and the like, for example. The operation judging unit 3033 inputs various information such as sensor information and execution command information acquired from the power management apparatus 11 to be verified and judges whether the operation of the power management apparatus 11 being verified is normal or abnormal based on history information and the like of the power management apparatus 11 or another power management apparatus 11. The judging process carried out by the operation judging unit 3033 will be described later.

The database management unit 3035 is realized by a CPU, a ROM, a RAM, and the like, for example. The database management unit 3035 stores various information such as sensor information of new batteries and appliances, execution command information, and history information that have been transmitted from the power management apparatus 11 in the database 3041 and also updates the judging dictionary 3043. The database management unit 3035 regularly compares statistics of a specified power management apparatus 11 and statistics in data of other power management apparatuses 11 and tests whether there is data that has been deliberately generated.

The virus definition file management unit 3037 is realized by a CPU, a ROM, a RAM, and the like, for example. The virus definition file management unit 3037 defines execution command information which the operation judging unit 3033 has judged to be abnormal as a virus pattern and generates a virus definition file. The virus definition file management unit 3037 stores the generated virus definition file in the virus definition file database 3045 to update the database, and also transmits the generated virus definition file via the verification control unit 3031 to the outside.

The shared information generating unit 3039 gathers information (for example, sensor information on batteries/appliances, execution command information, appliance information on batteries/appliances, usage history information, and the like) on a power management apparatus 11 that has been detected as being abnormal by the operation judging unit 3033 as shared information. After this, the shared information generating unit 3039 outputs the generated shared information via the verification control unit 3031 and the acquired data verification control unit 3007 to the second verification unit 3011.

By using the shared information to update the setting information (parameters and the like) for a simulation, the second verification unit 3011 is capable of further improving the simulation precision.

The power management apparatus database 3041 is one example of a database stored in the first verification unit 3009. Various information such as appliance information relating to the batteries and appliances, usage environment information, and usage history information of each power management apparatus 11 is stored in this database.

The judging dictionary 3043 is another database stored in the first verification unit 3009 and stores information relating to characterizing amounts when the operation judging unit 3033 heuristically judges operations. Such characterizing amounts are statistics on typical sensor information when certain conditions (appliance information, usage environment information, and the like) are provided and are generated based on the power management apparatus database 3041.

The virus definition file database 3045 is yet another database stored in the first verification unit 3009. The virus definition file database 3045 stores virus definition files generated by the virus definition file management unit 3037.

This completes the detailed description of the configuration of the first verification unit 3009.

Configuration of Second Verification Unit

Next, the configuration of the second verification unit 3011 will be described in detail with reference to FIG. 62.

As described above, the second verification unit 3011 calculates a normal operating range by carrying out a simulation based on changes over time and usage environment, usage history, usage state, and characteristic information of a battery, and detects differences and abnormalities at high speed. The verification by the first verification unit 3009 is a high-speed determination method that uses statistical information from a virtual environment or the like, but the verification by the second verification unit 3011 is time consuming. However, the second verification unit 3011 is possible to calculate deterioration in the quality of a genuine product with high precision.

The second verification unit 3011 includes a function that uses shared information outputted from the first verification unit 3009 to update various setting information (parameters) to be used when carrying out simulation to appropriate values.

As shown in FIG. 62, the second verification unit 3011 further includes an estimated characteristic value calculating unit 3051, a database 3053, and a data judging unit 3055.

The estimated characteristic value calculating unit 3051 is realized by a CPU, a ROM, a RAM, and the like, for example. The estimated characteristic value calculating unit 3051 carries out a simulation based on the appliance information, electric specification and characteristic information, and usage history information acquired from the power management apparatus 11 to be verified to calculate estimated characteristic values. The estimated characteristic values are indices (that is, a normal operating range) showing whether an appliance is operating appropriately. When carrying out the simulation, the estimated characteristic value calculating unit 3051 acquires various parameters for the simulation that are registered in the database 3053.

The database 3053 is a database stored in the second verification unit 3011 and stores various setting information (parameters) used when the estimated characteristic value calculating unit 3051 carries out simulation. As described above, the parameters stored in the database 3053 are updated by the second verification unit 3011 using shared information outputted from the first verification unit 3009.

The data judging unit 3055 is realized by a CPU, a ROM, a RAM, and the like, for example. The data judging unit 3055 compares the various data acquired from the power management apparatus 11 to be verified and the estimated characteristic values calculated by the estimated characteristic value calculating unit 3051 and judges the various data acquired from the power management apparatus 11 to be verified. By using arbitrary logic, the data judging unit 3055 is capable of detecting an abnormality at a battery/appliance or sensor, and as one example, when a discrepancy between an actual value and an estimated characteristic value is equal to or above a specified threshold or when the discrepancy is equal to or below the threshold, the data judging unit 3055 can judge that an abnormality has occurred at the appliance.

In the second verification unit 3011, the parameters used in a physical simulation can be corrected to more realistic values. It is also possible to transmit such information to a battery or appliance manufacturer to inform the manufacturer of failures that were not imagined in advance.

This completes the detailed description of the configuration of the second verification unit 3011.

One example of the functions of the analysis server 34 according to the present embodiment has been described above. The component elements described above may be constructed using general-purpose parts and/or circuits or may be constructed by hardware that is dedicated to the functions of the respective component elements. Alternatively, the functions of the respective component elements may all be carried out by a CPU or the like. Accordingly, it is possible to change the configuration in use as appropriate in accordance with the prevailing technical level when implementing the present embodiment.

Note that a computer program for realizing the functions of the analysis server according to the present embodiment described above may be created and installed in a personal computer or the like. It is also possible to provide a computer-readable recording medium on which such a computer program is stored. As examples, the recording medium may be a magnetic disk, an optical disc, a magneto-optical disc, a flash memory, or the like. The computer program mentioned above may also be distributed via a network, for example, without using a recording medium.

(1-21) Process Specifying Battery to be Excluded

Next, the process for specifying a battery to be excluded that is carried out by the analysis server 34 with the functions described above will be described with reference to FIG. 63. FIG. 63 is a diagram useful in explaining batteries to be excluded.

The table shown in FIG. 63 is a list of conceivable states for a battery used in the local power management system 1. As shown at the top of FIG. 63, the battery used in the local power management system 1 includes one or a plurality of cells that store power, a circuit board for controlling the cell or cells, and an authentication chip provided on the circuit board. The conceivable states for the cells and the circuit board including the authentication chip can be roughly classified into the seven cases shown in the table.

Case 1 to case 3 are states that may occur in a battery composed of genuine cells and a genuine circuit board. Case 4 to case 7 are states that may occur in a battery that uses fake cells.

Out of the seven cases, there are no problems with the cell characteristics in case 1, case 2, and case 4 and a correct appliance state is being outputted. Since batteries classified into such cases have either deteriorated within an estimated range or are copies which have characteristics or information that are not problematic, such batteries do not pose a major problem if present in a local power management system.

However, for batteries classified into case 3 and cases 5 to 7, a discrepancy is produced when the characteristics or appliance information of cells are compared to a case with genuine products in normal use, and since such products present various kinds of risk, it is necessary to excluded such batteries from the local power management system 1.

For this reason, by using various verification processes as described above, the analysis server 34 according to the present embodiment is capable of specifying the batteries mentioned above that should be excluded.

The process for specifying batteries to be excluded which is carried out by the analysis server 34 will be described in detail later.

(1-22) Method of Protecting Against Illegal Attacks to Power Management Apparatus Next, the overall flow of a method of protecting against illegal attacks to a power management apparatus will be described with reference to FIG. 64. FIG. 64 is a flowchart useful in explaining a method of protecting against illegal attacks to the power management apparatus.

Note that it is assumed that before the following explanation begins, the power management apparatus 11 has been set so as to subscribe to a service that prevents illegal attacks (that is, a service provided by the analysis server 34) and the execution frequency, timing, and the like of such service have been set in advance.

The system management unit 1125 of the power management apparatus 11 first judges whether timing for checking the presence of illegal attacks has been reached (step S3001). If the check timing has not been reached, the system management unit 1125 of the power management apparatus 11 awaits the check timing to be reached. If the check timing has been reached, the system management unit 1125 of the power management apparatus 11 uses attack pattern files (virus definition files) stored thusfar in the power management apparatus 11 to search the system (step S3003).

When there is a problem in a pattern check, the system management unit 1125 of the power management apparatus 11 registers the problematic appliance in an appliance exclusion list stored in the power management apparatus 11 and the control unit 115 excludes the problematic appliance from the system (step S3005).

If there are no problems in the pattern check, the appliance management unit 1121 of the power management apparatus 11 gathers various information such as sensor information and execution command information from the various appliances including batteries that are connected to the system (step S3007). After this, the appliance management unit 1121 of the power management apparatus 11 accesses the analysis server 34 via mutual authentication (step S3009). When a connection has been established, the power management apparatus 11 encrypts the ID of the power management apparatus, the battery ID of each appliance, output information of the batteries, sensor information and execution command information of the power management apparatus and transmits the encrypted information to the analysis server 34 (step S3011).

The acquired data verification unit 3005 of the analysis server 34 determines whether there are any abnormalities in various data transmitted from the power management apparatus 11 (step S3013). When there are no abnormalities, the acquired data verification unit 3005 adds the acquired data on the power management apparatus 11 to the database (step S3015) and informs the power management apparatus 11 of the analysis result (step S3017).

Meanwhile, when an abnormality has been identified in step S3013, the acquired data verification unit 3005 of the analysis server 34 generates a virus definition file (step S3019). The acquired data verification unit 3005 of the analysis server 34 checks whether many abnormalities have occurred at the power management apparatus 11 where the abnormality was identified (step S3021). When it has been judged that many abnormalities have occurred and that the power management apparatus 11 has become a launchpad for attacks or the like, the analysis server 34 informs the system management server 33 of an abnormality (step S3023). The system management server 33 that has received the report excludes the apparatus in question by placing the apparatus on a blacklist, for example (step S3025). The analysis server 34 also transmits the analysis result and the virus definition file generated in step S3019 to the power management apparatus 11 (step S3027). The system management unit 1125 of the power management apparatus 11 receives the result and carries out appropriate processing such as updating the virus definition file when one exists (step S3029).

This completes the description of the overall flow of the method of protecting against illegal attacks to a power management apparatus.

(1-23) Method of Excluding Battery

Figure 65:
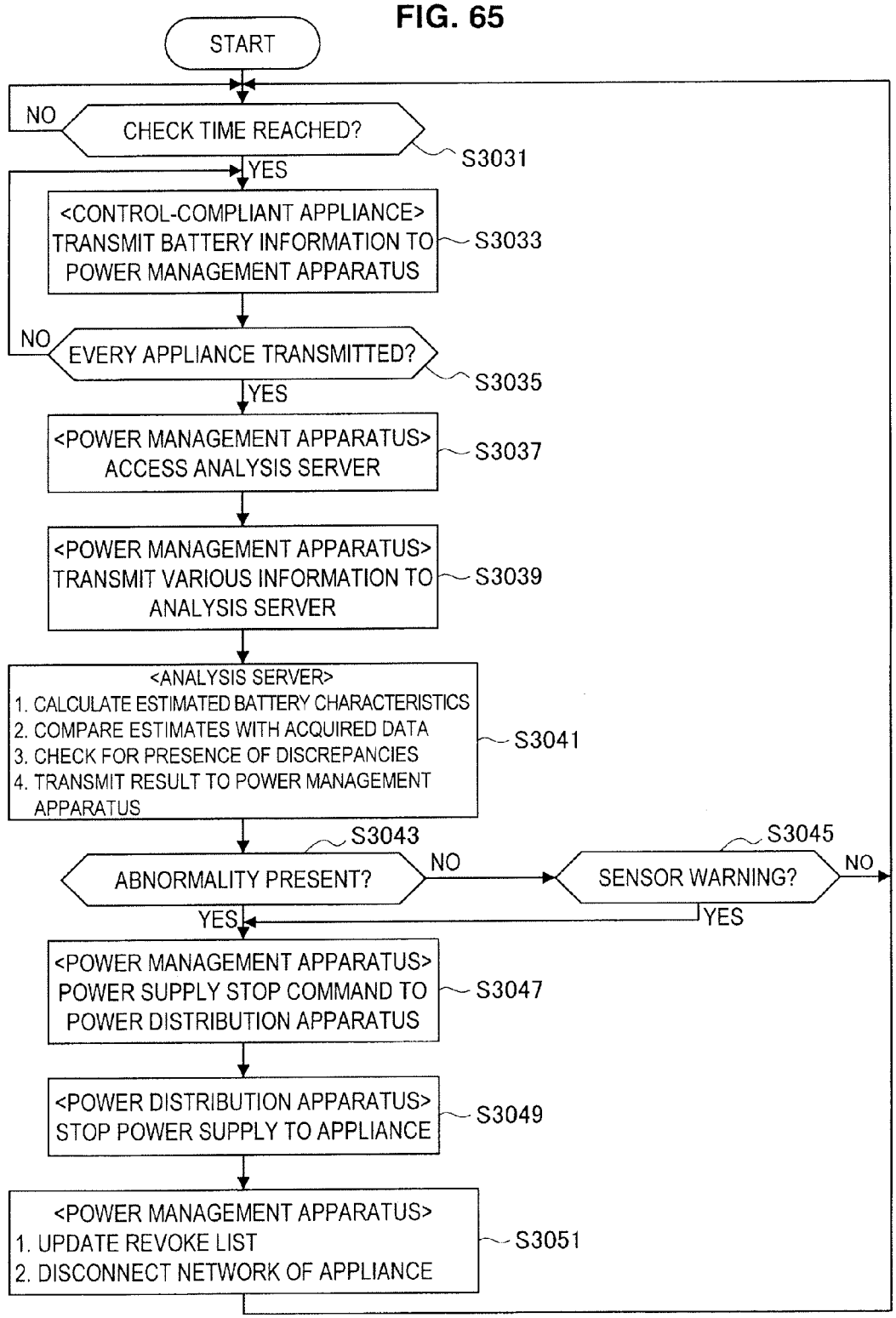
FIG. 65 is a flowchart useful in explaining a method of excluding a battery.

Next, the flow of a process carried out by the analysis server 34 to specify a battery to be excluded and a process carried out by the power management apparatus 11 to exclude such battery will be described with reference to FIG. 65. FIG. 65 is a flowchart useful in explaining the method of excluding a battery.

The analysis server 34 according to the present embodiment detects whether an abnormality is present at a battery based on the information transmitted from the power management apparatus 11 and informs the power management apparatus 11 when an abnormality has occurred. The power management apparatus 11 that has been informed of the abnormality carries out a series of operations, such as stopping the supplying of power to the abnormal battery.

Note that it is assumed that before the following explanation begins, the power management apparatus 11 has been set so as to subscribe to a service that excludes battery risks (that is, a service provided by the analysis server 34) and the execution frequency, timing, and the like of such service are set in advance.

The system management unit 1125 of the power management apparatus 11 first judges whether timing for checking for battery risks has been reached (step S3031). If the check timing has not been reached, the system management unit 1125 of the power management apparatus 11 awaits the check timing to be reached. If the check timing has been reached, the appliance management unit 1121 of the power management apparatus 11 requests the control-compliant appliances 125 and the like that include a battery to transmit battery information (battery primary information). In response, the respective control-compliant appliances 125 that include batteries transmit battery information to the power management apparatus 11 (step S3033). The power management apparatus 11 checks whether battery information has been acquired from every appliance (step S3035). Note that although it is not absolutely necessary to acquire battery information from every appliance, it is preferable to check all of the appliances.

The appliance management unit 1121 of the power management apparatus 11 accesses the analysis server 34 via mutual authentication (step S3037). When a connection has been established, the power management apparatus 11 transmits the ID of the power management apparatus, the battery ID of each appliance, and primary information of the batteries to the analysis server 34 (step S3039).

The acquired data verification unit 3005 of the analysis server 34 calculates estimated characteristic values using the various data transmitted from the power management apparatus 11 and compares the acquired data with the calculated estimated characteristic values. After doing so, the acquired data verification unit 3005 of the analysis server 34 informs the obtained results to the power management apparatus 11 (step S3041).

The system management unit 1125 of the power management apparatus 11 judges the obtained result (step S3043). When the result is that there are no abnormalities, the appliance management unit 1121 of the power management apparatus 11 checks the physical information gathered from the sensors (step S3045) and ends the processing if there are no problems.

When there is an abnormality in step S3043, the control unit 115 of the power management apparatus 11 issues a power supplying stop command for the appliance with the battery with the abnormality to the power distribution apparatus 121 (step S3047). The power distribution apparatus 121 stops the supplying of power to such appliance in accordance with the command from the power management apparatus 11 (step S3049). The system management unit 1125 of the power management apparatus 11 places the ID of the appliance with the abnormality on a revoke list and the appliance management unit 1121 disconnects the information network of the appliance (step S3051).

By carrying out the processing described above, the analysis server 34 is capable of specifying a battery to be excluded and the power management apparatus 11 is capable of excluding such battery to be excluded from the system.

(1-24) Verification Process by Acquired Data Verification Unit

Figure 66A:
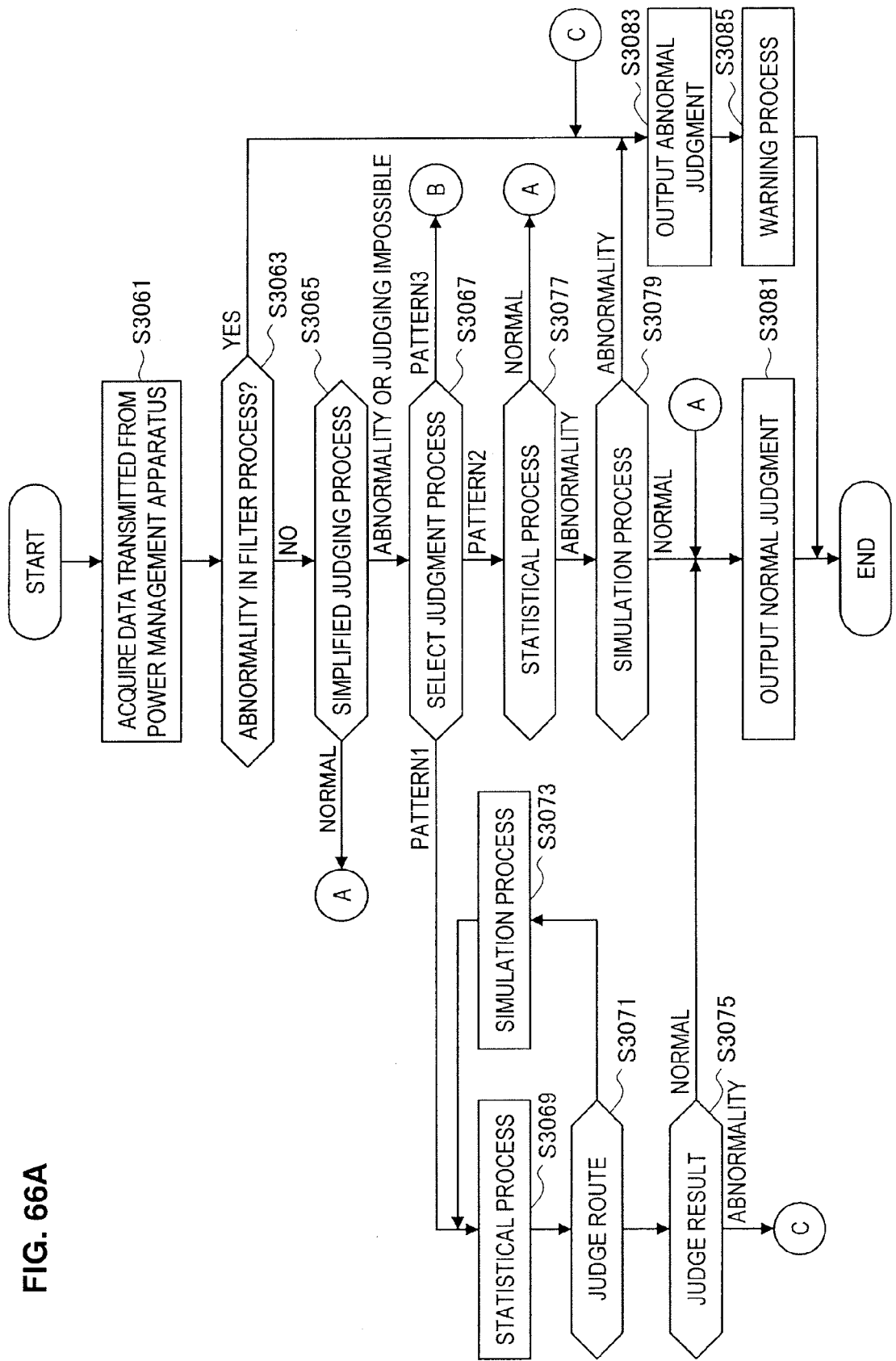
FIG. 66A is a flowchart useful in explaining a method of verifying by an acquired data verification unit of the analysis server.
Figure 66B:
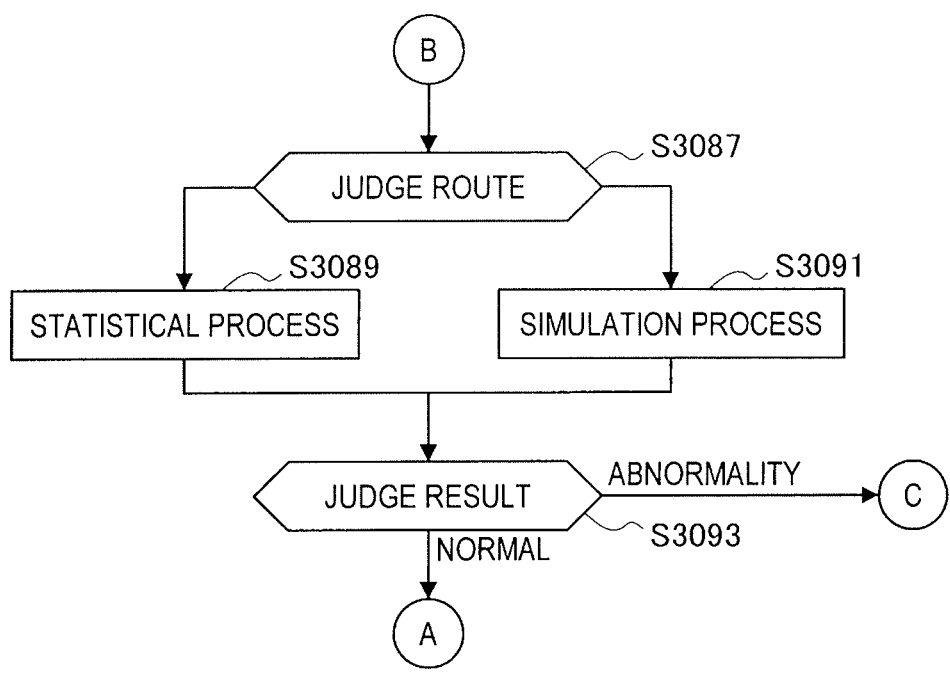
FIG. 66B is a flowchart useful in explaining a method of verifying by an acquired data verification unit of the analysis server.

Next, the overall flow of a verification process by the acquired data verification unit 3005 of the analysis server 34 will be described with reference to FIGS. 66A and 66B. FIGS. 66A and 66B are flowcharts useful in explaining the verification process by the acquired data verification unit.

The acquired data verification control unit 3007 of the acquired data verification unit 3005 of the analysis server 34 first acquires various data transmitted from the power management apparatus 11 (step S3061). Next, the acquired data verification control unit 3007 tests the acquired data using a predetermined filter (step S3063). As examples, the filter may protect against a DoS attack where a large amount of information is transmitted from a specified power management apparatus 11, may function as a firewall, and/or may reject nonstandard communication.

If an abnormality is detected in the filter processing on the acquired data, the acquired data verification control unit 3007 outputs an abnormality judgment (step S3083), implements a specified warning process (step S3085), and ends the flow. As one example, the warning process may be carried out for the system management server 33 or another server that is related to the power management apparatus in question.

Meanwhile, if an abnormality is not detected in the filter processing on the acquired data, the acquired data verification control unit 3007 implements a simplified judging process on the acquired data (step S3065). The simplified determination is assumed to include detecting virus patterns understood in advance by the analysis server 34, carrying out a simplified judgment by the first verification unit 3009, and/or carrying out matching against typical usage, with such processing normally being carried out at high speed. When it is possible at this stage to clearly confirm that the operation is normal, a normal judgment is outputted (step S3081) and the flow ends.

Meanwhile, if this simplified judgment has judged that an abnormality is present or if judgment was not possible, the acquired data verification control unit 3007 judges which of three judgment processes which are numbered pattern 1 to pattern 3 and described below is to be used (step S3067).

Pattern 1 is a pattern that selects a linked judging process that uses a combination of the first verification unit 3009 and the second verification unit 3011.

For example, the acquired data verification control unit 3007 first carries out a judgment via statistical processing by the first verification unit 3009 (step S3069) and also grasps the physical characteristics of a battery/appliance from the transmitted information. Here, the acquired data verification control unit 3007 judges the processing path (step S3071) and judges whether to output the final results (step S3075) or carry out verification by the second verification unit 3011 (step S3073). When verification by the second verification unit 3011 is also carried out, the second verification unit 3011 updates the physical parameters used in the simulation based on the shared information (that is, physical characteristics) received from the first verification unit 3009 and carries out simulation based on the transmitted information. In addition, the first verification unit 3009 updates the judging dictionary based on findings obtained by the verification by the second verification unit 3011 and carries out judgment again based on statistical processing.

It is also possible to select a judgment process where a point that should be investigated in more detail is clearly established in a judgment by one of the verification units and this is then fed back into a judgment by the other verification unit. In this way, pattern 1 is a method that improves the judgment precision through complimentary use of the first verification unit 3009 and the second verification unit 3011.

Pattern 2 is a pattern that selects a linear judgment process where verification by the first verification unit 3009 and verification by the second verification unit 3011 are carried out in that order.

More specifically, the acquired data verification control unit 3007 first implements verification using the first verification unit 3009 that is capable of judgment in a comparatively short processing time (step S3077) and, if the judgment result is not normal, then switches to verification by the second verification unit 3011 that takes a longer processing time (step S3079). Here, it is assumed that verification by the first verification unit 3009 is a more detailed investigation than verification in the simplified judgment.

When pattern 2 is used, if a judgment of "normal" is produced by the verification by the first verification unit 3009, the acquired data verification control unit 3007 outputs a normal judgment (step S3081) and the flow ends.

In FIG. 66A, a case is assumed where verification by the first verification unit 3009 that is comparatively fast is implemented first, but it is also possible to implement verification by the second verification unit 3011 first.

Pattern 3 is a pattern that selects a parallel judgment process where verification by the first verification unit 3009 and verification by the second verification unit 3011 are used simultaneously.

The acquired data verification control unit 3007 decides whether to carry out verification by both the first verification unit 3009 and the second verification unit 3011 or to carry out verification using only one of such verification units, as well as what attributes to investigate (step S3087). The first verification unit 3009 (step S3089) and the second verification unit 3011 (step S3091) carry out respective investigations, and the acquired data verification control unit 3007 carries out a final judgment based on the investigation results from both processing units (step S3093).

Note that although it is possible to carry out one of the three methods (patterns) described above, it is also possible to carry out the three methods in parallel. It is also possible to adaptively allocate such methods according to the range or the like of attribute information and/or the sensor information to be investigated. It would also be possible to produce a potentially high-speed model by using a plurality of patterns 1 to 3 in parallel instead of just pattern 1 to pattern 3 individually.

(1-25) Flow of Verification Process by First Verification Unit

Figure 67:
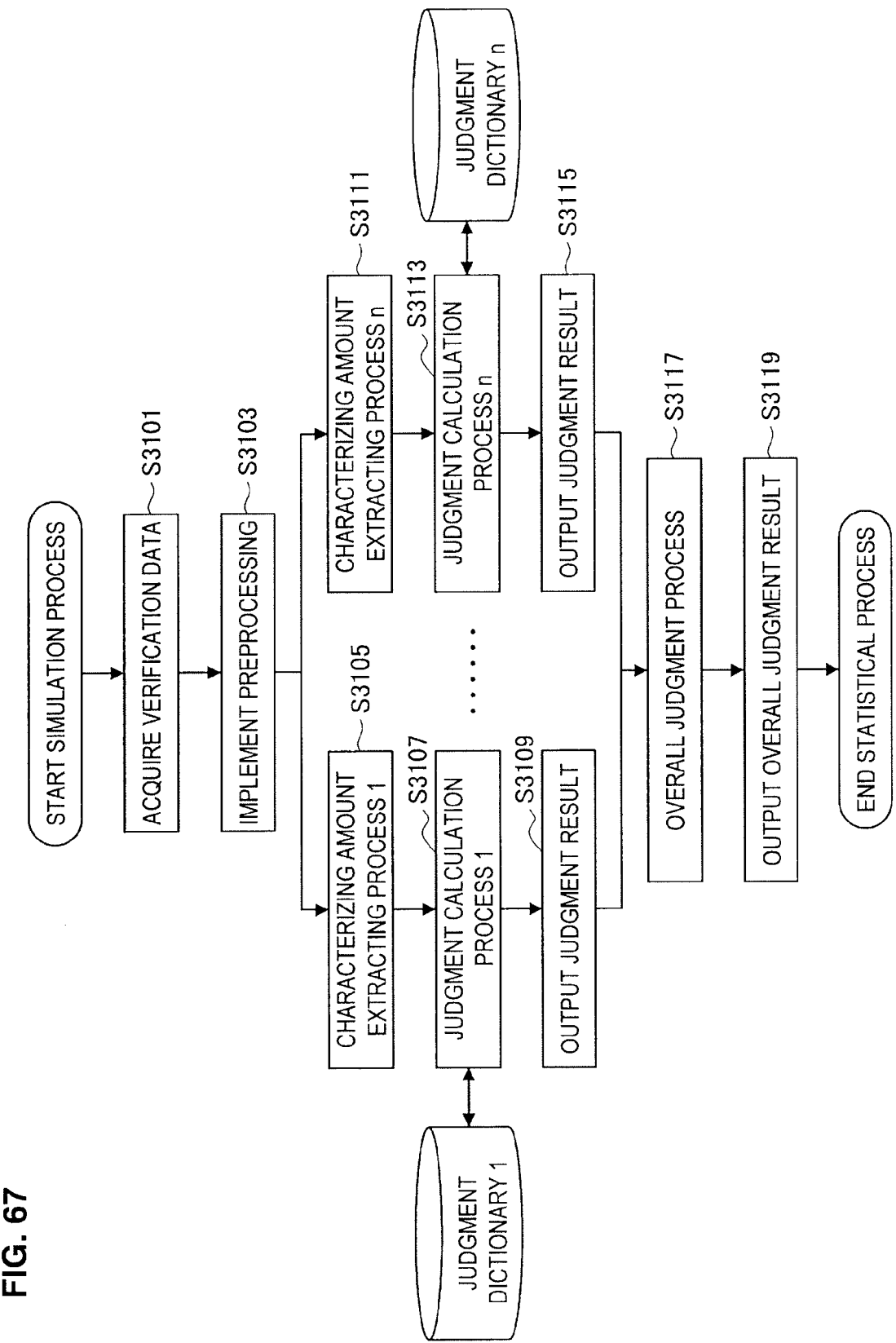
FIG. 67 is a flowchart useful in explaining a verification process of the first verification unit.

Next, the flow of a verification process by the first verification unit will be described with reference to FIG. 67. FIG. 67 is a flowchart useful in explaining the verification process by the first verification unit.

The verification control unit 3031 of the first verification unit 3009 first acquires at least one of battery/sensor information and execution command information for the power management apparatus 11 to be verified as the verification data (step S3101). Next, the operation judging unit 3033 carries out preprocessing that shapes a data format of the acquired information (for example, sensor information of a battery or appliance) (step S3103).

After this, the operation judging unit 3033 designates specified attribute information (for example, appliance information, usage environment information) and, in accordance with the attributes, extracts characterizing amounts from data (sensor information of a battery or appliance, execution command information) that has been shaped by the preprocessing (step S3105). Since typical characterizing amounts for the attribute information designated when characterizing amounts are extracted are calculated in advance from usage history of the power management apparatus to be verified or another power management apparatus, typical characterizing amounts for the designated attribute information will have been stored in the judgment dictionary.

Note that the characterizing amounts are as follows.
characteristic amounts given by battery/sensor information and usage history of a power management apparatus that is not being verified.

characteristic amounts given by battery/sensor information/history of the power management apparatus being verified characteristics of execution commands of a power management apparatus not being verified characteristics of execution commands of the power management apparatus being verified Next, the first operation judging unit 3033 compares a typical characterizing amount for the designated attribute information and the calculated characterizing amount (step S3107) and outputs a judgment result (step S3109). As one example, the operation judging unit 3033 can judge that an abnormality has occurred when the degree of correlation between the two characterizing amounts is low, and can judge that a state is normal when the degree of correlation is high.

Another operation judging unit 3033 may also carry out the same processing for the same characterizing amount or a different characterizing amount (step S3111 to step S3115) and output a judgment result.

After this, the verification control unit 3031 may give a final judgment of normal/abnormal based on judgment results from every operation judging unit 3033 (step S3117). For example, the verification control unit 3031 may give a majority judgment when judgments of normal/abnormal have been given by every operation judging unit 3033. Alternatively, the verification control unit 3031 may use a method where a sum is calculated using a weighting of 1 for normal and 0 for abnormal and a final judgment of normal is given when the sum is equal to or above a threshold. When calculating the degree of correlation or value of a function, the verification control unit 3031 may find a sum having applied the same weightings as above and then judge using a threshold or use some type of function.

The verification control unit 3031 outputs an overall judgment result obtained as described above to the acquired data verification control unit 3007 (step S3119) and ends the verification process. The acquired data verification control unit 3007 outputs the obtained verification result to a power management apparatus, the user himself/herself, and a server or the like that provides other services.

Note that as examples, the operation judging unit 3033 may use a method such as a nearest neighbor rule, a perceptron, a neural network, a support vector machine, multivariate analysis, or boosting as the judging function. The parameters of the judging function can be determined by learning in advance based on data on another power management apparatus 11 and/or physical data.

Note that if an abnormality has been ultimately identified by the process described above, the virus definition file management unit 3037 extracts a pattern from the execution command information for which the abnormality was identified and generates a virus definition file.

(1-26) Testing Process by Database Management Unit

Figure 68:
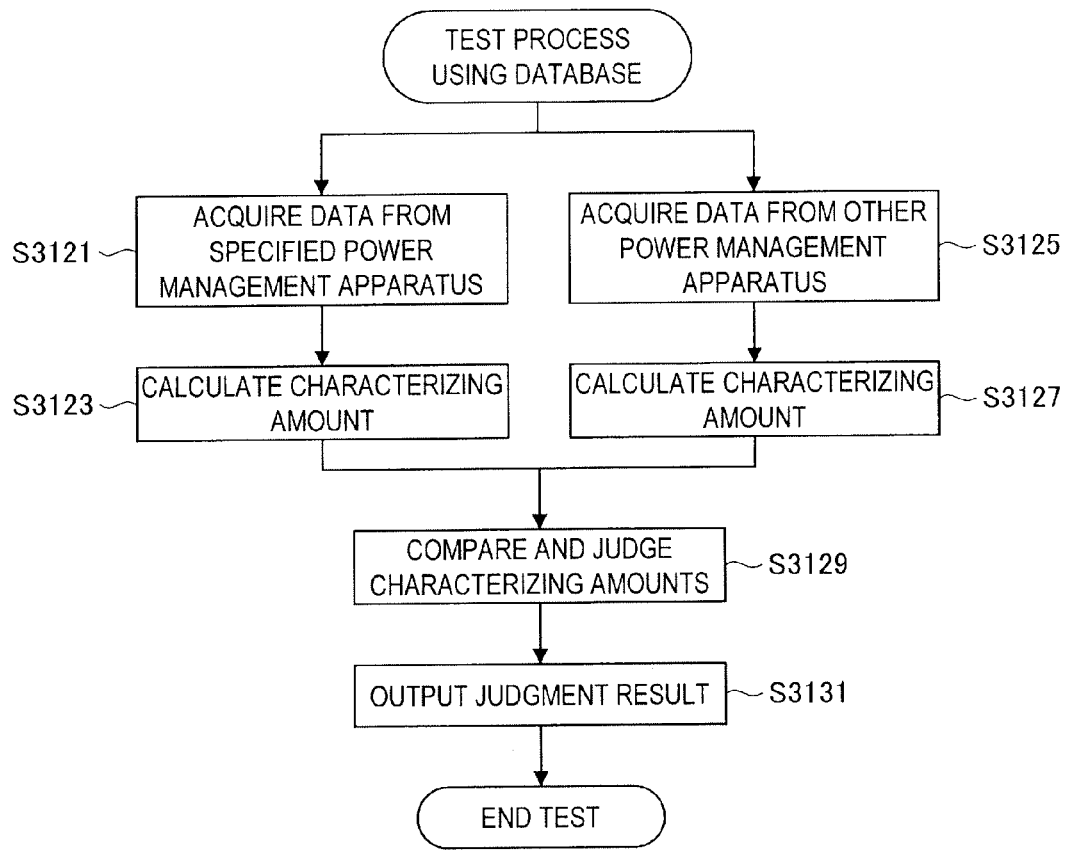
FIG. 68 is a flowchart useful in explaining a testing process by a database management unit.

Next, a testing process for a database management unit 3035 of the first verification unit 3009 will be described with reference to FIG. 68. FIG. 68 is a flowchart useful in explaining the testing process by the database management unit.

In the database management unit 3035, statistics on data acquired from a specified power management apparatus 11 are regularly compared with statistics on data acquired from another power management apparatus and tests are carried out into whether data that has been deliberately generated is present.

To detect abnormal operations by the operation judging unit 3033, the database management unit 3035 normally extracts characterizing amounts for comparison purposes in advance from various information (for example, sensor information of a battery or appliance) gathered from many power management apparatuses.

Here, there is the risk of a malicious power management apparatus 11 transmitting sensor information and the like of a battery or appliance that has been tampered with to manipulate the characterizing amounts. For this reason, by comparing characterizing amounts extracted from usage history information of a specified power management apparatus that has specified attribute information (for example, appliance information and usage environment information) and characterizing amounts extracted from usage history of a plurality of other power management apparatuses with the same attribute information, the virus definition file management unit 3037 detects such an attack.

First, regarding specified attribute information, the database management unit 3035 first obtains sensor information or execution command information of a power management apparatus which is to be judged as malicious or normal (step S3121), and extracts characterizing amounts from the acquired information (step S3123). The database management unit 3035 acquires the same information from a plurality of other power management apparatuses that have the same attribute information (step S3125), and extracts characterizing amounts using the same method (step S3127).

Next, the database management unit 3035 compares the two characteristic amounts that have been extracted and judges whether the specified power management apparatus currently subject to attention is illegally manipulating the characteristic amounts (step S3129) and outputs a final result (step S3131). Alternatively, the database management unit 3035 may carry out the same comparison and judgment for other attributes and then decide the final result. Note that one of the judging functions listed earlier is used for the comparison and judgment of characterizing amounts, with the parameters for such function being calculated in advance by learning.

When the judgment result is that a power management apparatus is malicious, the analysis server 34 informs the user who owns the power management apparatus 11 and/or a service providing server of a power company or the like.

(1-27) Updating of Database and Generation of Judgment Dictionary

Figure 69:
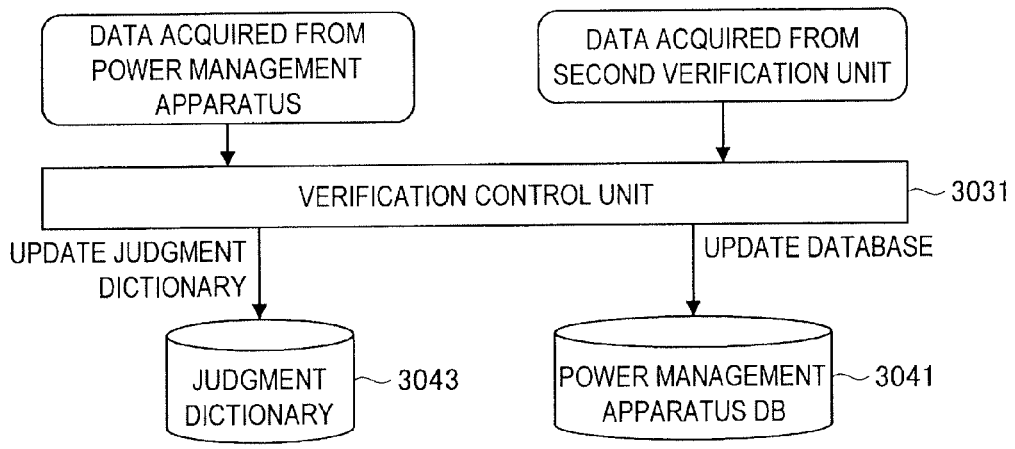
FIG. 69 is a diagram useful in explaining updating of a database and generation of a judgment dictionary by the database management unit.

Next, updating of the database and generation of the judgment dictionary by the database management unit 3035 will be described in brief with reference to FIG. 69. FIG. 69 is a diagram useful in explaining updating of the database and generation of the judgment dictionary by the database management unit.

The database management unit 3035 stores new sensor information and execution command information or the like from the power management apparatus 11 in the power management apparatus database 3041 and also generates the judging dictionary 3043 used by the operation judging unit 3033.

The sensor information and execution command information that are regularly transmitted from the power management apparatus 11 and the appliance information, usage environment information and the like transmitted from the power management apparatus 11 during registration are stored in the power management apparatus database 3041 via the verification control unit 3031. The usage time, usage frequency and the like of a specified power management apparatus 11 are also calculated based on sensor information and are stored in the power management apparatus database 3041.

For respective attributes out of specified attribute information, characterizing amounts extracted based on sensor information, execution command information, and the like of a plurality of power management apparatuses 11 are stored in the judging dictionary 3043 used by the operation judging unit 3033. Since it is imagined that few samples will be stored in the judging dictionary 3043 at an initial stage, physical data relating to respective appliances is transmitted from the power management apparatus 11 and characteristic amounts are estimated. Also, since the number of samples may be low for specified attribute information, in some cases characteristic amounts may be extracted from the physical data and used to correct the characterizing amounts stored in the judging dictionary 3043.

(1-28) Method of Managing Virus Definition File

Figure 70:
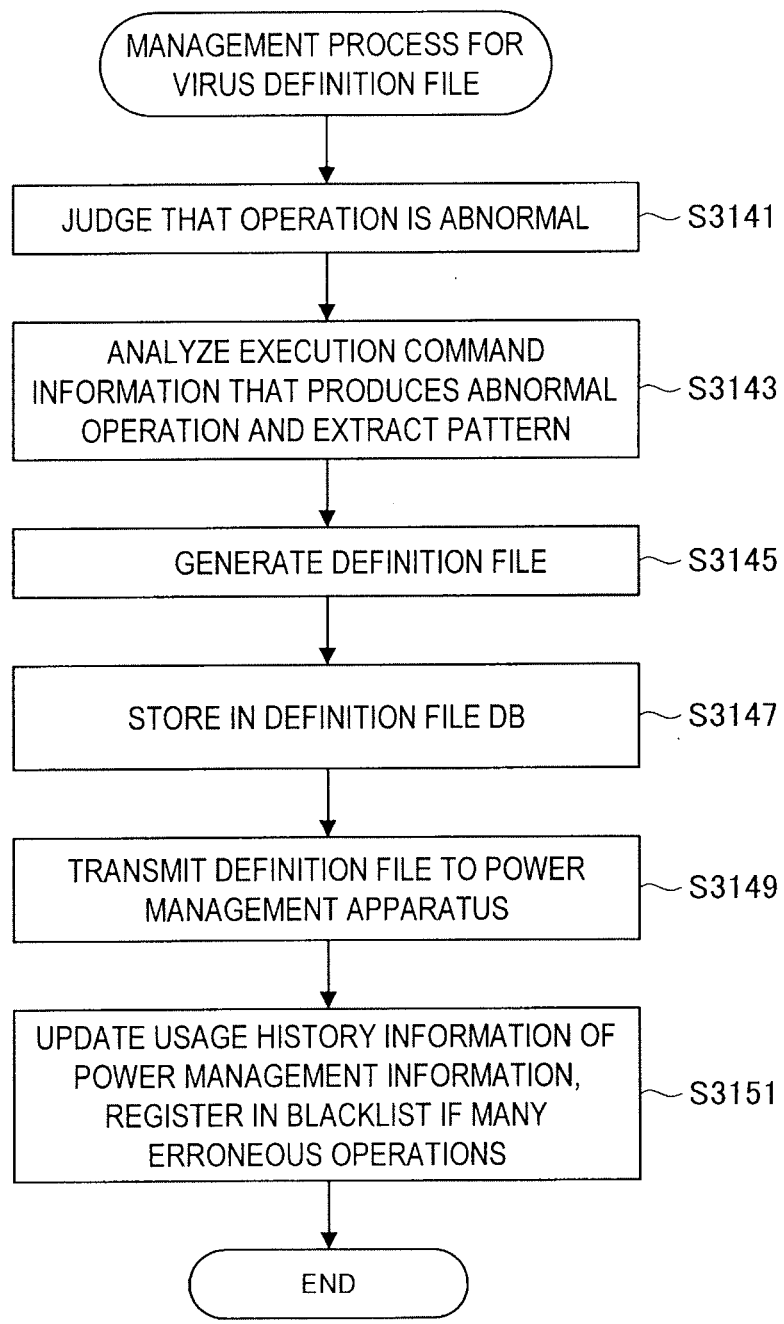
FIG. 70 is a flowchart useful in explaining a method of managing a virus definition file by a virus definition file management unit.

Next, the method of managing a virus definition file carried out by the virus definition file management unit 3037 will be described in brief with reference to FIG. 70. FIG. 70 is a flowchart useful in explaining a method of managing a virus definition file carried out by the virus definition file management unit.

The virus definition file management unit 3037 defines execution command information, which has been judged to be abnormal in a judgment by the operation judging unit 3033, as a virus pattern to generate a virus definition file. After this, the virus definition file management unit 3037 stores the generated virus definition file in the virus definition file database 3045.

Before generating a virus definition file, first, the operation judging unit 3033 judges that the operation of a certain power management apparatus 11 is abnormal (step S3141). After this, the virus definition file management unit 3037 analyzes the execution command information judged to be abnormal by the operation judging unit 3033 and extracts a pattern (step S3143).

Next, the virus definition file management unit 3037 generates a file (virus definition file) based on the extracted pattern (step S3145) and stores the generated definition file in the virus definition file database 3045. The virus definition file management unit 3037 transmits the generated definition file via the acquired data verification control unit 3007 to the power management apparatus 11 (step S3149). Each power management apparatus 11 and the analysis server 34 are capable of using this definition file as a filter for detecting viruses.

The virus definition file management unit 3037 analyzes the usage history information of the power management apparatus 11 including the execution command information from which the pattern was extracted. As a result, if abnormalities are frequently produced from the power management apparatus 11, in some cases the power management apparatus 11 is regarded as a malicious attacker and is registered on a blacklist (step S3151). The virus definition file management unit 3037 may also report the presence of such power management apparatus 11 to a power company.

Note that when a power management apparatus is registered on the blacklist, the reception of communication from the registered power management apparatus is denied and/or other power management apparatuses are warned.

(1-29) Flow of Method of Specifying Battery to be Excluded

Figure 71A:
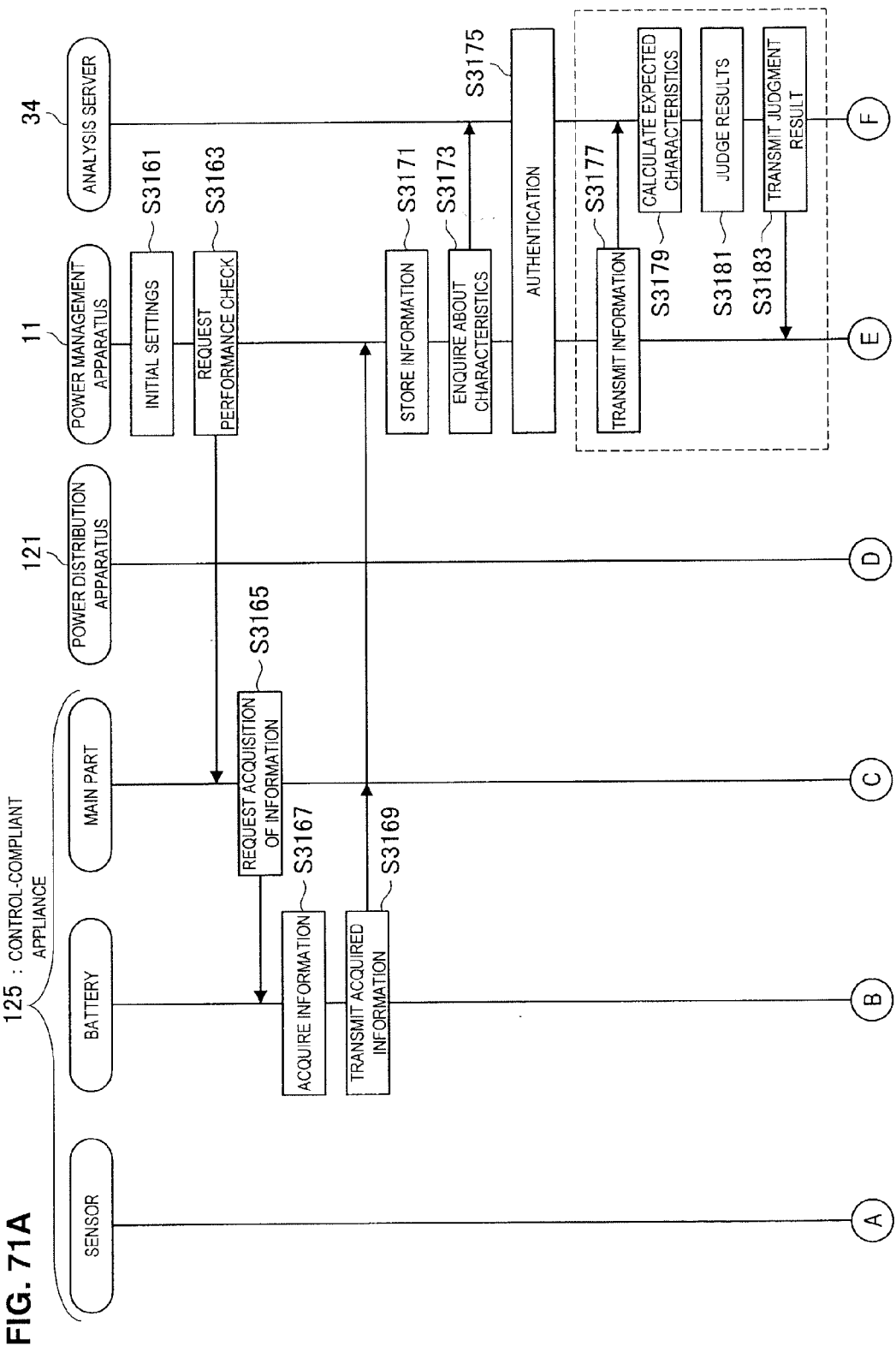
FIG. 71A is a flowchart useful in explaining a method implemented by the acquired data verification unit to specify a battery to be excluded.

Next, the flow of a method implemented by the acquired data verification unit 3005 to specify a battery to be excluded will be described with reference to FIGS. 71A to 72. FIGS. 71A to 72 are flowcharts useful in explaining a method implemented by the acquired data verification unit to specify a battery to be excluded.

Figure 71B:
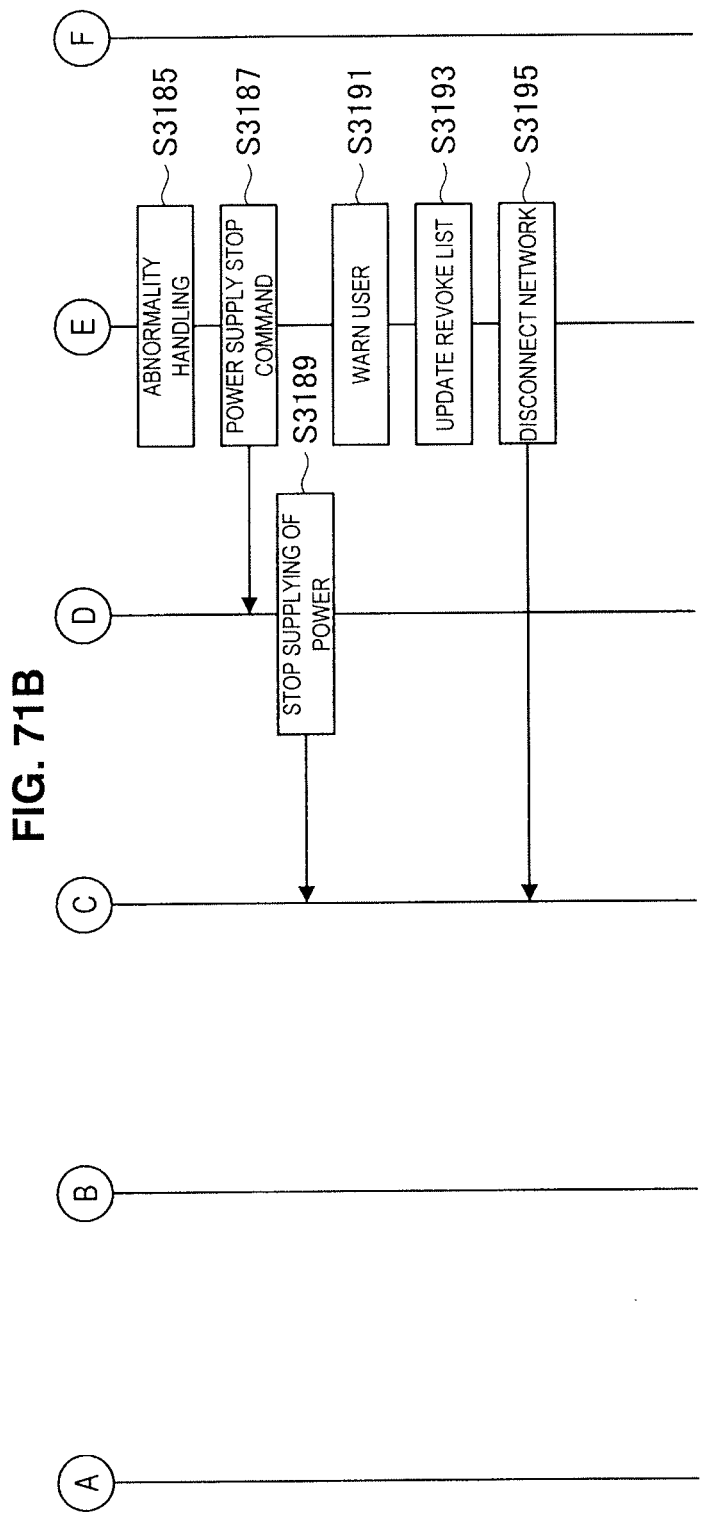
FIG. 71B is a flowchart useful in explaining a method implemented by the acquired data verification unit to specify a battery to be excluded.

First, a process that specifies batteries that correspond to case 3, case 5, and case 6 in FIG. 63 will be described with reference to FIGS. 71A to 71C.

Note that it is assumed that before the following explanation begins, the power management apparatus 11 has been set so as to subscribe to a service that excludes battery risks (that is, a service provided by the analysis server 34) and the execution frequency, timing, and the like of such service is set in advance (step S3161).

If the timing for checking for battery risks has been reached, the system management unit 1125 of the power management apparatus 11 requests a control-compliant appliance 125 that is a managed appliance managed by the power management apparatus 11 to carry out a performance check (step S3163).

A main part of the control-compliant appliance 125 then requests a battery connected thereto to acquire temporary-state information (that is, cell characteristics) D1 relating to voltage/current/remaining charge/impedance/load and the like relating to the battery and appliance information D2 (step S3165).

The battery connected to the control-compliant appliance 125 acquires the information D1 and D2 (step S3167) and transmits such information and ID information of the battery via the main part of the control-compliant appliance 125 to the power management apparatus 11 (step S3169).

The appliance management unit 1121 of the power management apparatus 11 stores the acquired information in a database stored in the power management apparatus 11 (step S3171). The power management apparatus 11 also makes a specific enquiry to the analysis server 34 (step S3173). After this, the power management apparatus 11 carries out authentication with the analysis server 34 (step S3175) and establishes a communication path with the analysis server 34.

Next, the system management unit 1125 of the power management apparatus 11 transmits the acquired information (D1, D2, and ID information of the battery) to the analysis server 34 (step S3177).

The second verification unit 3011 of the acquired data verification unit 3005 in the analysis server 34 uses the acquired data to carry out a characteristic estimation calculation (step S3179) to calculate estimated characteristic values relating to the information D1 and D2. After this, the second verification unit 3011 calculates discrepancies between the actual measurements and the estimated values and judges the result (step S3181). Next, the analysis server 34 transmits the obtained judgment result to the power management apparatus 11 (step S3183).

Here, the judgment results obtained in step S3181 are expected to be as follows for the respective cases.
(Case 3)
Discrepancy for D1: Outside Specified Range, Discrepancy for D2: Outside Specified Range
(Case 5)
Discrepancy for D1: Outside Specified Range, Discrepancy for D2: Outside Specified Range
(Case 6)
Discrepancy for D1: Outside Specified Range, Discrepancy for D2: Outside Specified Range The power management apparatus 11 that has acquired such judgment result carries out processing for handling the abnormality (step S3185). More specifically, the appliance management unit 1121 of the power management apparatus 11 commands the power distribution apparatus 121 to stop supplying power to the control-compliant appliance 125 where the abnormality has occurred (step S3187). The power distribution apparatus 121 receives the command and stops the supplying of power to the control-compliant appliance 125 (step S3189).

Meanwhile, the system management unit 1125 of the power management apparatus 11 issues a warning to the user (step S3191) and updates a revoke list (step S3193). After this, the power management apparatus 11 disconnects the network of the control-compliant appliance 125 in question (step S3195).

Figure 71C:
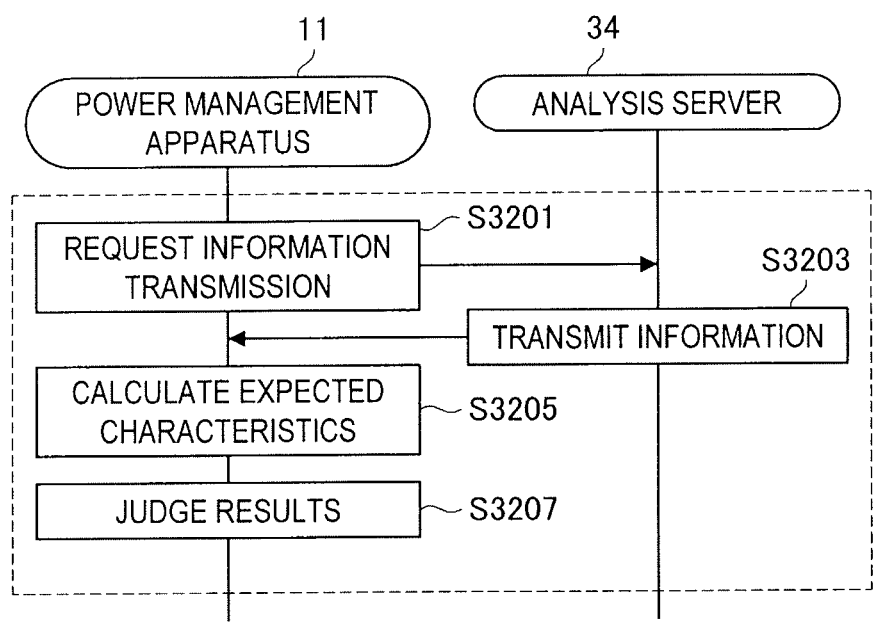
FIG. 71C is a flowchart useful in explaining a method implemented by the acquired data verification unit to specify a battery to be excluded.

Note that although a process where the analysis server 34 specifies a battery to be excluded is shown in FIG. 71A, if the power management apparatus 11 has a function for calculating the estimated characteristic values, the process shown in FIG. 71C may be carried out in place of steps S3177 to S3183 in FIG. 71A. More specifically, the power management apparatus 11 requests information, such as characteristic values, that is necessary to calculate the estimated characteristic values from the analysis server 34 (step S3201). On receiving such request, the analysis server 34 transmits the information necessary to calculate the estimated characteristic values to the power management apparatus 11 (step S3203). After this, the power management apparatus 11 uses the acquired information to calculate the estimated characteristic values (step S3205) and judges the result (step S3207). By carrying out processing in this way, it is possible for the power management apparatus 11 also to specify batteries to be excluded.

Next, the flow for specifying and excluding batteries that correspond to case 7 will be described with reference to FIG. 72. The processing up to the specifying of batteries that correspond to case 7 is the same as steps S3161 to S3183 shown in FIG. 71A. However, the judging result for batteries that correspond to case 7 is as follows.
(Case 7)
Discrepancy for D1: Outside Specified Range, Discrepancy for D2: Within Specified Range The power management apparatus 11 that has acquired the above judging result carries out processing to handle the abnormality (step S3211). More specifically, the appliance management unit 1121 of the power management apparatus 11 transmits a sensor check command and a command that increases the check frequency to the control-compliant appliance 125 (step S3213). On receiving such a command, the control-compliant appliance 125 implements the received command and requests the sensor to carry out measurement (step S3215). As a result, the sensor outputs sensor information relating to a warning (step S3217).

The power management apparatus 11 that has acquired the sensor information relating to a warning commands the power distribution apparatus 121 to stop supplying power to the control-compliant appliance 125 where the abnormality occurred (step S3219). The power distribution apparatus 121 receives the command and stops supplying power to the control-compliant appliance 125 (step S3221).

Meanwhile, the system management unit 1125 of the power management apparatus 11 issues a warning to the user (step S3223) and updates the revoke list (step S3225). After this, the power management apparatus 11 disconnects the network of the control-compliant appliance 125 in question (step S3227).

This completes the description of the flow of the method of specifying batteries to be excluded and the method of excluding batteries.

Due to the presence of the analysis server 34 described above, it is possible to protect the power management apparatus 11 not only from existing attacks but also from unknown attacks. The acquired data verification unit 3005 of the analysis server 34 according to the present embodiment has a function that is capable of judgments that are heuristic or based on physical analysis, which means that judging can be carried out at high speed when a problem has not occurred.

Also, by using verification results produced by the acquired data verification unit 3005, it is possible to specify appliances where a discrepancy has been identified for physical information or digital information obtained from any of a legitimate battery and an illegal battery such as a copy. By doing so, it is possible to remove a problematic battery from the local power management system 1 or to stop supplying power to such battery. Various safety measures are enacted for batteries, but even when control is not possible via such safety measures, it is possible via the present method to ensure that safety is maintained.

(1-30) Processing when Multiple Power Management Apparatuses are Present

Next, the processing when a plurality of power management apparatuses 11 are present in the local power management system 1 will be described with reference to FIGS. 73 to 75.

Here, use of multiple power management apparatuses 11 will be described with reference to FIGS. 73 to 75. As described above, a power management apparatus 11 acts as an overall manager over the supplying of power to appliances and the like in the local power management system 1. This means that if the power management apparatus 11 fails or stops due to a software update, it becomes no longer possible to use the appliances and the like in the local power management system 1. In readiness for such situation, it is preferable to use multiple power management apparatuses 11. However, a power management apparatus 11 acts as an overall manager for information relating to power and controls the various appliances and the like in the local power management system 1. This means that certain measures are wanted to cause a plurality of power management apparatuses 11 to safely and efficiently carry out complex management and control. One conceivable measure is the method shown in FIGS. 73 to 75.

Control Operation

First, a method of controlling the appliances and the like using multiple power management apparatuses 11 will be described with reference to FIG. 73. Note that cooperative operation by a plurality of power management apparatuses 11 is realized by the functions of the system management unit 1125 included in the information management unit 112.

Figure 73:
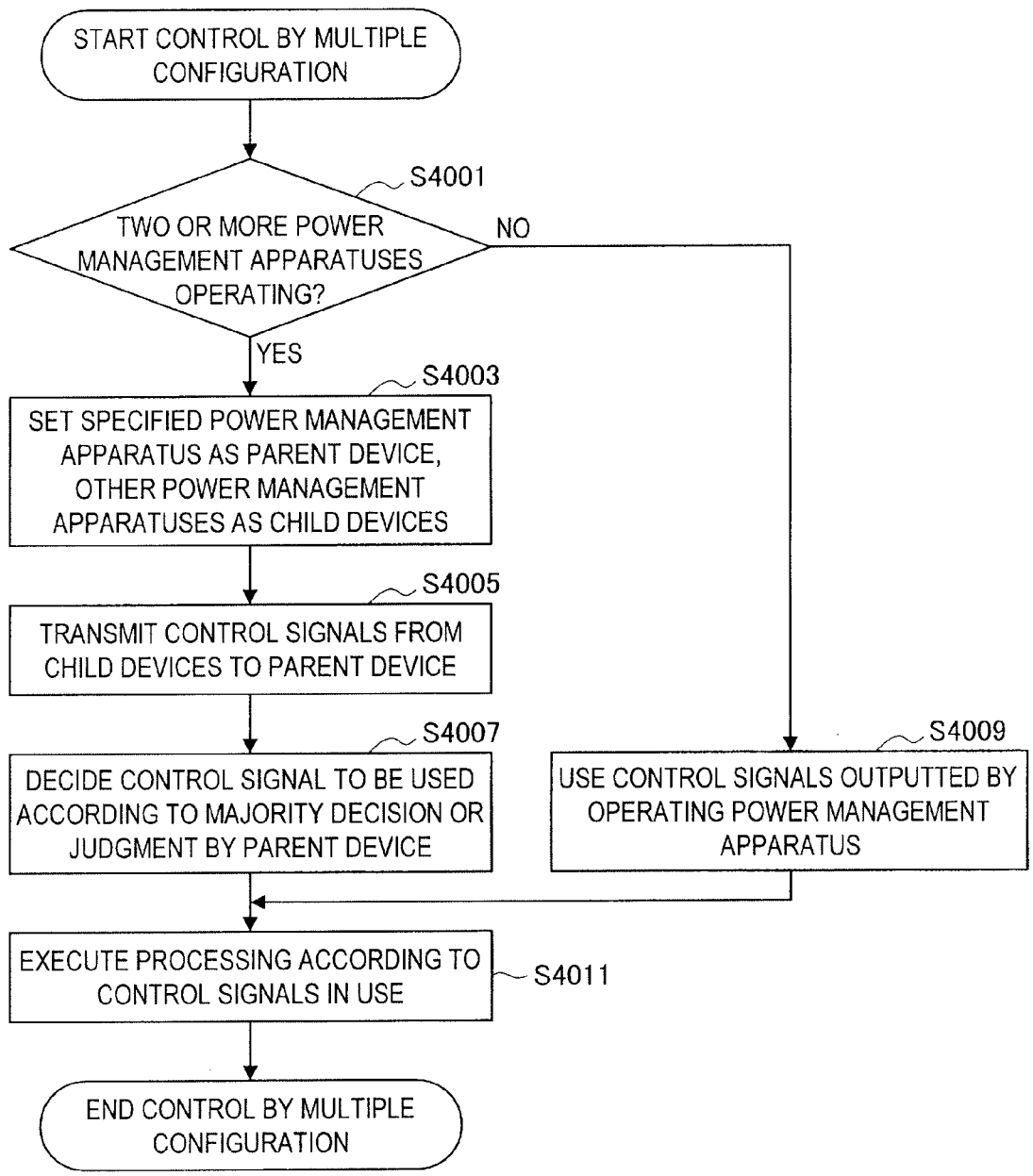
FIG. 73 is a diagram useful in explaining the operation flow of multiple power management apparatuses.

As shown in FIG. 73, first, the system management unit 1125 checks whether two or more power management apparatuses 11 are operating (step S4001). When doing so, the system management unit 1125 uses the functions of the local communication unit 111 to enquire to the system management units 1125 of other power management apparatuses 11 and check whether such power management apparatuses 11 are operating. When two or more power management apparatuses 11 are operating, the processing of the system management unit 1125 proceeds to step S4003. Meanwhile, when no other power management apparatuses 11 are operating, the processing of the system management unit 1125 proceeds to step S4009.

When the processing has proceeded to step S4003 from step S4001, the system management unit 1125 sets a specified power management apparatus 11 as a parent device and sets the remaining power management apparatuses 11 as child devices (step S4003). For example, when a priority-based order for setting power management apparatuses as the parent device has been decided in advance, the power management apparatus 11 with the highest priority ranking is set as the parent device. Note that the expressions "parent device" and "child device" used here refer to an attribute of a power management apparatus 11. By setting this attribute, a power management apparatus 11 with a "child device" attribute transmits a control signal to a power management apparatus 11 with a "parent device" attribute when controlling an appliance or the like (step S4005).

When control signals have been transmitted from a plurality of child devices to the parent device, the system management unit 1125 of the parent device decides the control signal to be transmitted to an appliance or the like based on a majority decision or a judgment by the parent device (randomly or according to a predetermined condition) (step S4007). Once the control signal has been decided, the control unit 115 transmits the control signal decided by the system management unit 1125 to the appliance or the like to cause the appliance or the like to carry out processing according to the control signal (step S4011) and ends the series of processes. Meanwhile, when the processing has proceeded to step S4009 from step S4001, the control unit 115 transmits a self-created control signal to the appliance or the like to cause the appliance or the like to carry out processing according to the control signal (step S4009) and ends the series of processes.

In this way, the system management unit 1125 has a function for setting the attribute of each power management apparatus 11 and a function for selecting a control signal. The system management unit 1125 is capable of efficiently controlling appliances and the like using such functions. It is also possible, when one or more power management apparatuses 11 have broken down or have stopped for updating purposes, to have another power management apparatus 11 continue power management and thereby avoid a situation where appliances and the like become unusable.

Operation During Updating

Next, a method of updating the software (or "firmware") that defines the fundamental operation of the power management apparatus 11 will be described with reference to FIGS. 74 and 75. Note that the updating process for the firmware is realized by a function of the system management unit 1125. Here, it is assumed that N power management apparatuses 11 are operating within the local power management system 1.

Figure 74:
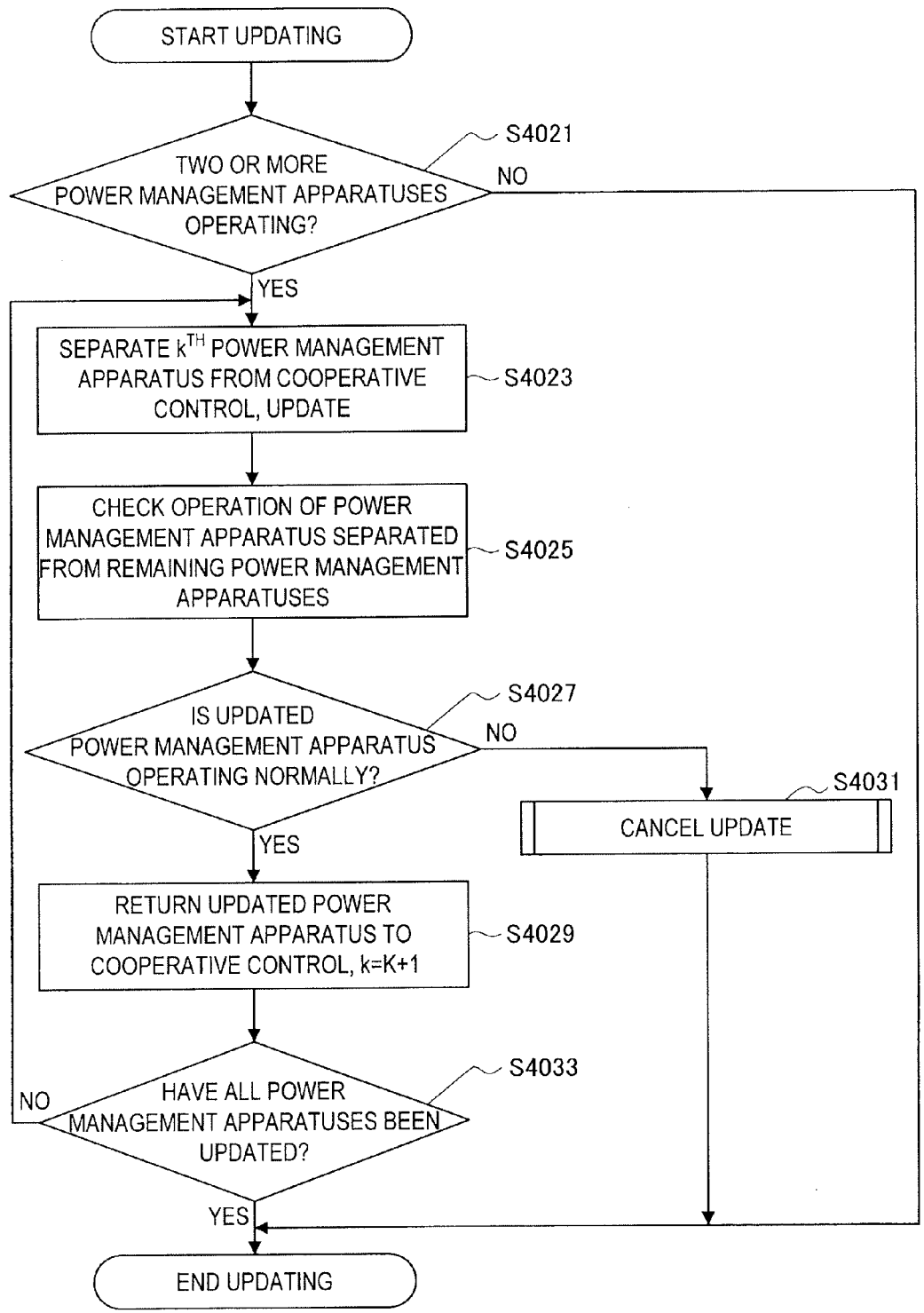
FIG. 74 is a diagram useful in explaining the operation flow of multiple power management apparatuses.

As shown in FIG. 74, the system management unit 1125 first checks whether two or more power management apparatuses 11 are operating (step S4021). When two or more power management apparatuses 11 are operating, the processing of the system management unit 1125 proceeds to step S4023. Meanwhile, when no other power management apparatus 11 is operating, the system management unit 1125 ends the series of processes relating to updating.

When processing has proceeded to step S4023, the system management unit 1125 removes the first power management apparatus 11 to be updated from the cooperative operation and carries out updating (step S4023). When doing so, the system management unit 1125 of the power management apparatus 11 that has been removed from the cooperative operation acquires the latest firmware from the system management server 33 and updates the old firmware to the latest firmware. When the updating of the firmware has been completed, the remaining power management apparatuses 11 that are operating cooperatively check the operation of the power management apparatus 11 whose updating has been completed (steps S4025, S4027).

If the power management apparatus 11 is operating normally, the processing proceeds to step S4029. Meanwhile, if the updated power management apparatus 11 is not operating normally, the processing proceeds to step S4031. When the processing has proceeded to step S4029, the system management units 1125 of the plurality of power management apparatuses 11 that include the updated power management apparatus 11 return the updated power management apparatus 11 to the cooperative operation (step S4029), and change the power management apparatus 11 to be updated. At this time, it is checked whether the updating has been completed for all N power management apparatuses 11 (step S4033), and when the updating of N apparatuses is complete, the updating process ends.

Meanwhile, when the updating has not been completed for all N power management apparatuses 11, the processing returns to step S4023 and the updating process is carried out on the next power management apparatus 11 to be updated. In this way, the processing in steps S4023 to S4029 is repeatedly executed until the updating of all N power management apparatuses 11 has been completed. However, when the processing has proceeded from step S4027 to step S4031, an updating cancelling process is carried out (step S4031), and the series of processes relating to updating is completed.

Here, the updating cancelling process will be described with reference to FIG. 75.

Figure 75:
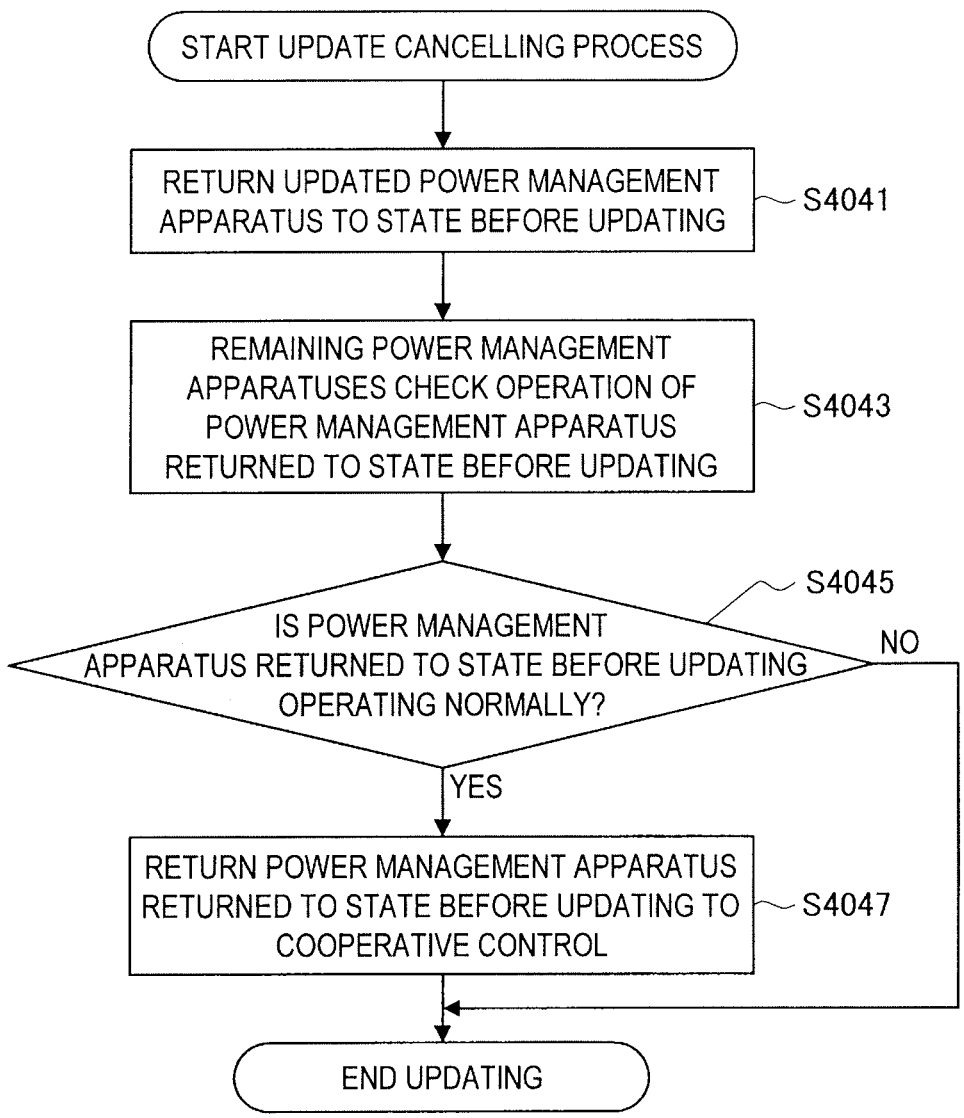
FIG. 75 is a diagram useful in explaining the operation flow of multiple power management apparatuses.

As shown in FIG. 75, when the updating cancelling process is commenced, the system management unit 1125 of the updated power management apparatus 11 returns the firmware of the updated power management apparatus 11 to the state before updating (step S4041). After this, the system management units 1125 of the remaining power management apparatuses 11 that are operating cooperatively check whether the power management apparatus 11 that has been returned to the state before updating is operating normally (steps S4043, S4045).

If the power management apparatus 11 that has been returned to the state before updating is operating normally, the processing proceeds to step S4047. Meanwhile, if the power management apparatus 11 that has been returned to the state before updating is not operating normally, the updating cancelling process ends in this state. When the processing has proceeded to step S4047, the system management units 1125 of the plurality of power management apparatuses 11 that include the power management apparatus 11 that has been returned to the state before updating return the power management apparatus 11 that has been returned to the state before updating to the cooperative operation (step S4047) and the updating cancelling process ends.

In this way, during updating, processes that separate a power management apparatus 11 to be updated from cooperative operation and return the power management apparatus 11 to cooperative operation when normal operation has been confirmed after updating are carried out. If the updating has failed, a process is also carried out that checks for normal operation after the power management apparatus has been returned to the state before updating and then returns the power management apparatus 11 to cooperative control if normal operation has been confirmed. By using this configuration, the updating can be carried out without affecting the power management apparatuses 11 that are operating cooperatively and ensures safe operation of the power management apparatuses 11.

(2) Second Embodiment
(2-1) Overview of Second Embodiment

A local power management system is one sign of a transformation to a low-energy society, but at present, such systems are yet to become widespread due to the work necessary for installation. This situation means that it is important to add other attractive aspects to system installation and use so as to encourage more users to install systems and thereby realize a low-energy society. One example of such an additional attraction would be to provide entertainment (such as a game) that is linked to a local power management system.

Most video games currently on sale are fictional. Although some games, such as games relating to historical events or sports, use the names of real people and places and/or use actual footage in game video, the games themselves have no connection to actual society or to real life. For this reason, in a second embodiment of the present invention described below, a real-life game with a storyline where the game content itself can lead to reduced energy use in individual local power management systems (for example, household systems) is proposed.

In addition, games in the past have only been able to interest the user and provide satisfaction and a sense of achievement in the form of intangibles such as points, items collected within the game, and the clearing of stages. However, with system-linked entertainment such as that described below, effective gameplay and strategies in the game can be implemented in the operation of an actual local power management system. By doing so, the system-linked entertainment according to the present embodiment has aspects that lead to real-world benefits such as actual control over power, reducing power consumption, contributing to a reduction in $CO_2$, and profiting from selling power, and at the same time has a tangible effect whereby the user can gain real-world knowledge.

As should be clear from the above, by using the system-linked entertainment described below, the user can have fun while engaging in an eco-friendly activity, such as reducing power consumption.

Note that although the present embodiment is an example applied to a local power management system, it is also possible to apply the present invention to any game that is linked to the real world and has tangible effects.

The system-linked entertainment is realized by the service providing unit 118 of the power management apparatus 11 operating so as to be linked to the various processing units of the power management apparatus 11 and a service providing server 31 (game service providing server) present outside the local power management system 1. Also, by operating a control-compliant appliance 125 that is capable of connecting to the power management apparatus 11, the user is capable of enjoying system-linked entertainment, as represented by a game.

(2-2) Configuration of Service Providing Unit

Figure 76:
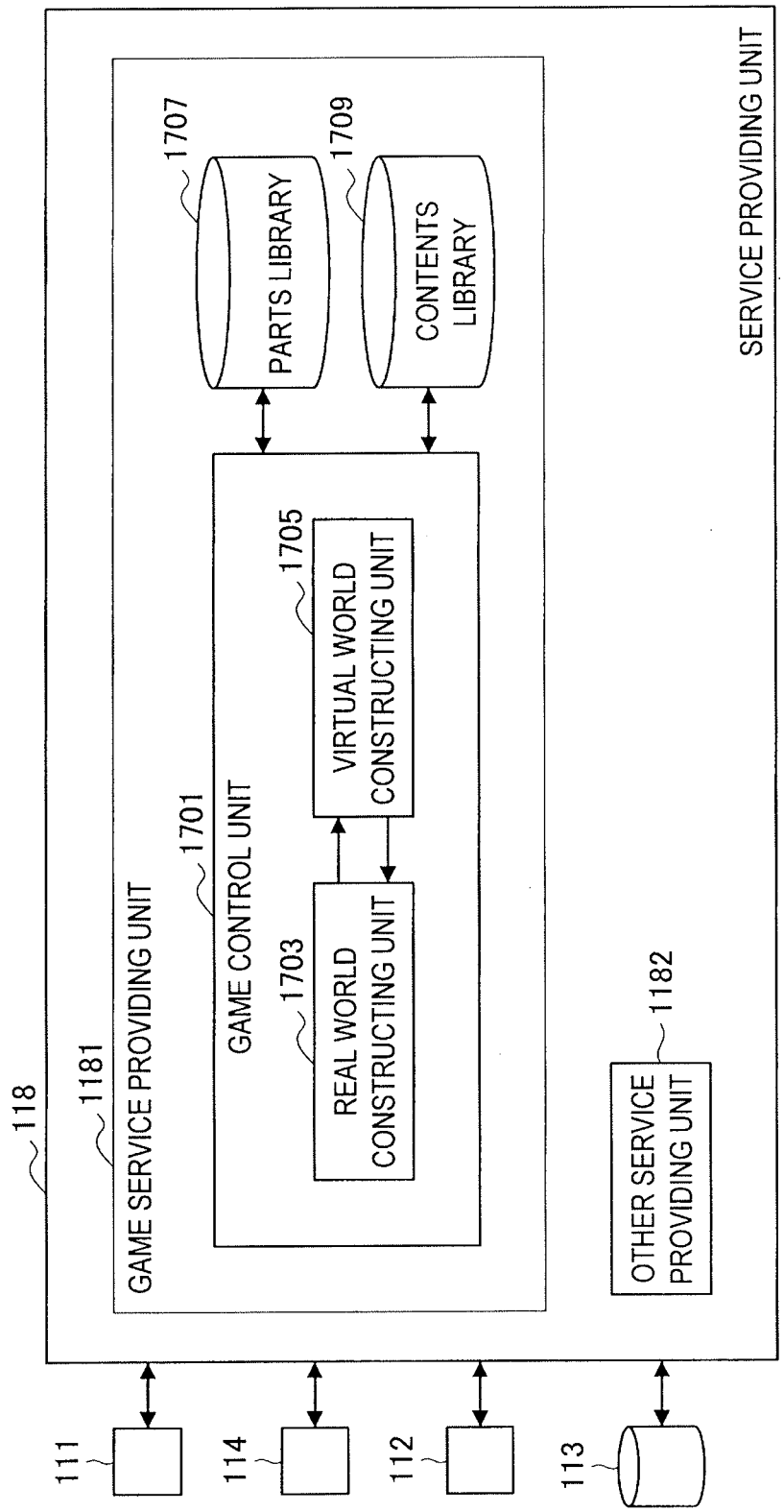
FIG. 76 is a block diagram useful in explaining the configuration of a service providing unit of a power management apparatus.
Figure 77:
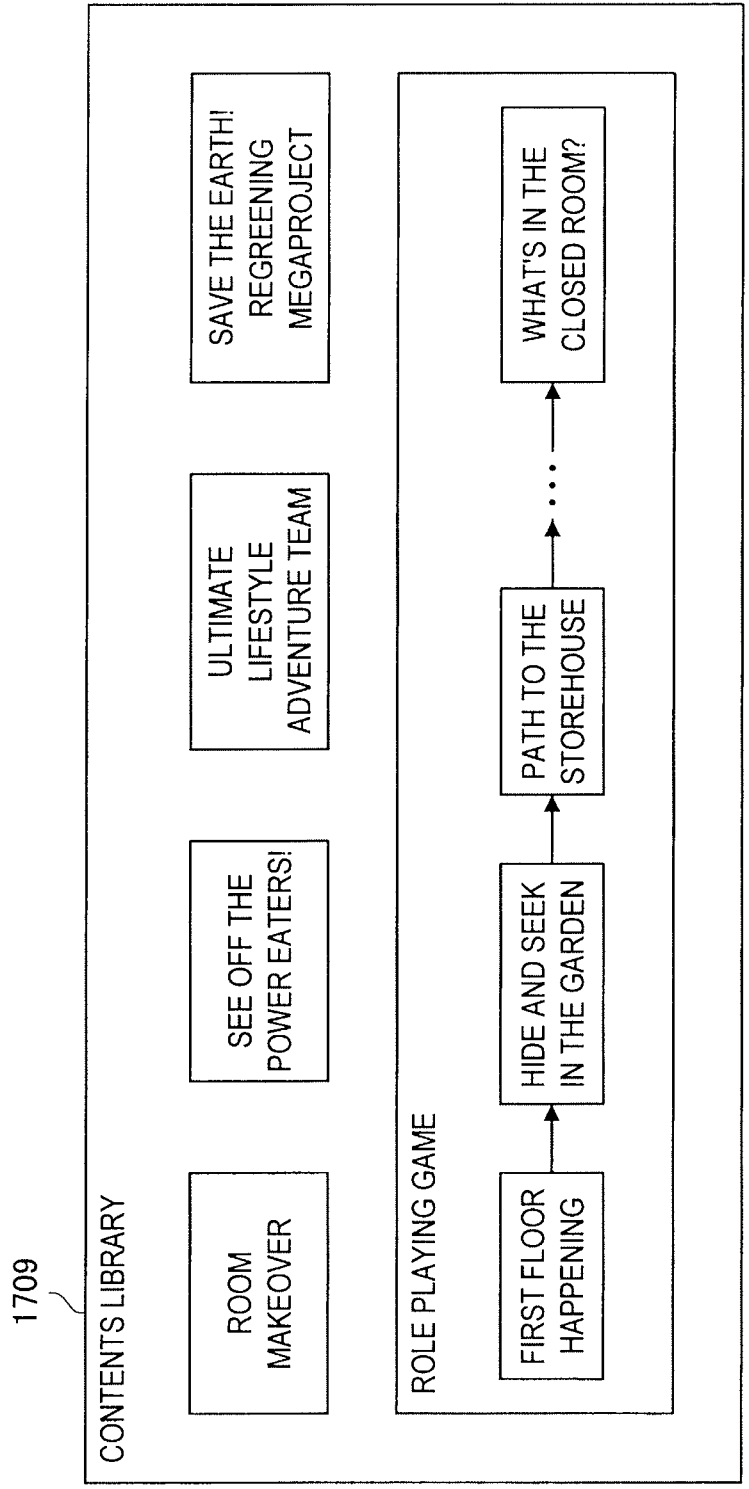
FIG. 77 is a block diagram useful in explaining the configuration of a service providing unit of a power management apparatus.

First, the configuration of the service providing unit 118 of the power management apparatus 11 will be described with reference to FIGS. 76 and 77. FIGS. 76 and 77 are block diagrams useful in explaining the configuration of a service providing unit of the power management apparatus.

Note that it is assumed that the power management apparatus 11 according to the present embodiment includes the processing units of the power management apparatus 11 according to the first embodiment of the present invention and is capable of realizing the same functions as the power management apparatus 11 according to the first embodiment.

The service providing unit 118 is realized by a CPU, a ROM, a RAM, and the like, for example. As shown in FIG. 76, the service providing unit 118 includes a game service providing unit 1181 and an "other service" providing unit 1182.

The game service providing unit 1181 is realized by a CPU, a ROM, a RAM, and the like, for example. The game service providing unit 1181 includes a game control unit 1701, a parts library 1707, and a contents library 1709.

The game control unit 1701 is realized by a CPU, a ROM, a RAM, and the like, for example. The game control unit 1701 is a processing unit that links to the parts library 1707 and the game service providing server 31 and makes fundamental settings of a game, such as the background story and stages of the game. Also, when a game program stored in the contents library 1709 and/or the game service providing server 31 is being executed, the game control unit 1701 controls the execution of the game program to control how the game progresses. The game control unit 1701 includes a real world constructing unit 1703 and a virtual world constructing unit 1705.

The real world constructing unit 1703 is realized by a CPU, a ROM, a RAM, and the like, for example. The real world constructing unit 1703 refers to a database stored in the storage unit 113 or the like of the power management apparatus 11 and constructs a real world in which information on the actual local power management system 1 is incorporated.

The virtual world constructing unit 1705 is realized by a CPU, a ROM, a RAM, and the like, for example. The virtual world constructing unit 1705 constructs a virtual world that is provided in advance in a content program.

The game control unit 1701 realizes the system-linked entertainment while linking the real world constructing unit 1703 and the virtual world constructing unit 1705 to one another.

The game control unit 1701 is capable of accessing a database in the power management apparatus 11 and also has a control execution path for the power management apparatus 11.

The game controlled by the game control unit 1701 includes members of another local power management system 1 in the characters and enables users to enjoy match-ups or to remotely operate the game as members of a role playing game. Note that when the participation of members of other systems is permitted, the members of such other systems should preferably be prevented from accessing the real world for the present system 1.

The parts library 1707 is a database provided in the game service providing unit 1181. Information relating to parts such as virtual furniture, virtual appliances, and characters that appear in game contents and items and the like that appear during a game is recorded in the parts library 1707. Note that the parts library 1707 may be present in the game service providing server 31.

The contents library 1709 is another database provided in the game service providing unit 1181. Various actual programs of game contents that can be executed by the power management apparatus 11 are stored in the contents library 1709.

FIG. 77 shows one example of a game content stored in the contents library 1709. A specific example of a game content will be described in brief below.

Room Makeover (Real World Game)

This is a game with a concept of changing the layout of furniture and household appliances from the present layout of a room, coordinating curtains and carpets, buying new furniture and household appliances, and competing to produce an interior design with the best colors and taste. This game makes it possible for the user to grasp how the total amount of power used by appliances changes as a result of changing the room layout or to grasp what happens to the amount of power when a new household appliance has been bought and set up. Here, libraries that are capable of displaying items with real-world attributes such as the manufacturer, design, and power consumption are provided. Such libraries may be stored in the game service providing server 31. For improved items that are linked to the real world, it is possible to implement "result application mode" (a mode where game results are applied to the real-world system).

See Off the Power Eaters! (Real World+Virtual World Game)

The game displays current power usage in the present room and turns off unnecessary lights. The game also allows the user to compete to reduce power and/or to profit from selling more electricity by making adjustments to lighting, volume, and the like. Result application mode can be implemented for this part of the game. The game also has a concept of a virtual world in which "power eaters" go around turning on lights and the user competes to fight off such "power eaters" as best as he/she can.

Ultimate Lifestyle Adventure Team (Real World+Virtual World Game)

This game is composed of a stage where users aim to achieve the ultimate low consumption lifestyle using appliances that are present in the actual home and a stage where users aim for the ultimate lifestyle using appliances in a virtual home.

Save the Earth! Regreening Megaproject (Virtual World Game)

This game has a concept where the user tries to survive the global warming crisis caused by $CO_2$ emissions. The user assumes the role of the environment minister of a country and progresses through stages while grasping domestic public opinion and negotiating with other countries. This is an intelligent game that is capable of using real-world statistics and situations to enable advanced learning about the environment.

Role Playing Game (Real World+Virtual World Game)

This game has a stage that links only the first floor to the real world, with other stages providing virtual environments (as examples, a garden, a storehouse, and a closed room) in a matching form in which a story then progresses. In the real world stage, result application mode can be implemented for game results that can be reflected in the power state.

(2-3) Linking to Database

Figure 78:
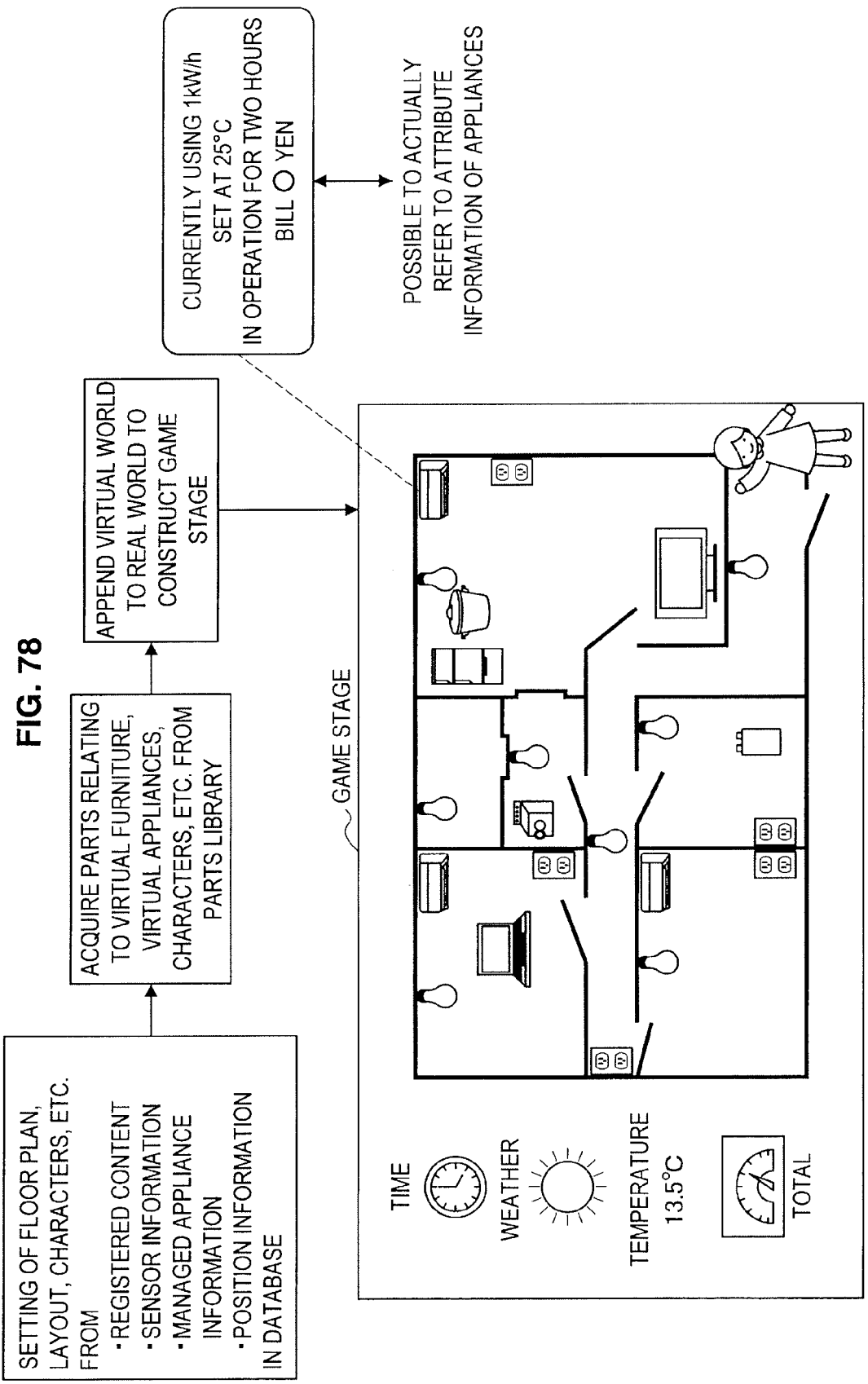
FIG. 78 is a diagram useful in explaining linking to a database in a power management apparatus.

Next, linking to a database of the power management apparatus 11 in which various information showing a state of the real-world local power management system 1 is stored will be described with reference to FIG. 78. FIG. 78 is a diagram useful in explaining linking to a database in a power management apparatus.

As examples, the data shown below is stored in a database stored in the power management apparatus 11.

- appliance information on control-compliant appliances, electric vehicles, power generating apparatuses, power storage apparatuses, batteries of appliances, control-compliant outlets, outlet expansion apparatuses, and the like
- power information (usage/power storage state) and position information relating to the apparatuses described above
- registered users and access rights
- power billing information and account information
- time, weather, temperature By using such data, the game control unit 1701 reproduces the real world in a game.

By arranging such appliances, the real world constructing unit 1703 is capable of imagining the overall floor plan of a game stage. For example, it is possible to imagine a floor plan, by assuming that the presence of a refrigerator or the like denotes a dining area, a personal computer or lamp denotes a private room, a washing machine denotes a bathroom or washroom area, an electric vehicle denotes a garage, and a light denotes a corridor. The real world constructing unit 1703 decides a floor plan based on such assumptions, and arranges items representing appliances, furniture, and the like from the parts library 1707.

The real world constructing unit 1703 decides the characters of a game based on the registered user information. In a real world, actual appliances and attributes of items are linked, so that it is possible to display such appliances and in result application mode to carry out actions such as switching the power off. Accordingly, when an object such as an icon of an appliance disposed on a display screen or the like has been selected by the user, various information written in a database, such as appliance information, power information, and the like of the selected appliance, is displayed.

Since the game stages will be limited when only the real world is used in the game, the virtual world constructing unit 1703 adds a virtual world set in advance in the game contents to the game stages set based on the real world to configure more game stages (story backgrounds).

In FIG. 78, a state where the real world is display in a display area of a display device is shown. The user is capable of enjoying the game on this stage while operating the main character.

(2-4) Security for System-Linked Entertainment

Figure 79:
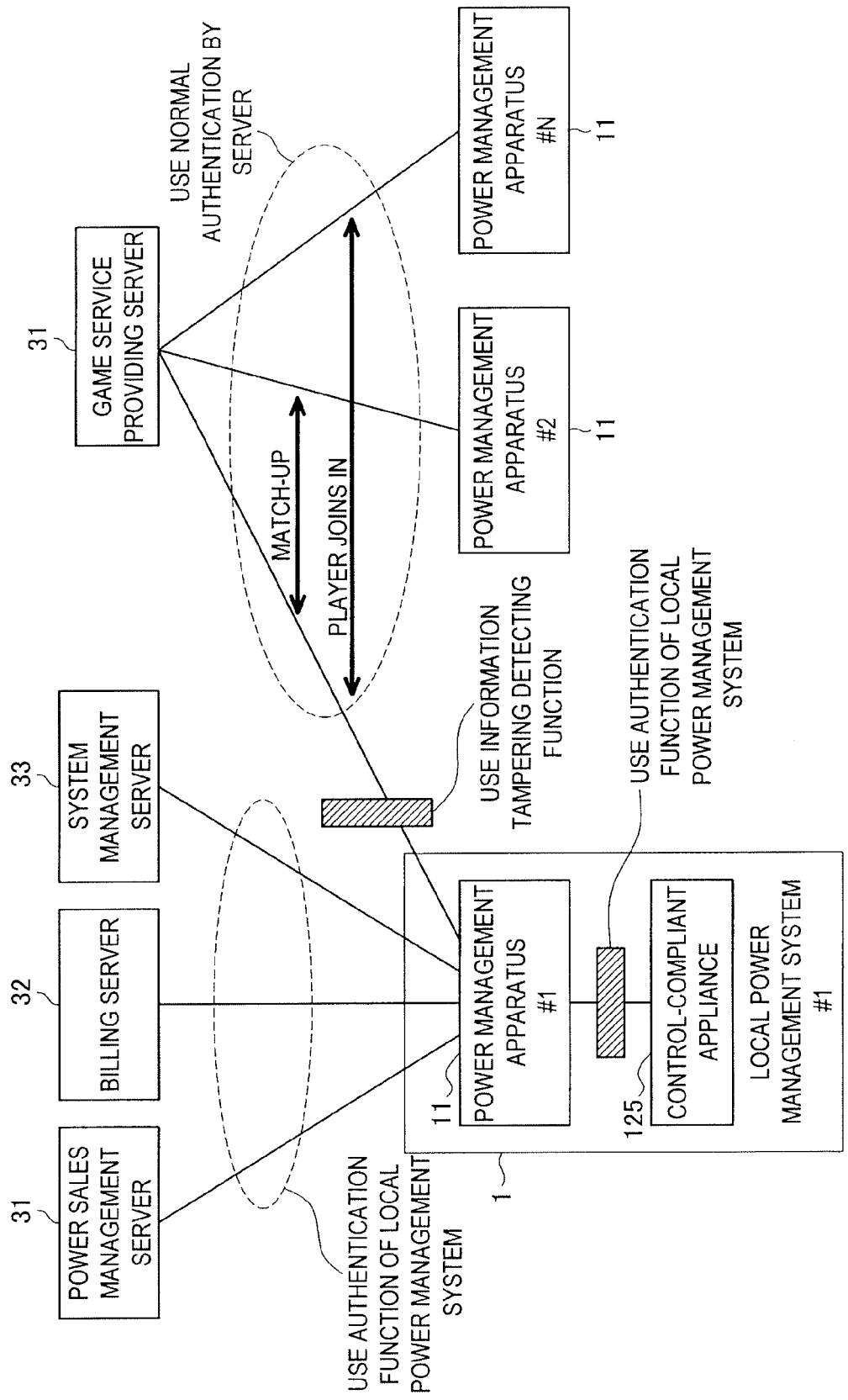
FIG. 79 is a diagram useful in explaining about security for system-linked entertainment.

Next, security for the system-linked entertainment will be described with reference to FIG. 79. FIG. 79 is a diagram useful in explaining security for the system-linked entertainment.

In a system that carries out the present game, it is preferable to pay attention to the following three points regarding security.
(1) There is the risk of a power management apparatus breaking down, of control rights over result application mode being compromised, of confidential information in the power management apparatus being leaked and the like due to participation of an anonymous third party accepted by a game on a power management apparatus or an attack from a malicious third party that uses such connection.
(2) A game on a power management apparatus is executed from a malicious third-party appliance and harmful activity is implemented.
(3) Confidential information (account/billing information and the like) leaks between a power management apparatus and a service providing server (power sales management server) related to selling power.

Security Risk 1

First, when an anonymous third party accepted by a game on a power management apparatus participates, the game is designed so as to limit such participation to a stage composed of only a virtual world, thereby preventing confidential information in the power management apparatus from leaking from the game.

Next, to stop attacks from a malicious third party, it is necessary to prevent the third party from freely controlling the power management apparatus. To do so, by installing virus removing software into the power management apparatus, third-party attacks are detected and/or removed. Further protection against attacks is provided by using an electronic watermark to prevent the power management apparatus from being taken over and by using the analysis server 34 to detect suspicious repeated attacks and the like from the execution history and prevent execution and/or cut off the connection.

Security Risk 2

Appliances and players check whether a member is a legitimate member who is allowed to play the game. Even if the member is a legitimate member, since it is not preferable for children to engage in activities such as selling power, access to the game itself is divided into levels and settings of whether a member has access rights and/or can implement result application mode are made. When other users are permitted to play, control is carried out to prevent the story from using real world information.

Accordingly, appliances and users are set in advance in the power management apparatus, access levels are assigned, and authentication is carried out for both appliances and users. This authentication can use the same scheme as the methods shown in the first embodiment that use a public key or common key or both. It is also preferable to include an arrangement for implementing authentication at specified intervals in the game. It is also preferable to prevent the database from being accessed while a user without access rights is using the game.

Security Risk 3

It is preferable to implement security measures during the selling of power, not just for the present game. This should not be problematic if authentication of services by the local power management system 1 via the Internet is functioning.

(2-5) Flow of System-Linked Entertainment

Figure 81A:
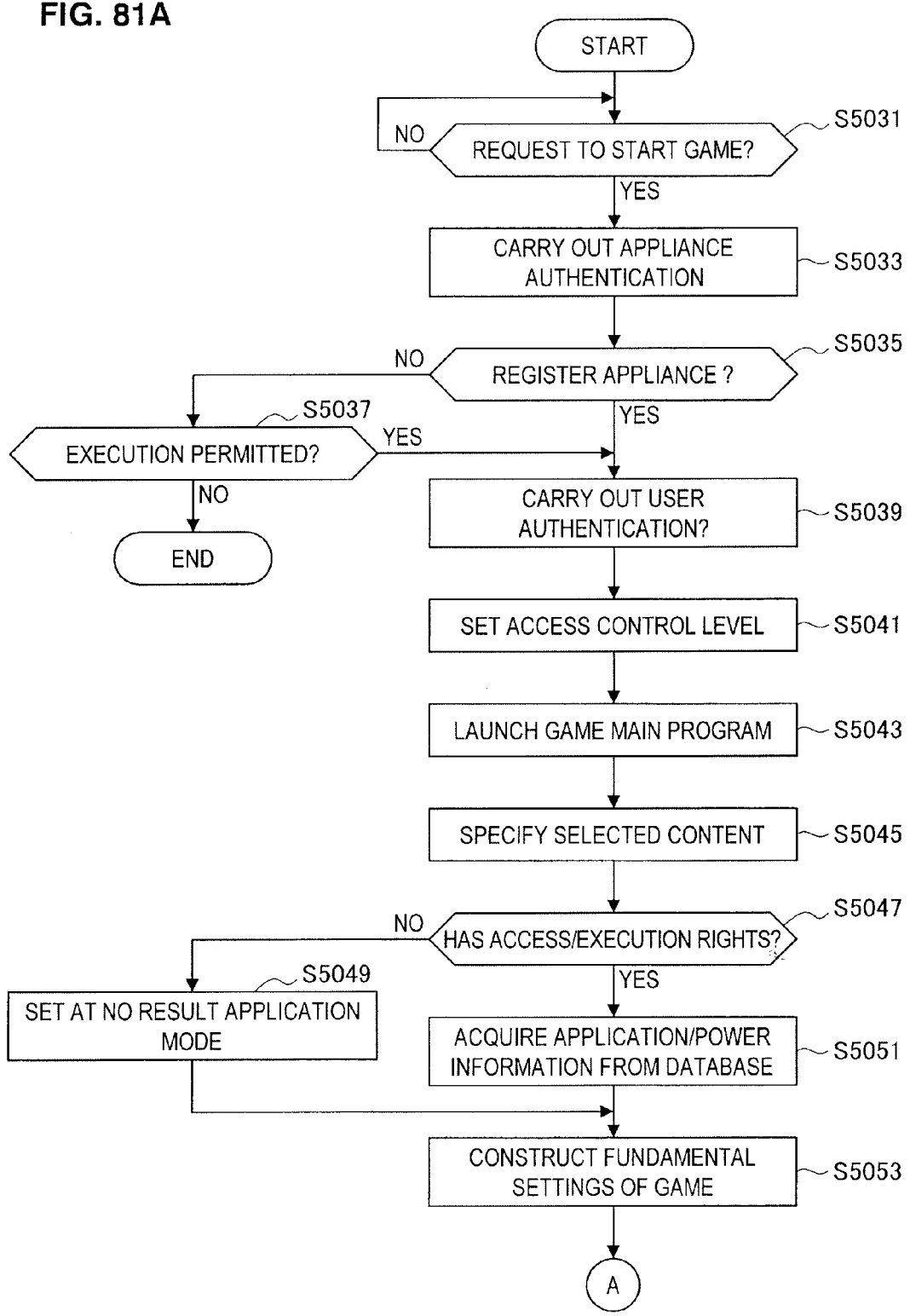
FIG. 81A is a flowchart useful in explaining the flow of system-linked entertainment.
Figure 81B:
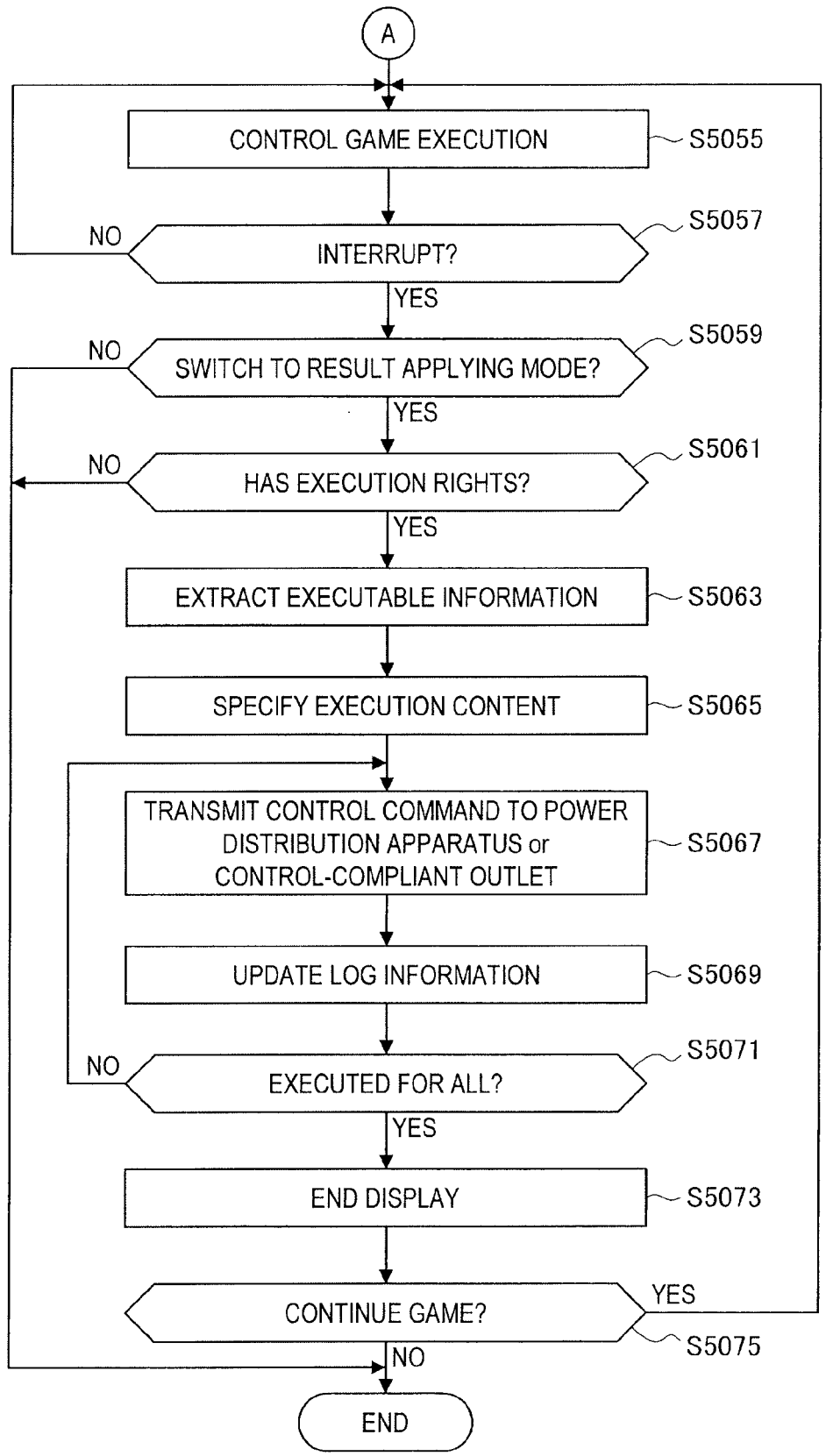
FIG. 81B is a flowchart useful in explaining the flow of system-linked entertainment.

Next, the flow of system-linked entertainment provided by a power management apparatus 11 according to the present embodiment will be described with reference to FIGS. 80 to 81B. FIGS. 80 to 81B are flowcharts useful in explaining the flow of system-linked entertainment. Note that FIGS. 80 to 81B are used to explain a game as one example of system-linked entertainment.

Note that it is assumed that before the following explanation begins, a user who wishes to play a game linked to the local power management system 1 plays the game by operating a display terminal (for example, a display appliance such as a television set, or a portable appliance such as a mobile telephone or a mobile game console) that has a display screen and is capable of connecting to the power management apparatus 11. The appliance used by the user to play the game may also be the power management apparatus 11 itself.

First, the overall flow will be described with reference to FIG. 80.

First, the user turns on the power of a display terminal 125 to activate the terminal itself (step S5001). After activating the terminal, the user selects an object such as an icon for launching the game and thereby requests the power management apparatus 11 to launch the game.

The power management apparatus 11 that has received the request implements a process that authenticates the display terminal to judge whether the display terminal that requested the launching of the game is a managed appliance that is managed by the power management apparatus 11 itself (step S5003). Also, as shown in detail in FIGS. 81A and 81B, since the functions of the game provided to the user will differ depending on whether the display terminal is a managed appliance, the power management apparatus 11 checks the setting information (step S5005) and confirms which functions can be provided. After this, the power management apparatus 11 launches the game program (step S5007) and transmits the necessary data types to the display terminal.

The display terminal receives the data types transmitted from the power management apparatus 11 and displays an initial screen of the game on a display screen of the display terminal 125 (step S5009). The user selects an object such as an icon that represents a game and is displayed in the initial screen (step S5011) to specify a game content that the user wishes to play. Here, the games displayed on the display screen are games that the user is permitted to execute out of the games stored in the contents library 1709 or the like.

The user operates an input apparatus (a mouse, keyboard, touch panel, or the like) of the display terminal 125 to start the game (step S5013). In accordance with the progress of the game on the display terminal, the power management apparatus 11 loads individual data, prepares data, and/or stores a game content (step S5015).

There are cases where at an arbitrary time during the game, the user requests a start of result application mode where game results are applied to the actual system (step S5017).

The power management apparatus 11 that has received the request checks whether execution of result application mode is possible by the user who made the start request for result application mode (step S5019). After checking the setting information and the like to check the access rights and execution rights of the user and thereby confirm the execution risk (step S5020), the power management apparatus 11 presents the range of executable actions out of result application mode to the display terminal (step S5021).

At the display terminal, the content presented from the power management apparatus 11 is displayed on the display screen and the user is invited to select the execution content (step S5023). The display terminal informs the power management apparatus 11 of the content of the user's selection.

In accordance with the selection result of the user, the power management apparatus 11 issues a suitable execution instruction for the selection result to the power distribution apparatus in accordance with the selection result of the user (step S5025). The power management apparatus 11 updates the log information (step S5027) and informs the user that the execution of result application mode has ended (step S5029).

Next, the detailed flow of the system-linked entertainment will be described with reference to FIGS. 81A and 81B.

As described earlier, the user operates an appliance that executes the game to launch the game, with the game service providing unit 1181 of the power management apparatus 11 awaiting a start request for the game to be transmitted from the display terminal (step S5031).

When a game start request has been transmitted from the display terminal, the power management apparatus 11 implements appliance authentication of the display terminal that transmitted the game start request (step S5033). By doing so, the power management apparatus 11 is capable of checking whether the display terminal that has requested the start of a game is a managed appliance that is managed by the power management apparatus 11 itself (step S5035).

When the display terminal is not a managed appliance, the game service providing unit 1181 of the power management apparatus 11 checks whether the user of the power management apparatus 11 is permitted to start the game (step S5037) and if the user of the power management apparatus 11 is not permitted to execute the game, the processing ends. When the user of the power management apparatus 11 is permitted to execute the game, the game service providing unit 1181 of the power management apparatus 11 implements step S5039, described below.

Meanwhile, if the display terminal is a managed appliance, or is not a managed appliance but has obtained permission from the user of the power management apparatus 11 to execute the game, the game service providing unit 1181 of the power management apparatus 11 carries out user authentication (step S5039).

If the game service providing unit 1181 of the power management apparatus 11 has confirmed that the user is a member registered in the power management apparatus 11, the access level of the game and a control level for result application mode are set from the level of the control rights of the user (step S5041).

Next, the game service providing unit 1181 of the power management apparatus 11 launches the main program of the game (step S5043) and has an initial display of the game displayed on the display terminal used by the user.

Once the user of the display terminal has selected a game content which the user wishes to play, the selection result is transmitted to the power management apparatus 11 so that the game service providing unit 1181 of the power management apparatus 11 can specify the selected game content (step S5045).

The game service providing unit 1181 of the power management apparatus 11 checks whether the specified content is capable of being accessed by the user of the display terminal and whether result activation mode can be implemented (step S5047).

When the game user does not have access rights or does not have authority to implement result application mode, the game service providing unit 1181 of the power management apparatus 11 makes settings so that access to the database and implementation of result determination mode are not possible while the game is activated (step S5049).

When the game user has access rights and is capable of implementing result application mode, the power management apparatus 11 accesses the database and gathers appliance information and power information of the managed appliances (step S5051).

The game control unit 1701 of the game service providing unit 1181 uses the various information gathered in step S5051 to construct fundamental settings such as the story background of the game (step S5053). When the constructing of the fundamental settings has ended, the game control unit 1701 carries out execution control over the selected game content based on the set story background (step S5055). While this is happening, the power management apparatus 11 and the display terminal communicate interactively, so that the power management apparatus 11 displays game screens on the display of the terminal and information inputted by the user is transmitted from the display terminal. Also during this time, the game control unit 1701 of the power management apparatus 11 judges whether processing that requests an end of the game, suspension of the game, or the like has been made (step S5057).

After a status such as end the game, suspend the game, or the like has been selected by the user, if the game is a content where activation of result application mode is possible, the game service providing unit 1181 of the power management apparatus 11 checks whether the user wishes to switch to result application mode (step S5059).

If the user has selected not to switch to result application mode, the game service providing unit 1181 of the power management apparatus 11 checks whether the game content is to be saved and ends the game program.

Also, when switching to result application mode, the game service providing unit 1181 of the power management apparatus 11 confirms whether the user has execution rights for result application mode (step S5061). If the user does not have execution rights for result application mode, the game service providing unit 1181 of the power management apparatus 11 ends the game program.

When the user has execution rights for result application mode, the game service providing unit 1181 of the power management apparatus 11 extracts control that can be implemented on actual appliances based on the content of the game from activation to the present point (step S5063) and displays a list to the user.

Before displaying the list, the game service providing unit 1181 of the power management apparatus 11 should preferably implement a check for risks. More specifically, the game service providing unit 1181 should enquire to the analysis server 34 to check whether the control is suspicious based on the controllable content and the history thereof, and delete suspicious control from the extracted list mentioned above. By doing so, aside from risks relating to cyber attacks and the like, it is possible to check for risks relating to commands that turn off the power of appliances (for example, a household appliance such as a refrigerator) for which an uninterrupted connection is preferred.

The user of the game selects an item that the user wishes to implement such as "Switch Off Appliance A" from the list displayed on the display screen of the display terminal. The selection result is transmitted to the power management apparatus 11 and the power management apparatus 11 is capable of specifying the item content (step S5065).

After this, in accordance with the user's selection result, the power management apparatus 11 issues an execution instruction in accordance with the selection result to the power distribution apparatus 121, the control-compliant outlet 123, the control-compliant appliance 125, or the like (step S5067). The power management apparatus 11 updates the log information (step S5069) and checks whether all of the control has been carried out (step S5071).

The power management apparatus 11 receives an execution end from the command target appliance and if all of the control has been carried out, displays an end message to the user (step S5073). The power management apparatus 11 checks whether the game is to end or continue (step S5075) and returns to step S5055 when the game continues. Meanwhile, when the game is to end, the power management apparatus 11 ends the game.

By carrying out processing according to the flow described above, the power management apparatus is capable of providing the user with entertainment, such as a game, that is linked to a local power management system. As a result, the system-linked entertainment is capable of actually contributing to reductions in power and $CO_2$ as an attractive application of the local power management system.

Hardware Configuration

Figure 82:
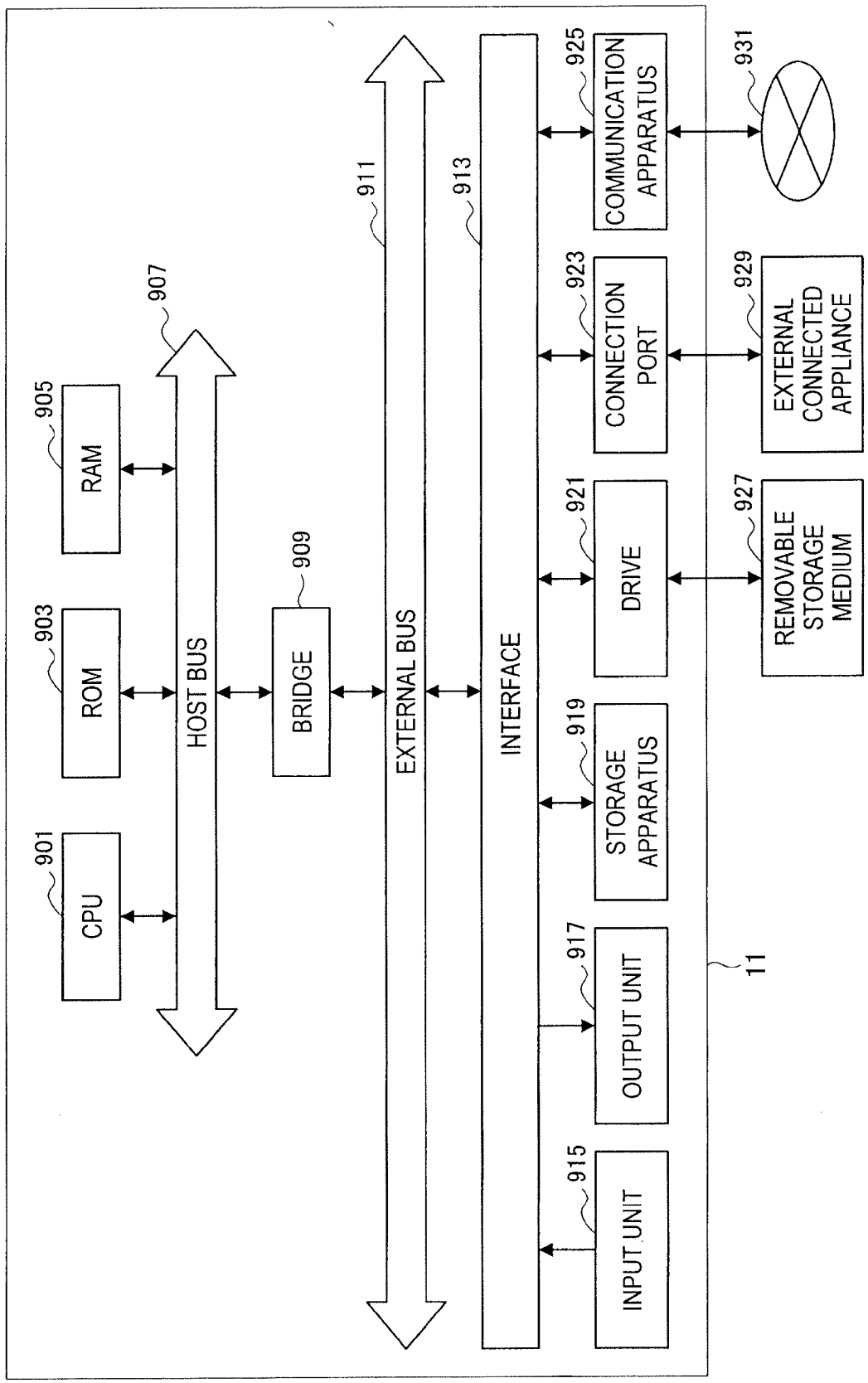
FIG. 82 is a block diagram useful in explaining the hardware configuration of a power management apparatus according to an embodiment of the present invention.

Next, the hardware configuration of the power management apparatus 11 according to the embodiment of the present invention will be described in detail with reference to FIG. 82. FIG. 82 is a block diagram useful in explaining the hardware configuration of the power management apparatus 11 according to the embodiment of the present invention The power management apparatus 11 mainly includes a CPU 901, a ROM 903, and a RAM 905. Furthermore, the power management apparatus 11 also includes a host bus 907, a bridge 909, an external bus 911, an interface 913, an input device 915, an output device 917, a storage device 919, a drive 921, a connection port 923, and a communication device 925.

The CPU 901 serves as an arithmetic processing apparatus and a control device, and controls the overall operation or a part of the operation of the power management apparatus 11 according to various programs recorded in the ROM 903, the RAM 905, the storage device 919, or a removable recording medium 927. The ROM 903 stores programs, operation parameters, and the like used by the CPU 901. The RAM 905 primarily stores programs used in execution of the CPU 901 and parameters and the like varying as appropriate during the execution. These are connected with each other via the host bus 907 configured from an internal bus such as a CPU bus or the like.

The host bus 907 is connected to the external bus 911 such as a PCI (Peripheral Component Interconnect/Interface) bus via the bridge 909.

The input device 915 is operation means operated by a user, such as a mouse, a keyboard, a touch panel, buttons, a switch and a lever. Also, the input device 915 may be remote control means (a so-called remote control) using, for example, infrared light or other radio waves, or may be an externally connected device 929 such as a mobile phone or a PDA conforming to the operation of the power management apparatus 11. Furthermore, the input device 915 generates an input signal based on, for example, information which is input by a user with the above operation means, and is configured from an input control circuit for outputting the input signal to the CPU 901. The user of the power management apparatus 11 can input various data to the power management apparatus 11 and can instruct the power management apparatus 11 to perform processing by operating this input apparatus 915.

The output device 917 is configured from a device capable of visually or audibly notifying acquired information to a user. Examples of such device include display devices such as a CRT display device, a liquid crystal display device, a plasma display device, an EL display device and lamps, audio output devices such as a speaker and a headphone, a printer, a mobile phone, a facsimile machine, and the like. For example, the output device 917 outputs a result obtained by various processings performed by the power management apparatus 11. More specifically, the display device displays, in the form of texts or images, a result obtained by various processes performed by the power management apparatus 11. On the other hand, the audio output device converts an audio signal such as reproduced audio data and sound data into an analog signal, and outputs the analog signal.

The storage device 919 is a device for storing data configured as an example of a storage unit of the power management apparatus 11 and is used to store data. The storage device 919 is configured from, for example, a magnetic storage device such as a HDD (Hard Disk Drive), a semiconductor storage device, an optical storage device, or a magneto-optical storage device. This storage device 919 stores programs to be executed by the CPU 901, various data, and various data obtained from the outside.

The drive 921 is a reader/writer for recording medium, and is embedded in the power management apparatus 11 or attached externally thereto. The drive 921 reads information recorded in the attached removable recording medium 927 such as a magnetic disk, an optical disk, a magneto-optical disk, or a semiconductor memory, and outputs the read information to the RAM 905. Furthermore, the drive 921 can write in the attached removable recording medium 927 such as a magnetic disk, an optical disk, a magneto-optical disk, or a semiconductor memory. The removable recording medium 927 is, for example, a DVD medium, an HD-DVD medium, or a Blu-ray medium. The removable recording medium 927 may be a CompactFlash (CF; registered trademark), a flash memory, an SD memory card (Secure Digital Memory Card), or the like. Alternatively, the removable recording medium 927 may be, for example, an IC card (Integrated Circuit Card) equipped with a non-contact IC chip or an electronic appliance.

The connection port 923 is a port for allowing devices to directly connect to the power management apparatus 11. Examples of the connection port 923 include a USB (Universal Serial Bus) port, an IEEE1394 port, a SCSI (Small Computer System Interface) port, and the like. Other examples of the connection port 923 include an RS-232C port, an optical audio terminal, an HDMI (High-Definition Multimedia Interface) port, and the like. By the externally connected apparatus 929 connecting to this connection port 923, the power management apparatus 11 directly obtains various data from the externally connected apparatus 929 and provides various data to the externally connected apparatus 929.

The communication device 925 is a communication interface configured from, for example, a communication device for connecting to a communication network 931. The communication device 925 is, for example, a wired or wireless LAN (Local Area Network), Bluetooth (registered trademark), a communication card for WUSB (Wireless USB), or the like. Alternatively, the communication device 925 may be a router for optical communication, a router for ADSL (Asymmetric Digital Subscriber Line), a modem for various communications, or the like. This communication device 925 can transmit and receive signals and the like in accordance with a predetermined protocol such as TCP/IP on the Internet and with other communication devices, for example. The communication network 931 connected to the communication device 925 is configured from a network and the like, which is connected via wire or wirelessly, and may be, for example, the Internet, a home LAN, infrared communication, radio wave communication, satellite communication, or the like.

Heretofore, an example of the hardware configuration capable of realizing the functions of the power management apparatus 11 according to the embodiment of the present invention has been shown. Each of the structural elements described above may be configured using a general-purpose material, or may be configured from hardware dedicated to the function of each structural element. Accordingly, the hardware configuration to be used can be changed as appropriate according to the technical level at the time of carrying out the present embodiment.

Since the hardware configurations of the control-compliant appliance 125 and the analysis server 34 according to the present embodiment of the invention are the same as the configuration of the power management apparatus 11 according to the present embodiment of the invention, detailed description thereof is omitted.

Although preferred embodiments of the present invention have been described in detail with reference to the attached drawings, the present invention is not limited to the above examples. It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2010-013677 filed in the Japan Patent Office on Jan. 25, 2010, the entire content of which is hereby incorporated by reference.

What is claimed is:

1. A power management apparatus comprising:
a managed appliance registering unit carrying out authentication on an electronic appliance connected to a power network and registering an electronic appliance for which the authentication has succeeded as a managed appliance;
a managed appliance information acquiring unit acquiring from the managed appliance, as managed appliance information, at least any of appliance information including identification information that is unique to the electronic appliance, information indicating an operation state of the electronic appliance, information indicating an usage state of the electronic appliance and power information of the electronic appliance;
a database storing the managed appliance information; and
a game service providing unit providing, to the electronic appliance, a service using game contents whose theme is power,
wherein the game service providing unit includes
a game controlling execution of the game contents,
a real world constructing unit constructing a setting of a game reflecting a real-world environment, based on the managed appliance information stored in the database, and
a virtual world constructing unit constructing a setting of the game reflecting a virtual environment based on a setting set in advance in the game contents, and
wherein the control unit is operable to initialize the game contents by combining the setting of the same constructed b the real world constructing unit and the setting of the game constructed by the virtual world constructing unit, and
wherein position information indicating a location of the electronic appliance is described in the database, and
wherein the real world constructing unit is operable to arrange an object corresponding to the electronic appliance registered as the managed appliance in a game stage based on the position information.

2. The power management apparatus according to claim 1, wherein the game control unit is operable, when an object corresponding to the electronic appliance is selected, to display on a display screen on which the game contents are displayed any of the appliance information of the electronic appliance corresponding to the selected object, the information indicating an operation state, the information indicating an usage state and the power information.

3. The power management apparatus according to claim 2, further comprising:
a control unit controlling operation of the managed appliance and supplying of power to the managed appliance,
wherein a result application mode of applying a game result of the game contents to the electronic appliance in a real world is set in the game contents, and
wherein the control unit is operable, when there is a notification from the game control unit indicating that the result application mode is carried out, to reflect a result of the game to an actual electronic appliance.

4. The power management apparatus according to claim 1, wherein the game service providing unit provides the service using game contents while acting in concert with a game service providing server provided outside the power management apparatus.

5. A method of providing game contents, comprising the steps of:
carrying out authentication on an electronic appliance connected to a power network and registering an electronic appliance for which the authentication has succeeded as a managed appliance;
acquiring, from the managed appliance, as managed appliance information, at least any of appliance information including identification information that is unique to the electronic appliance, information indicating an operation state of the electronic appliance, information indicating an usage state of the electronic appliance and power information of the electronic appliance; and
providing, to the electronic appliance, a service using game contents whose theme is power,
wherein the step of providing further includes the steps of
constructing a setting of a game reflecting a real-world environment by referring to a database in which the managed appliance information is stored, and
constructing a setting of the game reflecting a virtual environment, based on setting set in advance in the game contents, and wherein the game contents are initialized by combining the setting of the game constructed in the step of constructing a setting of a game reflecting a real-world environment and the setting of the game constructed in the step of constructing a setting of the game reflecting a virtual environment, and wherein the real-world environment is a simulation of a physical environment surrounding the electronic appliance.

6. The power management apparatus according to claim 5, wherein the real-world environment includes an object corresponding to the electronic appliance.

7. The power management apparatus according to claim 6, wherein a change to the object in the real-world environment causes a change in the electronic appliance in the physical environment.

8. The power management apparatus according to claim 6, wherein the game service providing unit receives a selection of the object from a user and displays at least a portion of the managed appliance information based on the selection.

* * * * *